United States Patent
Gallagher et al.

(10) Patent No.: US 7,852,817 B2
(45) Date of Patent: Dec. 14, 2010

(54) GENERIC ACCESS TO THE IU INTERFACE

(75) Inventors: Michael D. Gallagher, San Jose, CA (US); Milan Markovic, Pleasanton, CA (US); Patrick Tao, San Jose, CA (US); Amit Khetawat, San Jose, CA (US)

(73) Assignee: Kineto Wireless, Inc., Milpitas, CA (US)

( * ) Notice: Subject to any disclaimer, the term of this patent is extended or adjusted under 35 U.S.C. 154(b) by 0 days.

(21) Appl. No.: 11/778,043

(22) Filed: Jul. 14, 2007

(65) Prior Publication Data

US 2008/0039087 A1 Feb. 14, 2008

Related U.S. Application Data

(60) Provisional application No. 60/807,470, filed on Jul. 14, 2006, provisional application No. 60/823,092, filed on Aug. 21, 2006, provisional application No. 60/862,564, filed on Oct. 23, 2006, provisional application No. 60/949,826, filed on Jul. 13, 2007.

(51) Int. Cl.
*H04W 4/00* (2009.01)

(52) U.S. Cl. .................. 370/338; 370/351; 370/401; 455/445; 455/552.1

(58) Field of Classification Search .................. None
See application file for complete search history.

(56) References Cited

U.S. PATENT DOCUMENTS 5,014,197 A 5/1991 Wolf
5,101,501 A 3/1992 Gilhousen et al.
5,109,528 A 4/1992 Uddenfeldt
5,226,045 A 7/1993 Chuang
5,235,632 A 8/1993 Raith (Continued)

FOREIGN PATENT DOCUMENTS

EP 0936777 8/1999

(Continued)

OTHER PUBLICATIONS

Non-Final Office Action of U.S. Appl. No. 10/116,311, filed Feb. 9, 2006, Mohammed, Jahangir.

(Continued)

*Primary Examiner*—Lester Kincaid
*Assistant Examiner*—Mehmood B Khan
(74) *Attorney, Agent, or Firm*—Adell & Tollen LLP

(57) ABSTRACT

Some embodiments provide a communication system that includes a first licensed wireless communication system, a second generic access network (GAN) that includes a generic access network controller (GANC). The GANC is communicatively coupled to the first communication system through a universal mobile telecommunication system (UMTS) terrestrial radio access network (UTRAN) Iu interface. The communication system also includes a user equipment (UE). The GANC includes a UDP protocol layer and a GTP-U protocol layer over the UDP protocol layer of the GANC. The UE includes a UDP protocol layer and a GTP-U protocol layer over said UDP protocol layer of the UE. The UDP protocol layer of the GANC is communicatively coupled to the UDP protocol layer of the UE. The GTP-U protocol layer of the GANC is communicatively coupled to the GTP-U protocol layer of the UE.

23 Claims, 81 Drawing Sheets

U.S. PATENT DOCUMENTS

| | | |
|---|---|---|
| 5,260,944 A | 11/1993 | Tomabechi |
| 5,260,988 A | 11/1993 | Schellinger |
| 5,267,261 A | 11/1993 | Blakeney |
| 5,367,558 A | 11/1994 | Gillig |
| 5,390,233 A | 2/1995 | Jensen |
| 5,392,331 A | 2/1995 | Patsiokas |
| 5,406,615 A | 4/1995 | Miller, II et al. |
| 5,428,601 A | 6/1995 | Owen |
| 5,442,680 A | 8/1995 | Schellinger |
| 5,448,619 A | 9/1995 | Evans et al. |
| 5,507,035 A | 4/1996 | Bantz |
| 5,533,027 A | 7/1996 | Akerberg et al. |
| 5,594,782 A | 1/1997 | Zicker et al. |
| 5,610,969 A | 3/1997 | McHenry |
| 5,634,193 A | 5/1997 | Ghisler |
| 5,640,414 A | 6/1997 | Blakeney |
| 5,659,598 A | 8/1997 | Byrne et al. |
| 5,659,878 A | 8/1997 | Uchida et al. |
| 5,664,005 A | 9/1997 | Emery |
| 5,673,307 A | 9/1997 | Holland |
| 5,675,629 A | 10/1997 | Raffel |
| 5,724,658 A | 3/1998 | Hasan |
| 5,732,076 A | 3/1998 | Ketseoglou |
| 5,745,852 A | 4/1998 | Khan |
| 5,758,281 A | 5/1998 | Emery |
| 5,796,727 A | 8/1998 | Harrison |
| 5,815,525 A | 9/1998 | Smith et al. |
| 5,818,820 A | 10/1998 | Anderson |
| 5,822,681 A | 10/1998 | Chang et al. |
| 5,822,767 A | 10/1998 | MacWilliams et al. |
| 5,825,759 A | 10/1998 | Liu |
| 5,852,767 A | 12/1998 | Sugita |
| 5,870,677 A | 2/1999 | Takahashi et al. |
| 5,887,020 A | 3/1999 | Smith |
| 5,887,260 A | 3/1999 | Nakata |
| 5,890,055 A | 3/1999 | Chu |
| 5,890,064 A | 3/1999 | Widergen |
| 5,903,834 A | 5/1999 | Wallstedt |
| 5,915,224 A | 6/1999 | Jonsson |
| 5,926,760 A | 7/1999 | Khan |
| 5,796,729 A | 8/1999 | Greaney |
| 5,936,949 A | 8/1999 | Pasternak |
| 5,940,512 A | 8/1999 | Tomoike |
| 5,946,622 A | 8/1999 | Bojeryd |
| 5,949,773 A | 9/1999 | Bhalla et al. |
| 5,960,341 A | 9/1999 | LeBlanc et al. |
| 5,995,828 A | 11/1999 | Nishida |
| 6,016,318 A | 1/2000 | Tomoike |
| 6,035,193 A | 3/2000 | Buhrmann |
| 6,052,592 A | 4/2000 | Schellinger |
| 6,101,176 A | 8/2000 | Honkasalo et al. |
| 6,112,080 A | 8/2000 | Anderson |
| 6,112,088 A | 8/2000 | Haartsen |
| 6,119,000 A | 9/2000 | Stephenson et al. |
| 6,130,886 A | 10/2000 | Ketseoglou |
| 6,134,227 A | 10/2000 | Magana |
| 6,138,019 A | 10/2000 | Trompower |
| 6,167,279 A | 12/2000 | Chang et al. |
| 6,226,515 B1 | 5/2001 | Pauli et al. |
| 6,236,852 B1 | 5/2001 | Veerasamy et al. |
| 6,243,581 B1 | 6/2001 | Jawanda |
| 6,256,511 B1 | 7/2001 | Brown et al. |
| 6,263,211 B1 | 7/2001 | Brunner |
| 6,269,086 B1 | 7/2001 | Magana |
| 6,320,873 B1 | 11/2001 | Nevo |
| 6,327,470 B1 | 12/2001 | Ostling |
| 6,359,872 B1 | 3/2002 | Mahany et al. |
| 6,374,102 B1 | 4/2002 | Brachman |
| 6,381,457 B1 | 4/2002 | Carlsson et al. |
| 6,389,059 B1 | 5/2002 | Smith et al. |
| 6,393,007 B1 | 5/2002 | Haartsen |
| 6,415,158 B1 | 7/2002 | King |
| 6,430,395 B2 | 8/2002 | Arazi et al. |
| 6,434,389 B1 | 8/2002 | Meskanen et al. |
| 6,445,921 B1 | 9/2002 | Bell |
| 6,463,307 B1 | 10/2002 | Larsson et al. |
| 6,539,237 B1 | 3/2003 | Sayers et al. |
| 6,542,516 B1 | 4/2003 | Vialen et al. |
| 6,553,219 B1 | 4/2003 | Vilander et al. |
| 6,556,822 B1 | 4/2003 | Matsumoto |
| 6,556,825 B1 | 4/2003 | Mansfield |
| 6,556,830 B1 | 4/2003 | Lenzo |
| 6,574,266 B1 | 6/2003 | Haartsen |
| 6,587,444 B1 | 7/2003 | Lenzo |
| 6,633,761 B1 | 10/2003 | Singhal |
| 6,643,512 B1 | 11/2003 | Ramaswamy |
| 6,647,426 B2 | 11/2003 | Mohammed |
| 6,658,250 B1 | 12/2003 | Ganesan |
| 6,665,276 B1 | 12/2003 | Culbertson |
| 6,675,009 B1 | 1/2004 | Cook |
| 6,680,923 B1 | 1/2004 | Leon |
| 6,711,400 B1 | 3/2004 | Aura |
| 6,766,160 B1 | 7/2004 | Lemilainen et al. |
| 6,785,535 B2 | 8/2004 | Lucidarme et al. |
| 6,788,656 B1 | 9/2004 | Smolentzov |
| 6,801,519 B1 | 10/2004 | Mangal |
| 6,801,772 B1 | 10/2004 | Townend et al. |
| 6,801,777 B2 | 10/2004 | Rusch |
| 6,807,417 B2 | 10/2004 | Sallinen et al. |
| 6,823,154 B2 | 11/2004 | Koga et al. |
| 6,824,048 B1 | 11/2004 | Itabashi |
| 6,826,154 B2 | 11/2004 | Subbiah et al. |
| 6,829,227 B1 | 12/2004 | Pitt |
| 6,842,462 B1 | 1/2005 | Ramjee et al. |
| 6,842,621 B2 | 1/2005 | Labun et al. |
| 6,845,095 B2 | 1/2005 | Krishnarajah et al. |
| 6,850,503 B2 | 2/2005 | Dorenbosch et al. |
| 6,853,851 B1 | 2/2005 | Rautiola et al. |
| 6,895,255 B1 | 5/2005 | Bridgelall |
| 6,909,705 B1 | 6/2005 | Lee et al. |
| 6,922,559 B2 | 7/2005 | Mohammed |
| 6,925,074 B1 | 8/2005 | Vikberg et al. |
| 6,937,862 B2 | 8/2005 | Back et al. |
| 6,970,719 B1 | 11/2005 | McConnell et al. |
| 6,993,359 B1 | 1/2006 | Nelakanti |
| 7,009,952 B1 | 3/2006 | Razavilar et al. |
| 7,028,186 B1 | 4/2006 | Stenman et al. |
| 7,039,025 B1 | 5/2006 | Menon et al. |
| 7,065,353 B1 | 6/2006 | Bolinth et al. |
| 7,069,022 B2 | 6/2006 | Rajaniemi et al. |
| 7,099,339 B1 | 8/2006 | Wang et al. |
| 7,107,055 B2 | 9/2006 | Gallagher et al. |
| 7,127,250 B2 | 10/2006 | Gallagher et al. |
| 7,171,205 B2 | 1/2007 | Gallagher et al. |
| 7,197,309 B2 | 3/2007 | Gallagher et al. |
| 7,200,112 B2 | 4/2007 | Sundar et al. |
| 7,200,383 B2 | 4/2007 | Eronen |
| 7,200,399 B2 | 4/2007 | Gallagher et al. |
| 7,209,744 B2 | 4/2007 | Gallagher et al. |
| 7,212,819 B2 | 5/2007 | Gallagher et al. |
| 7,215,961 B2 | 5/2007 | Gallagher et al. |
| 7,245,916 B2 | 7/2007 | Gallagher et al. |
| 7,251,227 B2 | 7/2007 | de Jong et al. |
| 7,272,397 B2 | 9/2007 | Gallagher et al. |
| 7,283,821 B2 | 10/2007 | Gallagher et al. |
| 7,283,822 B2 | 10/2007 | Gallagher et al. |
| 7,308,263 B2 | 12/2007 | Gallagher et al. |
| 7,324,818 B2 | 1/2008 | Gallagher et al. |
| 7,349,698 B2 | 3/2008 | Gallagher et al. |
| 7,369,854 B2 | 5/2008 | Gallagher et al. |
| 7,369,859 B2 | 5/2008 | Gallagher |
| 7,454,207 B2 | 11/2008 | Glllagher et al. |
| 7,606,190 B2 | 10/2009 | Markovic et al. |
| 7,640,036 B2 | 12/2009 | Kallio |

| | | |
|---|---|---|
| 2001/0029186 A1 | 10/2001 | Canyon et al. |
| 2001/0031645 A1 | 10/2001 | Jarrett |
| 2001/0046860 A1 | 11/2001 | Lee |
| 2001/0049790 A1 | 12/2001 | Faccin et al. |
| 2002/0032030 A1 | 3/2002 | Berglund et al. |
| 2002/0045459 A1 | 4/2002 | Morikawa |
| 2002/0059516 A1 | 5/2002 | Turtiainen et al. |
| 2002/0065099 A1 | 5/2002 | Bjorndahl |
| 2002/0066036 A1 | 5/2002 | Makineni |
| 2002/0075844 A1 | 6/2002 | Hagen |
| 2002/0080797 A1 | 6/2002 | Kim |
| 2002/0082015 A1 | 6/2002 | Wu |
| 2002/0085516 A1 | 7/2002 | Bridgelall |
| 2002/0101848 A1 | 8/2002 | Lee et al. |
| 2002/0102974 A1 | 8/2002 | Raith |
| 2002/0118674 A1 | 8/2002 | Faccin et al. |
| 2002/0131387 A1 | 9/2002 | Pitcher et al. |
| 2002/0131396 A1 | 9/2002 | Knuutila et al. |
| 2002/0132630 A1 | 9/2002 | Arazi et al. |
| 2002/0142761 A1 | 10/2002 | Wallstedt et al. |
| 2002/0147008 A1 | 10/2002 | Kallio |
| 2002/0147016 A1 | 10/2002 | Arazi et al. |
| 2002/0155829 A1 | 10/2002 | Proctor, Jr. et al. |
| 2002/0160811 A1 | 10/2002 | Jannette et al. |
| 2002/0161905 A1 | 10/2002 | Haverinen et al. |
| 2002/0166068 A1 | 11/2002 | Kilgore |
| 2002/0174335 A1 | 11/2002 | Zhang et al. |
| 2002/0191556 A1 | 12/2002 | Krishnarajah et al. |
| 2002/0191575 A1 | 12/2002 | Kalavade et al. |
| 2002/0197984 A1 | 12/2002 | Monin et al. |
| 2003/0007475 A1 | 1/2003 | Tsuda et al. |
| 2003/0026269 A1 | 2/2003 | Paryani |
| 2003/0031151 A1 | 2/2003 | Sharma et al. |
| 2003/0043773 A1 | 3/2003 | Chang |
| 2003/0058816 A1 | 3/2003 | Shearer |
| 2003/0087653 A1 | 5/2003 | Leung |
| 2003/0112789 A1 | 6/2003 | Heinonen et al. |
| 2003/0119480 A1 | 6/2003 | Mohammed |
| 2003/0119490 A1 | 6/2003 | Mohammed |
| 2003/0119527 A1 | 6/2003 | Labun et al. |
| 2003/0119548 A1 | 6/2003 | Mohammed |
| 2003/0130008 A1 | 7/2003 | Rajaniemi et al. |
| 2003/0139180 A1 | 7/2003 | McIntosh et al. |
| 2003/0142673 A1 | 7/2003 | Patil et al. |
| 2003/0172264 A1 | 9/2003 | Dillon |
| 2003/0176186 A1 | 9/2003 | Mohammed |
| 2003/0193952 A1 | 10/2003 | O'Neill |
| 2003/0210199 A1 | 11/2003 | Sward et al. |
| 2003/0217132 A1 | 11/2003 | Batten et al. |
| 2003/0219022 A1 | 11/2003 | Dillon et al. |
| 2003/0219024 A1 | 11/2003 | Purnadi et al. |
| 2003/0224820 A1 | 12/2003 | Einola et al. |
| 2003/0227940 A1* | 12/2003 | Fiat ............................ 370/466 |
| 2003/0235186 A1 | 12/2003 | Park |
| 2004/0008649 A1 | 1/2004 | Wybenga et al. |
| 2004/0009749 A1 | 1/2004 | Arazi et al. |
| 2004/0013099 A1 | 1/2004 | O'Neill |
| 2004/0025018 A1 | 2/2004 | Haas |
| 2004/0037312 A1 | 2/2004 | Spear |
| 2004/0053623 A1 | 3/2004 | Hoff et al. |
| 2004/0063451 A1 | 4/2004 | Bonta et al. |
| 2004/0068571 A1 | 4/2004 | Ahmavaara |
| 2004/0072593 A1 | 4/2004 | Robbins et al. |
| 2004/0077355 A1 | 4/2004 | Krenik et al. |
| 2004/0077356 A1 | 4/2004 | Krenik et al. |
| 2004/0077374 A1 | 4/2004 | Terry |
| 2004/0087307 A1 | 5/2004 | Ibe et al. |
| 2004/0087319 A1 | 5/2004 | Bos et al. |
| 2004/0147223 A1 | 7/2004 | Cho |
| 2004/0171378 A1 | 9/2004 | Rautila |
| 2004/0202132 A1 | 10/2004 | Heinonen et al. |
| 2004/0203346 A1 | 10/2004 | Myhre et al. |
| 2004/0203737 A1 | 10/2004 | Myhre et al. |
| 2004/0203800 A1 | 10/2004 | Myhre et al. |
| 2004/0203815 A1 | 10/2004 | Shoemake et al. |
| 2004/0240525 A1 | 12/2004 | Karabinis et al. |
| 2005/0002407 A1 | 1/2005 | Shaheen et al. |
| 2005/0041787 A1 | 2/2005 | Casey et al. |
| 2005/0064896 A1 | 3/2005 | Rautiola et al. |
| 2005/0101245 A1 | 5/2005 | Ahmavaara |
| 2005/0101329 A1 | 5/2005 | Gallagher |
| 2005/0111409 A1 | 5/2005 | Spear et al. |
| 2005/0130659 A1 | 6/2005 | Grech et al. |
| 2005/0144647 A1 | 6/2005 | Zussman et al. |
| 2005/0186948 A1 | 8/2005 | Gallagher et al. |
| 2005/0198199 A1 | 9/2005 | Dowling |
| 2005/0198306 A1 | 9/2005 | Palojarvi et al. |
| 2005/0207395 A1 | 9/2005 | Mohammed |
| 2005/0239441 A1 | 10/2005 | Eronen |
| 2005/0250522 A1 | 11/2005 | Gilbert |
| 2005/0255879 A1 | 11/2005 | Shi et al. |
| 2005/0265279 A1 | 12/2005 | Markovic et al. |
| 2005/0266853 A1 | 12/2005 | Gallagher et al. |
| 2005/0271008 A1 | 12/2005 | Gallagher et al. |
| 2005/0272425 A1 | 12/2005 | Amerga et al. |
| 2005/0272449 A1 | 12/2005 | Gallagher et al. |
| 2006/0009202 A1 | 1/2006 | Gallagher et al. |
| 2006/0019657 A1 | 1/2006 | Gallagher et al. |
| 2006/0019658 A1 | 1/2006 | Gallagher et al. |
| 2006/0019667 A1 | 1/2006 | Hicks, III |
| 2006/0050667 A1 | 3/2006 | Verma et al. |
| 2006/0075073 A1 | 4/2006 | Bichot |
| 2006/0094431 A1 | 5/2006 | Saifullah et al. |
| 2006/0098598 A1 | 5/2006 | Gallagher et al. |
| 2006/0099935 A1 | 5/2006 | Gallagher et al. |
| 2006/0111113 A1 | 5/2006 | Waris |
| 2006/0114871 A1 | 6/2006 | Buckley et al. |
| 2006/0116125 A1 | 6/2006 | Buckley et al. |
| 2006/0133393 A1 | 6/2006 | Yun |
| 2006/0146803 A1 | 7/2006 | Bae et al. |
| 2006/0179474 A1* | 8/2006 | Bichot ............................ 726/3 |
| 2006/0183482 A1 | 8/2006 | Ueda |
| 2006/0223532 A1 | 10/2006 | Liu et al. |
| 2006/0239277 A1 | 10/2006 | Gallagher et al. |
| 2006/0262778 A1* | 11/2006 | Haumont et al. ............ 370/356 |
| 2006/0268845 A1 | 11/2006 | He et al. |
| 2006/0286981 A1 | 12/2006 | Summaki et al. |
| 2007/0019600 A1 | 1/2007 | Zhang |
| 2007/0041360 A1 | 2/2007 | Gallagher et al. |
| 2007/0243872 A1 | 10/2007 | Gallagher et al. |
| 2007/0259673 A1 | 11/2007 | Willars et al. |
| 2007/0268855 A1* | 11/2007 | Grayson et al. ............. 370/328 |
| 2007/0287459 A1 | 12/2007 | Diachina et al. |
| 2007/0293222 A1 | 12/2007 | Vikberg et al. |
| 2008/0039086 A1 | 2/2008 | Gallagher et al. |
| 2008/0043669 A1 | 2/2008 | Gallagher et al. |
| 2008/0076386 A1 | 3/2008 | Khetawat et al. |
| 2008/0076392 A1 | 3/2008 | Khetawat et al. |
| 2008/0076393 A1 | 3/2008 | Khetawat et al. |
| 2008/0076411 A1 | 3/2008 | Khetawat et al. |
| 2008/0076412 A1 | 3/2008 | Khetawat et al. |
| 2008/0076419 A1 | 3/2008 | Khetawat et al. |
| 2008/0076420 A1 | 3/2008 | Khetawat et al. |
| 2008/0076425 A1 | 3/2008 | Khetawat et al. |
| 2008/0102794 A1 | 5/2008 | Keevil et al. |
| 2008/0117841 A1* | 5/2008 | Chen ............................ 370/310 |
| 2008/0123596 A1 | 5/2008 | Gallagher et al. |
| 2008/0125120 A1 | 5/2008 | Gallagher et al. |
| 2008/0130564 A1 | 6/2008 | Gallagher et al. |
| 2008/0130568 A1 | 6/2008 | Gallagher et al. |
| 2008/0132224 A1 | 6/2008 | Gallagher et al. |
| 2008/0132239 A1 | 6/2008 | Khetawat et al. |
| 2008/0137612 A1 | 6/2008 | Gallagher et al. |
| 2008/0165725 A1 | 7/2008 | Huomo et al. |
| 2008/0181204 A1 | 7/2008 | Gallagher et al. |
| 2008/0207170 A1 | 8/2008 | Khetawat et al. |

| | | | |
|---|---|---|---|
| 2008/0261596 | A1 | 10/2008 | Khetawat et al. |
| 2008/0299976 | A1 | 12/2008 | Gallagher et al. |
| 2008/0299977 | A1 | 12/2008 | Gallagher et al. |
| 2008/0305793 | A1 | 12/2008 | Gallagher et al. |

FOREIGN PATENT DOCUMENTS

| | | |
|---|---|---|
| EP | 1207708 | 5/2002 |
| EP | 1703673 A1 | 9/2006 |
| EP | 2044715 | 4/2009 |
| GB | 2282735 | 4/1995 |
| GB | 2428937 | 2/2007 |
| GB | 2428942 | 2/2007 |
| GB | 2430120 | 3/2007 |
| GB | 2430121 | 3/2007 |
| GB | 2430839 | 4/2007 |
| GB | 2432082 | 5/2007 |
| WO | WO 92/04796 | 3/1992 |
| WO | WO 97/24004 | 3/1997 |
| WO | WO 99/48312 | 9/1999 |
| WO | WO 99/48315 | 9/1999 |
| WO | WO 00/28762 | 5/2000 |
| WO | WO 00/51387 | 8/2000 |
| WO | WO 02/45456 | 6/2002 |
| WO | WO 03/039009 | 5/2003 |
| WO | WO 03/092312 | 11/2003 |
| WO | WO 2004/002051 | 12/2003 |
| WO | WO 2004/034219 | 4/2004 |
| WO | WO 2004/034219 A2 | 4/2004 |
| WO | WO 2004/036770 | 4/2004 |
| WO | WO 2004/039111 | 5/2004 |
| WO | WO 2005/006597 | 1/2005 |
| WO | WO 2005/069546 A1 | 7/2005 |
| WO | WO 2005/107169 | 11/2005 |
| WO | WO 2005/107297 | 11/2005 |
| WO | WO 2005/114918 | 12/2005 |
| WO | WO 2005/114920 | 12/2005 |
| WO | WO 2006/053102 | 5/2006 |
| WO | WO 2007/015066 | 2/2007 |
| WO | WO 2007/015067 | 2/2007 |
| WO | WO 2007/015068 | 2/2007 |
| WO | WO 2007/015071 | 2/2007 |
| WO | WO 2007/015075 | 2/2007 |
| WO | WO 2008/009016 | 1/2008 |
| WO | WO 2008/036961 | 3/2008 |
| WO | WO 2008/055251 | 5/2008 |
| WO | PCT/US2008/072542 | 8/2008 |
| WO | PCT/US2008/076913 | 9/2008 |
| WO | WO 2008/106360 | 9/2008 |

OTHER PUBLICATIONS

Non-Final Office Action of U.S. Appl. No. 10/115,767, filed Dec. 22, 2005, Mohammed, Jahangir.
Non-Final Office Action of U.S. Appl. No. 10/116,023, filed Apr. 13, 2006, Mohammed, Jahangir.
Non-Final Office Action of U.S. Appl. No. 10/115,835, filed Jul. 25, 2005, Mohammed, Jahangir.
Final Office Action of U.S. Appl. No. 10/116,186, filed Feb. 1, 2006, Mohammed, Jahangir.
Non-Final Office Action of U.S. Appl. No. 10/251,901, filed May 5, 2005, Gallagher, Michael et al.
Non-Final Office Action of U.S. Appl. No. 10/688,470, filed Dec. 15, 2005, Gallagher, Michael et al.
Notice of Allowance of U.S. Appl. No. 10/688,470, filed Jul. 19, 2006, Gallagher, Michael et al.
Non-Final Office Action of U.S. Appl. No. 11/004,439, filed Apr. 21, 2006, Gallagher, Michael.
U.S. Appl. No. 11/110,222, filed Apr. 20, 2005, Gallagher, Michael et al.
U.S. Appl. No. 11/068,445, filed Feb. 24, 2005, Gupta, Rajeev et al.
Non-Final Office Action U.S. Appl. No. 11/225,870, filed May 30, 2006, Gallagher, Michael et al.
Non-Final Office Action of U.S. Appl. No. 11/225,398, filed Apr. 5, 2006, Gallagher, Michael et al.
Non-Final Office Action of U.S. Appl. No. 11/225,872, filed May 8, 2006, Gallagher, Michael et al.
Non-Final Office Action of U.S. Appl. No. 11/225,871, filed Mar. 30, 2006, Gallagher, Michael et al.
Non-Final Office Action of U.S. Appl. No. 11/226,617, filed Apr. 6, 2006, Gallagher, Michael et al.
Non-Final Office Action of U.S. Appl. No. 11/226,610, filed Mar. 29, 2006, Gallagher, Michael et al.
Non-Final Office Action of U.S. Appl. No. 11/229,471, filed Nov. 17, 2008, Gallagher, Michael et al.
Non-Final Office Action of U.S. Appl. No. 11/229,471, filed Feb. 6, 2008, Gallagher, Michael et al.
Final Office Action of U.S. Appl. No. 11/229,471, filed Oct. 10, 2007, Gallagher, Michael et al.
Non-Final Office Action of U.S. Appl. No. 11/229,471, filed Apr. 19, 2007, Gallagher, Michael et al.
Non-Final Office Action of U.S. Appl. No. 11/229,471, filed Oct. 24, 2006, Gallagher, Michael et al.
Non-Final Office Action of U.S. Appl. No.11/229,471, filed Jun. 19, 2006, Gallagher, Michael et al.
Non-Final Office Action U.S. Appl. No. 11/228,853, filed Jun. 5, 2006, Gallagher, Michael et al., which issued as U.S. Patent 7,212,819.
Non-Final Office Action of U.S. Appl. No. 11/228,853, filed Nov. 22, 2006, Gallagher, Michael et al., which issued as U.S. Patent 7,212,819.
Notice of Allowance of U.S. Appl. No. 11/228,853, filed Feb. 23, 2007, Gallagher, Michael et al., which issued as U.S. Patent 7,212,819.
Non-Final Office Action of U.S. Appl. No. 11/229,470, filed Jun. 6, 2006, Gallagher, Michael et al.
Final Office Action of U.S. Appl. No. 11/229,470, filed Dec. 14, 2007, Gallagher, Michael et al.
Non-Final Office Action of U.S. Appl. No. 11/229,470, filed Feb. 27, 2008, Gallagher, Michael et al.
Non-Final Office Action of U.S. Appl. No. 11/229,470, filed Oct. 1, 2008, Gallagher, Michael et al.
Non-Final Office Action of U.S. Appl. No. 11/227,842, filed Jun. 5, 2006, Gallagher, Michael et al., which issued as U.S. patent 7,171,205.
Non-Final Office Action of U.S. Appl. No. 11/227,573, filed Apr. 6, 2006, Gallagher, Michael et al., which issued as 7,324,818.
Non-Final Office Action of U.S. Appl. No. 11/227,840, filed Apr. 21, 2006, Gallagher, Michael et al., which issued as 7,200,399.
Non-Final Office Action of U.S. Appl. No. 11/227,784, Gallagher, Michael et al., which issued as 7,197,309.
U.S. Appl. No. 12/233,571, filed Sep. 18, 2008, Khetawat, Amit et al.
U.S. Appl. No. 12/187,360, filed Aug. 6, 2008, Gallagher, Michael et al.
U.S. Appl. No. 12/193,598, filed Aug. 18, 2008, Gallagher, Michael et al.
U.S. Appl. No. 12/194,442, filed Aug. 19, 2008, Gallagher, Michael et al.
U.S. Appl. No. 12/328,719, filed Dec. 4, 2008, Gallagher, Michael et al.
U.S. Appl. No. 12/328,732, filed Dec. 4, 2008, Gallagher, Michael et al.
International Search Report for PCT/US2003/032855, filed Apr. 21, 2004, Kineto Wireless, Inc.
International Search Report and Written Opinion for PCT/US2005/016767, filed Nov. 7, 2005, Kineto Wireless Inc.
International Preliminary Report on Patentability and Written Opinion for PCT/US2005/016767, filed Nov. 14, 2006, Kineto Wireless Inc.
International Search Report and Written Opinion for PCT/US2005/040689, filed Mar. 13, 2006, Kineto Wireless, Inc.
International Preliminary Report on Patentability and Written Opinion for PCT/US2005/040689, filed May 15, 2007, Kineto Wireless, Inc.
International Search Report and Written Opinion for PCT/US2005/061921, filed Sep. 19, 2005, Kineto Wireless, Inc.

International Preliminary Report on Patentability and Written Opinion for PCT/US2005/016921, filed Nov. 23, 2006, Kineto Wireless, Inc.

International Search Report and Written Opinion for PCT/US2007/083266, filed Apr. 2, 2008, Kineto Wireless, Inc.

International Search Report and Written Opinion for PCT/US2008/054623, filed Aug. 18, 2008, Kineto Wireless, Inc.

International Serach Report and Written Opinion for PCT/US2007/073557, filed Jul. 16, 2008, Kineto Wireless, Inc.

International Search Report and Written Opinion for PCT/US2007/079258, filed Mar. 11, 2008, Kineto Wireless, Inc.

*Erricson Press Release*: "Ericsson presents the Mobile@Hometm concept," Mar. 21, 2001, http://www.ericsson.com/press/archive/2001Q1/20010321-0048.html, printed Jan. 6, 2004, pp. 1-2.

Claus Lindholt Hansen et al., "Mobile@Home—a NEW 1 Use Case for Bluetooth in the Access Network," *LM Ericsson Business Unit Multi-Service Networks*, ISSLS 2002, Apr. 14-18, 2002, Seoul, Korea, www.issls-council.org/proc02/papers/S6A3m.pdf, printed Dec. 8, 2003, 10 pages.

Perkins, Charles E., "Simplified Routing for Mobile Computers Using TCP/IP, Wireless LAN Implementation," *IBM T.J. Watson Research Center*, 0-8186-2625-9/92 1992 Proceeding, IEEE Conference on Sep. 17-18, 1992, pp. 7-13.

Wu, Jon C., et al., "Intelligent Handoff for Mobile Wireless Internet " *Mobile Networks and Applications*, Jan. 6, 2001 Kluwer Academic Publishers, Manufactured in the Netherlands (2001) 67-79.

ETSI TS 124 008 V5.6.0 (Dec. 2002) Digital cellular telecommunications system (Phase 2+); Universal Mobile Telecommunications System (UMTS); Mobile radio interface Layer 3 specification; Core network protocols; Stage 3; (3GPP TS 24.008 version 5.6.0 Release 5); ETSI Standards, European Telecommunications Standards Institute, Sophia-Antipolis, Fr, Dec. 2002, pp. 293-317.

ETSI TS 100 940 V7.19.1 (Apr. 2003) Digital cellular telecommunications system (Phase 2+); Mobile radio interface layer 3 specification; (3GPP TS 04.08 version 7.19.1 Release 1998); ETSI Standards, European Telecommunications Standards Institute, Sophia-Antipolis, Fr, Apr. 2003, 13 pages.

"3rd Generation Partnership Project; Technical Specification Group Services and System Aspects; 3GPP System to Wireless Local Area Network (WLAN) Interworking; System Description (Release 6); 3GPP TS 23.234," ETSI Standards, European Telecommunications Standards Institute, Sophia-Antipo, Fr, vol. 3-SA, No. V230, Nov. 2003, XP014023920, ISSN: 0000-0001.

*Digital Enhanced Cordless Telecommunications (DECT); Global System for Mobile Communications (GSM); DECT/GSM Interworking Profile (IWP); Access and Mapping*. (protocol/procedure description for 3,1 kHz speech service): ETSI EN 300 370 V1.3.1 European Standard (Telecommunications Series), European Telecommunications Standards Institute, Sophia Antipolis, Fr, Jan. 2001, 110 pages.

*Digital Enhanced Cordless Telecommunications (DECT); Global System for Mobile Communications (GSM); DECT/GSM Integration Based on Dual-Mode Terminals*: ETSI EN 301 242 V1.2.2 European Standard (Telecommunications Series), European Telecommunications Standards Institute, Sophia Antipolis, Fr, Sep. 1999, 23 pages.

*Digital Enhanced Cordless Telecommunications (DECT); DECT/UMTS Interworking Profile (IWP); Part 1:General Description and Overview*: ETSI TS 101 863-1 V1.1.2, Technical Specification, European Telecommunications Standards Institute, Sophia Antipolis, Fr, Nov. 2001, 38 pages.

*Radio Equipment and Systems (RES); Digital Enhanced Cordless Telecommunications/Global System for Mobile Communications (DECT/GSM) Interworking Profile; Profile Overview*: ETSI Technical Report, ETR 341, Source: ETSI DECT, ICS: 33.020, Reference: DTR/RES-03058. European Telecommunications Standards Institute, Sophia Antipolis, Fr, December 1996, 27 pages.

"Unlicensed Mobile Access (UMA); User Perspective (Stage 1);" UMA User Perspective (Stage 1) R1.0.0 (Sep. 1, 2004) Technical Specification, 29 pages.

"Unlicensed Mobile Access (UMA); Architecture (Stage 2);" UMA Architecture (Stage 2) R1.0.0 (Sep. 1, 2004) Technical Specification, 78 pages.

"Unlicensed Mobile Access (UMA); Protocols (Stage 3);" UMA Protocols (Stage 3) R1.0.0 (Sep.1, 2004) Technical Specification, 142 pages.

"Unlicensed Mobile Access (UMA); Architecture (Stage 2);" UMA Architecture (Stage 2) R1.0.1 (Oct. 8, 2004) Technical Specification, 80 pages.

"Unlicensed Mobile Access (UMA); Protocols (Stage 3);" UMA Protocols (Stage 3) R1.0.1 (Oct. 8, 2004) Technical Specification, 142 pages.

"Unlicensed Mobile Access (UMA); Architecture (Stage 2);" UMA Architecture (Stage 2) R1.0.2 (Nov. 3, 2004) Technical Specification, 79 pages.

"Unlicensed Mobile Access (UMA); Protocols (Stage 3);" UMA Protocols (Stage 3) R1.0.2 (Nov. 5, 2004) Technical Specification, 142 pages.

"Unlicensed Mobile Access (UMA); Architecture (Stage 2);" UMA Architecture (Stage 2) R1.0.3 (Feb. 28, 2005) Technical Specification, 85 pages.

"Unlicensed Mobile Access (UMA); Protocols (Stage 3);" UMA Protocols (Stage 3) R1.0.3 (Feb. 26, 2005) Technical Specification, 156 pages.

"Unlicensed Mobile Access (UMA); Architecture (Stage 2);" UMA Architecture (Stage 2) R1.0.4 (May 2, 2005) Technical Specification, 87 pages.

"Unlicensed Mobile Access (UMA); Protocols (Stage 3);" UMA Protocols (Stage 3) R1.0.4 (May 2, 2005) Technical Specification, 162 pages.

"3rd Generation Partnership Project; Technical Specification Group GSM/EDGE Radio Access Network; Generic Access to the A/Gb interface; Stage 2 (Release X);" 3GPP TS 43.318 V0.3.0 (Jan. 2005), 64 pages.

"Proposal for Stage 2 description for Generic Access to A/Gb interface", Tdoc GP-050403, Jan. 24-28, 2005, 1 page.

"3rd Generation Partnership Project; Technical Specification Group GSM/EDGE Radio Access Network; Generic Access to the A/Gb interface; Stage 2 (Release 6)" 3GPP TS 43.318 V0.4.0 (Jan. 2005), 68 pages.

"3rd Generation Partnership Project; Technical Specification Group GSM/EDGE Radio Access Network; Generic Access to the A/Gb interface; Stage 2 (Release 6)" 3GPP TS 43.318 V2.0.0 (Jan. 2005), 66 pages.

"3rd Generation Partnership Project; Technical Specification Group GSM/EDGE Radio Access Network; Generic Access to the A/Gb interface; Stage 2 (Release 6)" 3GPP TS 43.318 V6.0.0 (Jan. 2005), 68 pages.

"3rd Generation Partnership Project; Technical Specification Group GSM/EDGE Radio Access Network; Generic Access to the A/Gb interface; Stage 2 (Release 6)" 3GPP TS 43.318 V6.1.0 (Jan. 2005), Apr. 2005, 68 pages.

"3rd Generation Partnership Project; Technical Specification Group GSM/EDGE Radio Access Network; Generic Access to the A/Gb interface; Stage 2 (Release 6)" 3GPP TS 43.318 V6.2.0 (Jun. 2005) 68 pages.

"3rd Generation Partnership Project; Technical Specification Group GSM/Edge Radio Access Network; Generic Access to the A/Gb interface; Stage 2 (Release 6)" 3GPP TS 43.318 V6.3.0 (Sep. 2005), 68 pages.

"3rd Generation Partnership Project; Technical Specification Group GSM/EDGE Radio Access Network; Generic Access to the A/Gb interface; Stage 2 (Release 6)" 3GPP TS 43.318 V6.4.0 (Nov. 2005), 68 pages.

"3rd Generation Partnership Project; Technical Specification Group GSM/EDGE Radio Access Network; Generic Access to the A/Gb interface; Stage 2 (Release 6)" 3GPP TS 43.318 V6.5.0 (Jan. 2006), 70 pages.

"3rd Generation Partnership Project; Technical Specification Group GSM/EDGE Radio Access Network; Generic Access to the A/Gb interface; Stage 2 (Release 6)" 3GPP TS 43.318 V6.6.0 (Apr. 2006), May 2006, 70 pages.

"3rd Generation Partnership Project; Technical Specification Group GSM/EDGE Radio Access Network; Generic Access to the A/Gb interface; Stage 2 (Release 6)" 3GPP TS 43.318 V6.7.0 (Jun. 2006), Jul. 2006, 71 pages.

"3rd Generation Partnership Project; Technical Specification Group GSM/EDGE Radio Access Network; Generic Access to the A/Gb interface; Stage 2 (Release 6)" 3GPP TS 43.318 V6.8.0 (Nov. 2006), 71 pages.
"3rd Generation Partnership Project; Technical Specification Group GSM/EDGE Radio Access Network; Generic Access to the A/Gb interface; Stage 2 (Release 6)" 3GPP TS 43.318 V6.9.0 (Feb. 2007), 71 pages.
"3rd Generation Partnership Project; Technical Specification Group GSM/EDGE Radio Access Network; Generic access to the A/Gb interface; Stage 2 (Release 7)" 3GPP TS 43.318 V7.0.0 (Nov. 2006), 71 pages.
"3rd Generation Partnership Project; Technical Specification Group GSM/EDGE Radio Access Network; Generic access to the A/Gb interface; Stage 2 (Release 7)" 3GPP TS 43.318 V7.1.0 (Feb. 2007), 71 pages.
"3rd Generation Partnership Project; Technical Specification Group GSM/EDGE Radio Access Network; Generic access to the A/Gb interface; Stage 2 (Release 7)" 3GPP TS 43.318 V7.2.0 (May 2007), 71 pages.
"Proposal for Stage 3 description for Generic Access to A/Gb interface", Tdoc GP-050279, Jan. 18, 2005, 1 page.
"3rd Generation Partnership Project; Technical Specification Group GSM/EDGE Radio Access Network; Generic Access to the A/Gb interface; Mobile Generic Access Interface Layer 3 Specification (Release x)" 3GPP TS 44.318 Vx.1.0 (Jan. 2005), 133 pages.
"3rd Generation Partnership Project; Technical Specification Group GSM/EDGE Radio Access Network; Generic Access to the A/Gb interface; Mobile Generic Access Interface Layer 3 Specification (Release x)" 3GPP TS 44.318 V0.4.0 (Apr. 2005), 161 pages.
"3rd Generation Partnership Project; Technical Specification Group GSM/EDGE Radio Access Network; Generic Access to the A/Gb interface; Mobile Generic Access Interface Layer 3 Specification (Release 6)" 3GPP TS 44.318 V0.5.0 (Apr. 2005), 160 pages.
"3rd Generation Partnership Project; Technical Specification Group GSM/EDGE Radio Access Network; Generic Access to the A/Gb interface; Mobile Generic Access Interface Layer 3 Specification (Release 6)" 3GPP TS 44.318 V2.0.0 (Apr. 2005), 152 pages.
"3rd Generation Partnership Project; Technical Specification Group GSM/EDGE Radio Access Network; Generic Access (GA) to the A/Gb interface; Mobile GA interface layer 3 specification (Release 6)" 3GPP TS 44.318 V6.0.0 (Apr. 2005), 146 pages.
"3rd Generation Partnership Project; Technical Specification Group GSM/EDGE Radio Access Network; Generic Access (GA) to the A/Gb interface; Mobile GA interface layer 3 specification (Release 6)" 3GPP TS 44.318 V6.1.0 (Jul. 2005), 149 pages.
"3rd Generation Partnership Project; Technical Specification Group GSM/EDGE Radio Access Network; Generic Access (GA) to the A/Gb interface; Mobile GA interface layer 3 specification (Release 6)" 3GPP TS 44.318 V6.2.0 (Sep. 2005), 148 pages.
"3rd Generation Partnership Project; Technical Specification Group GSM/EDGE Radio Access Network; Generic Access (GA) to the A/Gb interface; Mobile GA interface layer 3 specification (Release 6)" 3GPP TS 44.318 V6.3.0 (Nov. 2005), 149 pages.
"3rd Generation Partnership Project; Technical Specification Group GSM/EDGE Radio Access Network; Generic Access (GA) to the A/Gb interface; Mobile GA interface layer 3 specification (Release 6)" 3GPP TS 44.318 V6.4.0 (Jan. 2006), 152 pages.
"3rd Generation Partnership Project; Technical Specification Group GSM/EDGE Radio Access Network; Generic Access (GA) to the A/Gb interface; Mobile GA interface layer 3 specification (Release 6)" 3GPP TS 44.318 V6.5.0 (May 2006), 153 pages.
"3rd Generation Partnership Project; Technical Specification Group GSM/EDGE Radio Access Network; Generic Access (GA) to the A/Gb interface; Mobile GA interface layer 3 specification (Release 6)" 3GPP Ts 44.318 V6.4.0 (Jan. 2006), 152 pages.
"3rd Generation Partnership Project; Technical Specification Group GSM/EDGE Radio Access Network; Generic Access (GA) to the A/Gb interface; Mobile GA interface layer 3 specification (Release 6)" 3GPP TS 44.318 V6.7.0 (Dec. 2006), 154 pages.
"3rd Generation Partnership Project; Technical Specification Group GSM/EDGE Radio Access Network; Generic Access (GA) to the A/Gb interface; Mobile GA interface layer 3 specification (Release 6)" 3GPP TS 44.318 V6.8.0 (Mar. 2007), 154 pages.
"3rd Generation Partnership Project; Technical Specification Group GSM/EDGE Radio Access Network; Generic Access (GA) to the A/Gb interface; Mobile GA interface layer 3 specification (Release 6)" 3GPP TS 44.318 V6.9.0 (Jun. 2007), 154 pages.
"3rd Generation Partnership Project; Technical Specification Group GSM/EDGE Radio Access Network; Generic Access (GA) to the A/Gb interface; Mobile GA interface layer 3 specification (Release 7)" 3GPP TS 44.318 V7.0.0 (Jul. 2006), 153 pages.
"3rd Generation Partnership Project; Technical Specification Group GSM/EDGE Radio Access Network; Generic Access (GA) to the A/Gb interface; Mobile GA interface layer 3 specification (Release 7)" 3GPP TS 44.318 V7.1.0 (Dec. 2006), 154 pages.
"3rd Generation Partnership Project; Technical Specification Group GSM/EDGE Radio Access Network; Generic Access (GA) to the A/Gb interface; Mobile GA interface layer 3 specification (Release 7)" 3GPP TS 44.318 V7.2.0 (Mar. 2007), 163 pages.
"3rd Generation Partnership Project; Technical Specification Group GSM/EDGE Radio Access Network; Generic Access (GA) to the A/Gb interface; Mobile GA interface layer 3 specification (Release 7)" 3GPP TS 44.318 V7.3.0 (Jun. 2007), 163 pages.
Portions of prosecution history of commonly owned U.S. Appl. No. 11/778,041, filed Dec. 18, 2009, Gallagher, Michael et al., including office actions dated Aug. 21, 2008, Mar. 18, 2009, and Dec. 10, 2009; and responses/amendments dated Aug. 19, 2008, Nov. 21, 2008, Dec. 24, 2008, and Aug. 18, 2009 (69 pages).
Portions of prosecution history of U.S. Appl. No. 11/927,665, filed Feb. 16, 2010, Gallagher, Michael et al., including office actions dated Feb. 4, 2009, and Nov. 13, 2009; and responses/amendments dated Jul. 6, 2009, and Feb. 16, 2010 (37 pages).
International Preliminary Report on Patentability and Written Opinion for PCT/US2007/073557, filed Jan. 14, 2009, Kineto Wireless, Inc.
EP Supplementary Search Report of EP07812949, filed Mar. 26, 2010, Kineto Wireless, Inc.
EP Office Action of EP07812949, filed Mar. 31, 2010, Kineto Wireless, Inc.
Portions of prosecution history of U.S. Appl. No. 11/128,461, filed May 26, 2009, Markovic, Milan et al., including office actions dated Jan. 24, 2008, Sep. 18, 2008, Dec. 5, 2008, Jan. 23, 2009, Jan. 27, 2009, and May 26, 2009; and responses/amendments dated Jun. 24, 2008, Dec. 4, 2008, Jan. 5, 2009, and, Apr. 27, 2009 (122 pages).
Non-Final office action of commonly owned U.S. Appl. No. 11/737,128, filed Mar. 1, 2010, Gallagher, Michael et al.
Notice of Appeal and Pre-Brief Request of U.S. Appl. No. 11/778,041, Apr. 12, 2010, Gallagher, Michael et al.
Pre-Brief Appeal Conference decision of U.S. Appl. No. 11/927,665, filed Jun. 1, 2010, Gallagher, Michael et al.

* cited by examiner

GENERIC ACCESS TO THE IU INTERFACE

CLAIM OF BENEFIT TO RELATED APPLICATIONS

This application claims the benefit of U.S. Provisional Application 60/807,470, entitled "E-UMA Technology," filed Jul. 14, 2006; U.S. Provisional Application 60/823,092, entitled "Generic Access to the Iu Interface," filed Aug. 21, 2006; U.S. Provisional Application 60/862,564, entitled "E-UMA—Generic Access to the Iu Interface," filed Oct. 23, 2006, and U.S. Provisional Application 60/949,826, entitled "Generic Access to the Iu Interface," filed Jul. 13, 2007. The contents of each of these four provisional applications are hereby incorporated by reference.

FIELD OF THE INVENTION

The field of invention relates generally to telecommunications. More particularly, this invention relates to a mechanism for extending Unlicensed Mobile Access (UMA) or Generic Access Network (GAN) to inter-work with a GSM core network using the Universal Mobile Telecommunication System (UMTS) Iu interface.

BACKGROUND OF THE INVENTION

Licensed wireless systems provide mobile wireless communications to individuals using wireless transceivers. Licensed wireless systems refer to public cellular telephone systems and/or Personal Communication Services (PCS) telephone systems. Wireless transceivers include cellular telephones, PCS telephones, wireless-enabled personal digital assistants, wireless modems, and the like.

Licensed wireless systems utilize wireless signal frequencies that are licensed from governments. Large fees are paid for access to these frequencies. Expensive base station (BS) equipment is used to support communications on licensed frequencies. Base stations are typically installed approximately a mile apart from one another (e.g., cellular towers in a cellular network). The wireless transport mechanisms and frequencies employed by typical licensed wireless systems limit both data transfer rates and range. As a result, the quality of service (voice quality and speed of data transfer) in licensed wireless systems is considerably inferior to the quality of service afforded by landline (wired) connections. Thus, the user of a licensed wireless system pays relatively high fees for relatively low quality service.

Landline (wired) connections are extensively deployed and generally perform at a lower cost with higher quality voice and higher speed data services. The problem with landline connections is that they constrain the mobility of a user. Traditionally, a physical connection to the landline was required.

In the past few years, the use of unlicensed wireless communication systems to facilitate mobile access to landline-based networks has seen rapid growth. For example, such unlicensed wireless systems may support wireless communication based on the IEEE 802.11a, b or g standards (WiFi), or the Bluetooth® standard. The mobility range associated with such systems is typically on the order of 100 meters or less. A typical unlicensed wireless communication system includes a base station comprising a wireless access point (AP) with a physical connection (e.g., coaxial, twisted pair, or optical cable) to a landline-based network. The AP has a RF transceiver to facilitate communication with a wireless handset that is operative within a modest distance of the AP, wherein the data transport rates supported by the WiFi and Bluetooth® standards are much higher than those supported by the aforementioned licensed wireless systems. Thus, this option provides higher quality services at a lower cost, but the services only extend a modest distance from the base station.

Currently, technology is being developed to integrate the use of licensed and unlicensed wireless systems in a seamless fashion, thus enabling a user to access, via a single handset, an unlicensed wireless system when within the range of such a system, while accessing a licensed wireless system when out of range of the unlicensed wireless system.

SUMMARY OF THE INVENTION

Some embodiments provide a method of registering a user equipment (UE) in a communication system that includes a licensed wireless communication system and a generic access network (GAN) that has a generic access network controller (GANC). The method sends a register request message from the UE to the GANC that indicates a GAN mode capability of A/Gb only for the UE. When the GANC has a GAN mode capability of A/Gb, the GANC registers the UE with the GAN. When the GANC has a GAN mode capability of Iu only, the GANC rejects the register request message. When the GANC has a GAN mode capability of both A/Gb and Iu, the GANC registers the UE based on a set of GANC mode selection rules that the GANC applies for registering UEs with the GAN.

Some embodiments provide a method of activating a packet transport channel (PTC) in a communication system that includes a first licensed wireless communication system and a second generic access network (GAN) that has a generic access network controller (GANC). The GANC is communicatively coupled to the first communication system through a universal mobile telecommunication system (UMTS) terrestrial radio access network (UTRAN) Iu interface. The method sends a GA-PSR activate PTC request message from the GANC to a user equipment (UE). The message comprises a terminal endpoint identifier (TEID) that the GANC assigns to the UE.

Some embodiments provide a communication system that includes a first licensed wireless communication system, a second generic access network (GAN) that includes a generic access network controller (GANC). The GANC is communicatively coupled to the first communication system through a universal mobile telecommunication system (UMTS) terrestrial radio access network (UTRAN) Iu interface. The communication system also includes a user equipment (UE). The GANC includes a UDP protocol layer and a GTP-U protocol layer over the UDP protocol layer of the GANC. The UE includes a UDP protocol layer and a GTP-U protocol layer over said UDP protocol layer of the UE. The UDP protocol layer of the GANC is communicatively coupled to the UDP protocol layer of the UE. The GTP-U protocol layer of the GANC is communicatively coupled to the GTP-U protocol layer of the UE.

BRIEF DESCRIPTION OF THE DRAWINGS

The novel features of the invention are set forth in the appended claims. However, for purpose of explanation, several embodiments of the invention are set forth in the following figures.

DETAILED DESCRIPTION OF THE INVENTION

Figure 1:
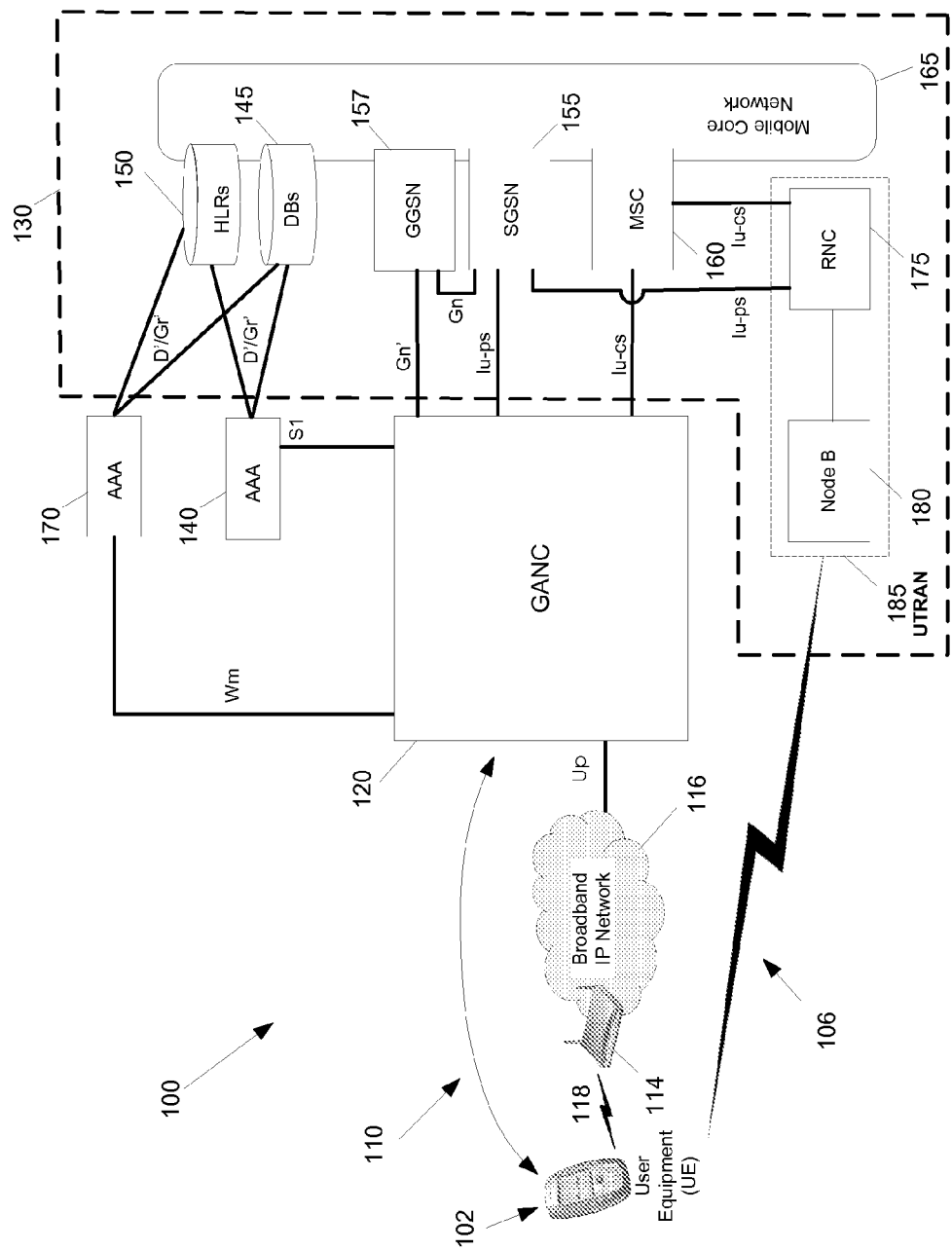
FIG. 1 illustrates an integrated communication system (ICS) of some embodiments.

In the following detailed description of the invention, numerous details, examples, and embodiments of the invention are set forth and described. However, it will be clear and apparent to one skilled in the art that the invention is not limited to the embodiments set forth and that the invention may be practiced without some of the specific details and examples discussed.

Throughout the following description, acronyms commonly used in the telecommunications industry for wireless services are utilized along with acronyms specific to the present invention. A table of acronyms used in this application is included in Section X.

Some embodiments provide a method of registering a user equipment (UE) in a communication system that includes a licensed wireless communication system and a generic access network (GAN) that has a generic access network controller (GANC). The method sends a register request message from the UE to the GANC that indicates a GAN mode capability of A/Gb only for the UE. When the GANC has a GAN mode capability of A/Gb, the GANC registers the UE with the GAN. When the GANC has a GAN mode capability of Iu only, the GANC rejects the register request message. When the GANC has a GAN mode capability of both A/Gb and Iu, the GANC registers the UE based on a set of GANC mode selection rules that the GANC applies for registering UEs with the GAN.

Some embodiments provide a method of activating a packet transport channel (PTC) in a communication system that includes a first licensed wireless communication system and a second generic access network (GAN) that has a generic access network controller (GANC). The GANC is communicatively coupled to the first communication system through a universal mobile telecommunication system (UMTS) terrestrial radio access network (UTRAN) Iu interface. The method sends a GA-PSR activate PTC request message from the GANC to a user equipment (UE). The message comprises a terminal endpoint identifier (TEID) that the GANC assigns to the UE.

Some embodiments provide a communication system that includes a first licensed wireless communication system, a second generic access network (GAN) that includes a generic access network controller (GANC). The GANC is communicatively coupled to the first communication system through a universal mobile telecommunication system (UMTS) terrestrial radio access network (UTRAN) Iu interface. The communication system also includes a user equipment (UE). The GANC includes a UDP protocol layer and a GTP-U protocol layer over the UDP protocol layer of the GANC. The UE includes a UDP protocol layer and a GTP-U protocol layer over said UDP protocol layer of the UE. The UDP protocol layer of the GANC is communicatively coupled to the UDP protocol layer of the UE. The GTP-U protocol layer of the GANC is communicatively coupled to the GTP-U protocol layer of the UE.

Several more detailed embodiments of the invention are described in sections below. Specifically, Section I describes the overall integrated communication system in which some embodiments are incorporated. The discussion in Section I is followed by a discussion of the functional entities of some embodiments in Section II. Next, Section III describes the control and user plane architecture of some embodiments.

Section IV then describes the generic access network (GAN) security mechanism of some embodiments.

Next, Section V describes high level procedures such as discovery, registration, authentication, handover, etc. of some embodiments. Section VI then describes the configuration information of some embodiments. Next, identifiers used in GAN are presented in Section VII. An alternative embodiment that utilizes the same protocol for both voice and data services is disclosed in Section VIII. The discussion is followed by Section IX description of a computer system with which some embodiments of the invention are implemented. Finally, Section X lists the abbreviations used.

I. Overall System

A. Integrated Communication Systems (ICS)

FIG. 1 illustrates an integrated communication system (ICS) architecture 100 in accordance with some embodiments of the present invention. ICS architecture 100 enables user equipment (UE) 102 to access a voice and data network 165 via either a licensed air interface 106 or an ICS interface 110 through which components of a mobile core network 165 are alternatively accessed. In some embodiments, a communication session includes voice services, data services, or both.

The mobile core network 165 includes one or more Home Location Registers (HLRs) 150 and databases 145 for subscriber authentication and authorization. Once authorized, the UE 102 may access the voice and data services of the mobile core network 165. In order to provide such services, the mobile core network 165 includes a mobile switching center (MSC) 160 for providing access to the voice services. Data services are provided for through a Serving GPRS (General Packet Radio Service) Support Node (SGSN) 155 in conjunction with a gateway such as the Gateway GPRS Support Node (GGSN) 157.

The SGSN 155 is typically responsible for delivering data packets from and to the GGSN 157 and the user equipment within the geographical service area of the SGSN 155. Additionally, the SGSN 155 may perform functionality such as mobility management, storing user profiles, and storing location information. However, the actual interface from the mobile core network 165 to various external data packet services networks (e.g., public Internet) is facilitated by the GGSN 157. As the data packets originating from the user equipment typically are not structured in the format with which to access the external data networks, it is the role of the GGSN 157 to act as the gateway into such packet services networks. In this manner, the GGSN 157 provides addressing for data packets passing to and from the UE 102 and the external packet services networks (not shown). Moreover, as the user equipment of a licensed wireless network traverses multiple service regions and thus multiple SGSNs, it is the role of the GGSN 157 to provide a static gateway into the external data networks.

Figure 3:
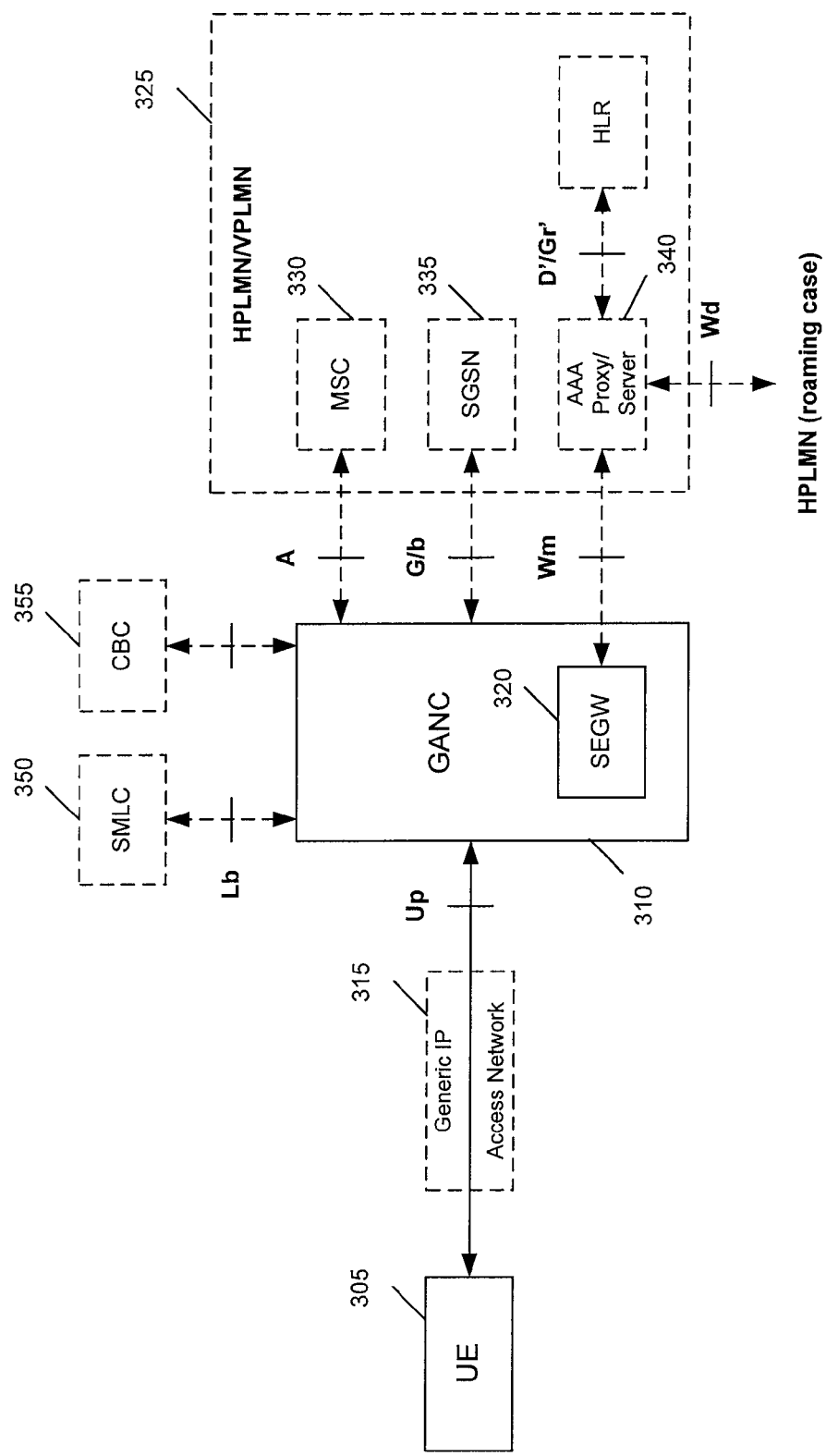
FIG. 3 illustrates the overall A/Gb-mode GAN functional architecture of some embodiments.

In the illustrated embodiment, components common to a UMTS Terrestrial Radio Access Network (UTRAN) based cellular network 185 are depicted that include multiple base stations referred to as Node Bs 180 (of which only one is shown for simplicity) that facilitate wireless communication services for various user equipment 102 via respective licensed radio links 106 (e.g., radio links employing radio frequencies within a licensed bandwidth). However, one of ordinary skill in the art will recognize that in some embodiments, the licensed wireless network may include other licensed wireless networks such as the GSM/EDGE Radio Access Network (GERAN). An example of a system using A and Gb interfaces to access GERAN is shown in FIG. 3 below.

The licensed wireless channel 106 may comprise any licensed wireless service having a defined UTRAN or GERAN interface protocol (e.g., Iu-cs and Iu-ps interfaces for UTRAN or A and Gb interfaces for GERAN) for a voice/data network. The UTRAN 185 typically includes at least one Node B 180 and a Radio Network Controller (RNC) 175 for managing the set of Node Bs 180. Typically, the multiple Node Bs 180 are configured in a cellular configuration (one per each cell) that covers a wide service area.

Each RNC 175 communicates with components of the core network 165 through a standard radio network controller interface such as the Iu-cs and Iu-ps interfaces depicted in FIG. 1. For example, a RNC 175 communicates with MSC 160 via the UTRAN Iu-cs interface for circuit switched voice services. Additionally, the RNC 175 communicates with SGSN 155 via the UTRAN Iu-ps interface for packet data services through GGSN 157. Moreover, one of ordinary skill in the art will recognize that in some embodiments, other networks with other standard interfaces may apply. For example, the RNC 175 in a GERAN network is replaced with a Base Station Controller (BSC) that communicates voice to the MSC 160 via an A interface and the BSC communicates data to the SGSN via a Gb interface of the GERAN network.

In some embodiments of the ICS architecture, the user equipment 102 use the services of the mobile core network (CN) 165 via a second communication network facilitated by the ICS access interface 110 and a Generic Access Network Controller (GANC) 120 (also referred to as a Universal Network Controller or UNC).

In some embodiments, the voice and data services over the ICS access interface 110 are facilitated via an access point 114 communicatively coupled to a broadband IP network 116. In some embodiments, the access point 114 is a generic wireless access point that connects the user equipment 102 to the ICS network through an unlicensed wireless network 118 created by the access point 114.

The signaling from the UE 102 is passed over the ICS access interface 110 to the GANC 120. After the GANC 120 performs authentication and authorization of the subscriber, the GANC 120 communicates with components of the mobile core network 165 using a radio network controller interface that is the same or similar to the radio network controller interface of the UTRAN described above, and includes a UTRAN Iu-cs interface for circuit switched voice services and a UTRAN Iu-ps interface for packet data services (e.g., GPRS). In this manner, the GANC 120 uses the same or similar interface to the mobile core network as a UTRAN Radio Network Subsystem (e.g., the Node B 180 and RNC 175).

In some embodiments, the GANC 120 communicates with other system components of the ICS system through one or more of several other interfaces, which are (1) "Up", (2) "Wm", (3) "D'/Gr'", (4) "Gn'", and (5) "S1". The "Up" interface is the interface between the UE 102 and the GANC 120. The "Wm" interface is a standardized interface between the GANC 120 and an Authorization, Authentication, and Accounting (AAA) Server 170 for authentication and authorization of the UE 102 into the ICS. The "D'/Gr'" interface is the standard interface between the AAA server 170 and the HLR 160. Optionally, some embodiments use the "Gn'" interface which is a modified interface for direct communications with the data services gateway (e.g., GGSN) of the core licensed network. Some embodiments optionally include the "S1" interface. In these embodiments, the "S1" interface provides an authorization and authentication interface from the GANC 120 to an AAA 140 server. In some embodiments, the AAA server 140 that supports the S1 interface and the AAA server 170 that supports Wm interface may be the same. More details of the S1 interface are described in U.S. application Ser. No. 11/349,025, entitled "Service Access Control Interface for an Unlicensed Wireless Communication System", filed Feb. 6, 2006, now issued as U.S. Pat. No. 7,283, 822.

In some embodiments, the UE 102 must register with the GANC 120 prior to accessing ICS services. Registration information of some embodiments includes a subscriber's International Mobile Subscriber Identity (IMSI), a Media Access Control (MAC) address, and a Service Set Identifier (SSID) of the serving access point as well as the cell identity from the GSM or UTRAN cell upon which the UE 102 is already camped. In some embodiments, the GANC 120 may pass this information to the AAA server 140 to authenticate the subscriber and determine the services (e.g., voice and data) available to the subscriber. If approved by the AAA 140 for access, the GANC 120 will permit the UE 102 to access voice and data services of the ICS system.

These voice and data services are seamlessly provided by the ICS to the UE 102 through the various interfaces described above. In some embodiments, when data services are requested by the UE 102, the ICS uses the optional Gn' interface for directly communicating with a GGSN 157. The Gn' interface allows the GANC 120 to avoid the overhead and latency associated with communicating with the SGSN 155 over the Iu-ps interface of the UTRAN or the Gb interface of the GSM core networks prior to reaching the GGSN 157.

In some other embodiments, the access point 114 is a Femtocell access point (FAP). The FAP facilitates short-range licensed wireless communication sessions 118 that operate independent of the licensed communication session 106. In case of the Femtocell, the user equipment 102 connects to the ICS network through the short-range licensed wireless network 118 created by the FAP 114. Signals from the FAP are then transmitted over the broadband IP network 116.

B. Applications of ICS

Figure 2:
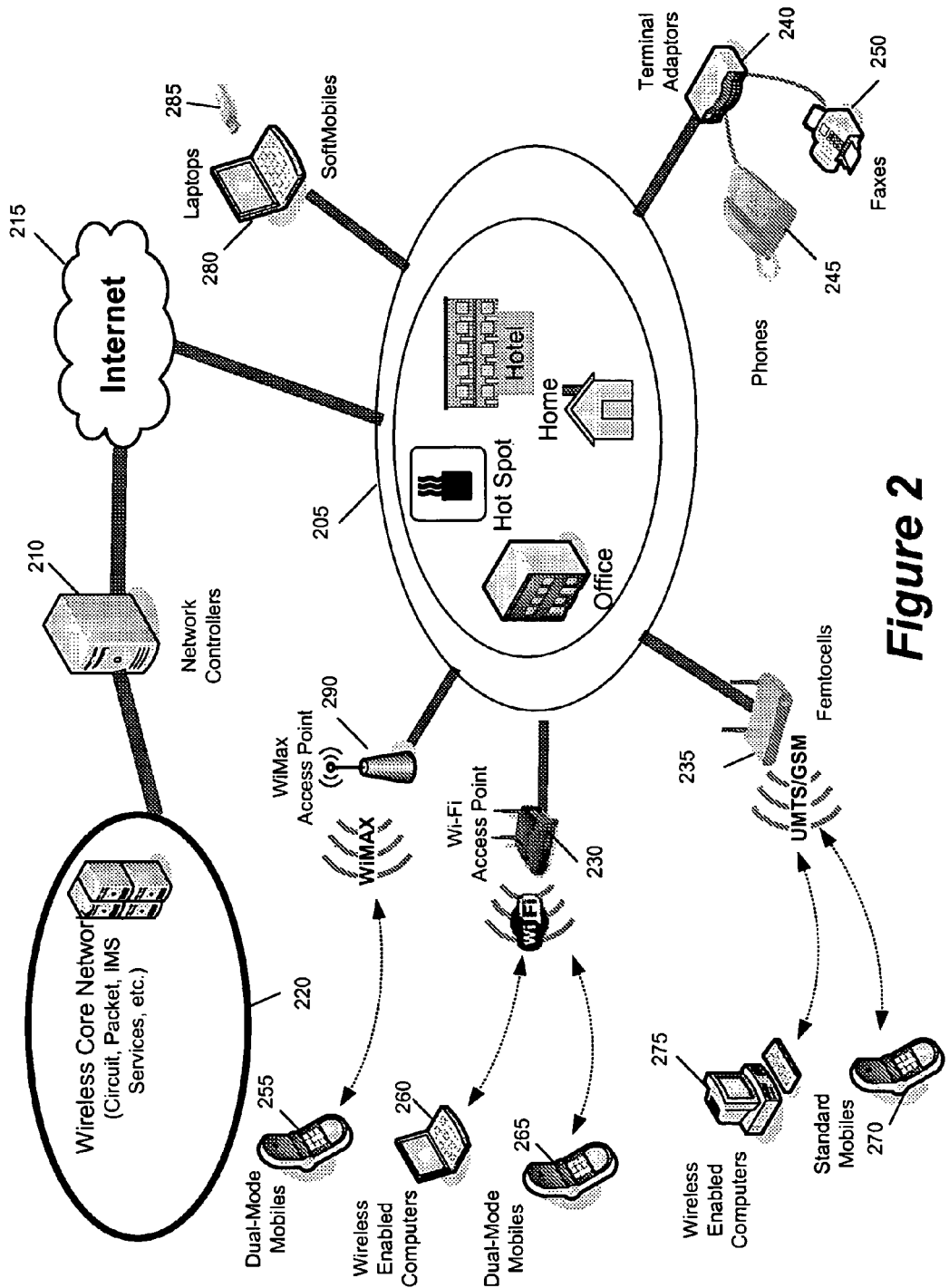
FIG. 2 illustrates several applications of an ICS in some embodiments.

An ICS provides scalable and secure interfaces into the core service network of mobile communication systems. FIG. 2 illustrates several applications of an ICS in some embodiments. As shown, homes, offices, hot spots, hotels, and other public and private places 205 are connected to one or more network controllers 210 (such as the GANC 120 shown in FIG. 1) through the Internet 215. The network controllers in turn connect to the mobile core network 220 (such as the core network 165 shown in FIG. 1).

FIG. 2 also shows several user equipments. These user equipments are just examples of user equipments that can be used for each application. Although in most examples only one of each type of user equipments is shown, one of ordinary skill in the art would realize that other type of user equipments can be used in these examples without deviating from the teachings of the invention. Also, although only of each type of access points, user equipment, or network controllers are shown, many such access points, user equipments, or network controllers may be employed in FIG. 2. For instance, an access point may be connected to several user equipment, a network controller may be connected to several access points, and several network controllers may be connected to the core network. The following sub-sections provide several examples of services that can be provided by an ICS.

1. Wi-Fi

A Wi-Fi access point 230 enables a dual-mode cellular/Wi-Fi UEs 260-265 to receive high-performance, low-cost mobile services when in range of a home, office, or public Wi-Fi network. With dual-mode UEs, subscribers can roam and handover between licensed wireless communication system and Wi-Fi access and receive a consistent set of services as they transition between networks.

2. Femtocells

A Femtocell enables user equipments, such as standard mobile stations 270 and wireless enabled computers 275 shown, to receive low cost services using a short-range licensed wireless communication sessions through a FAP 235.

3. Terminal Adaptors

Terminal adaptors 240 allow incorporating fixed-terminal devices such as telephones 245, Faxes 250, and other equipments that are not wireless enabled within the ICS. As long as the subscriber is concerned, the service behaves as a standard analog fixed telephone line. The service is delivered in a manner similar to other fixed line VoIP services, where a UE is connected to the subscriber's existing broadband (e.g., Internet) service.

4. WiMAX

Some licensed wireless communication system operators are investigating deployment of WiMAX networks in parallel with their existing cellular networks. A dual mode cellular/WiMAX UE 290 enables a subscriber to seamlessly transition between a cellular network and such a WiMAX network.

5. SoftMobiles

Connecting laptops 280 to broadband access at hotels and Wi-Fi hot spots has become popular, particularly for international business travelers. In addition, many travelers are beginning to utilize their laptops and broadband connections for the purpose of voice communications. Rather than using mobile phones to make calls and pay significant roaming fees, they utilize SoftMobiles (or SoftPhones) and VoIP services when making long distance calls.

To use a SoftMobile service, a subscriber would place a USB memory stick 285 with an embedded SIM into a USB port of their laptop 280. A SoftMobile client would automatically launch and connect over IP to the mobile service provider. From that point on, the subscriber would be able to make and receive mobile calls as if she was in her home calling area.

Several examples of Integrated Communication Systems (ICS) are given in the following sub-sections. A person of ordinary skill in the art would realize that the teachings in these examples can be readily combined. For instance, an ICS can be an IP based system and have an A/Gb interface towards the core network while another ICS can have a similar IP based system with an Iu interface towards the core network.

C. Integrated Systems with A/Gb and/or Iu Interfaces Towards the Core Network FIG. 3 illustrates the A/Gb-mode Generic Access Network (GAN) functional architecture of some embodiments. The GAN includes one or more Generic Access Network Controllers (GANC) 310 and one or more generic IP access networks 315. One or more UEs 305 (one is shown for simplicity) can connect to a GANC 310 through a generic IP access network 315. The GANC 310 has the capability to appear to the core network 325 as a GSM/EDGE Radio Access Network (GE-RAN) Base Station Controller (BSC). The GANC 310 includes a Security Gateway (SEGW) 320 that terminates secure remote access tunnels from the UE 305, providing mutual authentication, encryption and data integrity for signaling, voice and data traffic.

The generic IP access network 315 provides connectivity between the UE 305 and the GANC 310. The IP transport connection extends from the GANC 310 to the UE 305. A single interface, the Up interface, is defined between the GANC 310 and the UE 305.

The GAN co-exists with the GERAN and maintains the interconnections with the Core Network (CN) 325 via the standardized interfaces defined for GERAN. These standardized interfaces include the A interface to Mobile Switching Center (MSC) 330 for circuit switched services, Gb interface to Serving GPRS Support Node (SGSN) 335 for packet switched services, Lb interface to Serving Mobile Location Center (SMLC) 350 for supporting location services, and an interface to Cell Broadcast Center (CBC) 355 for supporting cell broadcast services. The transaction control (e.g. Connection Management, CC, and Session Management, SM) and user services are provided by the core network (e.g. MSC/VLR and the SGSN/GGSN).

As shown, the SEGW 320 is connected to a AAA server 340 over the Wm interface. The AAA server 340 is used to authenticate the UE 305 when it sets up a secure tunnel. Some embodiments require only a subset of the Wm functionalities for the GAN application. In these embodiments, as a minimum the GANC-SEGW shall support the Wm authentication procedures.

Figure 4:
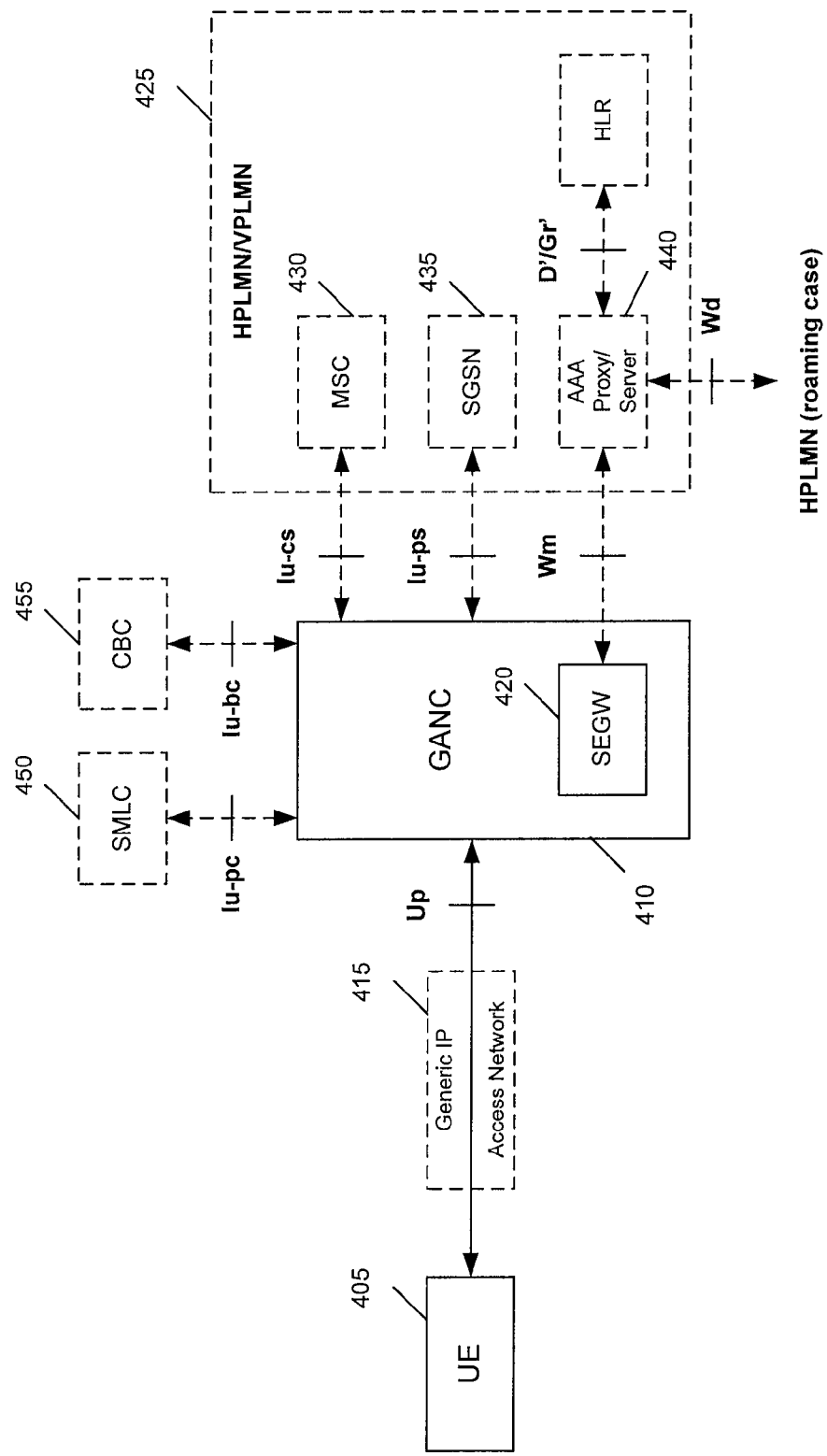
FIG. 4 illustrates the overall Iu-mode GAN functional architecture of some embodiments.

FIG. 4 illustrates the Iu-mode Generic Access Network (GAN) functional architecture of some embodiments. The GAN includes one or more Generic Access Network Controllers (GANC) 410 and one or more generic IP access networks 415. One or more UEs 405 (one is shown for simplicity) can be connected to a GANC 410 through a generic IP access network 415. In comparison with the GANC 310, the GANC 410 has the capability to appear to the core network 425 as a UMTS Terrestrial Radio Access Network (UTRAN) Radio Network Controller (RNC). In some embodiments, the GANC has the expanded capability of supporting both the Iu and A/Gb interfaces to concurrently support both Iu-mode and A/Gb-mode UEs. Similar to the GANC 310, the GANC 410 includes a Security Gateway (SEGW) 420 that terminates secure remote access tunnels from the UE 405, providing mutual authentication, encryption and data integrity for signaling, voice and data traffic.

The generic IP access network 415 provides connectivity between the UE 405 and the GANC 410. The IP transport connection extends from the GANC 410 to the UE 405. A single interface, the Up interface, is defined between the GANC 410 and the UE 405. Functionality is added to this interface, over the UP interface shown in FIG. 3 to support the Iu-mode GAN service.

The GAN co-exists with the UTRAN and maintains the interconnections with the Core Network (CN) 425 and via the standardized interfaces defined for UTRAN. These standardized interfaces include the Iu-cs interface to Mobile Switching Center (MSC) 430 for circuit switched services, Iu-ps interface to Serving GPRS Support Node (SGSN) 435 for packet switched services, Iu-pc interface to Serving Mobile Location Center (SMLC) 450 for supporting location services, and Iu-bc interface to Cell Broadcast Center (CBC) 455 for supporting cell broadcast services. The transaction control (e.g. Connection Management, CC, and Session Management, SM) and user services are provided by the core network (e.g. MSC/VLR and the SGSN/GGSN).

As shown, the SEGW 420 is connected to a AAA server 440 over the Wm interface. The AAA server 440 is used to authenticate the UE 405 when it sets up a secure tunnel. Some embodiments require only a subset of the Wm functionalities for the Iu mode GAN application. In these embodiments, as a minimum the GANC-SEGW shall support the Wm authentication procedures.

D. ATM and IP Based Architectures

In some embodiments, the system uses Asynchronous Transfer Mode (ATM) based Iu (Iu-cs and Iu-ps) interfaces towards the CN. In some embodiments, the system architecture can also support an IP based Iu (Iu-cs and Iu-ps) interface towards the CN. The following two sub-sections describe examples of these architectures for Femtocell.

A person of ordinary skill in the art would realize that the same examples can be readily applied to other types of ICS. For instance, these examples can be used when the ICS access interface 110 (shown in FIG. 1) uses unlicensed frequencies (instead of Femtocell's licensed frequencies), the access point 114 is a generic WiFi access point (instead of a FAP), etc. Also, a person of ordinary skill in the art would realize that the same examples can be readily implemented using A/Gb interfaces (described above) instead of Iu interfaces.

Figure 5:
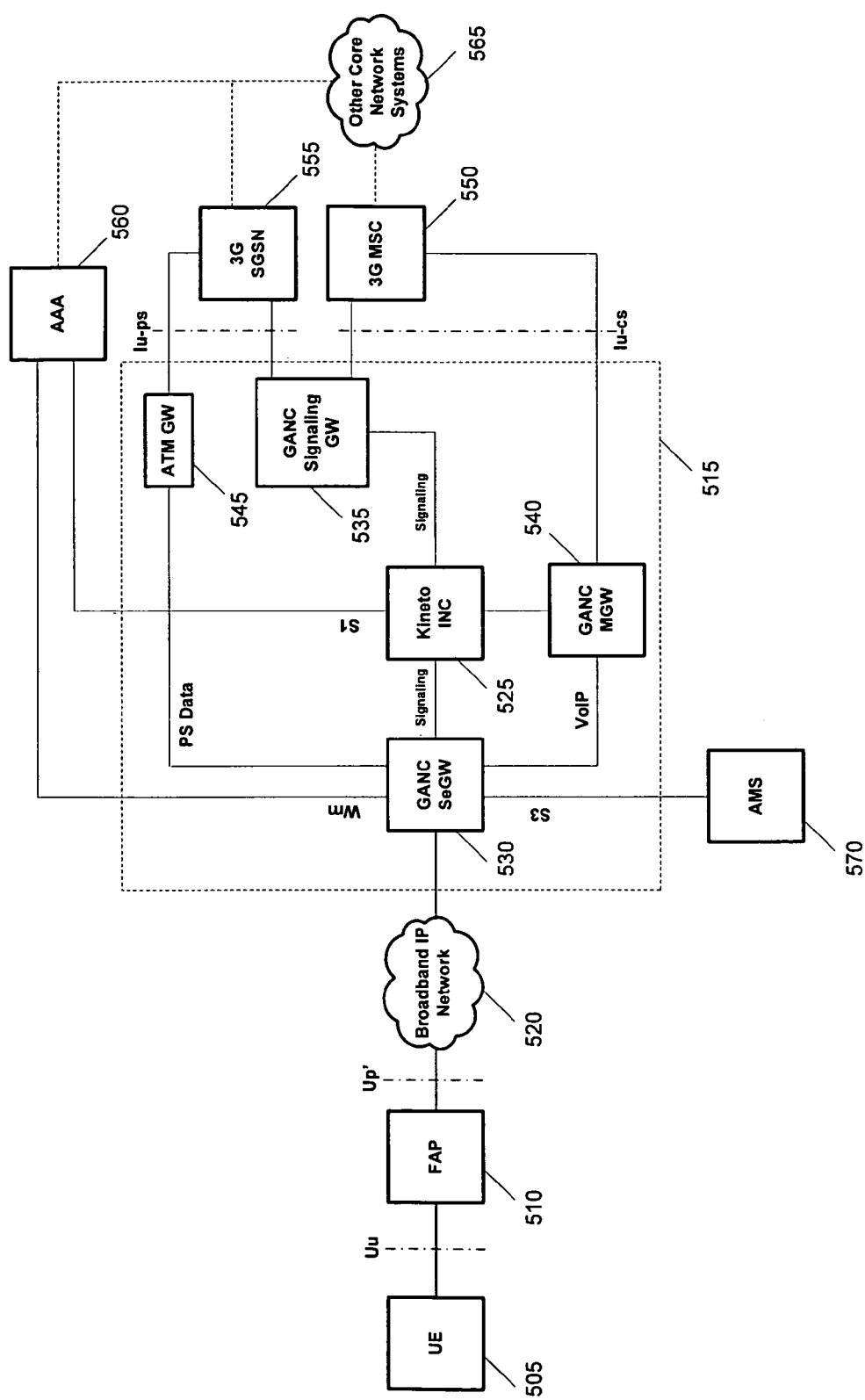
FIG. 5 illustrates the basic elements of a Femtocell system architecture with Asynchronous Transfer Mode based Iu interfaces towards the core network in some embodiments.

FIG. 5 illustrates the basic elements of a Femtocell system architecture with Asynchronous Transfer Mode (ATM) based Iu (Iu-cs and Iu-ps) interfaces towards the CN in some embodiments. These elements include the user equipment (UE) 505, the FAP 510, and the Generic Access Network Controller (GANC) 515, and the Access Point Management SYSTEM (AMS) 570.

For simplicity, only one UE and one FAP are shown. However, each GANC can support multiple FAPs and each FAP in turn can support multiple UEs. As shown, the GANC 515 includes an IP Network Controller (INC) 525, a GANC Security Gateway (SeGW) 530, a GANC Signaling Gateway 535, a GANC Media Gateway (MGW) 540, an ATM Gateway (545). Elements of the Femtocell are described further below.

Figure 6:
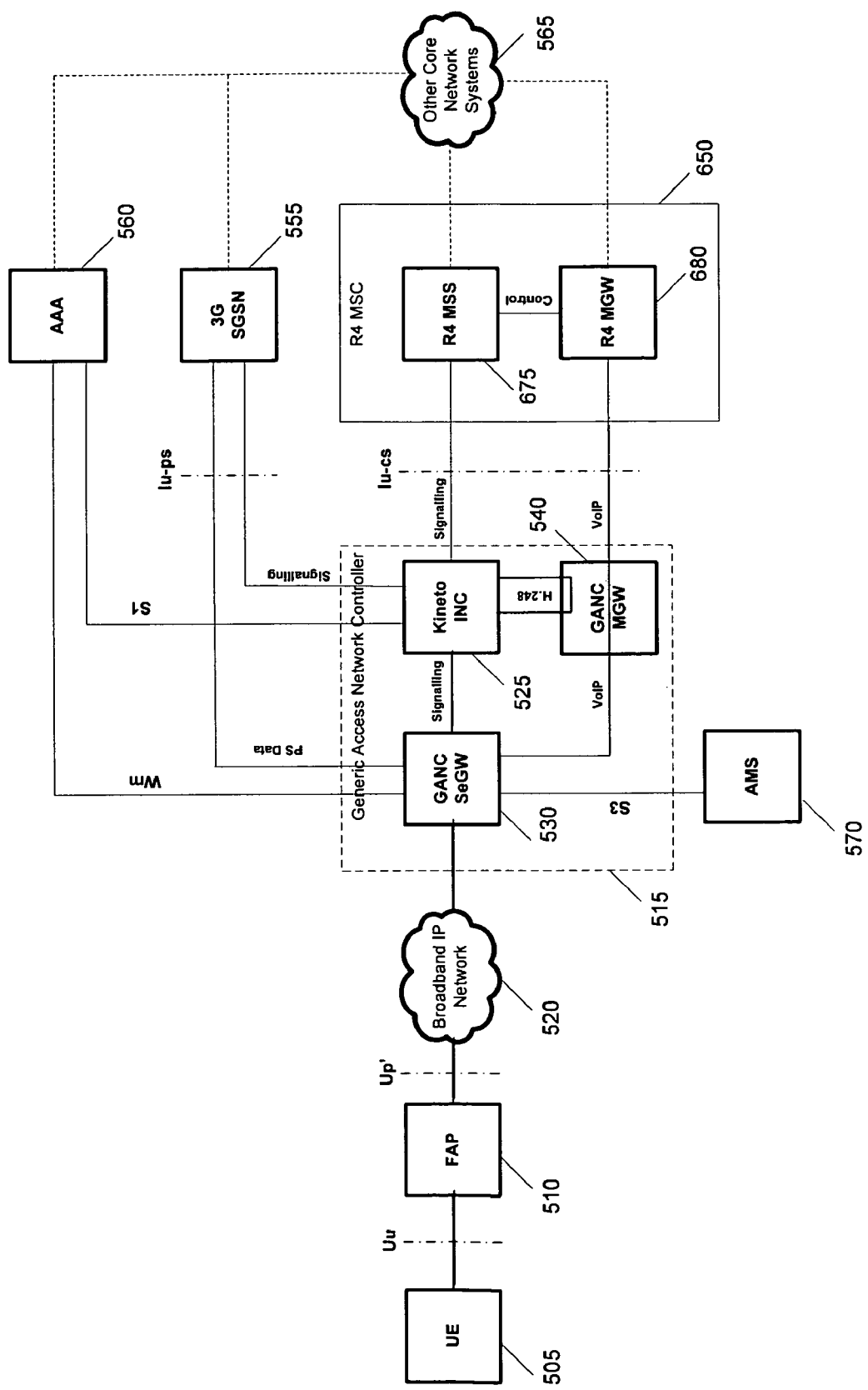
FIG. 6 illustrates the basic elements of a Femtocell system architecture with an IP based Iu interface towards the core network in some embodiments.

FIG. 6 illustrates the basic elements of a Femtocell system architecture with an IP based Iu (Iu-cs and Iu-ps) interface towards the CN in some embodiments. For simplicity, only one UE and one FAP are shown. However, each GANC can support multiple FAPs and each FAP in turn can support multiple UEs. This option eliminates the need for the GANC Signaling gateway 535 and also the ATM gateway 545. Optionally for IP based Iu interface, the GANC Media Gateway 540 can also be eliminated if the R4 MGW 605 in the CN can support termination of voice data i.e. RTP frames as defined in "IETF RFC 3267—Real-Time Transport Protocol (RTP) Payload Format and File Storage Format for the Adaptive Multi-Rate (AMR) and Adaptive Multi-Rate Wideband (AMR-WB) Audio Codecs", "RFC 3267".

Also shown in FIGS. 5 and 6 are components of the licensed wireless communication systems. These components are 3G MSC 550, 3G SGSN 555, and other Core Network System (shown together) 565. The 3G MSC 550 provides a standard Iu-cs interface towards the GANC. Another alternative for the MSC is shown in FIG. 6. As shown, the MSC 650 is split up into a MSS (MSC Server) 675 for Iu-cs based signaling and MGW 680 for the bearer path. R4 MSC 650 is a release 4 version of a 3G MSC with a different architecture i.e. R4 MSC is split into MSS for control traffic and a MGW for handling the bearer. A similar MSC can be used for the ATM architecture of FIG. 5. Both architectures shown in FIG. 5 and 6 are also adaptable to use any future versions of the MSC.

The 3G SGSN 555 provides packet services (PS) via the standard Iu-ps interface. The SGSN connects to the INC 525 for signaling and to the SeGW 530 for PS data. The AAA server 560 communicates with the SeGW 530 and supports the EAP-AKA and EAP-SIM procedures used in IKEv2 over the Wm interface and includes a MAP interface to the HLR/AuC. In some embodiments, this system also supports the enhanced service access control functions over the S1 interface.

II. Functional Entities

A. User Equipment

The UE 405 contains the functions that are required to access the Iu-mode GAN. In some embodiments, the UE additionally contains that are required to access the A/Gb-mode GAN. In some embodiments, the User Equipment (UE) 305 is a dual mode (e.g., GSM and unlicensed radios) handset device with capability to switch between the two modes. The user equipment can support either Bluetooth® or IEEE 802.11 protocols. In some embodiments, the UE supports an IP interface to the access point. In these embodiments, the IP connection from the GANC extends all the way to the UE. In some other embodiments, the User Equipment (UE) 305 is a standard 3G handset device operating over licensed spectrum of the provider.

In some embodiments, the user equipment includes a cellular telephone, smart phone, personal digital assistant, or computer equipped with a subscriber identity mobile (SIM) card for communicating over the licensed or unlicensed wireless networks. Moreover, in some embodiments the computer equipped with the SIM card communicates through a wired communication network.

Alternatively, in some embodiments the user equipment includes a fixed wireless device providing a set of terminal adapter functions for connecting Integrated Services Digital Network (ISDN), Session Initiation Protocol (SIP), or Plain Old Telephone Service (POTS) terminals to the ICS. Application of the present invention to this type of device enables the wireless service provider to offer the so-called landline replacement service to users, even for user locations not sufficiently covered by the licensed wireless network. Moreover, some embodiments of the terminal adapters are fixed wired devices for connecting ISDN, SIP, or POTS terminals to a different communication network (e.g., IP network) though alternate embodiments of the terminal adapters provide wireless equivalent functionality for connecting through unlicensed or licensed wireless networks.

B. Generic Access Network Controller (GANC)

The core network 425 interacts with the GANC 410 as though it was an RNC. The generic IP access network 415 provides connectivity between the GANC 410 and the UE 405. The GANC 410 entity inter-works between the Iu interfaces and a generic IP access network, using the control plane and user plane functionalities. The control plane functionality is utilized for call control signaling and the user plane functionality is utilized for information transfer (e.g., voice or data). In some embodiments, the GANC has the extended capability to also inter-work with GERAN A/Gb interfaces.

Some embodiments of the above mentioned devices, such as the user equipment, FAP, or GANC, include electronic components, such as microprocessors and memory (not shown), that store computer program instructions for executing wireless protocols for managing voice and data services in a machine-readable or computer-readable medium as further described below in the section labeled "Computer System". Examples of machine-readable media or computer-readable media include, but are not limited to magnetic media such as hard disks, memory modules, magnetic tape, optical media such as CD-ROMS and holographic devices, magneto-optical media such as optical disks, and hardware devices that are specially configured to store and execute program code, such as application specific integrated circuits (ASICs), programmable logic devices (PLDs), ROM, and RAM devices. Examples of computer programs or computer code include machine code, such as produced by a compiler, and files containing higher-level code that are executed by a computer, an electronic component, or a microprocessor using an interpreter.

III. Control and User Plane Architecture

In some embodiments, the Iu interface includes support for both Asynchronous Transfer Mode (ATM) and IP-based signaling and user data transport mechanisms. The following sections describe the control and user plane architectures for the Circuit Switched (CS) domain and Packet Switched (PS) domain of some embodiments.

A. Circuit Switched (CS) Domain

1. CS Domain—Control Plane

Figure 7:
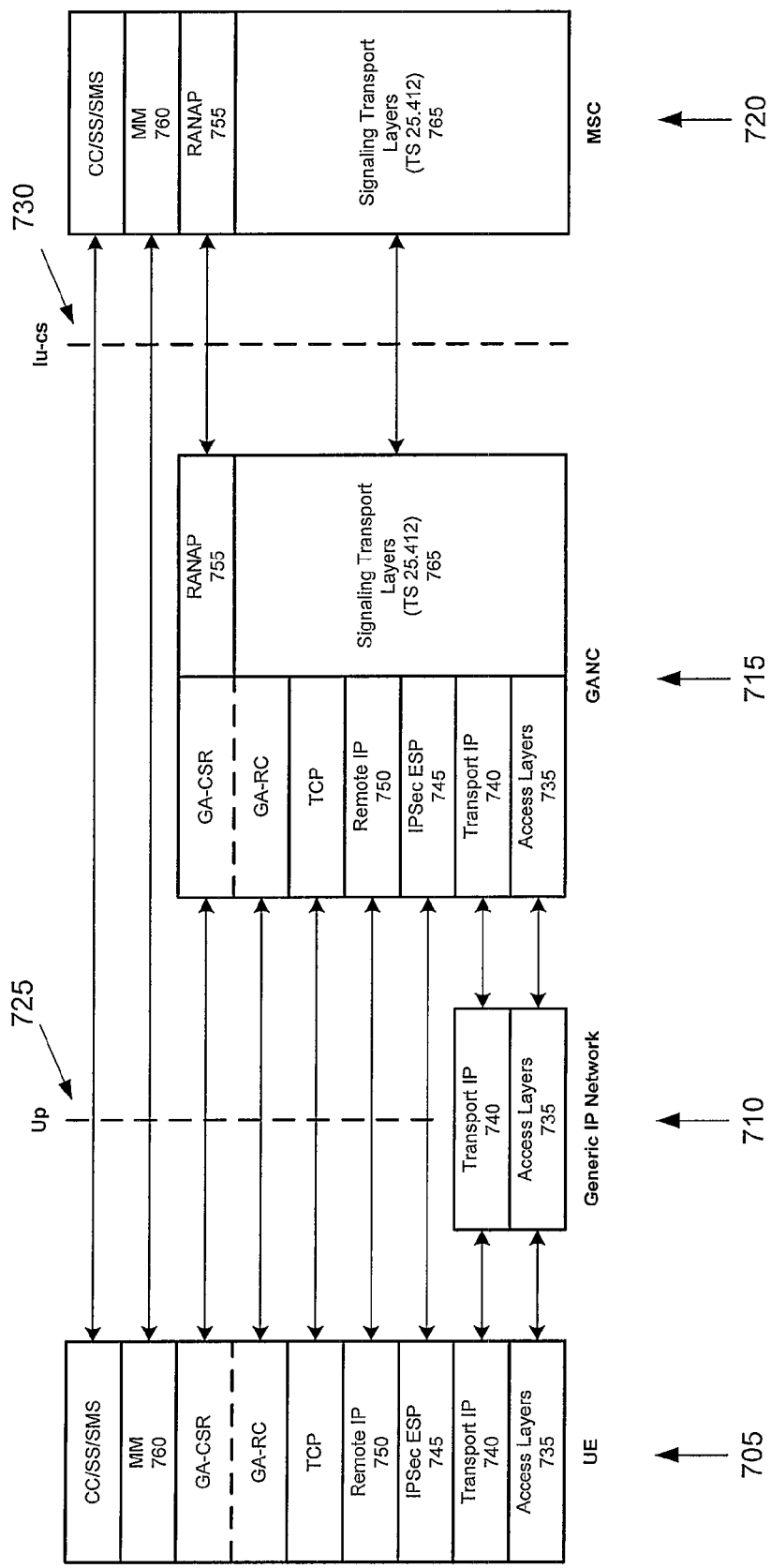
FIG. 7 illustrates the CS domain control plane architecture of some embodiments.

FIG. 7 illustrates the GAN architecture in support of the CS Domain control plane in some embodiments. The figure shows different protocol layers for the UE 705, Generic IP Network 710, GANC 715, and MSC 720. FIG. 7 also shows the two interfaces Up 725 and Iu-cs 730. The main features of the GAN CS domain control plane architecture are as follows. The underlying Access Layers 735 and Transport IP layer 740 provide the generic IP connectivity between the UE 705 and the GANC 715. The IPSec layer 745 provides encryption and data integrity between the UE 705 and GANC 715. The Remote IP layer 750 is the 'inner' IP layer for IPSec tunnel mode and is used by the UE 705 to be addressed by the GANC 715. The Remote IP layer 750 is configured during the IPSec connection establishment.

In some embodiments, a single TCP connection is used to provide reliable transport for both the GA-RC and GA-CSR signaling between the UE 705 and GANC 715. The TCP connection is managed by GA-RC and is transported using the Remote IP layer. Non-Access Stratum (NAS) protocols, such as MM 760 and above, are carried transparently between the UE 705 and MSC 720. The Generic Access Resource Control (GA-RC) protocol manages the Up session, including the GAN discovery and registration procedures. The GA-RC protocol (described in clause 8.1.4 of "Generic access to the A/Gb interface; Stage 2", 3GPP TS 43.318 standard) is extended to include support for the selection of either A/Gb mode or Iu mode GAN.

The Generic Access Circuit Switched Resource (GA-CSR) protocol supports UMTS-specific requirements as well as GERAN-specific requirements. The GANC 715 terminates the GA-CSR protocol and inter-works it to the RANAP 755 protocol over the Iu-cs 730 interface. In some embodiments, the Iu-cs signaling transport layers 765 are per "UTRAN Iu interface signalling transport", 3GPP TS 25.412 standard, hereinafter "3GPP TS 25.412".

a) Alternative Architectures for CS Domain—Control Plane

The embodiment shown in FIG. 7 is just one alternative for implementing the CS domain control plane architecture in which a UE 705 and a Generic IP Network 710 are used to connect a subscriber using the UE to the MSC 720 through the GANC 715. A person of ordinary skill in the art would realize that the teachings of the invention can be applied for other user equipment and access points (such as the ones described in FIG. 2).

Figure 8:
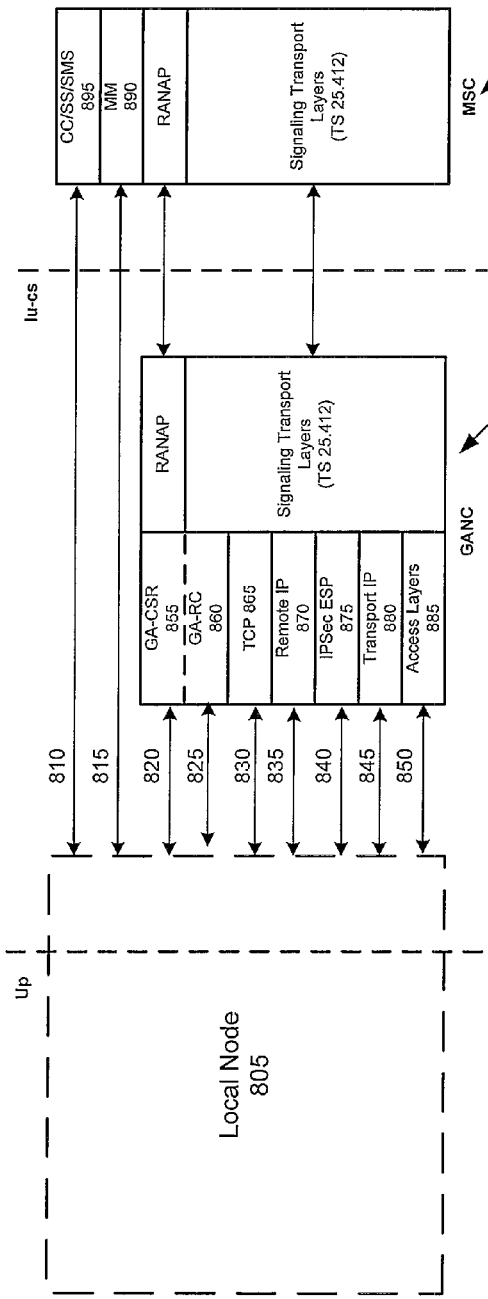
FIG. 8 illustrates the CS domain control plane architecture of some embodiments.
Figure 9:
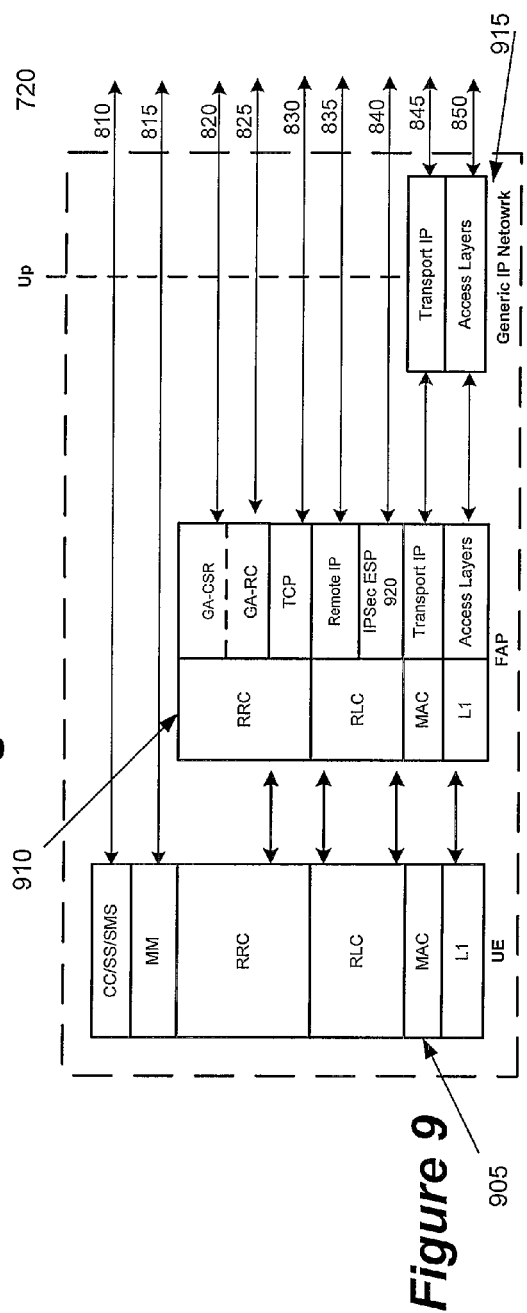
FIG. 9 illustrates the CS domain control plane architecture of some embodiments.

For instance, FIG. 8 illustrates the CS domain control plane architecture of some embodiments. As shown, the GANC and MSC in FIG. 8 are similar to the GANC and MSC shown in FIG. 7. In FIG. 8, the local node in which the subscriber is located is represented as a black box (referred to as Local Node 805). Different embodiments utilize different equipments in order to connect a subscriber located in the Local Node 805 with the MSC 720 through the GANC 715. For instance, in the embodiment shown in FIG. 7, a UE 705 and a Generic IP Network are used 710. FIG. 9 illustrates another embodiment in which a UE 905, a Femtocell access point (FAP) 910, and a Generic IP Network 915 are used to connect the Local Node 805 with the MSC 720 through the GANC 715.

As shown, the protocol layers of the GANC 880-885 are communicatively coupled (shown with arrows 845-850 respectively) with their corresponding layers in the Generic IP Network 915. Similarly, the GANC layers 855-875 are communicatively coupled (shown with arrows 820-840 respectively) with their corresponding layers in the FAP 910. Also the MM layer 890 and CC/CS/SMS layers 895 of the MSC 720 are transparently connected (shown with arrows 810-815 respectively) to their corresponding layers in the UE 905. Using this technique, the FAP similar to the FAP 235 shown in FIG. 2 can be utilized to connect a UE (such as UEs 270-275) to the wireless core network 220 through a network controller 210. A person of ordinary skill in the art would be able to apply the technique shown in FIGS. 8 and 9 to communicatively couple any user equipment, access points, terminal adaptors, SoftMobiles, etc. (such as the ones shown in FIG. 2) to an integrated communication system (ICS) that uses a multi-layer CS domain control architecture as shown in FIG. 7.

b) CS Domain—Control Plane—UE Architecture

Figure 10:
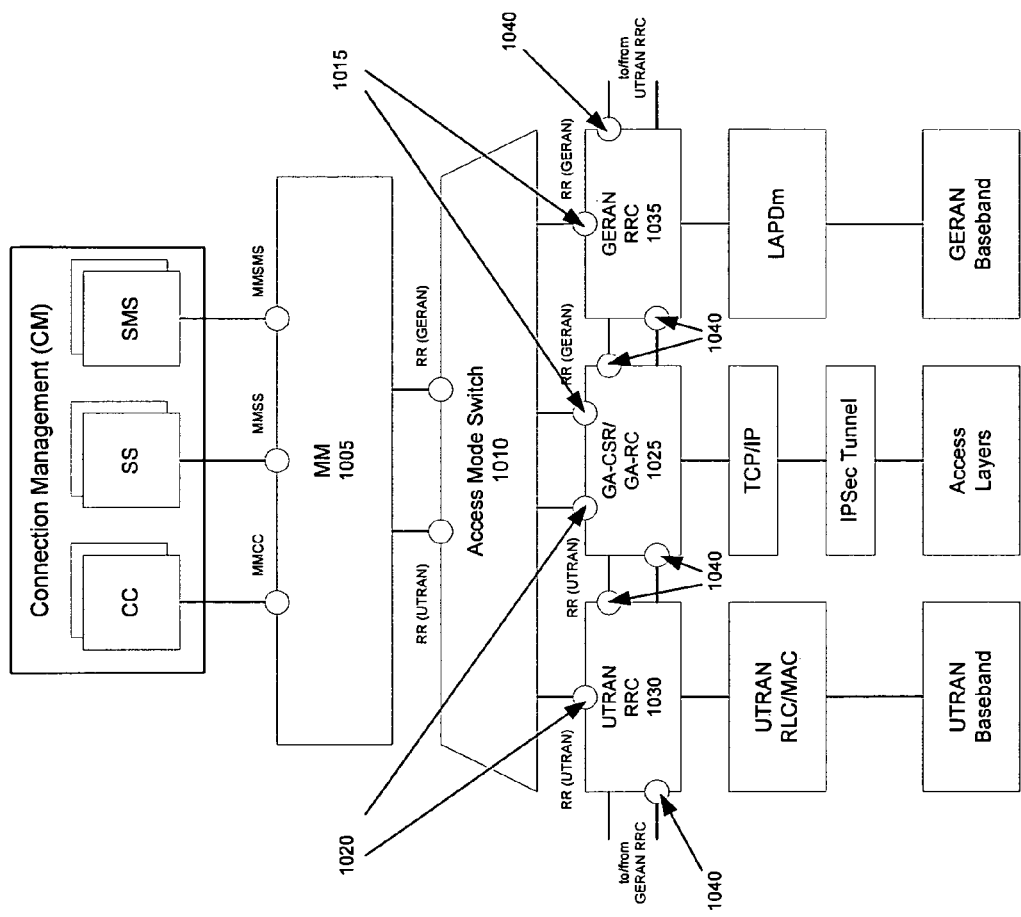
FIG. 10 illustrates the UE CS domain control plane architecture of some embodiments.

FIG. 10 illustrates the UE architecture for the CS domain control plane. As shown, the architecture includes support for GERAN, UTRAN, and both A/Gb mode GAN and Iu mode GAN. The main features of the UE CS Domain Control Plane architecture shown in FIG. 10 are as follows. The GERAN RR-SAP interface 1015 to the GSM-MM layer 1005 is preserved identically for both GERAN and A/Gb-mode GAN access. Likewise, the UTRAN RR-SAP interface 1020 to the GSM-MM layer 1005 is preserved identically for both UTRAN and Iu-mode GAN access. An access mode switch 1010 is provided to switch between GERAN/UTRAN, A/GB-mode GAN and Iu-mode GAN modes. GA-CSR/GA-RC 1025 peers directly with the UTRAN RRC 1030 and GERAN RRC 1035 layers to provide coordination for roving and handover. As shown in FIG. 10, GA-CSR/GA-RC 1025, UTRAN RRC 1030, and GERAN RRC 1035 interface through a set of service access interfaces (SAPs) 1040.

2. CS Domain—User Plane

Figure 11:
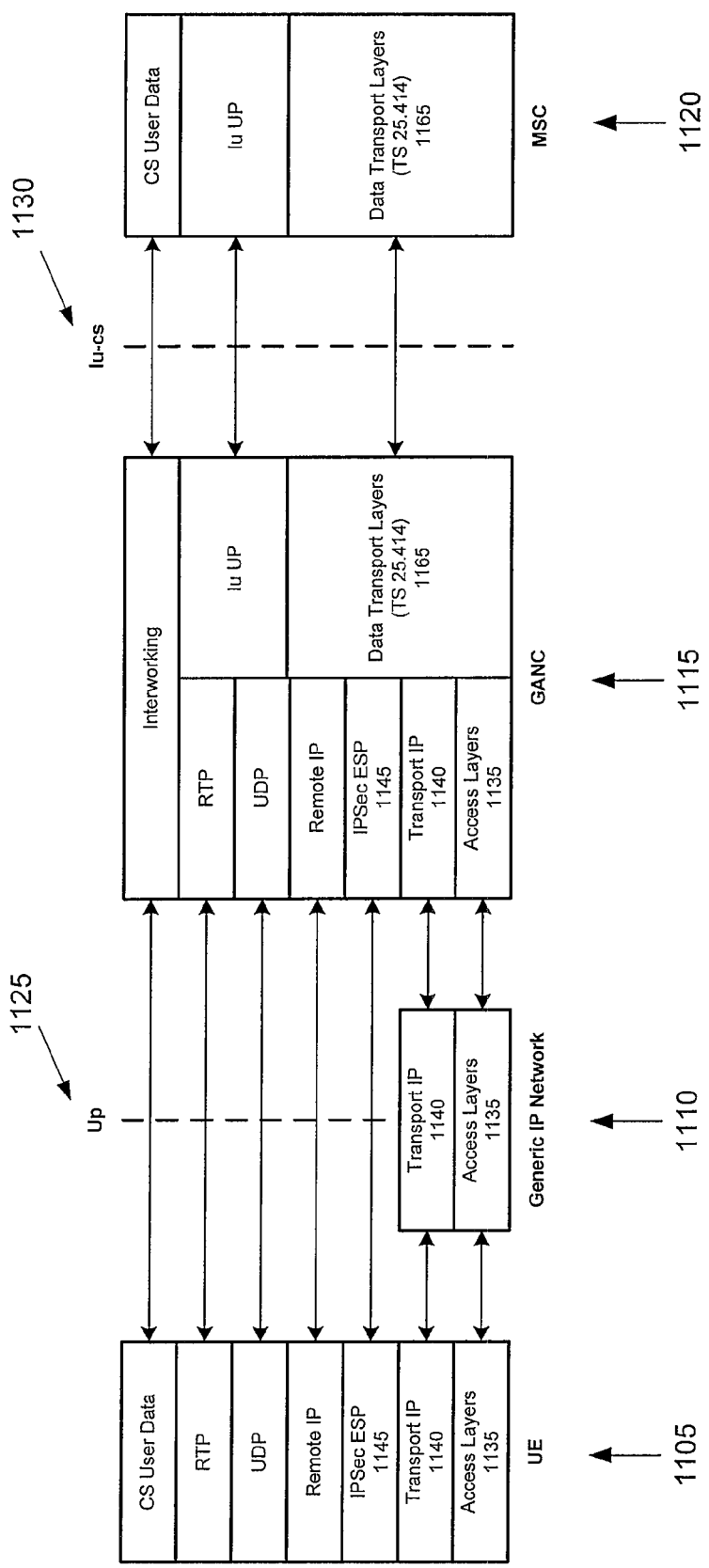
FIG. 11 illustrates CS domain user plane protocol architecture of some embodiments.

FIG. 11 illustrates the GAN protocol architecture in support of the CS domain user plane in some embodiments. The figure shows different protocol layers for the UE 1105, Generic IP Network 1110, GANC 1115, and MSC 1120. FIG. 11 also shows the two interfaces Up 1125 and Iu-cs 1130. The main features of the GAN CS domain user plane architecture are as follows. The underlying Access Layers 1135 and Transport IP layer 1140 provide the generic connectivity between the UE 1105 and the GANC 1115. The IPSec layer 1145 provides encryption and data integrity. The CS user plane data transport over the Up interface 1125 is the same as the CS user plane for A/Gb-mode GAN (i.e., using the Real Time Protocol, RTP, per IETF RFC 3267. The GANC 1115 interworks the CS domain user plane between RTP/UDP and the Iu User Plane (Iu-UP) protocol on the Iu-cs interface 1130. In some embodiments, the Iu-cs Data transport layers 1165 are per 3GPP TS 25.414 standard.

Figure 12:
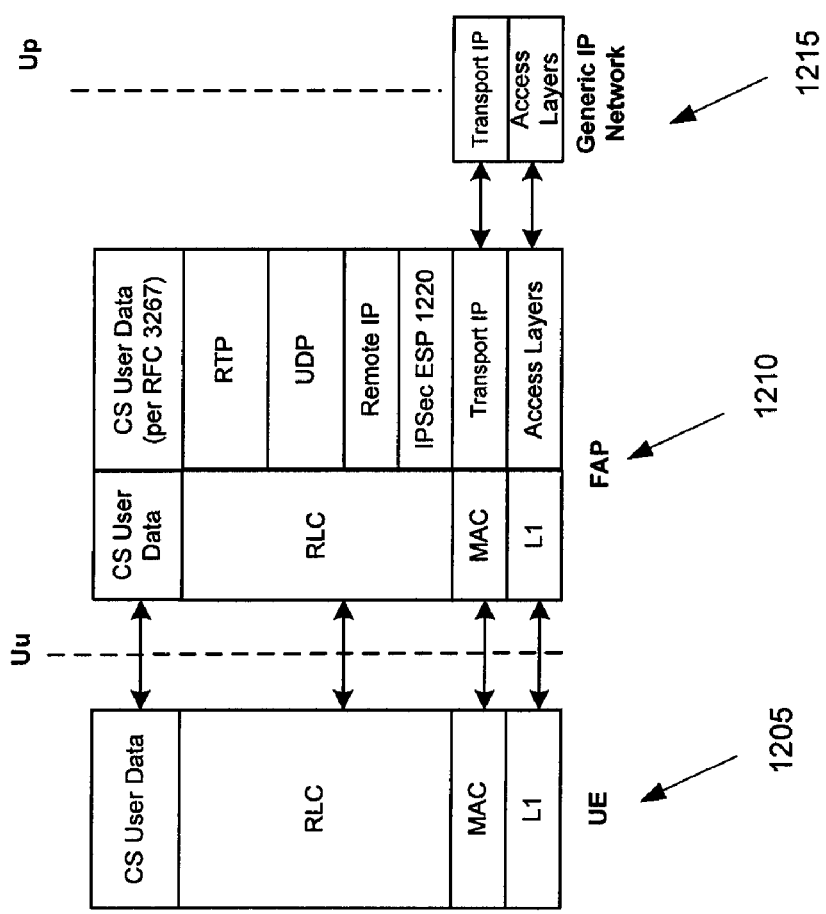
FIG. 12 illustrates CS domain user plane protocol architecture of some embodiments.

A person of ordinary skill in the art would realize that other user equipments, access point, terminal adaptor, SoftMobiles, etc. can be connected to the core network through a GANC. For instance, FIG. 12 illustrates the CS domain, user plane protocol architecture of a UE 1205, a Femtocell access point (FAP) 1210, and Generic IP Network 1215. Using the technique described in conjunction with FIGS. 8 and 9, a person of ordinary skill in the art would be able to replace the UE 1105 and Generic IP Network 1110 shown in FIG. 11 with the UE 1205, FAP 1210, and Generic IP Network 1215 to connect the Femtocell UE 1205 to the core network through the GANC. Similarly, other types of UE, access points, terminal adaptors, SoftMobiles, etc. can be connected to the core network through the GANC.

b) CS Domain—User Plane—UE Architecture

Figure 13:
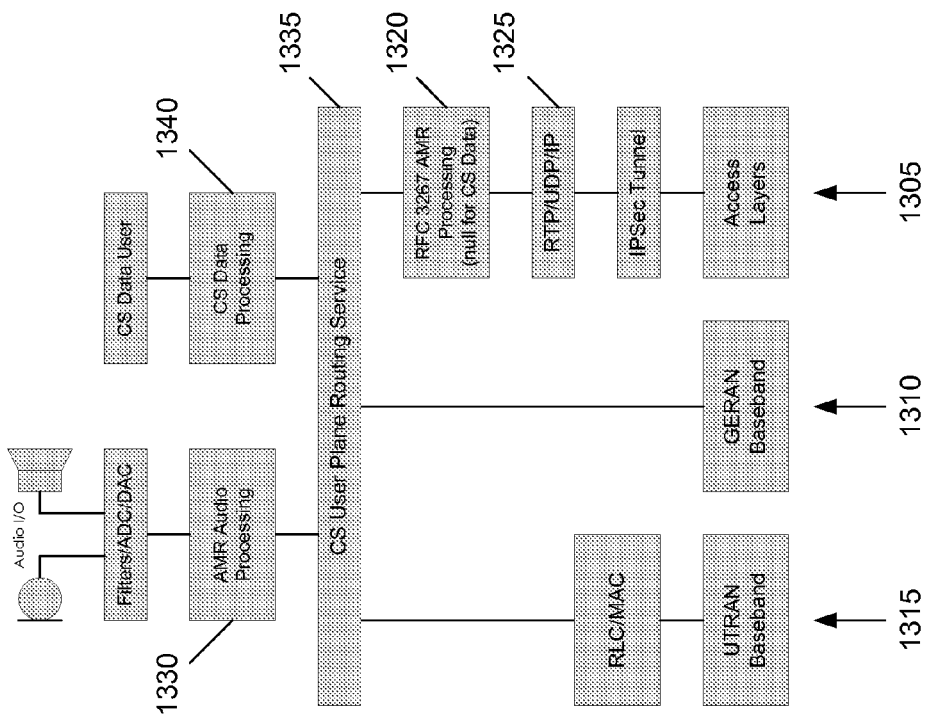
FIG. 13 illustrates the UE CS domain user plane architecture of some embodiments.

FIG. 13 illustrates the UE architecture for the CS domain user plane in some embodiments. As shown, the architecture includes support for both A/Gb mode and Iu mode GAN 1305, as well as GERAN 1310, and UTRAN 1315. The RFC 3267 AMR Processing layer 1320 is utilized for connecting the GAN RTP/UDP/IP layers 1325 to the AMR Audio Processing layer 1330 through the CS User Plane Routing Service layer 1335, which routes CS user plane data to and from the selected access network; i.e., GERAN, UTRAN, or GAN. The RFC 3267 AMR Processing layer 1320 is not used when connecting to the CS Data Processing layer 1340; i.e., in the case of circuit switched data, as opposed to circuit switched voice.

B. Packet Switched (PS) Domain

1. PS Domain—Control Plane

Figure 14:
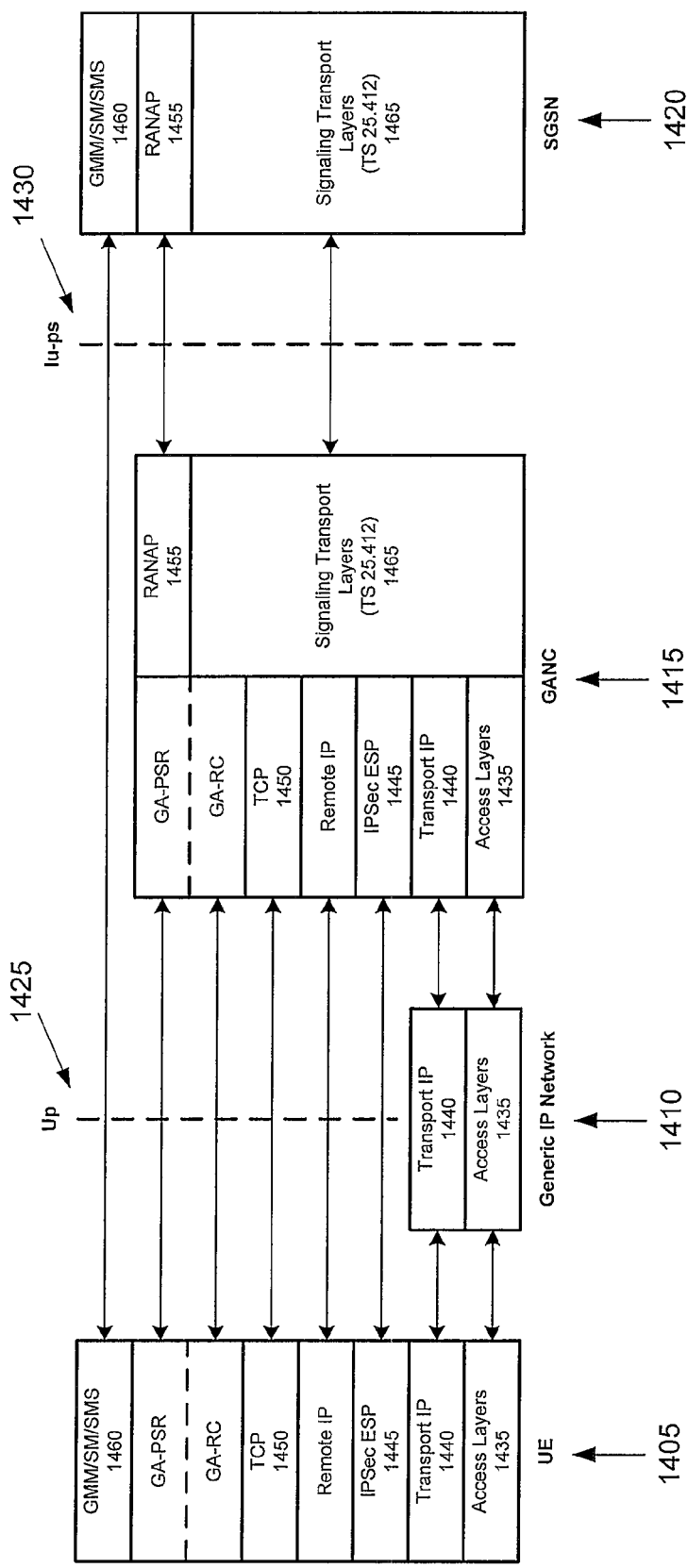
FIG. 14 illustrates PS domain control plane architecture of some embodiments.

FIG. 14 illustrates the GAN architecture in support of the PS Domain Control plane. The figure shows different protocol layers for the UE 1405, Generic IP Network 1410, GANC 1415, SGSN 1420. FIG. 14 also shows the two interfaces Up 1425 and Iu-ps 1430. The main features of the GAN PS domain control plane architecture shown in FIG. 14 are as follows. The underlying Access Layers 1435 and Transport IP layer 1440 provide the generic connectivity between the UE 1405 and the GANC 1415. The IPSec layer 1445 provides encryption and data integrity. TCP 1450 provides reliable transport for the GA-PSR between UE 1405 and GANC 1415. The GA-RC manages the IP connection, including the GAN registration procedures. The Generic Access Packet Switched Resource (GA-PSR) protocol supports UMTS-specific requirements.

The GANC 1415 terminates the GA-PSR protocol and inter-works it to the RANAP protocol 1455 over the Iu-ps interface 1430. NAS protocols 1460, such as for GMM, SM and SMS, are carried transparently between the UE 1405 and SGSN 1420. In some embodiments, the Iu-ps signaling transport layers 1465 are per 3GPP TS 25.412.

Figure 15:
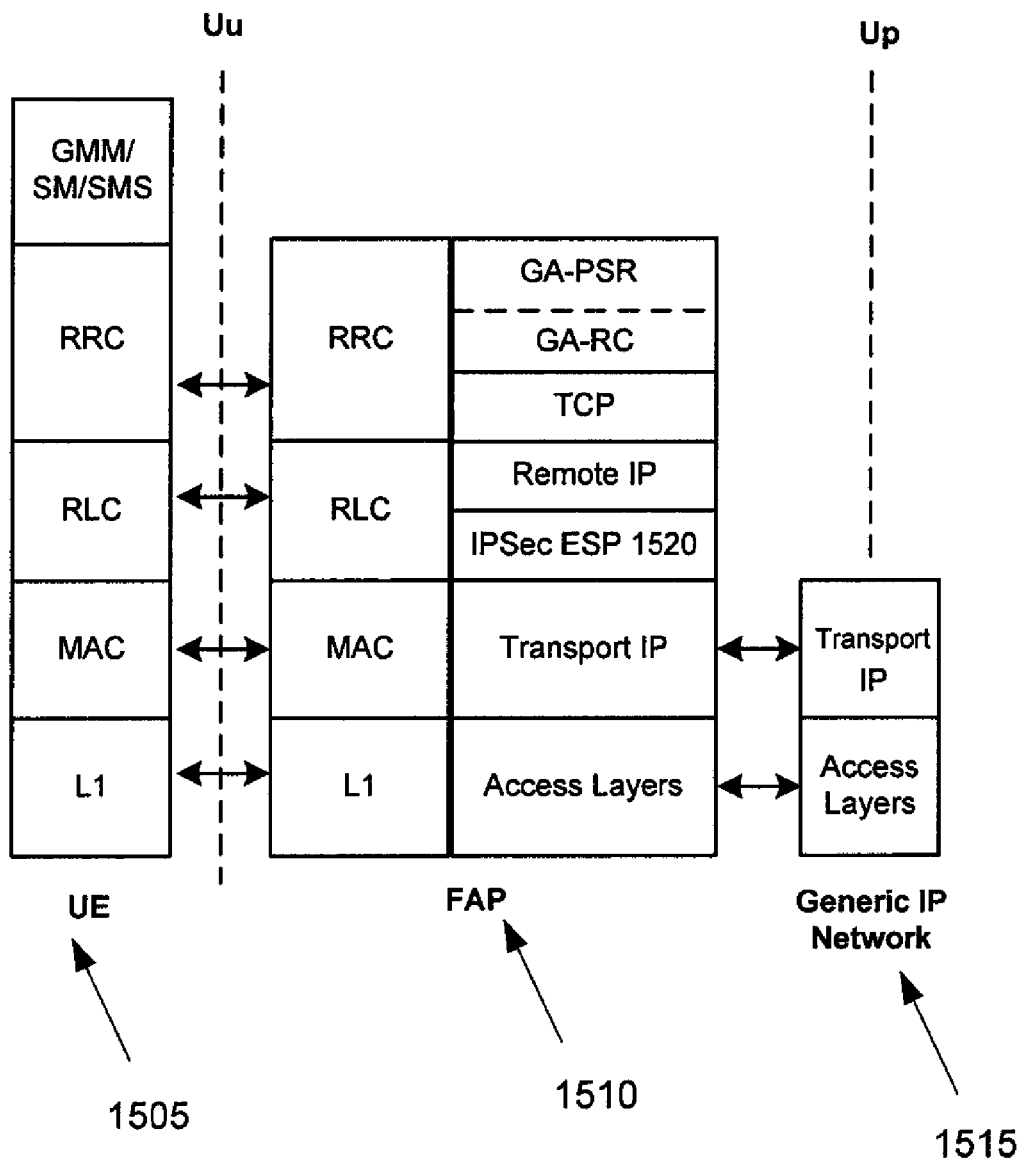
FIG. 15 illustrates PS domain control plane architecture of some embodiments.

A person of ordinary skill in the art would realize that other user equipments, access point, terminal adaptor, SoftMobiles, etc. can be connected to the core network through a GANC. For instance, FIG. 15 illustrates the PS domain, control plane protocol architecture of a UE 1505, a Femtocell access point (FAP) 1510, and Generic IP Network 1515. Using the technique described in conjunction with FIGS. 8 and 9, a person of ordinary skill in the art would be able to replace the UE 1405 and Generic IP Network 1410 shown in FIG. 11 with the UE 1505, FAP 1510, and Generic IP Network 1515 to connect the Femtocell UE 1505 to the core network through the GANC. Similarly, other types of UE, access points, terminal adaptors, SoftMobiles, etc. can be connected to the core network through the GANC.

c) PS Domain—Control Plane—UE Architecture

Figure 16:
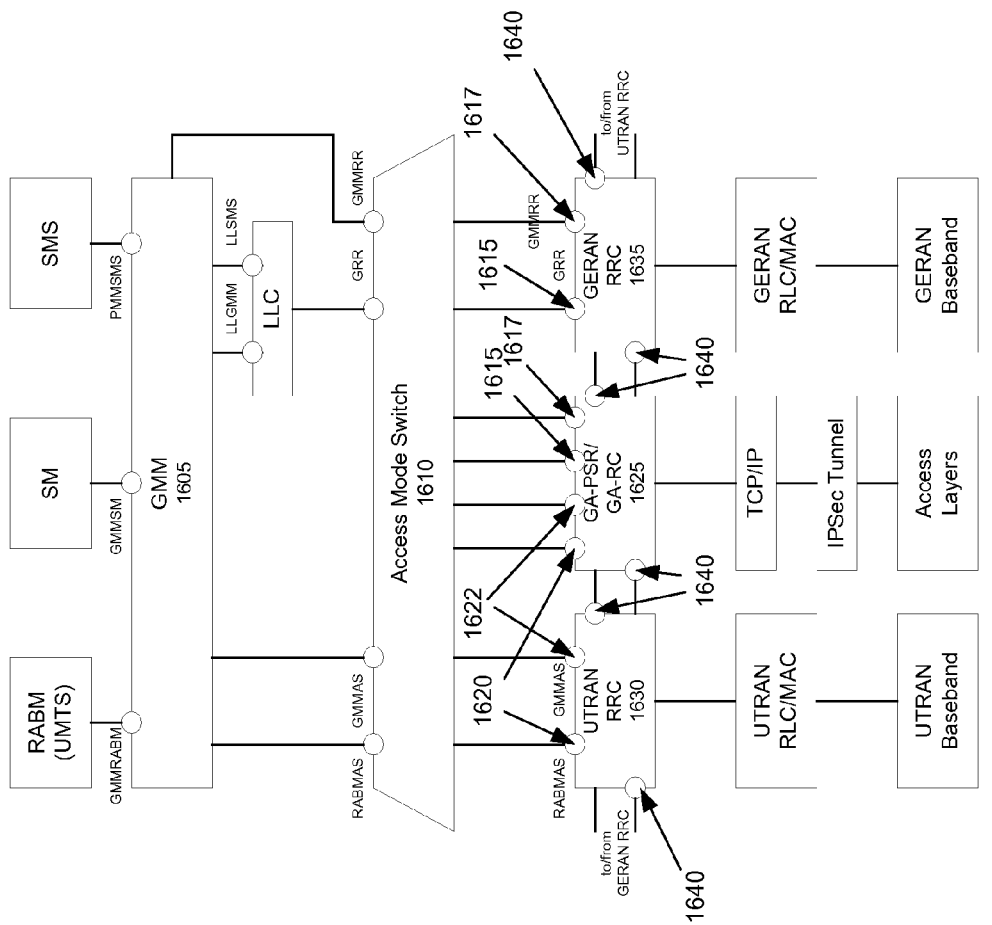
FIG. 16 illustrates the UE PS domain control architecture of some embodiments.

FIG. 16 illustrates the UE architecture for the PS domain control plane in some embodiments. As shown, the architecture includes support for both A/Gb mode and Iu mode GAN, as well as GERAN and UTRAN. The main features of the UE PS Domain Control Plane architecture shown in FIG. 16 are as follows. The GERAN GRR-SAP interface 1615 and GERAN GMMRR-SAP interface 1617 to the GMM layer 1605 is preserved identically for both GERAN and A/Gb-mode GAN access. Likewise, the UTRAN RABMAS-SAP interface 1620 and UTRAN GMMAS-SAP interface 1622 to the GMM layer 1605 is preserved identically for both UTRAN and Iu-mode GAN access. An access mode switch 1610 is provided to switch between GERAN/UTRAN, A/GB-mode GAN and Iu-mode GAN modes. GA-PSR/GA-RC 1625 peers directly with the UTRAN RRC 1630 and GERAN RRC 1635 layers to provide coordination for roving and handover. As shown in FIG. 16, GA-PSR/GA-RC 1625, UTRAN RRC 1630, and GERAN RRC 1635 interface through a set of service access interfaces (SAPs) 1640.

2. PS Domain—User Plane

Figure 17:
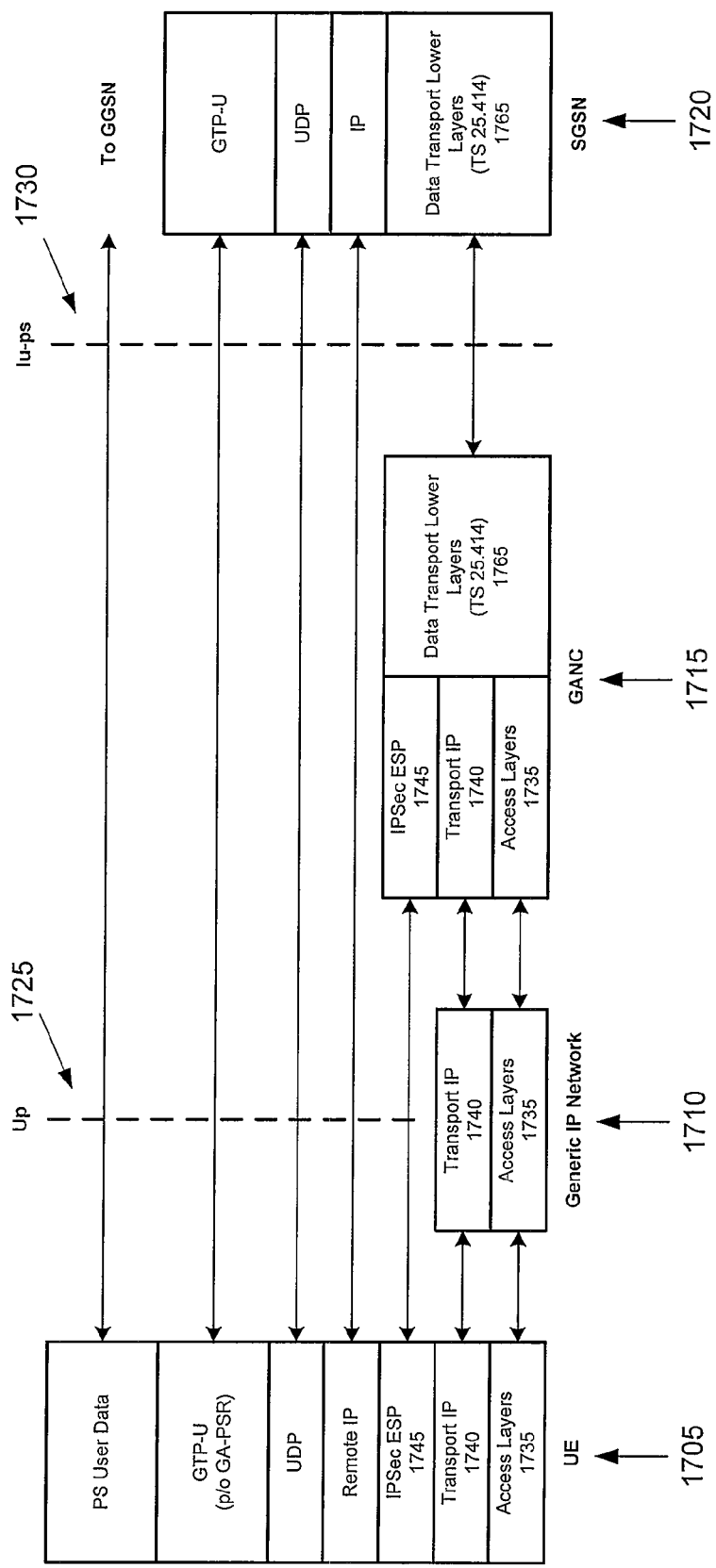
FIG. 17 illustrates PS domain user plane protocol architecture of some embodiments.

FIG. 17 illustrates the GAN architecture for the PS Domain User Plane in some embodiments. The figure shows different protocol layers for the UE 1705, Generic IP Network 1710, GANC 1715, SGSN 1720. FIG. 17 also shows the two interfaces Up 1725 and Iu-ps 1730. The main features of the GAN PS domain user plane architecture shown in FIG. 17 are as follows. The underlying Access Layers 1735 and Transport IP layer 1740 provide the generic connectivity between the UE 1705 and the GANC 1715. The IPSec layer 1745 provides encryption and data integrity.

GA-PSR is extended to include support for the GTP-U G-PDU message format to transport PS User Data (e.g., IP packets), rather than LLC PDUs as in A/Gb mode GAN. As shown in FIG. 17, user data in GTP-U G-PDU messages may be carried transparently between the UE 1705 and core network through the SGSN to the GGSN. In some embodiments, the Iu-ps data transport lower layers 1765 are per 3GPP TS 25.414 standard.

Figure 18:
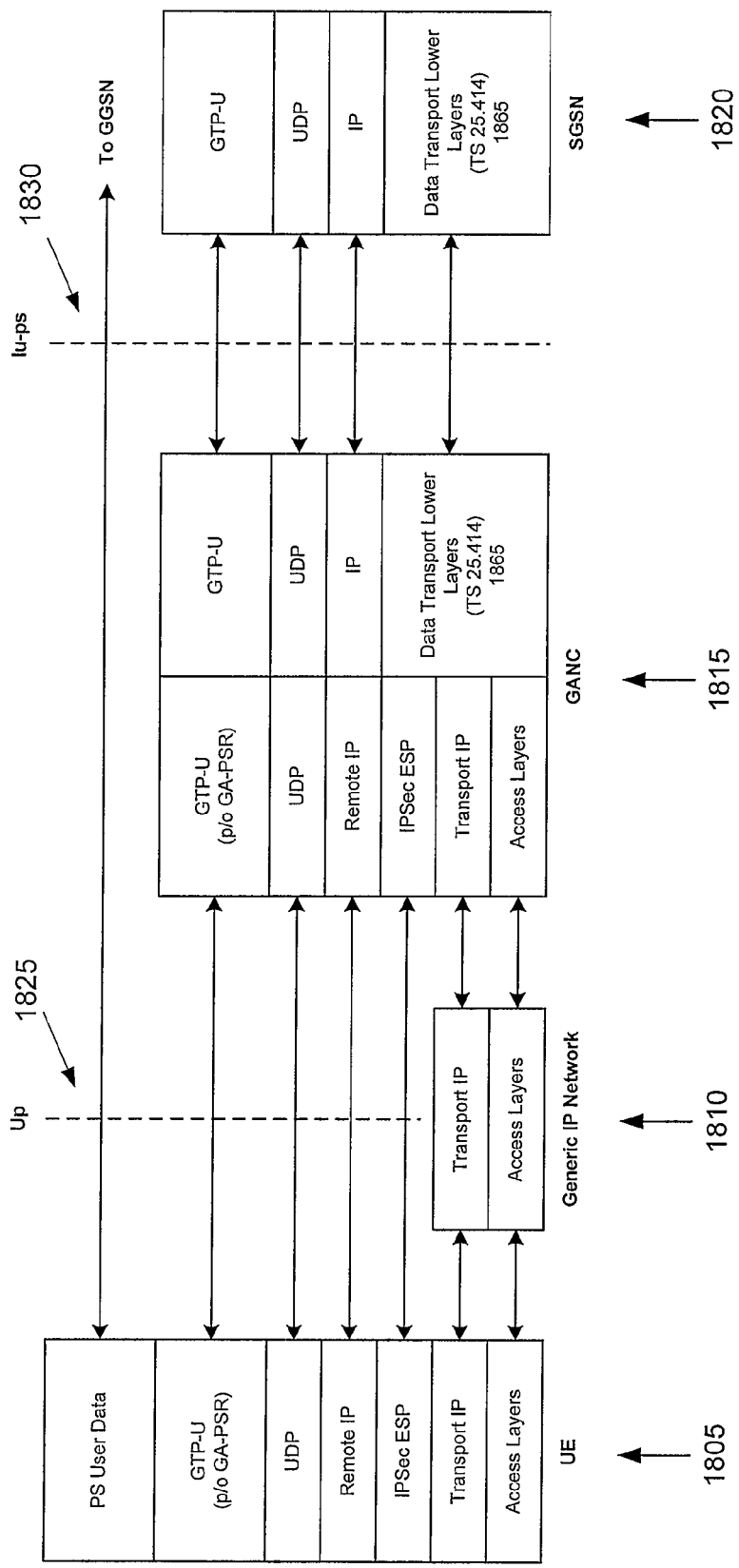
FIG. 18 illustrates PS domain user plane protocol architecture of some embodiments.

FIG. 18 illustrates an alternative GAN PS domain user plane configuration which is supported by the Up interface procedures of some embodiments. In this configuration, the GANC 1815 terminates the Up interface GTP-U tunnel with the UE 1805 and also terminates the separate Iu-ps GTP-U tunnel to the SGSN 1820. The GANC 1815 relays the PS user data between the Up interface GTP-U tunnel and the associated Iu-ps interface GTP-U tunnel to allow the PS user data to flow between the UE and the SGSN.

This configuration minimizes the number of active GTP-U "paths" presented to the core network; i.e., the SGSN may be limited in the number of RNCs with which it can concurrently exchange PS user data (e.g., today, there can be no more than 4096 RNCs in a given PLMN). It may not be able to support—without a software upgrade, for example—concurrent communication with hundreds of thousands of UEs as would be required if the GTP-U tunnels were from UE to SGSN. Terminating the Iu-ps GTP-U tunnels on the GANC avoids this potential SGSN limitation. In some embodiments, the Iu-ps data transport lower layers 1865 are per 3GPP TS 25.414 standard.

Figure 19:
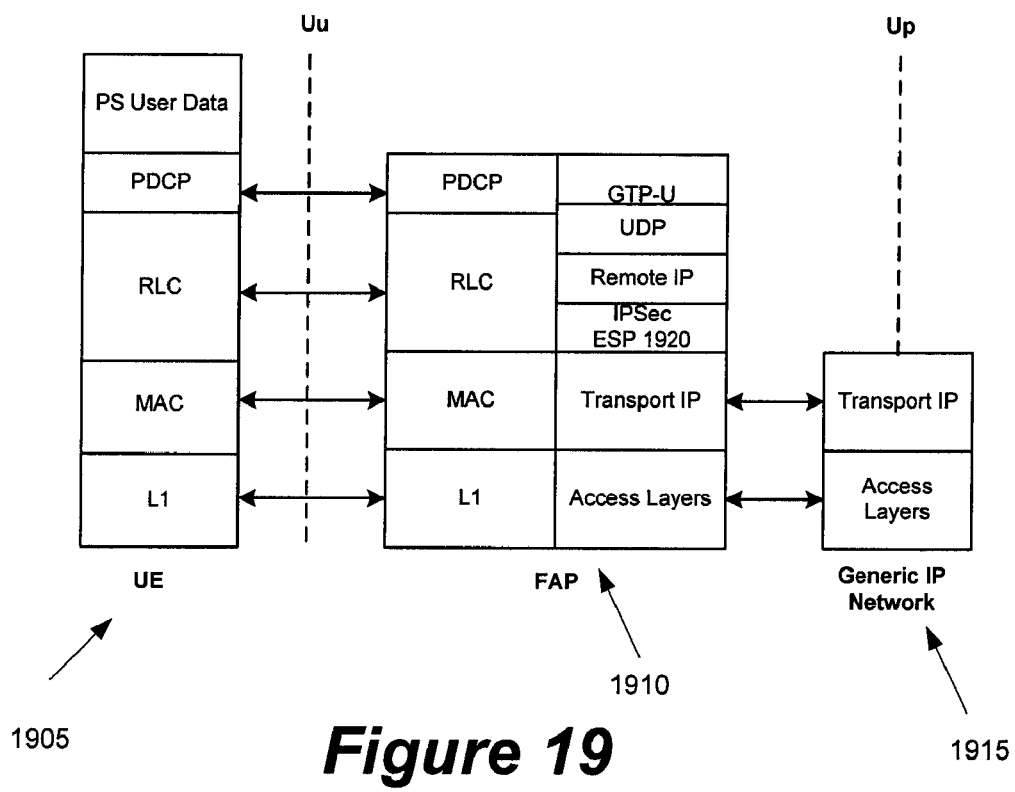
FIG. 19 illustrates PS domain user plane protocol architecture of some embodiments.

A person of ordinary skill in the art would realize that other user equipments, access point, terminal adaptor, SoftMobiles, etc. can be connected to the core network through a GANC. For instance, FIG. 19 illustrates the PS domain, user plane protocol architecture of a UE 1905, a Femtocell access point (FAP) 1910, and Generic IP Network 1915. Using the technique described in conjunction with FIGS. 8 and 9, a person of ordinary skill in the art would be able to replace the UE 1805 and Generic IP Network 1810 shown in FIG. 11 with the UE 1905, FAP 1910, and Generic IP Network 1915 to connect the Femtocell UE 1905 to the core network through the GANC. Similarly, other types of UE, access points, terminal adaptors, SoftMobiles, etc. can be connected to the core network through the GANC.

a) PS Domain—User Plane—UE Architecture

Figure 20:
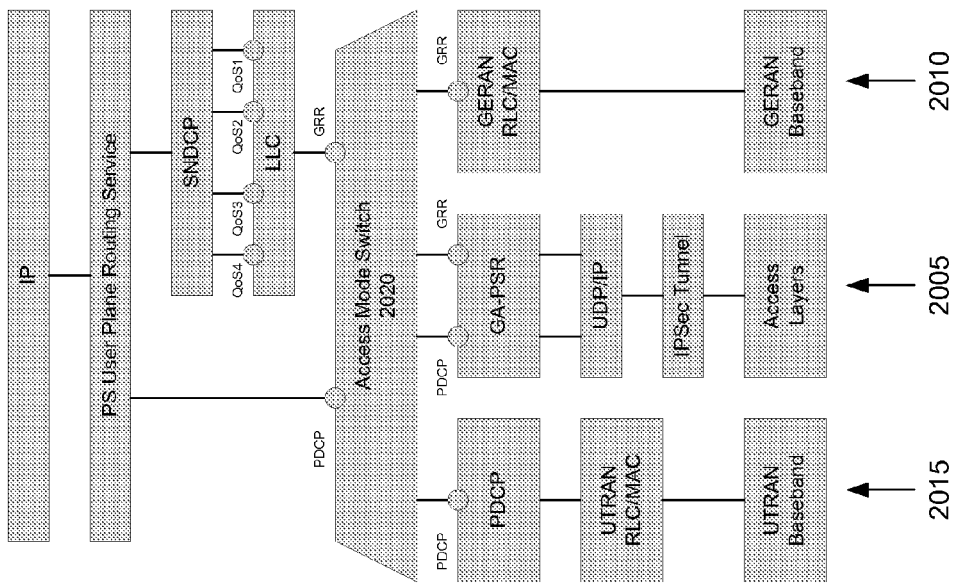
FIG. 20 illustrates the UE PS domain user plane architecture of some embodiments.

FIG. 20 illustrates the UE architecture for the PS domain user plane in some embodiments. As shown, the architecture includes support for both A/Gb mode and Iu mode GAN 2005, as well as GERAN 2010, and UTRAN 2015. An access mode switch 2020 is provided to switch between GERAN/UTRAN, A/GB-mode GAN and Iu-mode GAN modes.

C. GA-RC (Generic Access Resource Control)

The GA-RC protocol provides a resource management layer, with the following functions. Discovery and registration with GANC, registration update with GANC, application level keep-alive with GANC; and support for identification of the AP being used for GAN access.

1. States of the GA-RC Sub-Layer

Figure 21:
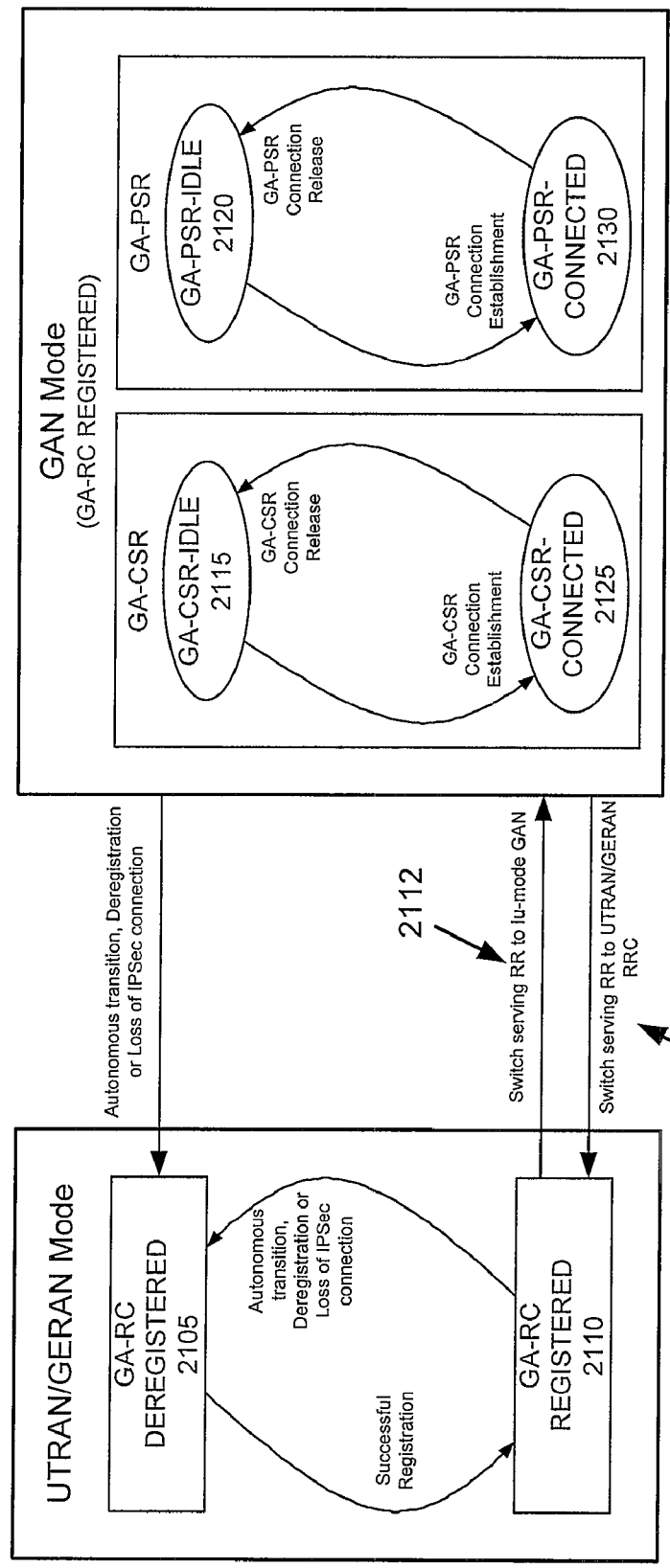
FIG. 21 illustrates state diagram for generic access in the UE of some embodiments.

FIG. 21 illustrates the state diagram for generic access in the UE in some embodiments. As shown, the GA-RC sub-layer in the UE can be in one of two states: GA-RC-DEREGISTERED 2105 or GA-RC-REGISTERED 2110. The following outcomes are possible when switching (shown by arrow 2112) the serving RR to Iu-mode GAN: (1) Transition to GA-CSR-IDLE 2115 and GA-PSR-IDLE 2120 (i.e., if the UE is idle during the transition), (2) Transition to GA-CSR-CONNECTED 2125 and GA-PSR-IDLE 2130 (i.e., due to CS handover or relocation), (3) Transition to GA-CSR-IDLE 2115 and GA-PSR-CONNECTED 2130 (i.e., due to PS handover or relocation), (4) Transition to GA-CSR-CONNECTED 2125 and GA-PSR-CONNECTED 2130 (i.e., due to dual transfer mode handover or CS+PS relocation). The switch of the serving RR from GAN to GERAN/UTRAN RRC (shown by arrow 2135) may occur when the UE is in any combination of the GA-CSR and GA-PSR states.

In the GA-RC-DEREGISTERED state 2105, the UE may be in a GAN coverage area; however, the UE has not registered successfully with the GANC. The UE may initiate the GAN Registration procedure when in the GA-RC-DEREGISTERED state 2105. The UE returns to GA-RC-DEREGISTERED state 2105 on loss of TCP or IPSec connection or on execution of the GAN De-registration procedure.

In the GA-RC-REGISTERED state 2110, the UE is registered with the Serving GANC. The UE has an IPSec tunnel and a TCP connection established to the Serving GANC through which the UE may exchange GA-RC, GA-CSR, and GA-PSR signaling messages with the GANC.

While the UE remains in the GA-RC-REGISTERED state 2110 it performs application level keep-alive with the GANC. In the GA-RC-REGISTERED state 2110, the UE may be in either UTRAN/GERAN mode or GAN mode. The UE may either (1) be camped on GERAN or UTRAN and idle, (2) be active in GERAN or UTRAN (e.g., a GSM RR or a UTRAN RRC connection may be established), (3) have "roved in" to GAN mode, or (4) have recently "roved out" of GAN mode (e.g., due to handover from GAN).

D. GA-CSR (Generic Access Circuit Switched Resources)

The GA-CSR protocol provides a circuit switched services resource management layer which supports the following functions: (1) setup of transport channels for CS traffic between the UE and GANC, (2) CS handover support between UTRAN/GERAN and GAN, (3) direct transfer of NAS messages between the ULE and the core network, and (4) other functions such as CS paging and security configuration.

1. States of the GA-CSR Sub-Layer

The GA-CSR sub-layer in the UE can be in two states, GA-CSR-IDLE or GA-CSR-CONNECTED as illustrated in FIG. 21. The UE enters the GA-CSR-IDLE state 2115 when the UE switches the serving RR entity to GAN. This switch may occur only when the GA-RC is in the GA-RC-REGISTERED state 2110.

The UE moves from the GA-CSR-IDLE state 2115 to the GA-CSR-CONNECTED state 2125 when the GA-CSR connection is established and returns to GA-CSR-IDLE state 2115 when the GA-CSR connection is released. Upon GA-CSR connection release, an indication that no dedicated CS resources exist is passed to the upper layers. The UE may also enter the GA-CSR-CONNECTED state 2125 while in the GA-RC-REGISTERED state 2110 in GERAN/UTRAN mode when Handover to GAN is being performed. In the same way, the UE enters the GA-RC-REGISTERED state 2110 in GERAN/UTRAN mode from the GA-CSR-CONNECTED state 2125 when Handover from GAN is successfully executed.

E. GA-PSR (Generic Access Packet Switched Resources)

The GA-PSR protocol provides a packet switched services resource management layer which supports the following functions: (1) setup of transport channels for PS traffic between the UE and network, (2) PS relocation/handover support between UTRAN/GERAN and GAN, (3) direct transfer of NAS messages between the UE and the PS core network, (4) transfer of GPRS user plane data, and (5) other functions such as PS paging and security configuration.

1. States of the GA-PSR Sub-Layer

The GA-PSR sub-layer in the UE can be in two states, GA-PSR-IDLE or GA-PSR-CONNECTED as illustrated in FIG. 21. The UE enters the GA-PSR-IDLE state 2120 when the UE switches the serving RR entity to GAN. This switch may occur only when the GA-RC is in the GA-RC-REGISTERED state 2110. The UE moves from the GA-PSR-IDLE state 2120 to the GA-PSR-CONNECTED state 2130 when the GA-PSR connection is established and returns to GA-PSR-IDLE state 2120 when the GA-PSR connection is released. Upon GA-PSR connection release, an indication that no dedicated resources exist is passed to the upper layers.

The UE may also enter the GA-PSR-CONNECTED state 2130 while in the GA-RC-REGISTERED state 2110 in GERAN/UTRAN mode when Handover to GAN is being performed. In the same way, the UE enters the GA-RC-REGISTERED state 2110 in GERAN/UTRAN mode from the GA-PSR-CONNECTED state 2130 when Handover from GAN is successfully executed. The GA-PSR Packet Transport Channel (GA-PSR PTC) provides the association between the UE and GANC for the transport of GPRS user data over the Up interface. It is described in PS NAS Signaling Procedures in sub-section V.P, below.

IV. GAN Security Mechanics

Figure 22:
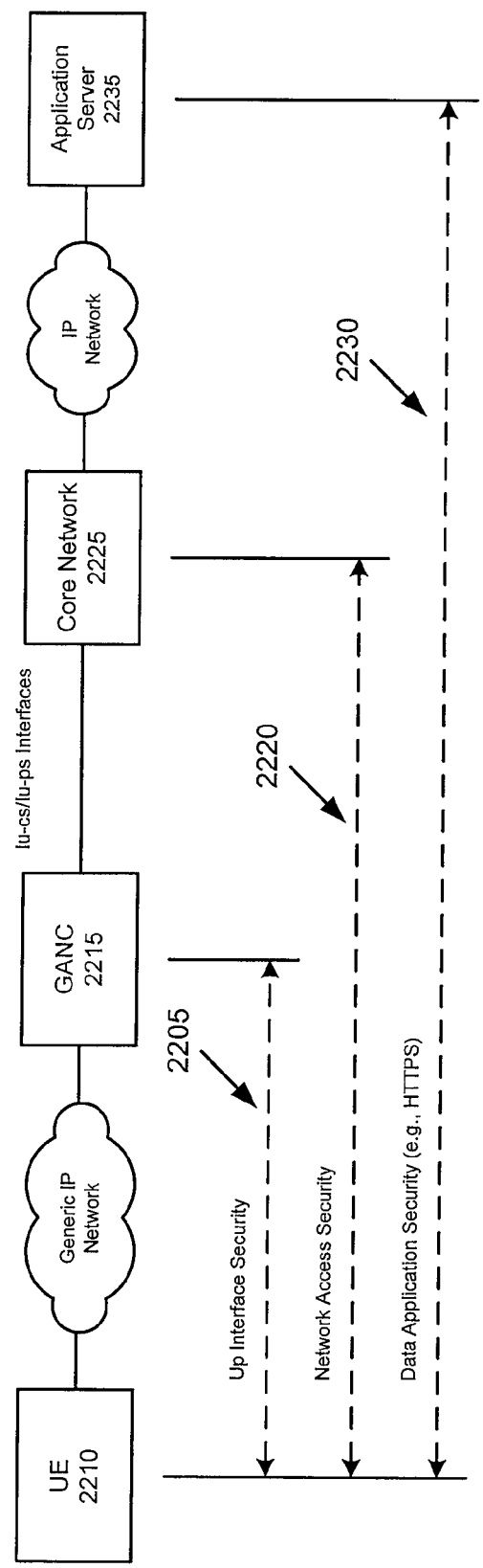
FIG. 22 illustrates GAN security mechanisms of some embodiments.

GAN supports security mechanisms at different levels and interfaces as depicted in FIG. 22. The security mechanisms 2205 over the Up interface protect control plane and user plane traffic flows between the UE 2210 and the GANC 2215 from unauthorized use, data manipulation and eavesdropping; i.e., authentication, encryption and data integrity mechanisms are supported.

Network access security 2220 includes the mechanisms defined in "3G Security; Security Architecture", 3GPP TS 33.102 standard. Mutual authentication of the subscriber and the core network (CN) 2225 occurs between the MSC/VLR or SGSN and the UE and is transparent to the GANC. However, there is a cryptographic binding between the UE-CN authentication and the UE-GANC authentication to prevent man-in-the-middle attacks.

Additional application level security mechanisms 2230 may be employed in the PS domain to secure the end-to-end communication between the UE 2210 and the application server 2235. For example, in some embodiments the UE 2210 may run the HTTP protocol over an SSL session for secure web access.

All control plane and user plane traffic sent between the UE 2210 and the GANC 2215 over the Up interface is protected by an IPSec tunnel between the UE 2210 and GANC-SEGW, that provides mutual authentication (using USIM credentials), encryption and data integrity using the same mechanisms as specified in "3G security; Wireless Local Area Network (WLAN) interworking security", 3GPP TS 33.234.

As described above (in relation to FIGS. 9, 12, 15, and 19), some embodiments utilize a Femtocell access point (FAP) to communicatively couple a user equipment UE to the GANC via a Generic IP Network. As shown in FIG. 9, the FAP architecture for the CS control plane has an IPSec layer 920. Similarly the FAP architectures for the CS user plane, PS control plane, and PS user plane architectures also include IPSec (or IPSec ESP) layers (1220, 1520, and 1920 respectively). As shown in FIGS. 9, 12, 15, and 19, these IPSec layers are over the transport IP layer and Remote IP layers of the GANC and are communicatively coupled to their corresponding GANC IPSec layers, thereby providing a secured link between the GANC and the FAP.

V. High-Level Procedures

A. Mode Selection in Multi-Mode Terminals

A Generic Access capable UE can support any IP access technology in addition to the UTRAN and possibly GERAN radio interfaces. The UE can be either in the GERAN/UTRAN mode or in GAN mode of operation. The UE can be configured to operate in one of the two modes (i.e., GERAN/UTRAN or GAN) at any given time. There may be a preferred mode of operation that can be configured by the subscriber or by the service provider through various mechanisms, e.g. device management.

On power up, the UE always starts in GERAN/UTRAN mode and executes the normal power-up sequence. The UE in some embodiments executes the power-up sequence as specified in "Non-Access-Stratum functions related to Mobile Station (MS) in idle mode", 3GPP TS 23.122 standard. Following this, the UE may switch into GAN mode based on mode selection preference determined by user preferences or operator configuration.

The various preferences for the UE that are possible are as follows: GERAN/UTRAN-only, GERAN/UTRAN-preferred, GAN-preferred, and GAN-only. In GERAN/UTRAN-only, the UE RR entity remains in GERAN/UTRAN mode and does not switch to GAN mode. In GERAN/UTRAN-preferred, the UE RR entity is in GERAN/UTRAN mode as long as there is a PLMN available and not forbidden through GERAN/UTRAN. If no allowable PLMN is available through GERAN/UTRAN, and UE has successfully registered with a GAN over the generic IP access network, then the UE switches to GAN mode. When a PLMN becomes available over GERAN/UTRAN and the PLMN is not forbidden, or the UE has de-registered or lost connectivity with the GAN over the generic IP access network, the UE returns to GERAN/UTRAN mode.

In GAN-preferred, when the UE has successfully registered with the GAN over the generic IP access network, the ULE switches to GAN mode and stays in this mode as long as the GAN is available. When the UE deregisters, or otherwise loses connectivity with the GAN over the generic IP access network, the UE switches to GERAN/UTRAN mode.

In GAN-only, the UE switches to GAN mode (after initial power up sequence in GERAN/UTRAN mode to obtain cellular network information, but excluding MM and GMM procedures with GERAN/UTRAN core network) and does not switch to GERAN/UTRAN mode. During the initial power up sequence in GERAN/UTRAN mode the UE shall ignore all paging messages received through the GERAN/UTRAN network.

B. PLMN Selection

In some embodiments, there are no changes from the PLMN selection procedures in the NAS layers (MM and above) in the UE, with the exception that in GAN mode the "in VPLMN background scan" is disabled. A GANC can only be connected to one PLMN. The PLMN selection in the NAS layers does not lead to a change of mode between GERAN/UTRAN mode and GAN mode. For a specific instance of PLMN selection, only PLMNs available via GAN or only PLMNs available via GERAN/UTRAN are provided to the NAS layer (i.e., no combination of the PLMNs available via GERAN/UTRAN and GAN).

In the case of a GAN capable UE, some embodiments require a GANC selection process as part of the process of establishing the connectivity between the UE and the GANC. This takes place when, during GAN registration, a GAN capable UE may have a choice among two or more GANC-PLMN pairs indicated by the Default GANC (i.e., in the GA-RC REGISTER REDIRECT message). The GANC selection process takes place while the UE is still in GERAN/UTRAN mode, and before the UE roves into GAN mode. If the current selected PLMN is available via GAN, it shall be selected. If not, the selection of GANC is implementation specific.

If the UE does not have any stored information related to the Serving GANC for the cell or AP to which the UE is currently connected, the UE attempts to register with the Default GANC (always located in the HPLMN) stored in UE. The UE includes an indication, identifying the GANC as the Default GANC in the GA-RC REGISTER REQUEST message.

When a UE attempts to register on the Default GANC including an indication that it is in automatic PLMN selection mode one of the followings happens. If the Default GANC decides to serve the UE, the Default GANC responds with a GA-RC REGISTER ACCEPT message. When the Default GANC decides to redirect the UE to another GANC within the HPLMN, the Default GANC responds with a GA-RC REGISTER REDIRECT message, not including a list of PLMN identities.

When the Default GANC decides to redirect the UE to a PLMN that is not the HPLMN, the Default GANC responds with a GA-RC REGISTER REDIRECT message and includes a list of PLMNs that may provide GAN service to the UE in its current location. The list contains one or more PLMN identities along with the identities of their associated GANC and SEGW nodes (either in IP address or FQDN format). Following the GANC selection process, the GA-RC entity in the UE attempts to register on the associated GANC.

If at any time the user wishes to perform manual PLMN selection or a "User reselection" irrespective of whether the UE is in manual or automatic PLMN selection mode, the UE sends a GA-RC REGISTER REQUEST message to the Default GANC, including an indication that it is in manual PLMN selection mode. The Default GANC is not allowed to accept the registration and responds with a GA-RC REGISTER REDIRECT message and includes a list of PLMNs that may provide GAN service to the UE in its current location.

When the UE includes the identity of the current serving GSM network in the GA-RC REGISTER REQUEST message, the Default GANC uses this to identify the list of PLMNs to send to the ULE in the response message.

After successful registration with a serving GANC, the UE does not store the PLMN list. The UE does not use the PLMN list, provided to the UE during the registration procedure, for background scanning. A UE cannot use GA in a VPLMN unless the HPLMN supports and authorizes GA.

C. Re-Selection Between GERAN/UTRAN and GAN Modes

1. Rove-In (from GERAN/UTRAN Mode to GAN Mode)

This procedure is applicable only when GAN service is available, a UE is not in NC2 mode (applicable if the UE is in GERAN mode and as defined in "Radio subsystem link control", 3GPP TS 45.008 standard) and has a UE preference for GAN-only, GAN-preferred or, if no allowable PLMN is available through GERAN/UTRAN, for GERAN/UTRAN-preferred.

Following successful GAN registration, the access mode in the UE is switched to GAN mode. The GA-CSR entity in the UE provides the NAS-related system information received in the GAN Registration Procedure to the NAS layers. The NAS considers the GANC-allocated cell identity as the current serving cell.

While in GAN mode, GERAN-RR and UTRAN RRC entities are detached from the RR-SAP in the UE. As a result the entities do not: (1) inform NAS about any GERAN/UTRAN cell re-selection and/or the change of system information of the current camping cell, (2) inform NAS about any newly found PLMN over GERAN or UTRAN, and (3) act on any paging request message received over GERAN or UTRAN.

2. Rove-Out (from GAN Mode to GERAN/UTRAN Mode)

This procedure is applicable when the UE detaches from the generic IP access network, and its mode selection is GAN-preferred or GERAN/UTRAN-preferred. When the UE detaches from the generic IP access network, depending on prevailing circumstances the UE may be able to deregister first with the GANC.

For the GAN-preferred and GERAN/UTRAN-preferred mode selections, the UE detaches the GA-CSR entity from the RR-SAP and re-attaches the GERAN-RR or UTRAN RRC entity to the RR-SAP and restores normal GERAN-RR or UTRAN RRC functionality. For the GAN-only mode selection, GA-CSR remains attached to the NAS and the UE stays in GAN mode (i.e., in "No Service" condition).

D. GAN Registration Related Procedures

1. Discovery and Registration for Generic Access

The Discovery and Registration procedures are applicable only if the UE preference is operating in GAN-only, GAN-preferred or, if no allowable PLMN is available through GERAN/UTRAN, in GERAN/UTRAN-preferred mode.

Once the UE has established a connection to the generic IP access network, the UE determines the appropriate GANC-SEGW to connect to, by completing the Discovery Procedure to the Provisioning GANC in the HPLMN of the UE. The Provisioning GANC provides the address of the Default GANC in the HPLMN of the UE, to which the UE can register.

The UE attempts to register on the Default GANC provided by the Provisioning GANC during the Discovery procedure, by completing the Registration Procedure. The Default GANC may accept the Registration; redirect the UE to another GANC; or reject the Registration.

a) Security Gateway Identification

The USIM of the UE contains the FQDN (or IP address) of the Provisioning GANC and the associated SEGW or the UE derives this information based on information in the USIM. When the UE does not have any information about other GANCs and associated SEGW stored, then the UE completes the Discovery procedure towards the Provisioning GANC. As part of the Registration Procedure, the Default GANC can indicate whether this GANC and SEGW address or the address of a GANC that the UE is being redirected to, may be stored by the UE.

The UE can also store Serving GANC information for Serving GANCs with which the UE was able to complete a successful registration procedure. The default GANC is in control of whether the UE is allowed to store Serving GANC information. When there is no GERAN/UTRAN coverage in the AP location, the stored Serving GANC information is associated with the AP-ID. When there is GERAN/UTRAN coverage in the AP location, the stored Serving GANC information is associated with the GSM CGI or LAI or UTRAN CI. The stored Serving GANC information is: (1) serving SEGW FQDN or IP address following successful registration, (2) serving GANC FQDN or IP address following successful registration, and (3) optionally, Serving GANC TCP port following successful registration and if returned from the network. Different embodiments store different number of such entries in the UE is implementation specific. Only the last successfully registered GANC association is stored when the Default GANC indicates that the UE is allowed to store these addresses. A UE may preferentially join a generic IP access network point of attachment whose association with a Serving GANC has been stored in memory.

On connecting to the generic IP access network, when the UE has a stored Serving GANC for the AP-ID or the GERAN/UTRAN cell, the UE attempts to register with the associated Serving GANC in its memory. The GANC may still reject the UE for any reason even though it may have served the UE before. The UE deletes from its stored list the address of the Serving GANC on receiving a registration reject or if the registration fails for any other reason (e.g., not receiving any response).

If the UE does not receive a response to the Registration Request sent to the Serving GANC (and which is not the Default GANC), the UE re-attempt to register with the Default GANC. If the UE does not receive a response to the registration request sent to the Default GANC, it attempts the discovery procedure with the Provisioning GANC to obtain a new Default GANC.

In the case when a UE is attempting to register or discover a GANC after failing to register on a GANC, the UE provides in the Registration or Discovery procedure an indication that the UE has attempted to register on another GANC, the failure reason, and the GANC and SEGW addresses of the failed registration. When the UE connects to a generic IP access network, for which the UE does not have a stored Serving GANC in it's memory, the UE attempt to register with the Default GANC.

b) GANC Capabilities

GANC specific information is transferred to the UE on successful registration.

c) UE Capabilities

GAN specific capabilities of the UE are transferred to the GANC during registration.

d) Required GAN Services

The UE may request which GAN services it requires from the GANC as part of the Registration procedures.

e) GAN Mode Selection

The UE (i.e., with Iu-mode GAN support) transfers its GAN Mode Support information to the GANC during Discovery and Registration procedures; i.e., in the GAN Classmark IE. GAN Mode Support options are A/Gb mode supported, Iu mode supported, or both modes supported. When no GAN Mode Support information is received, the GANC assumes that the UE supports A/Gb mode operation only.

The provisioning GANC may use the received GAN Mode Support information to assign the UE to an appropriate default GANC (e.g., if separate A/Gb mode and Iu-mode GANCs are deployed in the network) or to an appropriate TCP port on the default GANC (e.g., if separate TCP ports are used for A/Gb mode and Iu-mode GAN service). The Iu-mode capable GANC also indicates the GAN mode to use for the current session in the GAN Mode Indicator IE; this allows the UE to determine the Iu-mode capability of the Home PLMN.

Table 1 enumerates the discovery handling for the various combinations of UE and Home PLMN GAN mode capabilities.

TABLE 1

GAN Mode Selection procedures associated with GAN Discovery

| UE GAN Mode Capabilities | Home PLMN GAN Mode Capabilities | | |
|---|---|---|---|
| | A/Gb only | Iu only | Both |
| A/Gb only | GANC: Handle as normal A/Gb mode discovery UE: Proceed with A/Gb mode registration | GANC: No GAN Mode Support information provided or A/Gb mode (only) indicated by UE, therefore Reject (Unspecified) UE: Retry on next power-on | GANC: No GAN Mode Support information provided or A/Gb mode (only) indicated by UE, therefore handle as normal A/Gb mode discovery. Assign UE to A/Gb-capable GANC. UE: Proceed with A/Gb mode registration |

TABLE 1-continued

GAN Mode Selection procedures associated with GAN Discovery

| UE GAN Mode Capabilities | Home PLMN GAN Mode Capabilities | | |
|---|---|---|---|
| | A/Gb only | Iu only | Both |
| Iu only | GANC: Handle as normal A/Gb mode discovery UE: No GAN Mode Selection provided by GANC, therefore abort GAN operation and retry on next power-on | GANC: Iu Mode Support (only) indicated by UE, therefore accept and send GAN Mode Indicator = Iu UE: Proceed with Iu mode registration | GANC: Iu Mode Support (only) indicated by UE, therefore accept and send GAN Mode Indicator = Iu. Assign UE to Iu-capable GANC. UE: Proceed with Iu mode registration |
| Both | GANC: Handle as normal A/Gb discovery UE: No GAN Mode Selection provided by GANC, therefore proceed with Iu mode registration (Note 1) | GANC: Support for both modes indicated by UE, therefore accept and send GAN Mode Indicator = Iu UE: Proceed with Iu mode registration | GANC: Support for both modes indicated by UE, therefore accept and send GAN Mode Indicator = Iu. Assign UE to Iu-capable GANC. UE: Proceed with Iu mode registration |

Note:
As described in Table 2 below, the result of Iu mode registration of a A/Gb-capable UE on a A/Gb-capable GANC is that the UE is placed in A/Gb mode.

In some embodiments, the default or serving GANC uses the received GAN Mode Support information to redirect the UE to a different GANC or a different TCP port on the current GANC. The Iu-mode capable GANC also indicates the GAN mode to use for the current session in the GAN Mode Indicator IE.

Table 2 enumerates the registration handling for the various combinations of UE and Home PLMN GAN mode capabilities.

TABLE 2

GAN Mode Selection procedures associated with GAN Registration

| UE GAN Mode Capabilities | Default/Serving GANC GAN Mode Capabilities | | |
|---|---|---|---|
| | A/Gb only | Iu only | Both |
| A/Gb only | GANC: Handle as normal A/Gb mode registration UE: Proceed per A/Gb mode GAN procedures | GANC: No GAN Mode Support information provided or A/Gb mode (only) indicated by UE, therefore Reject (Invalid GANC) UE: Attempt registration with Default GANC or re-discovery (per A/Gb mode GAN procedures) | GANC: No GAN Mode Support information provided or A/Gb mode (only) indicated by UE, therefore handle as normal A/Gb mode registration. If required, redirect UE to A/Gb-capable GANC. UE: Proceed per A/Gb mode GAN procedures |
| Iu only | GANC: Handle as normal A/Gb mode registration UE: No GAN Mode Selection provided by GANC, therefore Deregister and treat as register reject (Invalid GANC) | GANC: Iu Mode Support (only) indicated by UE, therefore accept and send GAN Mode Indicator = Iu UE: Proceed per Iu mode GAN procedures | GANC: Iu Mode Support (only) indicated by UE, therefore accept and send GAN Mode Indicator = Iu. UE: Proceed per Iu mode GAN procedures |
| Both | GANC: Handle as normal A/Gb registration UE: No GAN Mode Selection provided by GANC, therefore proceed per A/Gb mode GAN procedures | GANC: Support for both modes indicated by UE, therefore accept and send GAN Mode Indicator = Iu UE: Proceed per Iu mode GAN procedures | GANC: Support for both modes indicated by UE, therefore accept and send GAN Mode Indicator = Iu or A/Gb (see Note 1 below). If required, redirect UE to Iu or |

TABLE 2-continued

GAN Mode Selection procedures associated with GAN Registration

| UE GAN Mode Capabilities | Default/Serving GANC GAN Mode Capabilities | | |
|---|---|---|---|
| | A/Gb only | Iu only | Both |
| | | | A/Gb-capable GANC. UE: Proceed per Iu or A/Gb mode GAN procedures |

Note 1:
The GANC's choice of Iu-mode versus A/Gb-mode may be based on other information received in the GAN registration message from the UE, information stored in the GANC, and on operator (i.e., service provider) policy; e.g., if the GSM RR/UTRAN RRC State IE indicates that the UE is in GERAN Dedicated mode, the UE location is an area without UTRAN coverage and the operator wants to minimize inter-RAT handovers, the GANC may direct the UE to use A/Gb mode.

f) Discovery Procedure

When a UE supporting GAN first attempts to connect to a GAN, the UE needs to identify the Default GANC. Each GAN capable UE can be configured with the FQDN (or IP address) of the Provisioning GANC and the associated SEGW or the UE can derive this FQDN based on information in the USIM (see "Numbering, addressing and identification", 3GPP TS 23.003 standard). The UE first connects to a Provisioning GANC-SEGW and GANC in the HPLMN of the UE, by establishing a secure IPSec tunnel and a TCP connection using the provisioned or derived addresses. The UE obtains the FQDN or IP address of the Default GANC in the HPLMN and the associated SEGW, through the Discovery procedure.

If no GERAN/UTRAN coverage is available when a UE connects to the GANC for GAN service, then the GANC cannot necessarily determine the location of the UE for the purposes of assigning the UE to the correct serving GANC (e.g., to enable handover and location-based services). The GANC permits the operator to determine the service policy in this case; e.g., the operator could provide service to the user with certain limitations (possibly with a user interface indication on the UE). When the UE initiates the Discovery/Registration procedures and no GERAN/UTRAN coverage is available, the GANC may have insufficient information to correctly route subsequent emergency calls.

Figure 23:
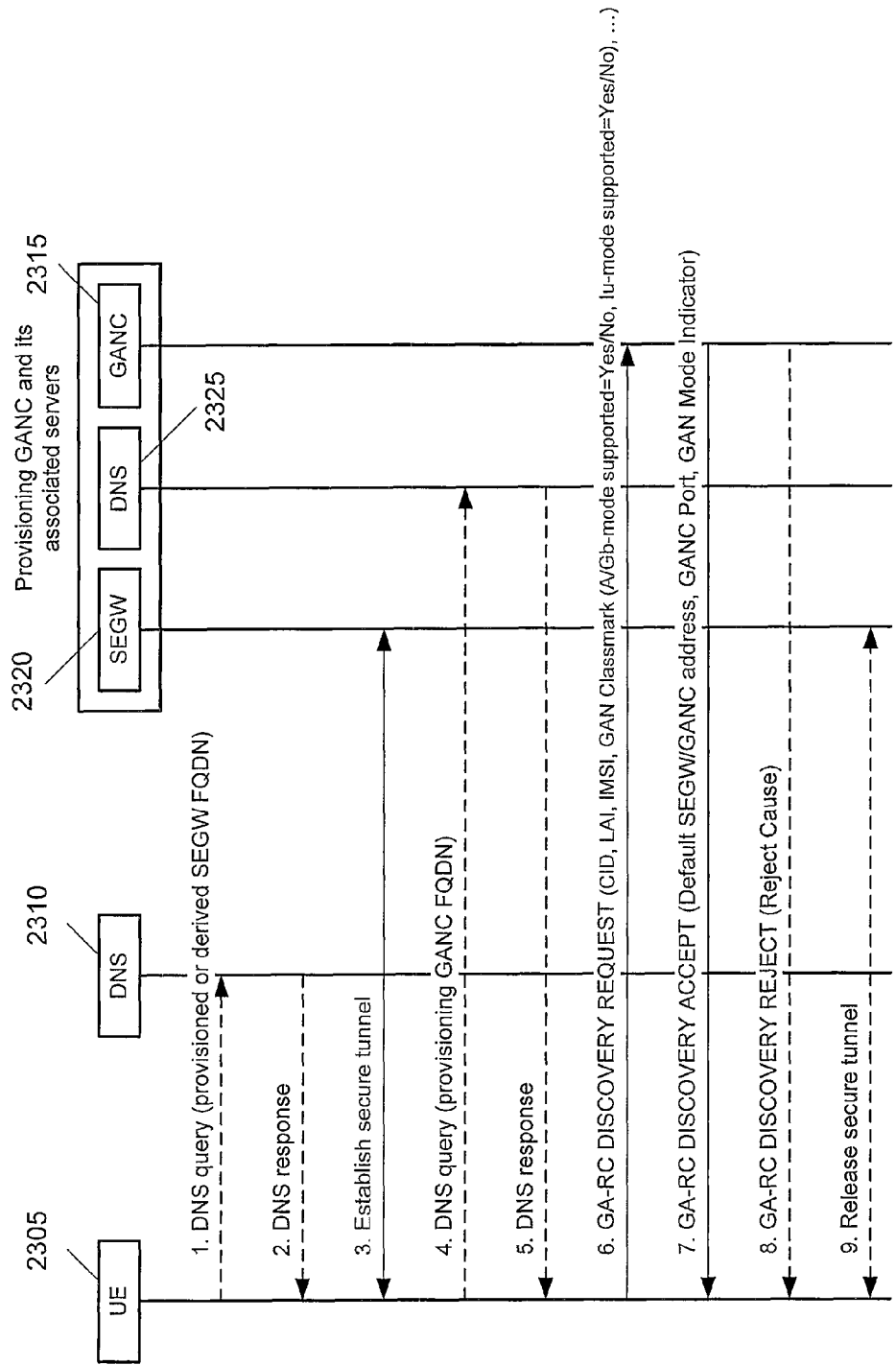
FIG. 23 illustrates discovery procedure of some embodiments.

FIG. 23 illustrates the Discovery procedure in some embodiments. The figure shows different messages exchanges between the UE 2305, DNS 2310, the provisioning GANC 2315, the security gateway SEGW 2320 associated with the provisioning GANC 2315, and the DNS server 2325 associated with the provisioning GANC 2315. In the description below it is assumed that the UE 2305 has a mode selection of GAN-only or GAN-preferred or GERAN/UTRAN-preferred and that the UE has already connected to the generic IP access network. Different embodiments deem different signal levels as sufficient for triggering the GAN Discovery and Registration procedures. The following steps are taken during Discovery procedure in some embodiments.

As shown in FIG. 23, when the UE 2305 has a provisioned or derived FQDN of the Provisioning SEGW, the UE performs (in Step 1) a DNS query (via the generic IP access network interface) to resolve the FQDN to an IP address. When the UE has a provisioned IP address for the Provisioning SEGW, the DNS step is omitted. Next, the DNS Server 2310 returns (in Step 2) a response including the IP Address of the Provisioning SEGW 2320.

As shown, the UE 2305 establishes (in Step 3) a secure tunnel to the Provisioning SEGW 2320. When the UE 2305 has a provisioned or derived FQDN of the Provisioning GANC 2315, the UE 2305 performs (in Step 4) a DNS query (via the secure tunnel) to the DNS server 2325 associated with the provisioning GANC 2315 to resolve the FQDN to an IP address. When the UE 2305 has a provisioned IP address for the Provisioning GANC, the DNS step will be omitted. The DNS Server 2325 returns (in Step 5) a response including the IP Address of the Provisioning GANC 2315.

The UE 2305 sets up a TCP connection to a well-defined port on the Provisioning GANC 2315. It then queries (in Step 6) the Provisioning GANC 2315 for the Default GANC, using GA-RC DISCOVERY REQUEST. The message contains: (1) Cell Info: Either current camping UTRAN/GERAN cell ID or the last LAI where the UE successfully registered, along with an indicator stating which one it is, (2) Generic IP access network attachment point information: AP-ID, as defined in Identifiers in GAN, sub-section VII, below, (3) UE Identity: IMSI, and (4) GAN Classmark: Including indications of A/Gb Mode supported and Iu Mode supported.

Next, the Provisioning GANC 2315 returns (in Step 7) the GA-RC DISCOVERY ACCEPT message, using the information provided by the UE (e.g. the cell ID), to provide the FQDN or IP address of the Default GANC and its associated Default SEGW. This is done so the UE is directed to a "local" Default GANC in the HPLMN to optimize network performance. The GANC Port that the UE must use for registration may be included. The GAN Mode Indicator may be included as described in GAN Mode Section, sub-section above.

When the Provisioning GANC 2315 cannot accept the GA-RC DISCOVERY REQUEST message, it returns (in Step 8) a GA-RC DISCOVERY REJECT message indicating the reject cause. The secure IPSec tunnel to the Provisioning SEGW 2320 is released (in Step 9). It is possible to reuse the same IPSec tunnel for GAN Registration procedures. In this case the IPSec tunnel is not released.

g) Registration Procedure—Normal Case

Following the Discovery procedure the UE establishes a secure tunnel with the security gateway of the Default GANC, provided by the Provisioning GANC in the Discovery procedure, and attempts to register with the Default GANC. The Default GANC may become the Serving GANC for that connection by accepting the registration, or the Default GANC may redirect a UE performing registration to a different Serving GANC.

GANC redirection may be based on information provided by the UE during the Registration procedure, operator chosen policy or network load balancing. The GAN Registration procedure serves the following functions: (1) Ensures the UE is registered to the appropriate GANC entity; i.e., with use of the redirection process, (2) Informs the GANC that the UE is now connected through a generic IP access network and is available at a particular IP address. The GANC maintains the registration context for the purposes of (for example) mobile-terminated calling, (3) Provides the UE with the operating parameters associated with the GAN service. The "System Information" message content that is applicable to the GAN cell is delivered to the UE during the GAN registration process. This enables the UE to switch to GAN mode, and following the Registration procedure trigger NAS procedures with the core network (such as Location/Routing Area Update, mobile originated calls, mobile terminated calls, etc.), and (4) Enables the UE to request which GAN services are required.

Figure 24:
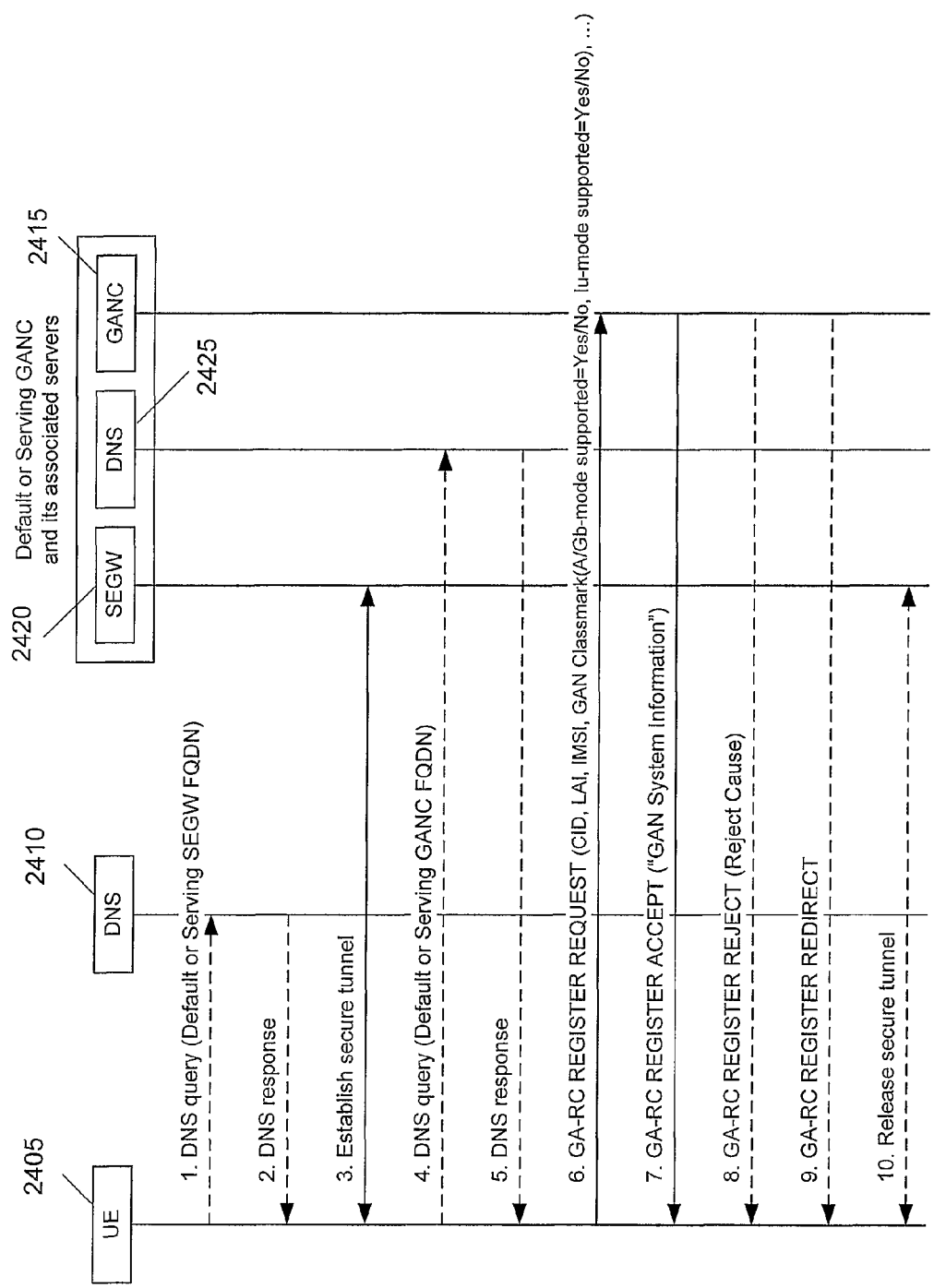
FIG. 24 illustrates registration procedure of some embodiments.

FIG. 24 illustrates Registration procedure in some embodiments. The figure shows different messages exchanges between the UE 2405, DNS 2410, the provisioning GANC 2415, the security gateway SEGW 2420 associated with the provisioning GANC 2415, and the DNS server 2425 associated with the provisioning GANC 2415. The following steps are done during Registration procedure.

As shown in FIG. 24, when the UE 2405 was provided the FQDN of the Default or Serving SEGW, the UE performs (in Step 1) a DNS query (via the generic IP access network interface) to resolve the FQDN to an IP address. When the UE has a provisioned IP address for the SEGW, the DNS step is omitted. The DNS Server 2410 returns (in Step 2) a response.

As shown, the UE 2405 sets up (in Step 3) a secure IPSec tunnel to the SEGW 2420. This step may be omitted if an IPSec tunnel is being reused from an earlier Discovery or Registration. When the UE 2405 was provided the FQDN of the Default or Serving GANC, the UE then performs (in Step 4) a DNS query (via the secure tunnel) to resolve the FQDN to an IP address. When the UE has an IP address for the GANC, the DNS step is omitted. Next, the DNS Server 2425 returns (in Step 5) a response.

The UE 2405 then sets up a TCP connection to a TCP port on the GANC. The TCP port can either be a well-known port or one that has been earlier received from the network during Discovery or Registration. The UE 2405 attempts (in Step 6) to register on the GANC by transmitting the GA-RC REGISTER REQUEST. The message includes: (1) Cell Info: Either current camping UTRAN/GERAN cell ID, or last LAI where the UE successfully registered, along with an indicator stating which one it is, (2) Generic IP access network attachment point information: AP-ID, as defined in Identifier in GAN, Section VII, below, (3) UE Identity: IMSI, (4) UE Capability Information, (5) GAN Services Required, (6) GAN Classmark: Including indications of A/Gb Mode supported, Iu Mode supported.

When the GANC 2415 accepts the registration attempt, the GANC 2415 responds (in Step 7) with a GA-RC REGISTER ACCEPT. In this case the TCP connection and the secure IPSec tunnel are not released and are maintained as long as the UE is registered to this GANC.

The GA-RC REGISTER ACCEPT message includes (1) GAN Capability Information and (2) GAN specific system information which includes (a) GAN Mode Indicator: A/Gb Mode GAN or Iu Mode GAN, (b) Cell description of the GAN cell, (c) Location-area identification comprising the mobile country code, mobile network code, and location area code corresponding to the GAN cell, (d) Cell identity identifying the cell within the location area corresponding to the GAN cell, and (e) Applicable system timer values (e.g., for the application-level keep alive message transmission interval, see Keep Alive sub-section, below)

Alternatively, the GANC 2415 may reject the request. In this case, the GANC 2415 responds (in Step 8) with a GA-RC REGISTER REJECT indicating the reject cause. The TCP connection and the secure IPSec tunnel are then released.

Alternatively, if the GANC 2415 decides to redirect the UE to (another) Serving GANC, the GANC 2415 responds (in Step 9) with a GA-RC REGISTER REDIRECT providing the FQDN or IP address of the target Serving GANC and the associated SEGW, and the GAN Mode Indicator if the GANC requires that a particular mode be used with the Serving GANC (e.g., if the GANC knows that the Serving GANC supports only A/Gb mode GAN). In this case the TCP connection is released and the secure IPSec tunnel is optionally released (in Step 10) depending on if the network indicates that the same IPSec tunnel can be reused for the next registration. The GA-RC REGISTER REDIRECT message may contain: (1) a single Serving SEGW and GANC address or (2) a list of PLMN identities and associated Serving SEGW and GANC addresses. The message also may contain an Indication of whether GANC address(es) can be stored in the UE for future use.

a) Registration Procedure—Abnormal Cases

When the Serving GANC rejects the Register request and does not provide redirection to another Serving GANC, the UE re-attempts Registration to the Default GANC including a cause that indicates the failed registration attempt and the Serving GANC and SEGW with which the Register request failed. The UE also deletes all stored information about this Serving GANC.

When the Default GANC rejects a Registration Request and is unable to provide redirection to suitable Serving GANC, the UE may re-attempt the Discovery procedure to the Provisioning GANC (including a cause indicating the failed registration attempt and the Default GANC provided in the last Discovery procedure). The UE also deletes all stored information about the Default GANC.

2. De-Registration

Figure 25:
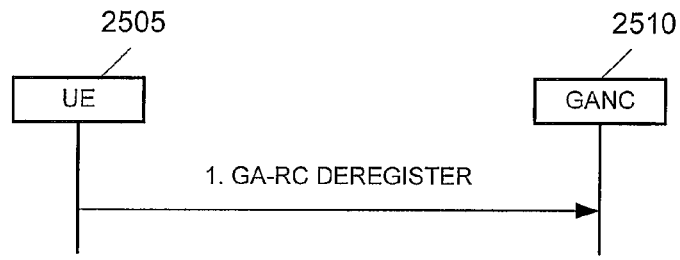
FIG. 25 illustrates De-Registration initiated by the UE in some embodiments.

FIG. 25 illustrates De-Registration initiated by the UE 2505 in some embodiments. The GA-RC De-Registration procedure allows the UE 2505 to explicitly inform the GANC 2510 that it is leaving GAN mode (e.g., when it detaches from the generic IP access network), by sending (in Step 1) a GA-RC DEREGISTER message to the GANC 2510, allowing the GANC 2510 to free resources that it assigned to the UE 2505. The GANC 2510 also supports "implicit GAN de-registration", when the TCP connection to the UE is abruptly lost.

Figure 26:
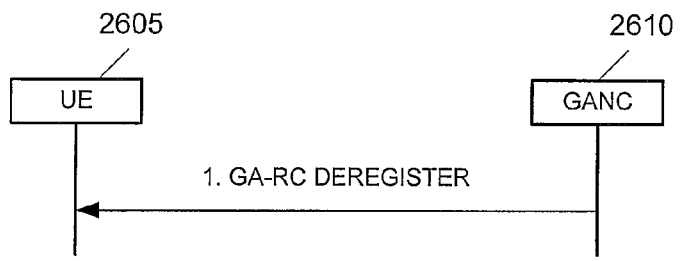
FIG. 26 illustrates De-Registration initiated by the GANC in some embodiments.

FIG. 26 illustrates De-Registration initiated by the GANC 2610 in some embodiments. As shown, the GANC 2610 can autonomously release the UE registration context, and send (in Step 1) a GA-RC DEREGISTER message to the UE 2605. Alternatively, the GANC 2610 can implicitly deregister the UE 2605 by closing the TCP connection with the UE. At power-down the GA-RC sublayer of the UE ensures that the UE explicitly detaches from the network, where possible, before completing the GA-RC De-Registration procedure.

3. Registration Update

Figure 27:
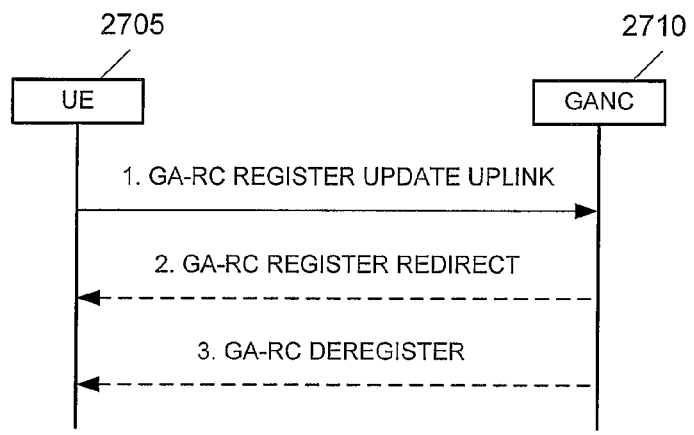
FIG. 27 illustrates registration Update Uplink of some embodiments.

FIG. 27 illustrates Registration Update in some embodiments. The GA-RC Registration Update procedure allows the UE 2705 to update information in the GANC 2710 regarding changes to the identity of the overlapping GERAN cell or changes to the generic IP access network point of attachment. As shown, the UE 2705 sends (in Step 1) a GA-RC REGISTER UPDATE UPLINK message to the GANC 2710 carrying the updated information. This may result in the UE 2705 being redirected to another serving GANC, or being denied service; e.g., due to operator policy.

When the UE 2705 detects UTRAN/GERAN coverage after reporting no coverage during GAN registration, the UE sends the GA-RC REGISTER UPDATE UPLINK to the GANC with the updated information. Whenever the generic IP access network point of attachment changes, the UE sends a GA-RC REGISTER UPDATE UPLINK to the GANC with the updated generic IP access network point of attachment information. When the UE requires to update the GANC with a new list of GAN Services required, then the UE sends GA-RC REGISTER UPDATE UPLINK message to the GANC including the new GAN Services Required list.

The GANC 2710 may optionally send (in Step 2) the GA-RC REGISTER REDIRECT when it decides to redirect the UE based on updated information. The GANC 2710 may also optionally deregister the ULE 2705 on receiving an update by sending (in Step 3) GA-RC DEREGISTER to the UE.

Figure 28:
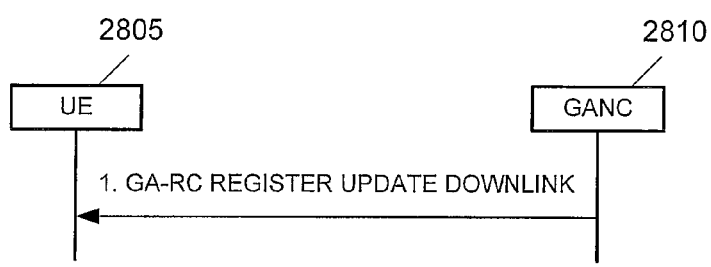
FIG. 28 illustrates Registration Update Downlink of some embodiments.

FIG. 28 illustrates Registration Update Downlink procedure in some embodiments. The GAN Registration Update procedure also allows the GANC 2810 to update the GAN system information in the UE 2805, if needed, by sending (in Step 1) a GA-RC REGISTER UPDATE DOWNLINK message to the UE carrying the updated information.

4. Keep Alive

Figure 29:
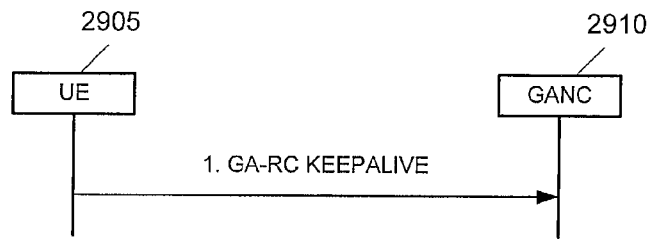
FIG. 29 illustrates Keep Alive procedure of some embodiments.

FIG. 29 illustrates the Keep Alive process in some embodiments. The Keep Alive process is a mechanism between the peer GA-RC entities to indicate that the UE is still registered to the GANC. Using periodic transmissions (in Step 1) of the GA-RC KEEP ALIVE message the UE 2805 in turn determines that the GANC 2810 is still available using the currently established lower layer connection.

5. Cell Broadcast Information

Figure 30:
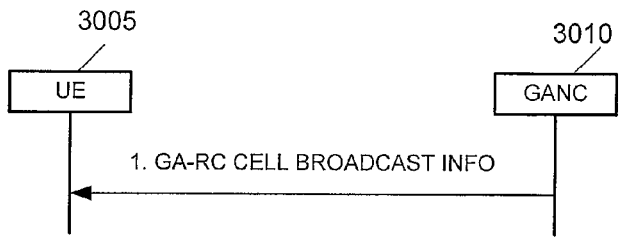
FIG. 30 illustrates Cell Broadcast Information in some embodiments.

FIG. 30 illustrates the Cell Broadcast Information mechanism of some embodiments. The Cell Broadcast Information is a mechanism between the peer GA-RC entities, allowing the GANC to pass the UE information relating to the Cell Broadcast Services. The UE 3005 includes GAN Service Required information in the GA-RC REGISTER REQUEST and GA-RC REGISTER UPDATE UPLINK messages passed to the GANC, indicating that the UE requires the Cell Broadcast Service. The GANC 3010 then passes (in Step 1) the required information to the UE 1105 in the GA-RC CELL BROADCAST INFO message.

E. Authentication

The Up interface supports the ability to authenticate the UE with the GANC (for the purposes of establishing the secure tunnel) using GSM or UMTS credentials. Authentication between UE and GANC is performed using EAP-SIM or EAP-AKA within IKEv2.

F. Encryption and Integrity Protection

All control and user plane traffic over the Up interface is sent through the pair of IPSec ESP tunnel mode security associations (one for each direction) that are established during the establishment of the IKEv2 security association. Encryption and integrity protection are via the negotiated cryptographic algorithms, based on core network policy, enforced by the GANC-SEGW.

G. GA-CSR Connection Handling

The Iu-mode GAN GA-CSR connection is a logical connection between the UE and the GANC for the CS domain. A GA-CSR connection is established when the upper layers in the UE request the establishment of a CS domain signaling connection and the UE is in GA-CSR-IDLE state; i.e., no GA-CSR connection exists. When a successful response is received from the network, GA-CSR replies to the upper layer that the CS domain signaling connection is established and the UE has entered the equivalent of the RRC connected mode (i.e., the GA-CSR-CONNECTED state).

1. GA-CSR Connection Establishment

Figure 31:
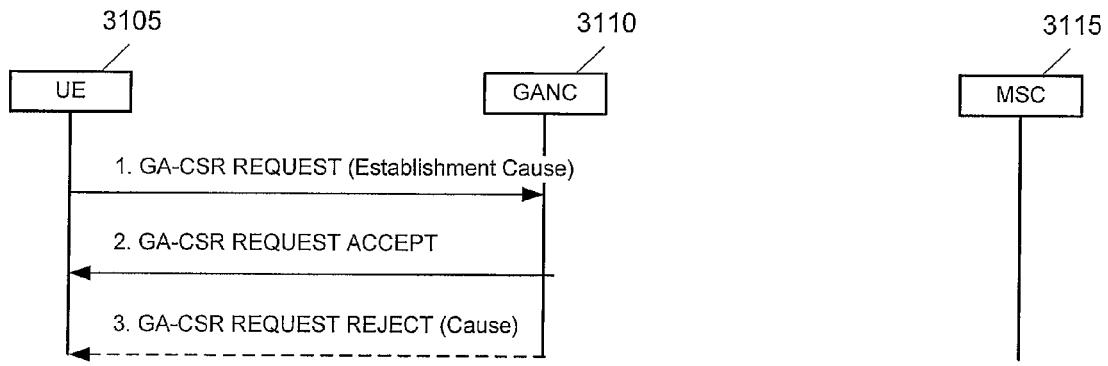
FIG. 31 illustrates GA-CSR Connection Establishment of some embodiments.

FIG. 31 illustrates successful and unsuccessful establishment of the GA-CSR Connection in some embodiments. As shown, the UE 3105 initiates GA-CSR connection establishment by sending (in Step 1) the GA-CSR REQUEST message to the GANC 3110. This message contains the Establishment Cause indicating the reason for GA-CSR connection establishment.

When GANC determines that the connection request can be accepted, the GANC 3110 signals the acceptance of the connection request to the UE 3105 by sending (in Step 2) the GA-CSR REQUEST ACCEPT and the UE enters the GA-CSR-CONNECTED state. On the other hand, when the GANC determines that the GA-CSR connection request has to be rejected, the GANC 3110 sends (in Step 3) a GA-CSR REQUEST REJECT to the UE 3105 indicating the reject cause, completing the procedure.

2. GA-CSR Connection Release

Figure 32:
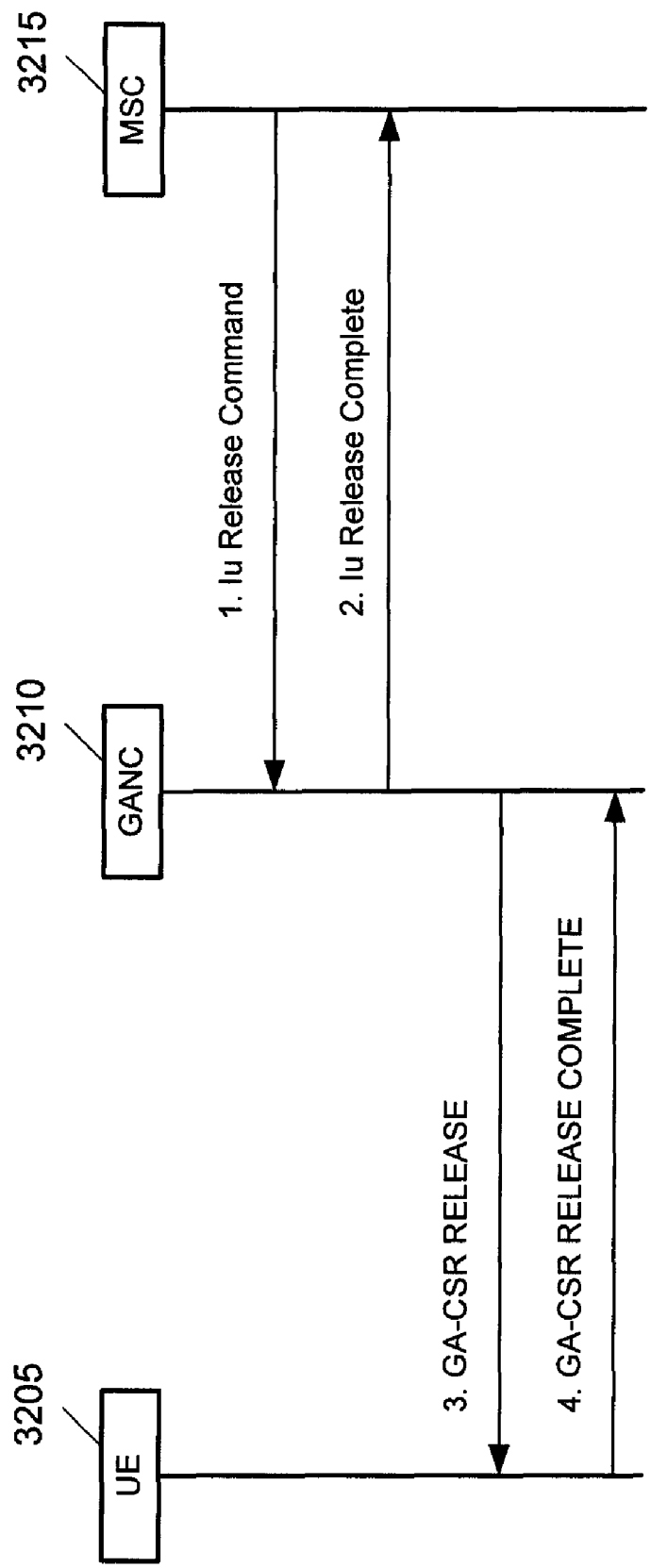
FIG. 32 illustrates GA-CSR Connection Release in some embodiments.

FIG. 32 illustrates release of the logical GA-CSR connection between the UE and the GANC in some embodiments. As shown, the MSC 3215 indicates to the GANC 3210 to release the CS resources allocated to the UE, by sending (in Step 1) the RANAP Iu Release Command message to the GANC 3210.

Next, the GANC 3210 confirms (in Step 2) resource release to MSC 3215 using the Iu Release Complete message. The GANC 3210 then commands (in Step 3) the UE 3205 to release resources, using the GA-CSR RELEASE message. Finally, the UE 3205 confirms (in Step 4) resource release to the GANC using the GA-CSR RELEASE COMPLETE message and the GA-CSR state in the UE changes to GA-CSR-IDLE.

H. CS Security Mode Control

Figure 33:
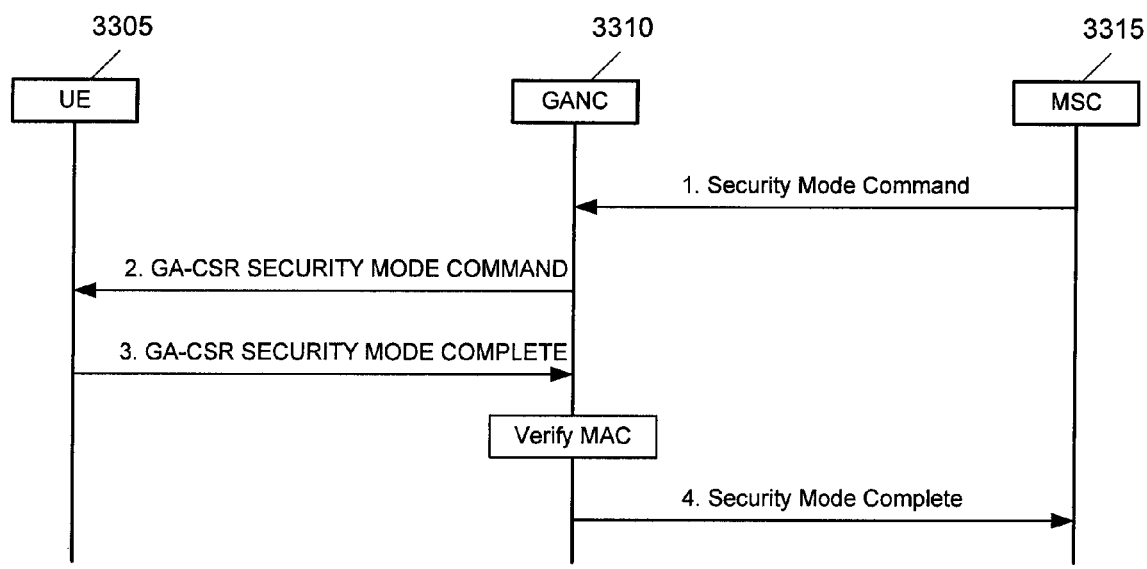
FIG. 33 illustrates Security Mode Control in some embodiments.

FIG. 33 illustrates the message flow for security mode control in some embodiments. As shown, the MSC 3315 sends (in Step 1) the RANAP Security Mode Command message to GANC 3310. This message contains the integrity key (IK) and allowed algorithms, and optionally the encryption key (CK) and allowed algorithms.

Next, the GANC 3310 sends (in Step 2) the GA-CSR SECURITY MODE COMMAND message to the UE 3305. This message indicates the integrity protection and encryption settings (i.e., that are applicable after relocation to UTRAN), and a random number. The UE stores the information for possible future use after a relocation to UTRAN.

Next, the UE 3305 computes a MAC based on the random number, the UE IMSI and the integrity key calculated by the UE. The MAC or "message authentication code" allows the GANC to verify that the UE has been able to calculate the same integrity key value as the GANC received from the MSC, thereby preventing certain "man-in-the-middle" security attacks. The UE 3305 then sends (in Step 3) the GA-CSR SECURITY MODE COMPLETE message to the GANC 3310 to signal its selected algorithm and the computed MAC.

The GANC 3310 then verifies the MAC using the random number, the UE IMSI and the integrity key provided by the MSC in Step 1. When the GANC verifies the MAC to be correct (i.e., the GANC-calculated MAC is the same as the UE-calculated MAC) it sends (in Step 4) the Security Mode Complete message to the MSC 3315. The MAC proves that the identity that is authenticated to the GANC is the same as the identity authenticated to the core network.

I. CS NAS Signaling Procedures

After GA-CSR connection establishment, NAS signaling may be transferred from MSC-to-UE and from UE-to-MSC.

1. MSC-to-UE NAS Signaling

Figure 34:
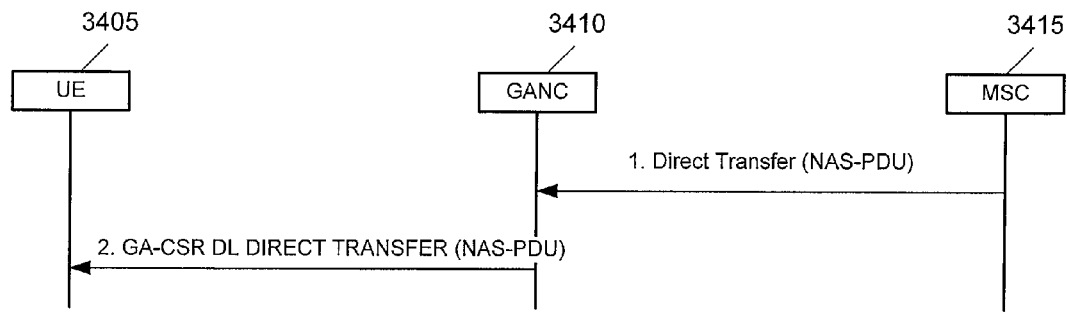
FIG. 34 illustrates core network to UE NAS signaling in some embodiments.

FIG. 34 illustrates MSC-to-UE NAS signaling in some embodiments. As shown, for MSC-to-UE NAS signaling, the MSC 3415 sends (in Step 1) a NAS PDU to the GANC via the RANAP Direct Transfer message. The GANC 3410 encapsulates the NAS PDU within a GA-CSR DL DIRECT TRANSFER message and forwards (in Step 2) the message to the UE 3405 via the existing TCP connection.

2. UE-to-MSC NAS Signaling

Figure 35:
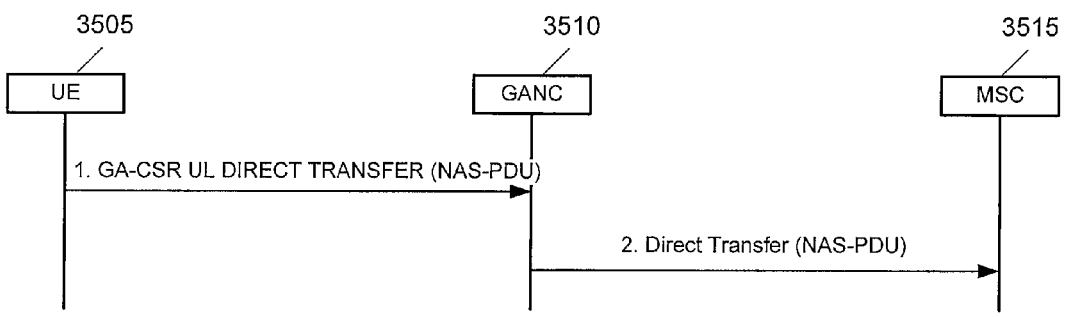
FIG. 35 illustrates UE to core network NAS signaling in some embodiments.

FIG. 35 illustrates UE-to-MSC NAS signaling in some embodiments. As shown, the UE 3505 receives a request from the NAS layer to transfer an uplink NAS PDU. Assuming that the required signaling connection already exists, the UE 3505 encapsulates the NAS PDU within a GA-CSR UL DIRECT TRANSFER message and sends (in Step 1) the message to the GANC 3510. The GANC 3510 relays (in Step 2) the received message to the MSC 3515 via the RANAP Direct Transfer message.

J. Mobile Originated CS Call

1. GANC Terminates Iu UP Protocol

Figure 36:
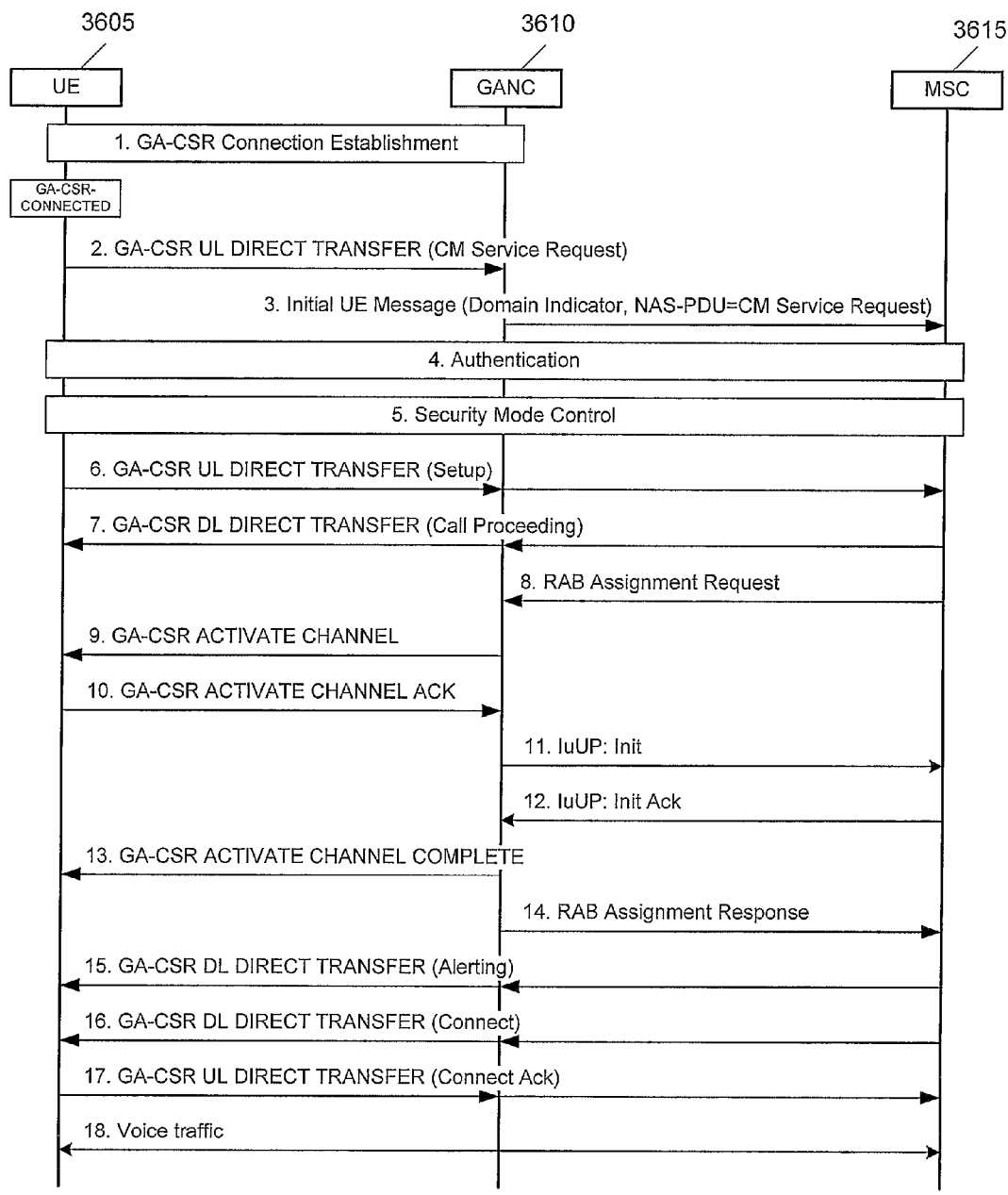
FIG. 36 illustrates Mobile Originated CS Call in some embodiments.

FIG. 36 illustrates steps performed during a mobile originated CS call in some embodiments. The procedure assumes that the UE is in GAN mode; i.e., it has successfully registered with the GANC and GA-CSR is the serving RR entity for CS services in the UE. It also assumes that no GA-CSR signaling connection exists between the UE and GANC (i.e., GA-CSR-IDLE state). As shown, the GA-CSR Connection Establishment procedure is performed (in Step 1). In some embodiments, this procedure is performed as described in GA-CSR Connection Establishment sub-section, above. Next, the UE 3605 sends the CM Service Request message to the GANC 3610 within the GA-CSR UL DIRECT TRANSFER message.

Next, the GANC 3610 establishes an SCCP connection to the MSC 3615 and forwards (in Step 3) the NAS PDU (i.e., the CM Service Request message) to the MSC 3615 using the RANAP Initial UE Message. The message includes the Domain Indicator set to value 'CS domain'. Subsequent NAS messages between the UE and MSC will be sent between GANC and MSC using the RANAP Direct Transfer message.

The MSC 3615 may optionally authenticate (in Step 4) the UE using standard UTRAN authentication procedures. The MSC 3615 may optionally initiate (in Step 5) the Security Mode Control procedure described in CS Security Mode Control sub-section, above. The UE 3605 sends (in Step 6) the Setup message providing details on the call to the MSC and its bearer capability and supported codecs. This message is contained within the GA-CSR UL DIRECT TRANSFER between the UE and the GANC. The GANC forwards the Setup message to the MSC.

Next, the MSC 3615 indicates (in Step 7) it has received the call setup and it will accept no additional call-establishment information using the Call Proceeding message to the GANC. The GANC forwards (in Step 7) this message to the UE in the GA-CSR DL DIRECT TRANSFER message.

The MSC 3615 requests (in Step 8) the GANC 3610 to assign call resources using the RANAP RAB Assignment Request message. The MSC 3615 includes the RAB-ID, the CN Transport Layer Address and the CN Iu Transport Association for user data, and an indication that Iu UP support mode is required, among other parameters.

The GANC 3610 then sends (in Step 9) the GA-CSR ACTIVATE CHANNEL message to the UE 3605 including bearer path setup information such as: (1) Channel mode, (2) Multi-rate codec configuration, (3) UDP port & the IP address for the uplink RTP stream, and (4) Voice sample size.

Next, the UE 3605 sends (in Step 10) the GA-CSR ACTIVATE CHANNEL ACK to the GANC 3610 indicating the UDP port for the downlink RTP stream. Since Iu UP support mode is indicated by the MSC in step 8, the GANC 3610 sends (in Step 11) the Iu UP INITIALIZATION packet to the MSC.

In response, the MSC responds (in Step 12) with the Iu UP INITIALISATION ACK packet. The GANC 3610 signals (in Step 13) the completion of the RAB establishment to the UE 3605 with the GA-CSR ACTIVATE CHANNEL COMPLETE message. Alternatively, Steps 11 and 12 may occur before Step 9.

The GANC 3610 signals to the MSC 3615 that the RAB has been established by sending (in Step 14) a RANAP RAB Assignment Response message. The MSC 3615 signals to the UE 3505, with the Alerting message, that the called party is ringing. The message is transferred (in Step 15) to the GANC 3610 and GANC forwards (in Step 15) the message to the UE 3605 in the GA-CSR DL DIRECT TRANSFER. When the UE has not connected the audio path to the user, it generates ring back to the calling party. Otherwise, the network-generated ring back will be returned to the calling party.

Next, the MSC 3615 signals that the called party has answered, via the Connect message. The message is transferred (in Step 16) to the GANC 3610 and GANC forwards (in Step 16) the message to the UE in the GA-CSR DL DIRECT TRANSFER. The UE connects the user to the audio path. If the UE is generating ring back, it stops and connects the user to the audio path.

The UE 3605 then sends (in Step 17) the Connect Ack message in response, and the two parties are connected for the voice call. This message is contained within the GA-CSR UL DIRECT TRANSFER between the UE and the GANC. The GANC forwards the Connect Ack message to the MSC. At this time, bi-directional voice traffic flows (in Step 18) between the UE 3605 and MSC 3615 through the GANC 3610.

2. UE Terminates Iu UP Protocol

Figure 37:
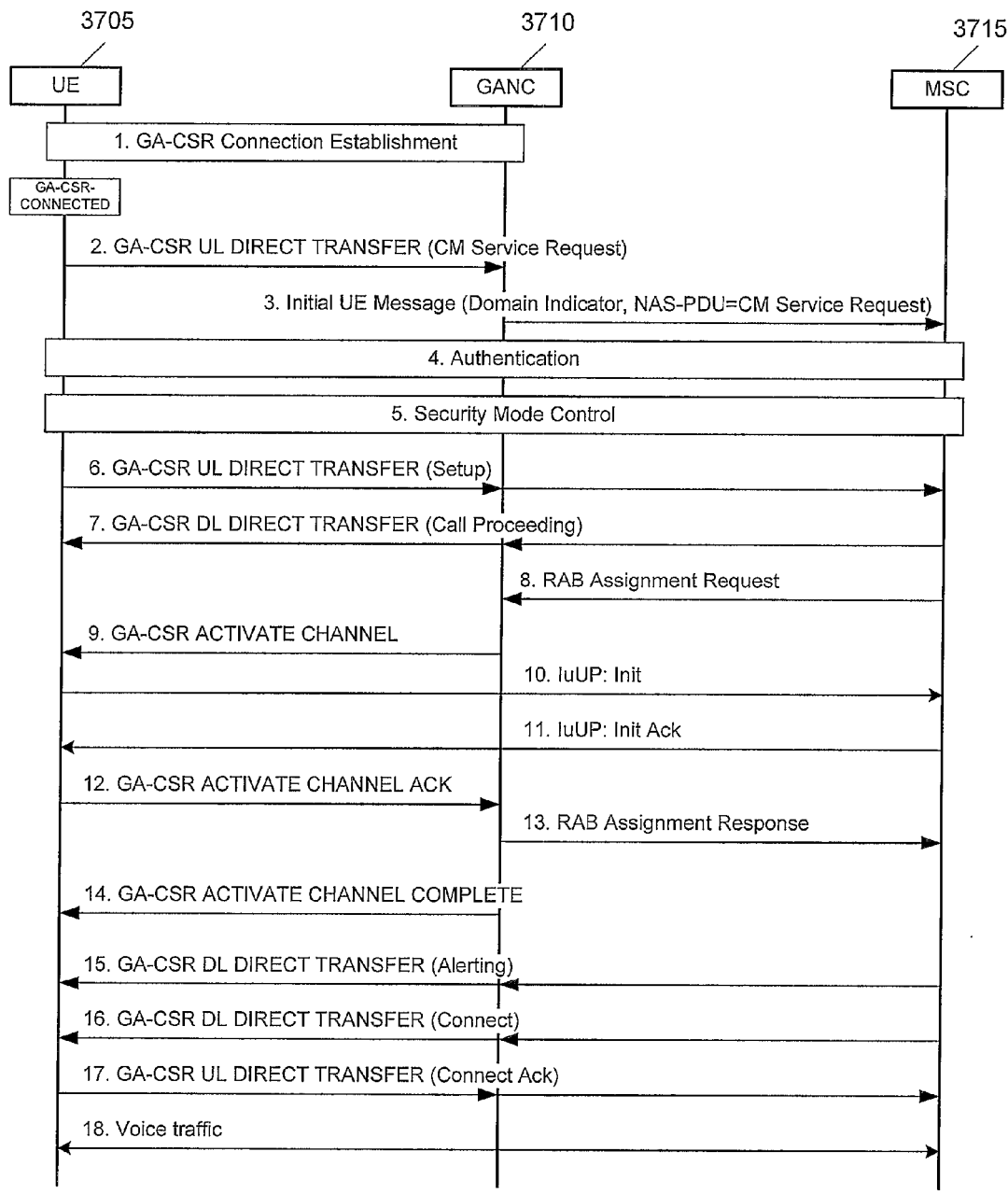
FIG. 37 illustrates Mobile Originated CS Call in some embodiments.

Some embodiments utilize an alternative procedure for a mobile originated CS call. FIG. 37 illustrates steps performed during a mobile originated CS call in these embodiments. The procedure assumes that the UE is in GAN mode; i.e., it has successfully registered with the GANC and GA-CSR is the serving RR entity for CS services in the UE. It also assumes that no GA-CSR signaling connection exists between the UE and GANC (i.e., GA-CSR-IDLE state). Steps 1 to 8 are performed the same as described for steps 1 to 8 shown in FIG. 36 above and are not repeated for simplicity.

Since Iu UP support mode is indicated by the MSC in step 8 (as described in reference with FIG. 36), the GANC indicates (in Step 9) that Iu UP support mode is required in the GA-CSR ACTIVATE CHANNEL message, and the UE 3705 sends (in Step 10) the Iu UP INITIALIZATION packet to the MSC 3715. In response, the MSC 3715 responds (in Step 11) with the Iu UP INITIALISATION ACK packet. Next, the UE 3705 sends (in Step 12) the GA-CSR ACTIVATE CHANNEL ACK to the GANC 3710.

The GANC 3710 signals to the MSC 3715 that the RAB has been established by sending (in Step 13) a RANAP RAB Assignment Response message. The GANC 3710 also sends (in Step 14) a GA-CSR ACTIVATE CHANNEL COMPLETE message to the UE 3705. Steps 15 to 18 are performed the same as described for steps 15 to 18 shown in FIG. 36 above and are not repeated for simplicity.

K. Mobile Terminated CS Call

Figure 38:
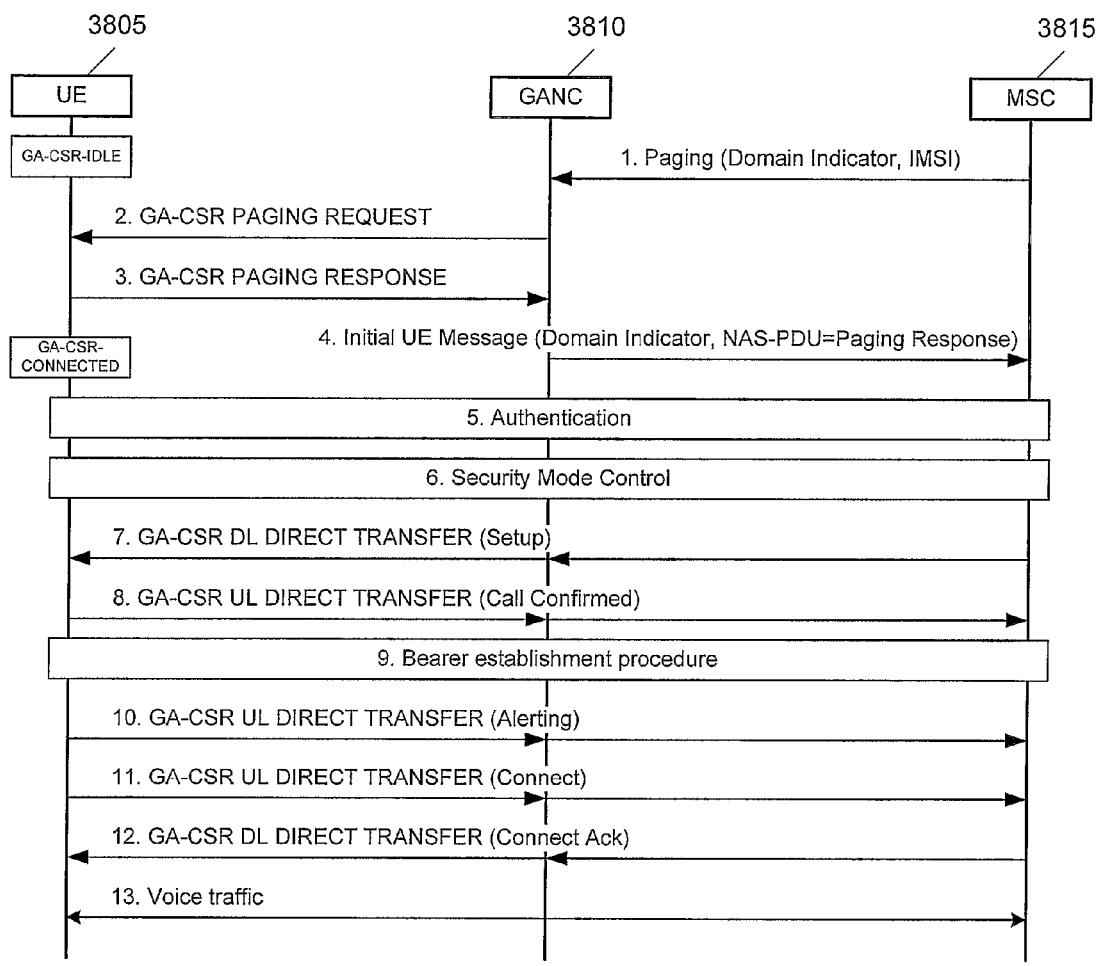
FIG. 38 illustrates Mobile Terminated CS Call in some embodiments.

FIG. 38 illustrates steps performed during a mobile terminated CS call in some embodiments. The description of the procedure assumes that the UE is in GAN mode; i.e., it has successfully registered with the GANC and GA-CSR is the serving RR entity for CS services in the UE. It also assumes that no GA-CSR signaling connection exists between the UE and GANC (i.e., the UE is in the GA-CSR-IDLE state). When a mobile-terminated call arrives at the MSC 3815, as shown in FIG. 38, the MSC 3815 sends (in Step 1) a RANAP Paging message to the GANC 3810 identified through the last Location Update received by it and includes the TMSI if available. The IMSI of the mobile being paged is always included in the request.

Next, the GANC 3810 identifies the UE registration context using the IMSI provided by the MSC 3815. It then pages (in Step 2) the UE 3805 using the GA-CSR PAGING REQUEST message. The message includes the TMSI, if available in the request from the MSC; else it includes only the IMSI of the UE.

The UE 3805 responds with a GA-CSR PAGING RESPONSE. The UE transitions to the GA-CSR CONNECTED state. The GANC 3810 establishes an SCCP connection to the MSC 3815. The GANC 3810 then forwards (in Step 4) the paging response to the MSC 3815 using the RANAP Initial UE Message. Subsequent NAS messages between the UE and core network will be sent between GANC and MSC using the RANAP Direct Transfer message.

The MSC 3815 may optionally authenticate (in Step 5) the UE 3805 using standard UTRAN authentication procedures. The MSC may optionally update (in Step 6) the security configuration in the UE, via the GANC, as described in CS Security Mode Control sub-section above.

The MSC 3815 then initiates (in Step 7) call setup using the Setup message sent to the UE via GANC. GANC forwards (in Step 7) this message to the UE 3805 in the GA-CSR DL DIRECT TRANSFER message.

Next, the UE 3805 responds with Call Confirmed using the GA-CSR UL DIRECT TRANSFER after checking it's compatibility with the bearer service requested in the Setup and modifying the bearer service as needed. When the Setup included the signal information element, the UE alerts the user using the indicated signal, otherwise the UE alerts the user after the successful configuration of the user plane. The GANC 3810 forwards (in Step 8) the Call Confirmed message to the MSC 3815.

Next, the MSC 3815 initiates the assignment procedure with the GANC 3810, which triggers (in Step 9) the setup of the RTP stream (voice bearer channel) between the GANC and UE, same as steps 8-14 in the mobile originated CS call scenario described above.

The UE 3805 then signals (in Step 10) that it is alerting the user, via the Alerting message contained in the GA-CSR UL DIRECT TRANSFER. The GANC forwards (in Step 10) the Alerting message to the MSC. The MSC sends a corresponding alerting message to the calling party.

The UE 3805 then signals (in Step 11) that the called party has answered, via the Connect message contained in the GA-CSR UL DIRECT TRANSFER. The GANC 3810 forwards (in Step 11) the Connect message to the MSC 3815. The MSC sends a corresponding Connect message to the calling party and through connects the audio. The UE connects the user to the audio path.

Next, the MSC 3815 acknowledges (in Step 12) via the Connect Ack message to the GANC 3810. GANC forwards (in Step 12) this message to the UE 3805 in the GA-CSR DL DIRECT TRANSFER. The two parties on the call are connected on the audio path. At this time, bi-directional voice traffic flows (in Step 13) between the UE and MSC through the GANC.

L. CS Call Clearing

Figure 39:
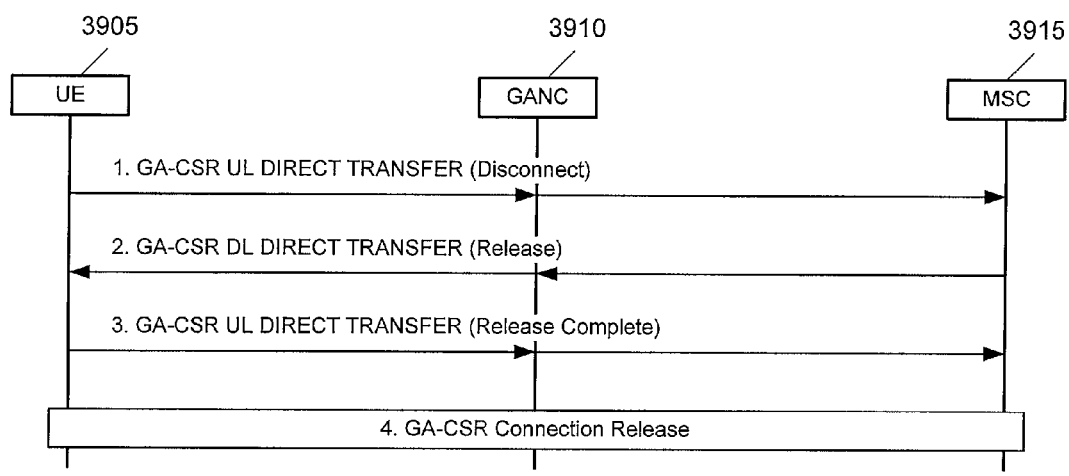
FIG. 39 illustrates UE initiated CS Call clearing in some embodiments.

FIG. 39 illustrates call clearing initiated by the UE in some embodiments. As shown, the UE 3905 sends (in Step 1) the Disconnect message to the MSC 3915 to release the call. This message is contained in the GA-CSR UL DIRECT TRANSFER message between ULE 3905 and GANC 3910. The GANC 3910 forwards (in Step 1) the Disconnect message to the MSC (i.e., using the RANAP Direct Transfer message).

Next, the MSC 3915 responds (in Step 2) with a Release message to the GANC. The GANC forwards (in Step 2) this message to the UE 3905 using the GA-CSR DL DIRECT TRANSFER message. The UE 3905 responds (in Step 3) with the Release Complete message. This message is contained within the GA-CSR UL DIRECT TRANSFER message between UE and GANC. The GANC forwards (in Step 3) the Disconnect message to the MSC. The MSC triggers (in Step 4) the release of connection as described in GA-CSR connection release sub-section, above.

M. CS Handover

1. CS Handover from GERAN to GAN a) GANC Terminates Iu UP Protocol

Figure 40:
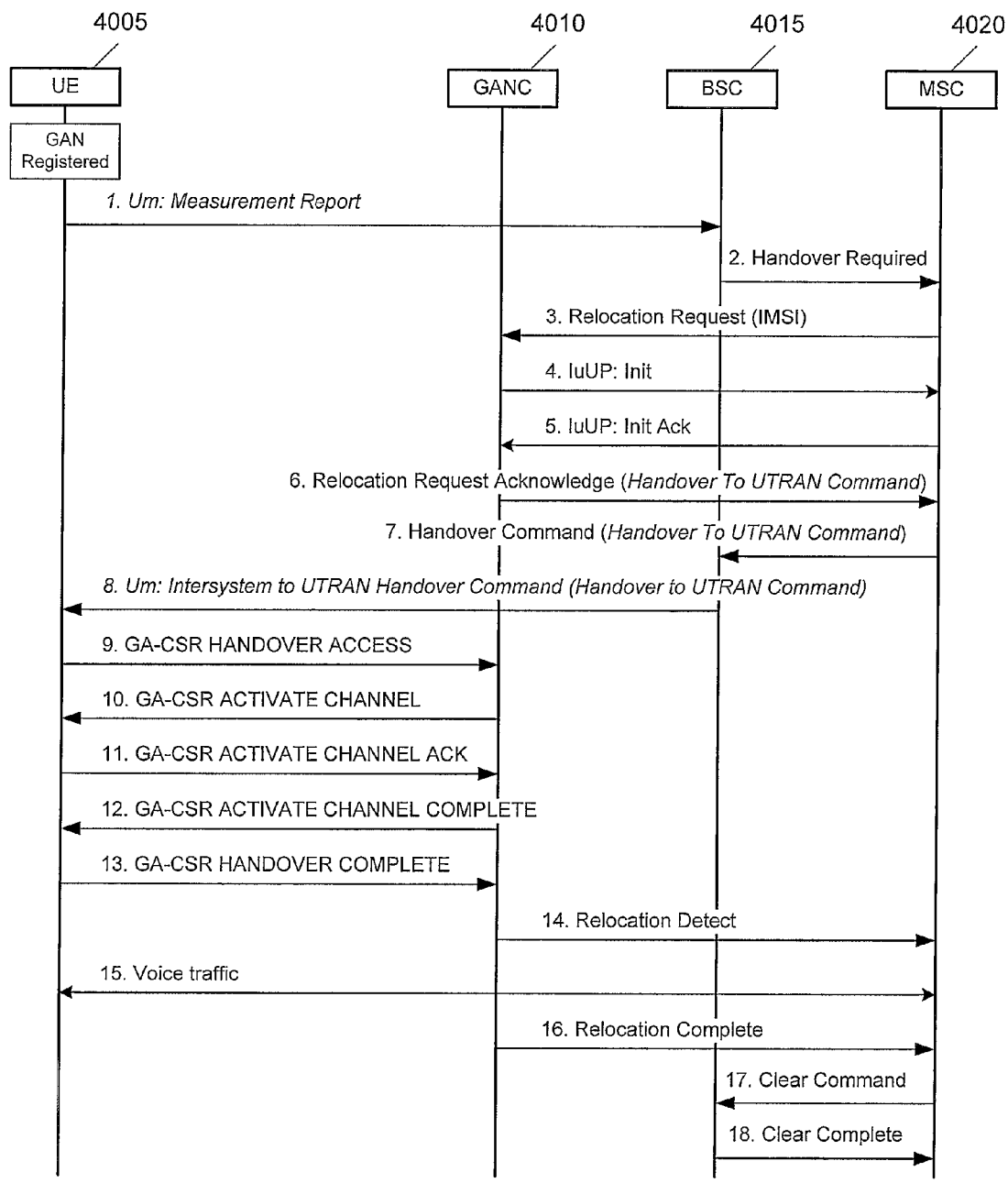
FIG. 40 illustrates CS Handover from GERAN to GAN in some embodiments.

FIG. 40 illustrates CS handover from GERAN to GAN in some embodiments. The description of the GERAN to GAN handover procedure assumes the following: (1) the UE is on an active call on the GERAN, (2) the UE mode selection is GAN-preferred, or if GERAN/UTRAN-preferred, the RxLev from the current serving cell drops below a defined threshold. In some embodiments, this threshold can be specified as a fixed value, or provided by the GERAN BSS to the UE in dedicated mode, (3) the UE has successfully registered with a GANC, allowing the UE to obtain GAN system information, and (4) the GERAN provides information on neighboring 3G cells such that one of the cells in the 3G neighbor list matches the 3G cell information associated with the GANC, as provided in the AS-related component of the system information obtained from the GANC. As shown, the UE 4005 begins to include GAN cell information in the Measurement Report message to the GERAN BSC 4015. The UE 4005 reports the highest signal level for the GAN cell. This is not the actual measured signal level on GAN, rather an artificial value (e.g., RxLev=63), allowing the UE to indicate preference for the GAN.

Based on UE measurement reports and other internal algorithms, the GERAN BSC 4015 decides to handover to the GAN cell. The BSC 4015 starts the handover preparation by sending (in Step 2) a Handover Required message to the MSC 4020, identifying the target 3G RNC (GANC).

The MSC 4020 requests (in Step 3) the target GANC 4010 to allocate resources for the handover using the Relocation Request message. The UE is identified by the included IMSI parameter.

Since Iu UP support mode is indicated, the GANC 4010 sends (in Step 4) the Iu UP INITIALISATION packet to the MSC. The MSC responds (in Step 5) with the Iu UP INITIALISATION ACK packet.

The GANC 4010 builds a Handover to UTRAN Command message and sends it (in Step 6) to the MSC 4020 through the Relocation Request Acknowledge message. The MSC forwards (in Step 7) the Handover to UTRAN Command message to the GERAN BSC 4015 in the BSSMAP Handover Command message, completing the handover preparation.

Next, the GERAN BSC 4015 sends (in Step 8) the Inter-system to UTRAN Handover Command message, containing the Handover to UTRAN Command message, to the UE 4005 to initiate handover to GAN. The UE does not switch its audio path from GERAN to GAN until handover completion (i.e., until it sends the GA-CSR HANDOVER COMPLETE message) to keep the audio interruption short.

The UE 4005 accesses (in Step 9) the GANC 4010 using the GA-CSR HANDOVER ACCESS message, and provides the entire Intersystem to UTRAN Handover Command message received from GERAN. The GANC 4010 sends (in Step 10) the GA-CSR ACTIVATE CHANNEL message to the UE 4005 including bearer path setup information such as: (1) Channel mode, (2) Multi-rate codec configuration, (3) UDP port & the IP address for the uplink RTP stream, and (4) Voice sample size.

Next, the UE 4005 sends (in Step 11) the GA-CSR ACTIVATE CHANNEL ACK to the GANC 4010 indicating the UDP port for the downlink RTP stream. The GANC 4010 signals (in Step 11) the completion of the RAB establishment to the UE 4005 with the GA-CSR ACTIVATE CHANNEL COMPLETE message.

The UE 4005 transmits (in Step 13) the GA-CSR HANDOVER COMPLETE message to indicate the completion of the handover procedure at its end. It switches the user from the GERAN user plane to the GAN user plane. The GANC 4010 indicates (in Step 14) to the MSC 4020 that it has detected the UE, using Relocation Detect message. The CN can optionally now switch the user plane from the source GERAN to the target GAN.

Bi-directional voice traffic is now (in Step 15) flowing between the UE 4005 and MSC 4020, via GANC 4010. The target GANC 4010 indicates (in Step 16) the handover is complete, using the Relocation Complete message. If it had not done so before, the CN now switches the user plane from source GERAN to target GAN.

The CN tears down (in Step 17) the connection to the source GERAN, using Clear Command message. Finally, the source GERAN 4015 confirms (in Step 18) the release of GERAN resources allocated for this call, using Clear Complete message.

b) UE Terminates Iu UP Protocol

Figure 41:
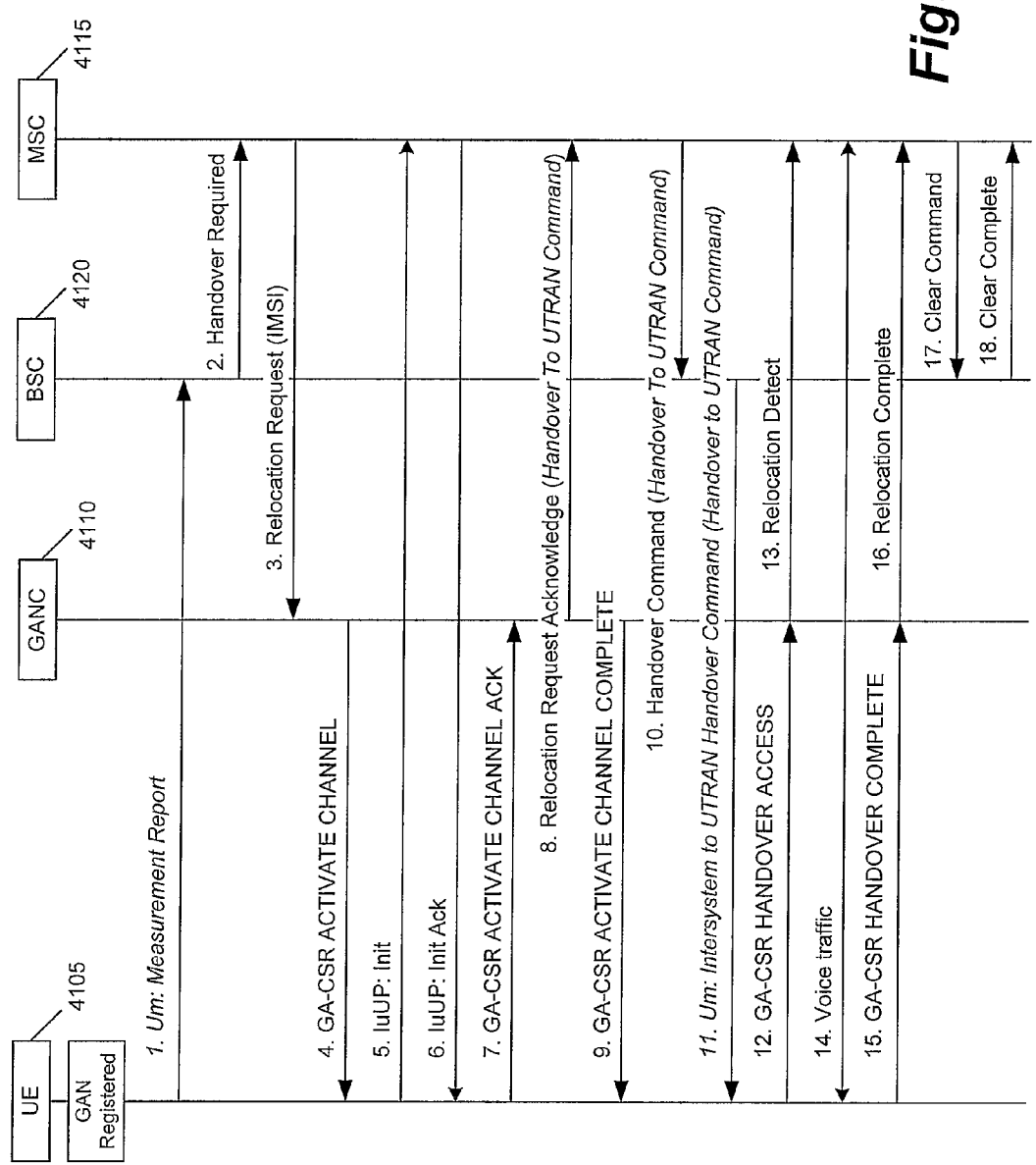
FIG. 41 illustrates an alternative procedure performed during GERAN to GAN in some embodiments.

Some embodiments utilize an alternative procedure for CS handover from GERAN to GAN. FIG. 41 illustrates steps performed during GERAN to GAN in these embodiments. The description of the GERAN to GAN handover procedure assumes the following: (1) the UE is on an active call on the GERAN, (2) the UE mode selection is GAN-preferred, or if GERAN/UTRAN-preferred, the RxLev from the current serving cell drops below a defined threshold. In some embodiments, this threshold can be specified as a fixed value, or provided by the GERAN BSS to the UE in dedicated mode, (3) the UE has successfully registered with a GANC, allowing the UE to obtain GAN system information, and (4) the GERAN provides information on neighboring 3G cells such that one of the cells in the 3G neighbor list matches the 3G cell information associated with the GANC, as provided in the AS-related component of the system information obtained from the GANC. Steps 1 to 3 are performed the same as described for steps 1 to 3 shown in FIG. 40 above and are not repeated for simplicity.

The GANC 4110 sends (in Step 4) the GA-CSR ACTIVATE CHANNEL message to the UE 4105 including bearer path setup information such as: (1) Channel mode, (2) Multi-rate codec configuration, (3) UDP port & the IP address for the uplink RTP stream, (4) Voice sample size, and an indication that Iu UP support mode is required. In some embodiments, the GANC 4110 includes the Radio Access Bearer (RAB) parameters, and the Iu UP parameters (e.g., Iu UP mode, where support mode is used for AMR voice calls).

Since Iu UP support mode is indicated, the UE 4110 sends (in Step 5) the Iu UP INITIALISATION packet to the IP address and UDP port indicated in the GA-CSR ACTIVATE CHANNEL message.

The MSC 4115 responds (in Step 6) with the Iu UP INITIALISATION ACK packet. The MSC 4115 sends the message to the source IP address and UDP port number of the received INITIALISATION packet. The UE 4105 sends (in Step 7) the GA-CSR ACTIVATE CHANNEL ACK to the GANC 4110. The GANC 4110 builds a Handover to UTRAN Command message and sends (in Step 8) it to the CN 4115 through the Relocation Request Acknowledge message.

The GANC 4110 signals (in Step 9) the completion of the RAB establishment to the UE 4105 with the GA-CSR ACTIVATE CHANNEL COMPLETE message. An end-to-end audio path now exists between the UE 4105 and the MSC 4115. The MSC 4115 forwards (in Step 10) the Handover to UTRAN Command message to the GERAN BSC 4120 in the BSSMAP Handover Command message, completing the handover preparation.

The GERAN BSC 4120 sends (in Step 11) the Intersystem to UTRAN Handover Command message, containing the Handover to UTRAN Command message, to the UE to initiate handover to GAN. The UE does not switch its audio path from GERAN to GAN until handover completion (i.e., until it sends the GA-CSR HANDOVER COMPLETE message) to keep the audio interruption short.

The UE accesses the GANC 4110 using (in Step 12) the GA-CSR HANDOVER ACCESS message, and provides the entire Intersystem to UTRAN Handover Command message received from GERAN. The GANC 4110 indicates (in Step 13) to the MSC 4115 that it has detected the UE, using Relocation Detect message. The MSC 4115 can optionally now switch the user plane from the source GERAN to the target GAN. Bi-directional voice traffic is now flowing (in Step 14) between the UE and MSC 4115, via GANC 4110.

The UE transmits (in Step 15) the GA-CSR HANDOVER COMPLETE message to indicate the completion of the handover procedure at its end. It switches the user from the GERAN user plane to the GAN user plane.

The target GANC 4110 indicates (in Step 16) the handover is complete, using the Relocation Complete message. If it had not done so before, the MSC 4115 now switches the user plane from source GERAN to target GAN.

Finally, the MSC 4115 tears (in Step 17) down the connection to the source GERAN, using Clear Command message. The source GERAN confirms (in Step 18) the release of GERAN resources allocated for this call, using Clear Complete message.

2. CS Handover from UTRAN to GAN a) GANC Terminates Iu UP Packet

Figure 42:
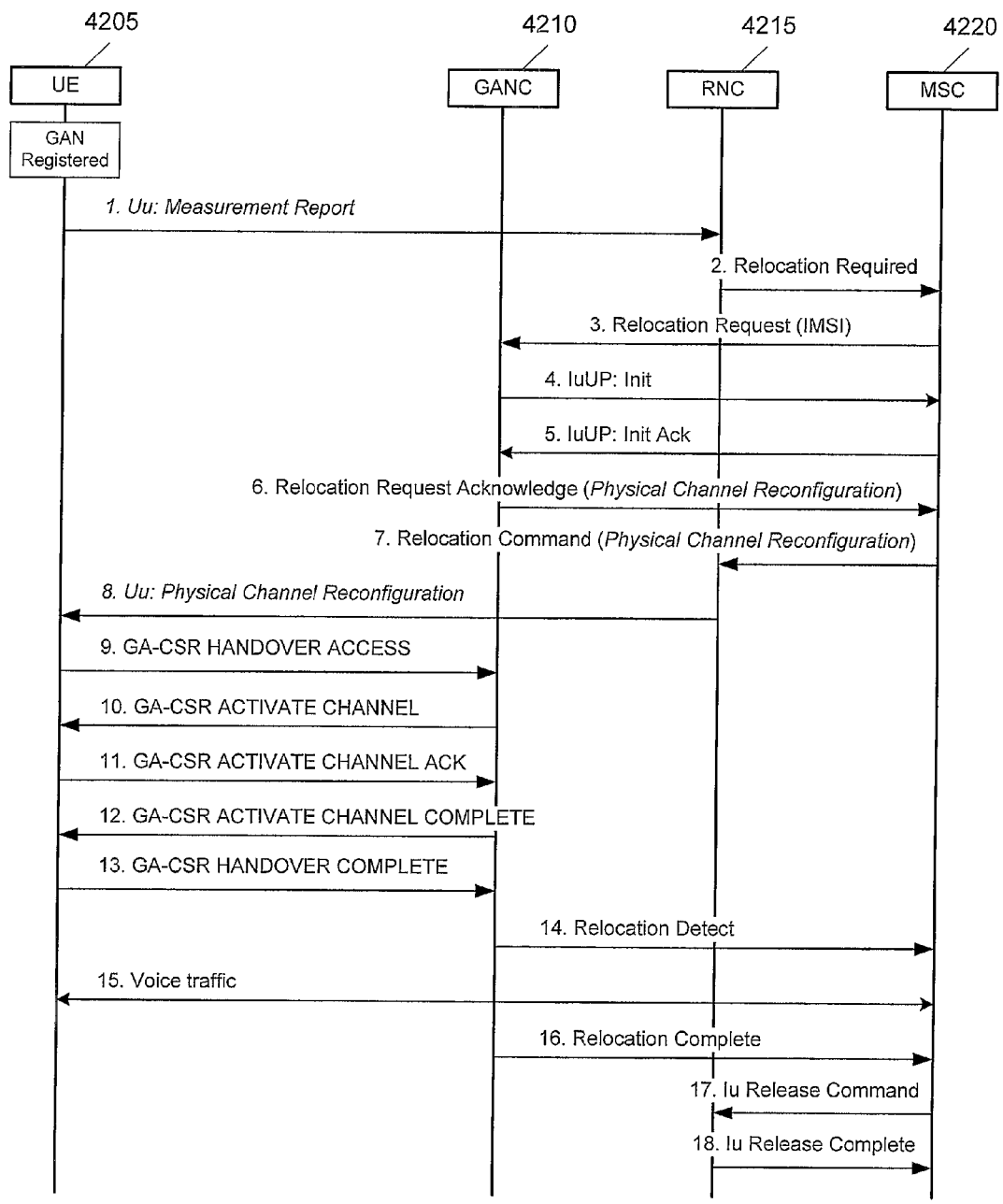
FIG. 42 illustrates CS Handover from UTRAN to GAN in some embodiments.

FIG. 42 illustrates CS handover from UTRAN to GAN in some embodiments. The description of the UTRAN to GAN Handover procedure assumes the following: (1) the UE is on an active call on the UTRAN, (2) the UE has been ordered by the RNC to make inter-frequency measurements (i.e., if the GAN cell has been allocated a different frequency value than is used in the UTRAN), (a) if the UE is in GAN preferred mode with an Event 2A configured, the UE handles parameters associated with the Event 2A in a GAN specific manner (as described in "Radio Resource Control (RRC) protocol specification", 3GPP TS 25.331 standard, hereinafter "3GPP TS 25.331") for the reporting of the EGAN, (b) when the UE is in GERAN/UTRAN preferred mode and an event 2A has been configured for the GAN cell, the UE shall only send a measurement about the GAN cell, when this event is triggered and no UTRAN cells from the neighbor cell list of the UE satisfy the triggering condition of this Event (as described in 3GPP TS 25.331), (3) the UTRAN provides information on neighboring cells such that one of the cells in the neighbor list matches the cell associated with the GANC, as provided in the AS-related component of the system information obtained from GANC.

As shown in FIG. 42, the UE 4205 begins to include information about a GAN cell in the Measurement Report message sent (in Step 1) to the RNC 4215. The UE 4205 reports the highest signal level for the GAN cell. This is not the actual measured signal level on the GAN, rather an artificial value allowing the UE 4205 to indicate preference for the GAN.

Based on UE measurement reports and other internal algorithms, the RNC 4215 decides to initiate handover to the GAN cell. The RNC 4215 starts the preparation phase of the Relocation procedure by sending (in Step 2) a Relocation Required message to the MSC, identifying the target (GAN) cell.

Next, steps 3 to 5 shown in FIG. 42 are performed as described for steps 3-5 for GERAN to GAN Handover subsection, above. The target GANC 4210 acknowledges (in Step 6) the handover request message, using Relocation Request Acknowledge message, indicating it can support the requested handover, and including a Physical Channel Reconfiguration message that indicates the radio channel to which the UE should be directed.

Next, the MSC 4220 sends (in Step 7) the Relocation Command message to the RNC 4215, completing the relocation preparation. The RNC 4215 sends (in Step 8) the PHYSICAL CHANNEL RECONFIGURATION message to the UE 4205 to initiate handover to GAN. The UE does not switch its audio path from UTRAN to GAN until handover completion (i.e., until it sends the GA-CSR HANDOVER COMPLETE message) to keep the audio interruption short.

Next, Steps 9-16 shown in FIG. 42 are performed similar to Steps 9-16 for GERAN to GAN Handover described above. Next, the MSC 4220 tears down (in Step 17) the connection to the source RNC, using Iu Release Command. Finally, the source RNC 4215 confirms (in Step 18) the release of UTRAN resources allocated for this call, using Iu Release Complete.

b) UE Terminates Iu UP Packet

Figure 43:
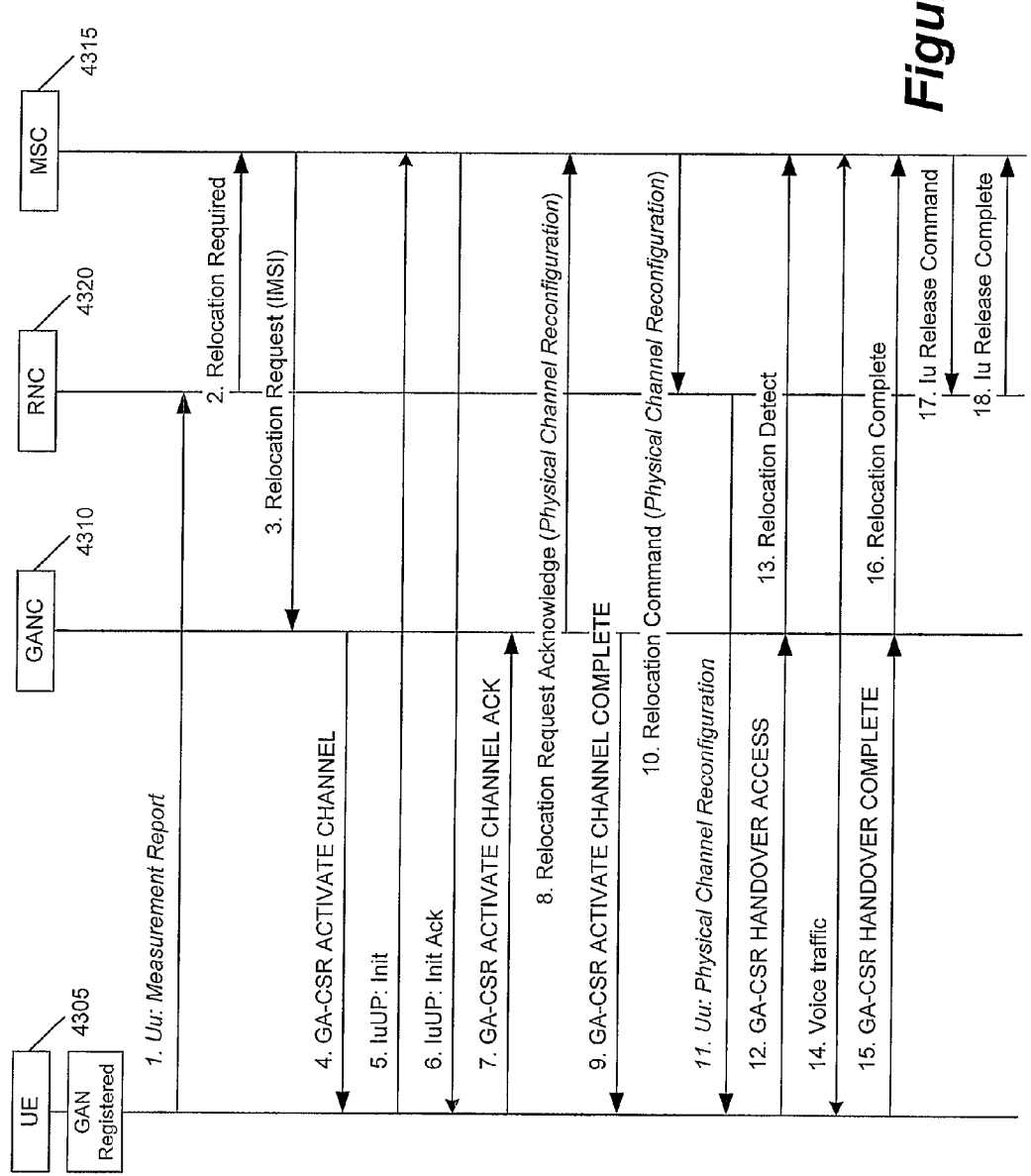
FIG. 43 illustrates an alternative procedure performed during UTRAN to GAN in these embodiments.

Some embodiments utilize an alternative procedure for CS handover from UTRAN to GAN. FIG. 43 illustrates steps performed during UTRAN to GAN in these embodiments. As shown, the UE begins to include (in Step 1) information about a GAN cell in the Measurement Report message sent to the RNC 4320. The UE reports the highest signal level for the GAN cell. This is not the actual measured signal level on the GAN, rather an artificial value allowing the UE to indicate preference for the GAN.

Based on UE measurement reports and other internal algorithms, the RNC 4320 decides to initiate handover to the GAN cell. The RNC 4320 starts the preparation phase of the Relocation procedure by sending (in Step 2) a Relocation Required message to the MSC 4315, identifying the target GAN cell.

The MSC 4315 requests (in Step 3) the target GANC 4310 to allocate resources for the handover using the Relocation Request message. The UE 4305 is identified by the included IMSI parameter.

The GANC 4310 sends (in Step 4) the GA-CSR ACTIVATE CHANNEL message to the UE 4305 including bearer path setup information received in the Relocation Request message, such as: (1) UDP port & the IP address for the uplink RTP stream, (2) Radio Access Bearer (RAB) parameters, and (3) Iu UP parameters (e.g., Iu UP mode, where support mode is used for AMR voice calls).

Since Iu UP support mode is indicated, the UE 4305 sends (in Step 5) the Iu UP INITIALISATION packet to the IP address and UDP port indicated in the GA-CSR ACTIVATE CHANNEL message. This message is routed to the core network 4315 (e.g., the R4 media gateway).

The MSC 4315 responds (in Step 6) with the Iu UP INITIALISATION ACK packet. The MSC 4315 sends the message to the source IP address and UDP port number of the received INITIALISATION packet. The UE 4305 sends (in Step 7) the GA-CSR ACTIVATE CHANNEL ACK to the GANC 4310.

The target GANC 4310 acknowledges (in Step 8) the handover request message, using Relocation Request Acknowledge message, indicating it can support the requested handover, and including a Physical Channel Reconfiguration message that indicates the radio channel to which the UE 4305 should be directed.

The GANC 4310 signals (in Step 9) the completion of the RAB establishment to the UE 4305 with the GA-CSR ACTIVATE CHANNEL COMPLETE message. An end-to-end audio path now exists between the UE 4305 and the MSC 4315. The MSC 4315 sends (in Step 10) the Relocation Command message to the RNC 4320, completing the relocation preparation.

The RNC 4320 sends (in Step 11) the PHYSICAL CHANNEL RECONFIGURATION message to the UE to initiate handover to GAN. The UE does not switch its audio path from UTRAN to GAN until handover completion (i.e., until it sends the GA-CSR HANDOVER COMPLETE message) to keep the audio interruption short. The UE accesses (in Step 12) the GANC 4310 using the GA-CSR HANDOVER ACCESS message, and provides the entire PHYSICAL CHANNEL RECONFIGURATION message received from RNC 4320.

The GANC 4310 indicates (in Step 13) to the MSC 4315 that it has detected the UE, using Relocation Detect message. The MSC 4315 can optionally now switch the user plane from the source RNC 4320 to the target GANC 4310. Bi-directional voice traffic is now flowing (in Step 14) between the UE and MSC 4315, via GANC 4310.

The UE transmits (in Step 15) the GA-CSR HANDOVER COMPLETE to indicate the completion of the handover procedure from its perspective. It switches the user from the UTRAN user plane to the GAN user plane. The target GANC 4310 indicates (in Step 16) the handover is complete, using the Relocation Complete message. If it has not done so before, the CN 4315 now switches the user plane from source RNC 4320 to target GANC 4310.

Finally, the MSC 4315 tears (in Step 17) down the connection to the source RNC 4320, using Iu Release Command. The source RNC 4320 confirms (in Step 18) the release of UTRAN resources allocated for this call, using Iu Release Complete.

3. CS Handover from GAN to GERAN

Figure 44:
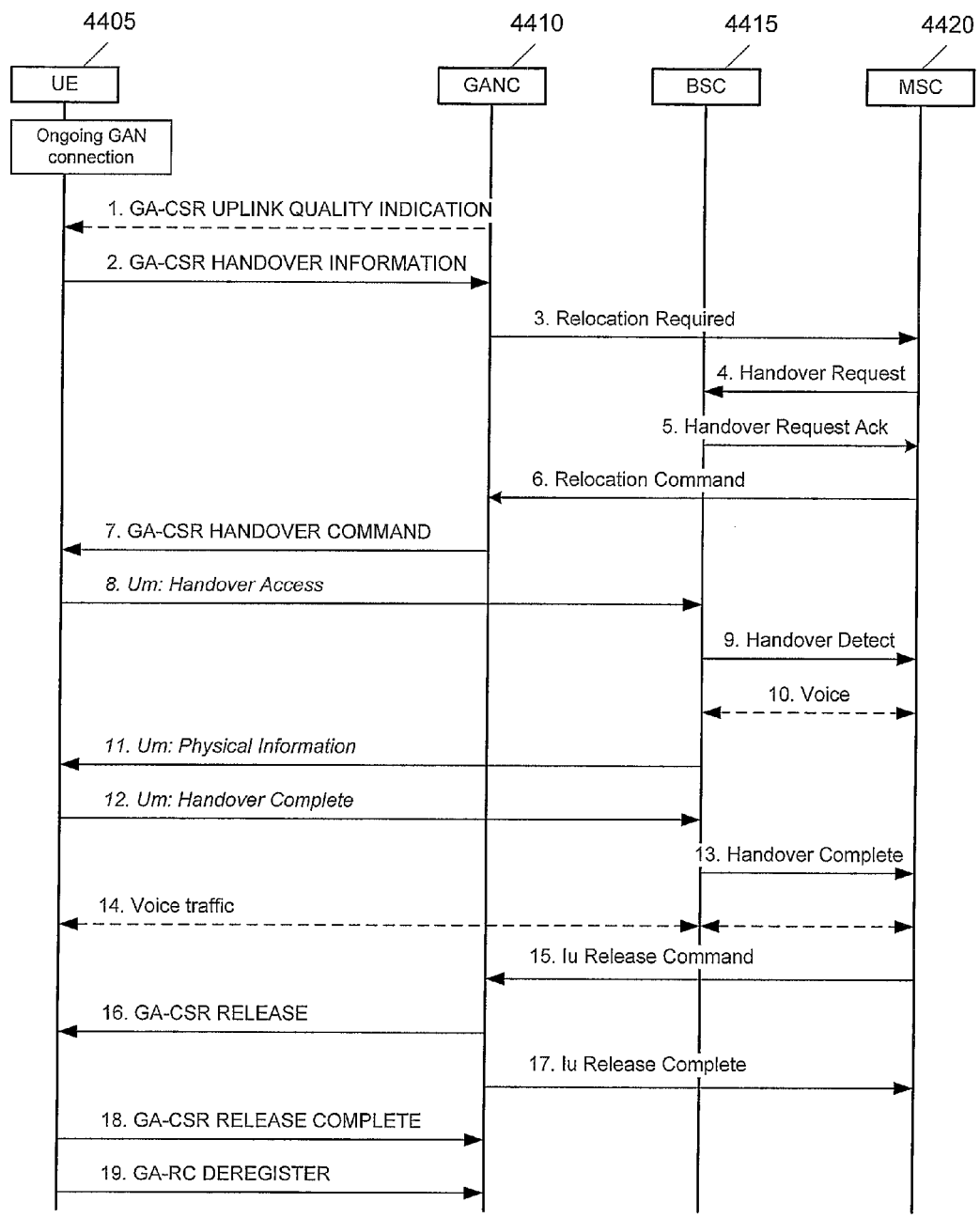
FIG. 44 illustrates CS Handover from GAN to GERAN in some embodiments.

FIG. 44 illustrates the procedure to handover from GAN to GERAN in some embodiments. The procedure description in this sub-clause assumes the following: (1) the UE is on an active call in GAN Iu-mode, and (2) the GERAN becomes available and (a) the UE mode selection is GERAN/UTRAN-preferred, or (b) the UE mode selection is GAN-preferred and the UE begins to leave GAN coverage, based on its local measurements, received RTCP reports, as well as any uplink quality indications received from the GANC. The handover from GAN to GERAN procedure is always triggered by the UE. As shown in FIG. 44, the following steps are performed during handover from GAN to GERAN.

The GANC 4410 may send (in Step 1) a GA-CSR UPLINK QUALITY INDICATION when there is a problem with the uplink quality for the ongoing call. Uplink Quality Indication is information sent by the GANC to the UE indicating the crossing of an uplink quality threshold in the uplink direction. Whenever the UE receives an indication of bad quality, it should start the handover procedure, as described in the next step. Alternatively, UE can use its local measurements or received RTCP reports, to decide to initiate the handover procedure.

As shown, the UE 4405 sends (in Step 2) the GA-CSR HANDOVER INFORMATION message to the GANC 4410 indicating the Channel Mode and a list of target GERAN cells, identified by CGI, in order of preference (e.g. ranked by C1 path loss parameter) for handover, and includes the received signal strength for each identified GERAN cell. This list is the most recent information available from the GSM RR subsystem. In addition, the GA-CSR HANDOVER INFORMATION message may include a list of target UTRAN cells ranked in order of preference for handover, and the received signal strength for each identified UTRAN cell.

If the Serving GANC selects a target GERAN cell, the handover to GERAN procedure is performed. The Serving GANC 4410 starts the handover preparation by signaling (in Step 3) to the MSC 4420 the need for handover, using Relocation Required, and including the GERAN cell list provided by the UE. The GANC may include only a subset of the cell list provided by the UE.

The MSC 4420 then selects a target GERAN cell and requests it (in Step 4) to allocate the necessary resources, using Handover Request. The target GERAN BSC 4415 builds a Handover Command message providing information on the channel allocated and sends it (in Step 5) to the MSC 4420 through the Handover Request Acknowledge message.

The MSC 4420 signals (in Step 6) the GANC 4410 to handover the UE 4405 to the GERAN, using Relocation Command message, ending the handover preparation phase. The GANC transmits (in Step 7) the GA-CSR HANDOVER COMMAND to the UE including the details sent by the GERAN on the target resource allocation.

Next, the UE 4405 transmits (in Step 8) the "Um: Handover Access" message containing the handover reference element to allow the target GERAN BSC 4415 to correlate this handover access with the Handover Command message transmitted earlier to the MSC in response to the Handover Required. The target GERAN BSC 4415 confirms (in Step 9) the detection of the handover to the MSC 4420, using the Handover Detect message.

The MSC 4420 may at this point switch (in Step 10) the user plane to the target BSS. The GERAN BSC 4415 provides (in Step 11) Physical Information to the UE (i.e., Timing Advance) to allow the UE to synchronize with the GERAN. The UE 4405 signals (in Step 12) to the GERAN BSC 4415 that the handover is completed, using Handover Complete.

The GERAN BSC 4415 confirms (in Step 13) to the MSC 4420 the completion of the handover, via Handover Complete message. The MSC 4420 may use the target CGI used in the Handover procedure for charging purposes.

Bi-directional voice traffic is now flowing (in Step 14) between the UE 4405 and MSC 4420, via the GERAN BSC 4415. On receiving the confirmation of the completion of the handover, the MSC 4420 indicates (in Step 15) to the GANC to release any resources allocated to the UE, via the Iu Release Command.

Next, GANC 4415 commands (in Step 16) the UE 4405 to release resources, using the GA-CSR RELEASE message. The GANC 4410 confirms (in Step 17) resource release to MSC 4420 using the Iu Release Complete message.

The UE 4405 confirms (in Step 18) resource release to the GANC 4410 using the GA-CSR RELEASE COMPLETE message. The UE 4405 may finally deregister (in Step 19) from the GANC, using GA-RC DEREGISTER message.

4. CS Handover from GAN to UTRAN

Figure 45:
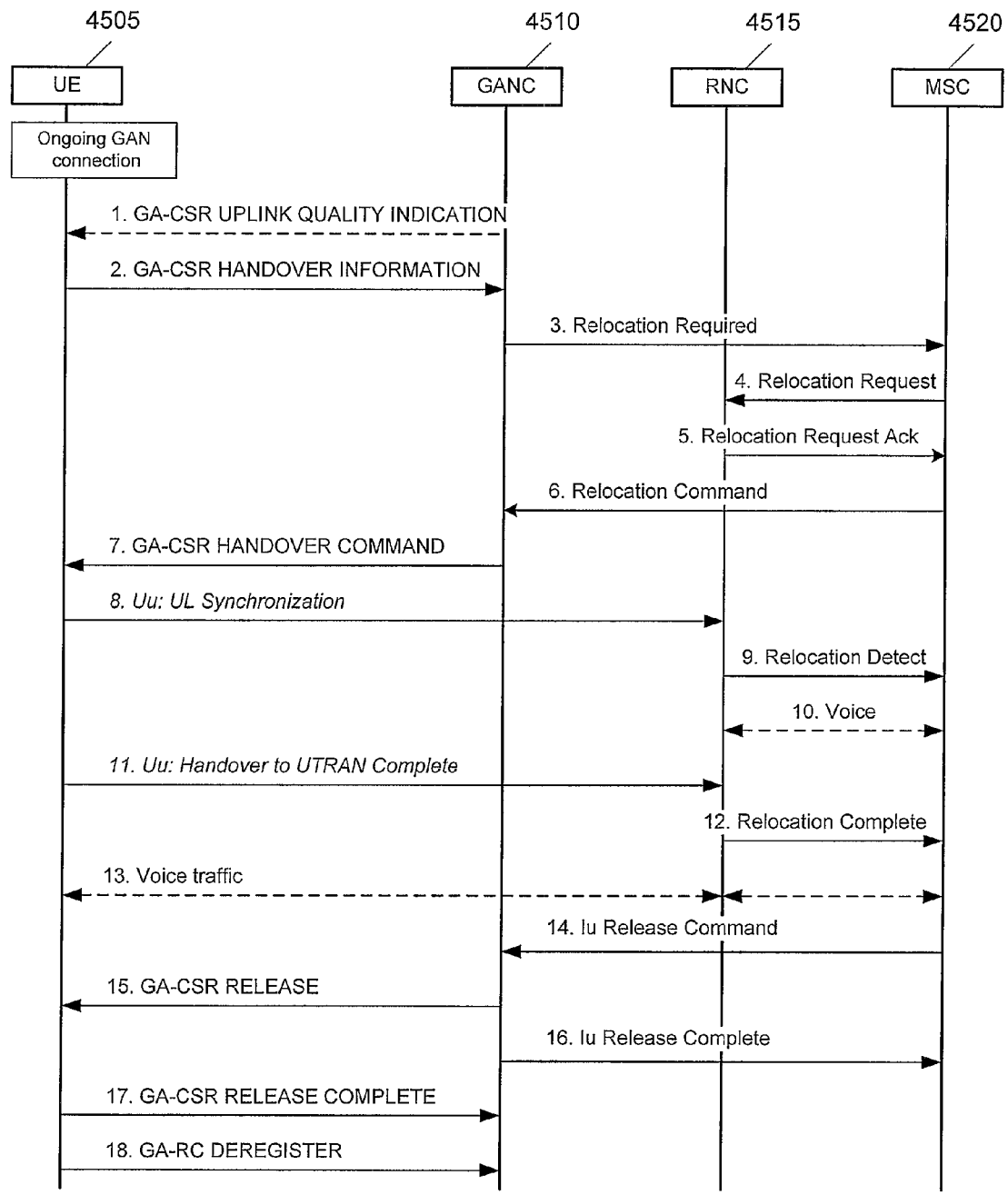
FIG. 45 illustrates CS Handover from GAN to UTRAN in some embodiments.

FIG. 45 illustrates the procedure to handover from GAN to UTRAN in some embodiments. The procedure description assumes the following: (1) the UE is on an active call on the GAN, (2) the UE is capable of operating in all of the GAN, GERAN and UTRAN modes, (3) the UTRAN becomes available and (a) the UE is in GERAN/UTRAN-preferred mode, or (b) the UE mode selection is GAN preferred and begins to leave GAN coverage, based on its local measurements, received RTCP reports, as well as any uplink quality indications received from the GANC. The handover from GAN procedure is always triggered by the UE. As shown in FIG. 45, the following steps are performed during handover from GAN to UTRAN.

The GANC 4510 may send (in Step 1) a GA-CSR UPLINK QUALITY INDICATION if there is a problem with the uplink quality for the ongoing call. Uplink Quality Indication is information sent by the GANC 4510 to the UE 4505 indicating the crossing of an uplink quality threshold in the uplink direction. Whenever the UE 4505 receives an indication of bad quality, it should start the handover procedure, as described in the next step. Alternatively, UE can use its local measurements or received RTCP reports, to decide to initiate the handover procedure.

Next, the UE 4505 sends (in Step 2) the GA-CSR HANDOVER INFORMATION message to the Serving GANC indicating the Channel Mode and a list of candidate target UTRAN and GERAN cells, in order of preference for handover, and includes the received signal strength for each identified cell. The UTRAN cells are identified by the PLMN ID, the LAC and the 3G Cell identity (defined in 3GPP TS 25.331).

If the Serving GANC 4510 selects UTRAN as the target RAT, the handover to UTRAN procedure is performed. The Serving GANC 4510 starts the handover preparation by signaling (in Step 3) to the MSC 4520 the need for handover, using Relocation Required and including the UTRAN cell list provided by the UE 4505. The GANC 4510 may include only a subset of the cell list provided by the UE 4505.

The MSC 4520 starts the handover procedure towards the target RNC 4515 identified by the Serving GANC. The MSC 4520 requests (in Step 4) from the target RNC 4515 to allocate the necessary resources using Relocation Request. The target RNC 4515 builds a Physical Channel Reconfiguration message providing information on the allocated UTRAN resources and sends it (in Step 5) to the MSC 4520 through the Relocation Request Acknowledge message.

Next, the MSC 4520 signals (in Step 6) the Serving GANC 4510 to handover the UE to the UTRAN, using Relocation Command message (which includes the Physical Channel Reconfiguration message), ending the handover preparation phase.

The Serving GANC 4510 transmits (in Step 7) the GA-CSR HANDOVER COMMAND to the UE including the details sent by the UTRAN on the target resource allocation. Target RNS 4515 achieves (in Step 8) uplink synchronization on the Uu interface.

The target RNC 4515 confirms (in Step 9) the detection of the handover to the MSC, using the Relocation Detect message. The MSC 4520 may at this point switch (in Step 10) the user plane to the target RNS 4515.

Next, the UE 4505 signals (in Step 11) to the UTRAN RNC 4515 that the handover is completed, using Handover to UTRAN Complete. The UTRAN RNC 4515 confirms (in Step 12) to the MSC 4520 the completion of the handover, via Relocation Complete message. If the user plane has not been switched in step 10, the MSC 4520 switches the user plane to the target RNS.

Bi-directional voice traffic is now flowing (in Step 13) between the UE 4505 and MSC 4520, via the UTRAN RNC 4515. On receiving the confirmation of the completion of the handover, the MSC 4520 indicates (in Step 14) to the Serving GANC 4510 to release any resources allocated to the UE, via the Iu Release Command.

The Serving GANC 4510 then commands (in Step 15) the UE 4505 to release resources, using the GA-CSR RELEASE message. The Serving GANC 4510 confirms (in Step 16) resource release to MSC 4520 using the Iu Release Complete message.

The UE 4505 confirms (in Step 17) resource release to the Serving GANC 4510 using the GA-CSR RELEASE COMPLETE message. The UE 4505 may finally deregister (in Step 18) from the Serving GANC 4510, using GA-RC DEREGISTER message.

N. GA-PSR Connection Handling

The Iu-mode GA-PSR connection is a logical connection between the ULE and the GANC for the PS domain. A GA-PSR connection is established when the upper layers in the UE request the establishment of a PS domain signaling connection and the UE is in GA-PSR-IDLE state; i.e., no GA-PSR connection exists. When a successful response is received from the network, GA-PSR replies to the upper layer that the PS domain signaling connection is established and the UE has entered the equivalent of the RRC connected mode (i.e., the GA-PSR-CONNECTED state).

1. GA-PSR Connection Establishment

Figure 46:
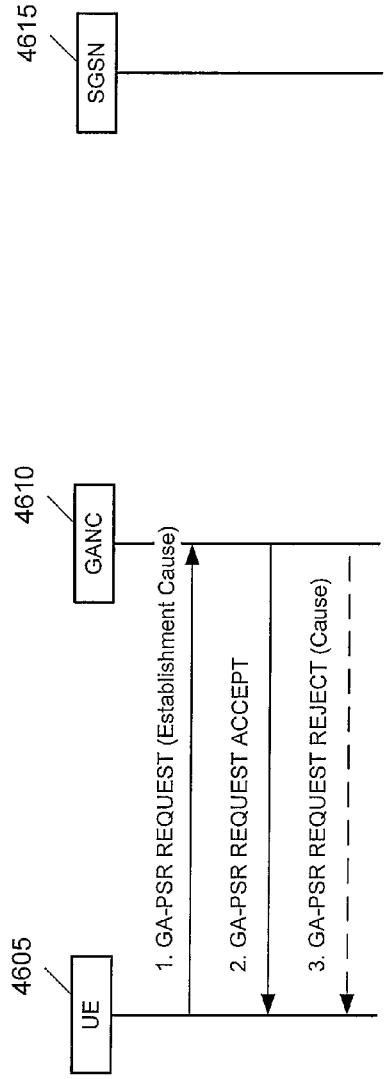
FIG. 46 illustrates GA-PSR Connection Establishment of some embodiments.

FIG. 46 illustrates successful and unsuccessful establishment of the GA-PSR Connection in some embodiments. As shown, the UE 4605 initiates GA-PSR connection establishment by sending (in Step 1) the GA-PSR REQUEST message to the GANC 4610. This message contains the Establishment Cause indicating the reason for GA-PSR connection establishment. When the GANC 4610 determines that the GA-PSR connection request can be accepted, the GANC 4610 signals the acceptance of the connection request to the UE 4605 by sending (in Step 2) the GA-PSR REQUEST ACCEPT and the UE enters the GA-PSR-CONNECTED state. Alternatively, when the GANC 4610 determines that the GA-PSR connection request has to be rejected, the GANC 4610 sends (in Step 3) a GA-PSR REQUEST REJECT to the UE ZC05 indicating the reject cause, completing the procedure.

2. GA-PSR Connection Release

Figure 47:
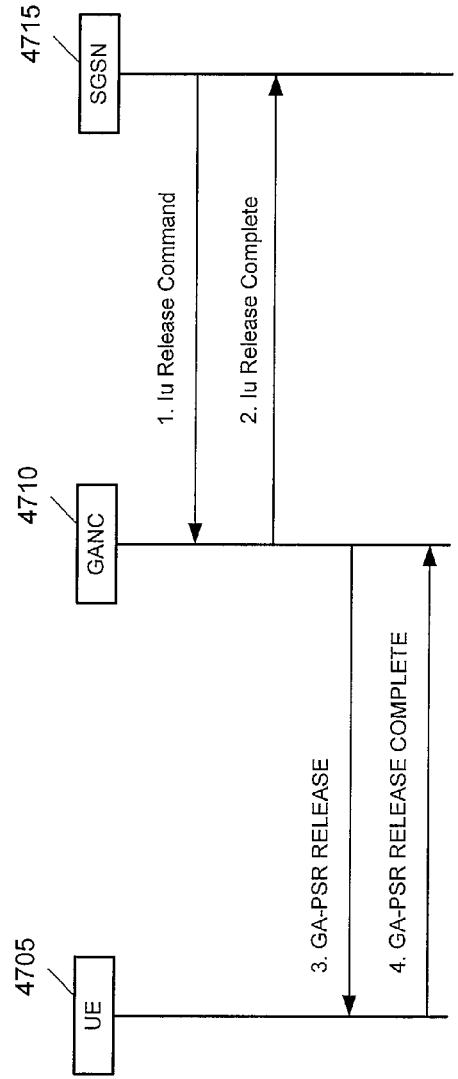
FIG. 47 illustrates GA-PSR Connection Release in some embodiments.

FIG. 47 illustrates release of the logical GA-PSR connection between the UE and the GANC in some embodiments. The following steps are performed during the release. As shown, the SGSN 4715 indicates to the GANC 4710 to release the PS resources allocated to the UE by sending (in Step 1) the RANAP Iu Release Command message to the GANC 4710.

Next, the GANC 4710 confirms (in Step 2) resource release to SGSN 4715 using the Iu Release Complete message. Next, the GANC 4710 commands (in Step 3) the UE 4705 to release resources, using the GA-PSR RELEASE message. Finally, the UE 4705 confirms (in Step 4) resource release to the GANC 4710 using the GA-PSR RELEASE COMPLETE message and the GA-PSR state in the UE changes to GA-PSR-IDLE.

O. PS Security Mode Control

Figure 48:
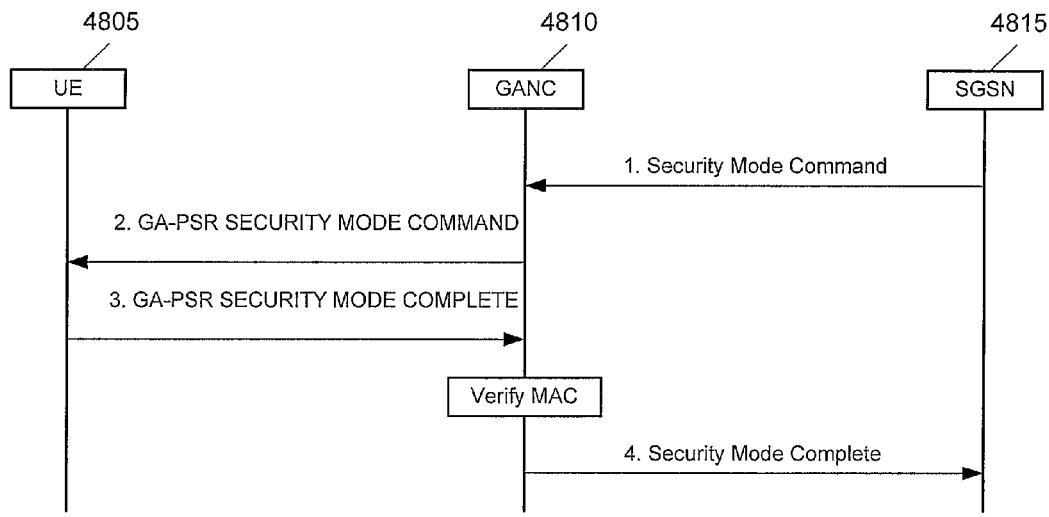
FIG. 48 illustrates the message flow for PS security mode control in some embodiments.

FIG. 48 illustrates the message flow for PS security mode control in some embodiments. As shown, SGSN 4815 sends (in Step 1) the RANAP Security Mode Command message to GANC 4810. This message contains the integrity key (IK) and allowed algorithms, and optionally the encryption key (CK) and allowed algorithms.

Next, the GANC 4810 sends (in Step 2) the GA-PSR SECURITY MODE COMMAND message to the UE 4805. This message indicates the integrity protection and encryption settings (i.e., that are applicable after relocation to UTRAN), and a random number. The UE stores the information for possible future use after a relocation to UTRAN.

Next, the UE 4805 computes a message authentication code (MAC) based on the random number, the UE IMSI and the integrity key calculated by the UE. The UE 4805 then sends (in Step 3) the GA-PSR SECURITY MODE COMPLETE message to the GANC 4810 to signal its selected algorithm and the computed MAC.

The GANC 4810 then verifies the MAC using the random number, the UE IMSI and the integrity key provided by the SGSN in step 1. When the GANC verifies the MAC to be correct it sends (in Step 4) the Security Mode Complete message to the SGSN 4815. The MAC proves that the identity that is authenticated to the GANC is the same as the identity authenticated to the core network.

P. PS NAS Signaling Procedures

After GA-PSR connection establishment, NAS signaling may be transfer from SGSN-to-UE and from UE-to-SGSN.

1. SGSN-to-UE NAS Signaling

Figure 49:
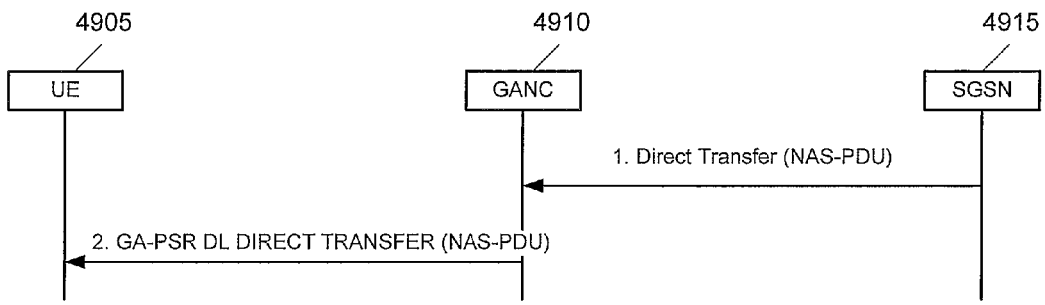
FIG. 49 illustrates core network to user equipment PS NAS signaling in some embodiments.

FIG. 49 illustrates SGSN-to-UE PS NAS signaling in some embodiments. As shown, for SGSN-to-UE NAS signaling, the SGSN 4915 sends (in Step 1) a NAS PDU to the GANC via the RANAP Direct Transfer message. The GANC 4910 encapsulates the NAS PDU within a GA-PSR DL DIRECT TRANSFER message and forwards (in Step 2) the message to the UE 4905 via the existing TCP connection.

2. UE-to-SGSN NAS Signaling

Figure 50:
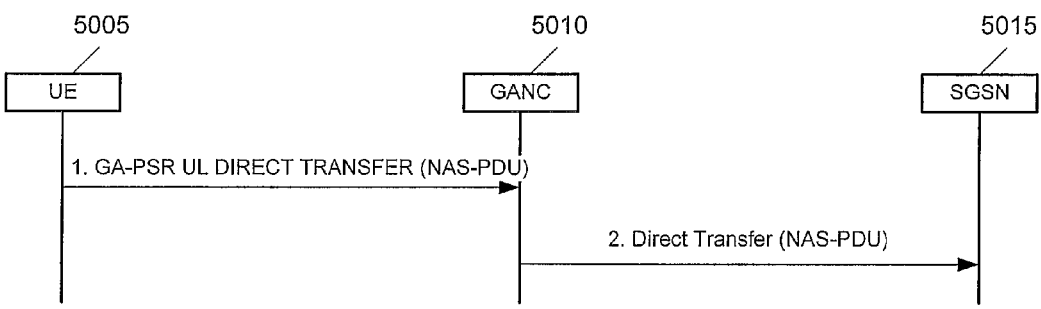
FIG. 50 illustrates user equipment to core network NAS signaling in some embodiments.

FIG. 50 illustrates UE-to-SGSN NAS signaling in some embodiments. As shown, the UE 5005 receives a request from the NAS layer to transfer an uplink NAS PDU. Assuming the required signaling connection already exists, the UE 5005 encapsulates the NAS PDU within a GA-PSR UL DIRECT TRANSFER message and sends (in Step 1) the message to the GANC 5010. The GANC 5010 relays (in Step 2) the received message to the SGSN 5015 that is currently serving the UE via the RANAP Direct Transfer message.

Q. GA-PSR Packet Transport Channel Management Procedures

The GA-PSR Packet Transport Channel (GA-PSR PTC) provides the association between the UE and the network for the transport of GPRS user data over the Up interface (i.e., via the GAN in Iu-mode). The PTC uses the GTP-U protocol running over UDP transport. The endpoint addresses of the PTC are identified by the IP addresses and UDP ports assigned to the PTC in the UE and network during the PTC activation procedure. The UDP port number for GTP-U is as defined in "UTRAN Iu interface data transport & transport signalling", 3GPP TS 25.414 standard, hereinafter "3GPP TS 25.414".

Multiple PTC instances between a UE and the network may be activated at the same time, using the same endpoint addresses. Each PTC instance is assigned unique GTP-U Tunnel Endpoint IDs (one on the UE and one on the network)

during the activation procedure. The UE and GANC manage the activation and deactivation of the PTC instances based on the requests for data transfer and the configurable PTC Timer.

1. States of the GA-PSR Packet Transport Channel

The UE in the GA-PSR-CONNECTED state can be in one of two PTC substates: PTC-STANDBY or PTC-ACTIVE. The PTC-STANDBY substate is the initial/default PTC substate of the UE when in the GA-PSR-CONNECTED state in GAN mode. The UE is not able to send or receive GPRS user data to or from the network. The UE needs to activate the PTC before sending any GPRS user data. When the UE successfully establishes a PTC, the UE transitions to the PTC-ACTIVE substate.

In PTC-ACTIVE substate, the UE is in the GA-PSR-CONNECTED state and the PTC is active between the UE and the network and the UE is able to send and receive GPRS user data to and from the network. Several events can trigger the GA-PSR PTC activation on the UE side. These events include the UE initiates the uplink user data transfer or the GANC initiates PTC activation; i.e., the UE receives a GA-PSR-ACTIVATE-PTC-REQUEST message from the GANC.

On successful PTC activation and in parallel with transition to the PTC-ACTIVE substate, the UE starts the PTC Timer. When the PTC Timer expires, the UE sends a message to the GANC to initiate PTC deactivation. On successful PTC deactivation, the UE transitions to PTC-STANDBY substate.

At any time while in the GA-PSR-CONNECTED state and the PTC-ACTIVE substate, the UE may receive the GA-PSR RELEASE message. In addition to requesting release of the GA-PSR session, this is interpreted by the UE as an implicit PTC deactivate command.

At any time while in GAN mode, if the serving RR entity is switched to GSM-RR/UTRAN-RRC, the GA-PSR is disconnected from the GPRS SAPs and the UE enters GERAN/UTRAN mode. Simultaneously, the UE will release the associated PTC regardless of the PTC Timer status.

The UE GA-PSR entity maintains one PTC for each active PDP context. The PTC Timer is restarted whenever any uplink user data packet is sent or downlink user data packet is received related to the PDP context. The PTC Timer value is provided to the UE as part of the GAN Registration procedure (i.e., in the GA-RC REGISTER ACCEPT message).

2. PTC Initial Activation

Figure 51:
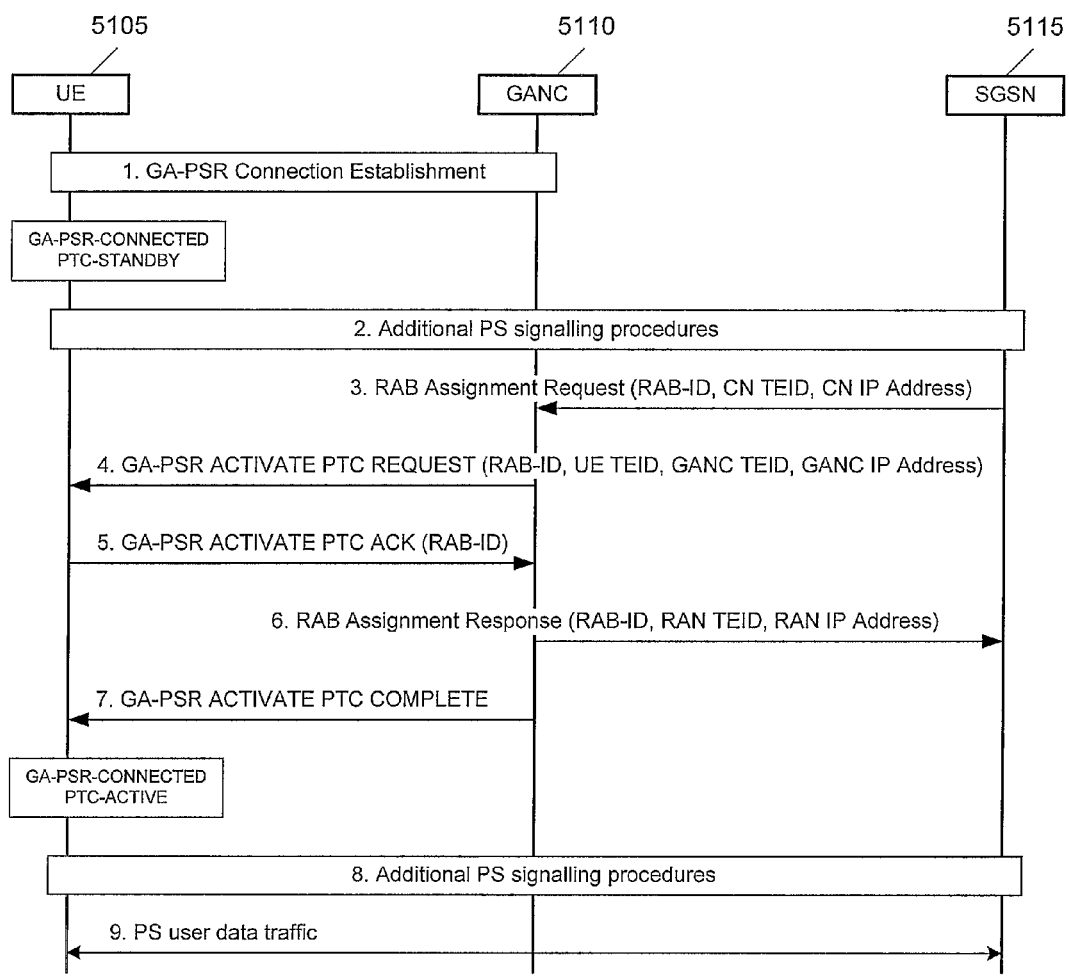
FIG. 51 illustrates PTC initial activation in some embodiments.

FIG. 51 depicts the Packet Transport Channel initial activation procedure, assuming the UE is in the GA-PSR-IDLE state. As shown, the following steps are performed. The GA-PSR Connection Establishment procedure is performed (in Step 1) as described in GA-PSR connection establishment sub-section, above. The UE 5105 transitions to the GA-PSR-CONNECTED state and the PTC-STANDBY substate. Next, additional PS signaling procedures are performed (in Step 2). Examples of these signaling procedures are illustrated in PDP Context Activation and Network Requested PDP Context Activation sub-sections, below.

Next, the SGSN 5115 initiates (in Step 3) the RAB Assignment procedure and includes the RAB-ID, the CN Transport Layer Address (IP address) and the CN Iu Transport Association (GTP-U Terminal Endpoint Identifier, TEID) for user data. The GANC 5110 sends (in Step 4) the GA-PSR ACTIVATE PTC REQUEST message to the UE to request activation of the Packet Transport Channel. The message includes the RAB-ID, a TEID that the GANC assigns to the UE, and the GANC IP Address and GANC TEID. If the GANC is configured to allow the UE to send PTC packets (i.e., GTP-U messages) directly to the SGSN (i.e., the configuration illustrated in FIG. 17), the GANC sets the GANC IP Address to the CN IP Address and the GANC TEID to the CN TEID; otherwise, the GANC assigns a local address as the GANC IP address and a GANC-allocated TEID as the GANC TEID and sends this information to the UE (i.e., the configuration illustrated in FIG. 18). The ULE 5105 acknowledges (in Step 5) the PTC activation.

The GANC 5110 sends (in Step 6) the RAB Assignment Response message to the SGSN 5115 to complete the RAB Assignment procedure. If the GANC is configured to allow the SGSN 5115 to send GTP-U messages directly to the UE 5105 (i.e., the configuration illustrated in FIG. 17), the GANC 5110 sets the RAN IP Address to the UE's IP Address and the RAN TEID to the TEID assigned to the UE by the GANC; otherwise, the GANC assigns a local address as the RAN IP address and a GANC-allocated TEID as the RAN TEID and sends this information to the SGSN (i.e., the configuration illustrated in FIG. 18).

Next, the GANC 5110 signals (in Step 7) the completion of the RAB establishment to the UE 5105 with the GA-PSR ACTIVATE PTC COMPLETE message. On receipt of the message, the UE transitions to the PTC-ACTIVE substate and starts the PTC Timer. Next, additional PS signaling procedures are performed (in Step 8). Examples of these PS signaling are illustrated in PDP Context Activation and Network Requested PDP Context Activation sub-sections, below. The UE 5105 initiates (in Step 9) uplink user data transfer via the established PTC and the SGSN 5115 may use the same transport channel to send downlink user data packets.

3. PTC Data Transfer

Figure 52:
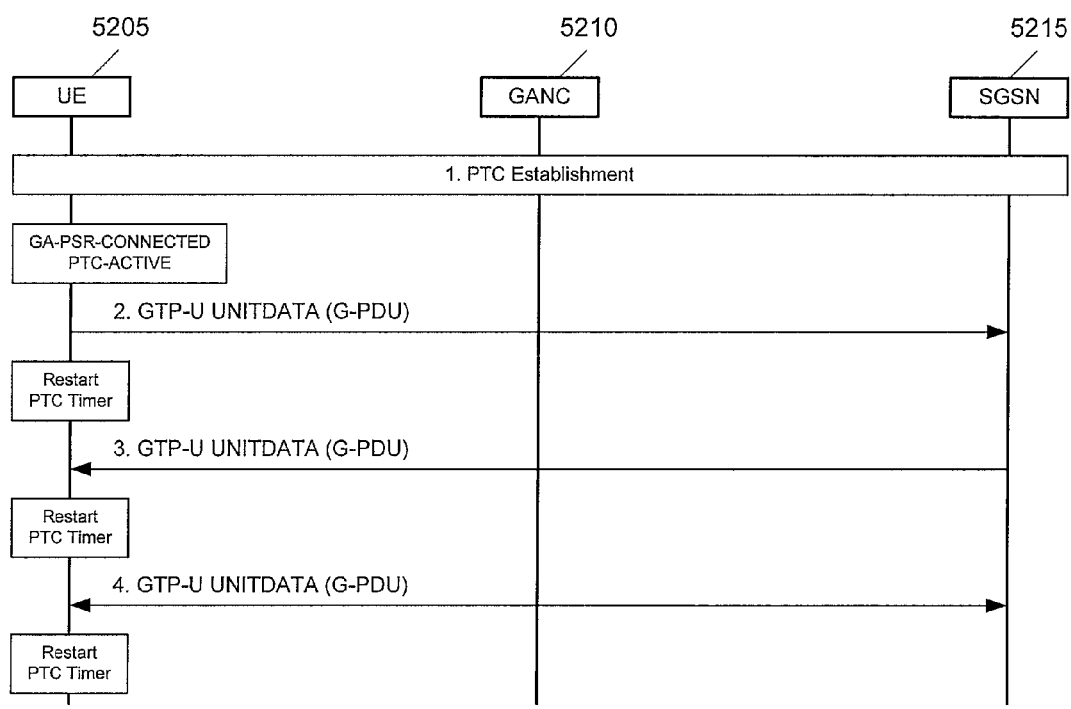
FIG. 52 illustrates PTC Data Transfer in some embodiments.

FIG. 52 illustrates the transfer of GPRS user data packets via the GAN Packet Transport Channel. This scenario assumes that user data is carried transparently between the UE and core network (i.e., the configuration illustrated in FIG. 17). As shown, the following steps are performed.

When required, the GAN PTC is established (in Step 1) as specified in PCT Intial Activation sub-section, above. Upon the GA-PSR PTC establishment, the UE 5205 enters the PTC-ACTIVE substate and starts the PTC Timer. Next, the UE 5205 initiates (in Step 2) the transfer of an uplink user data packet using the standard GTP-U protocol as specified in "GPRS Tunnelling Protocol (GTP) across the Gn and Gp interface", 3GPP TS 29.060 standard, hereinafter "3GPP TS 29.060" and restarts the PTC Timer.

Next, the SGSN 5215 transfers (in Step 3) downlink user data packet utilizing the same PTC associated with the specific PDP context. Downlink user data packets are transferred using the standard GTP-U protocol as specified in 3GPP TS 29.060. Upon receiving the downlink data packet, the UE restarts the associated PTC Timer. Additional uplink and downlink user data packets are transferred (in Step 4) via the same PTC as described in steps 2 and 3, respectively. After each transmission/reception, the UE restarts the PTC Timer. If the configuration illustrated in FIG. 18 is used, then the uplink GTP-U packets are sent from UE to GANC, then relayed from GANC to SGSN; likewise, downlink GTP-U packets are sent from SGSN to GANC, then relayed from GANC to UE.

4. MS initiated PTC Deactivation

Figure 53:
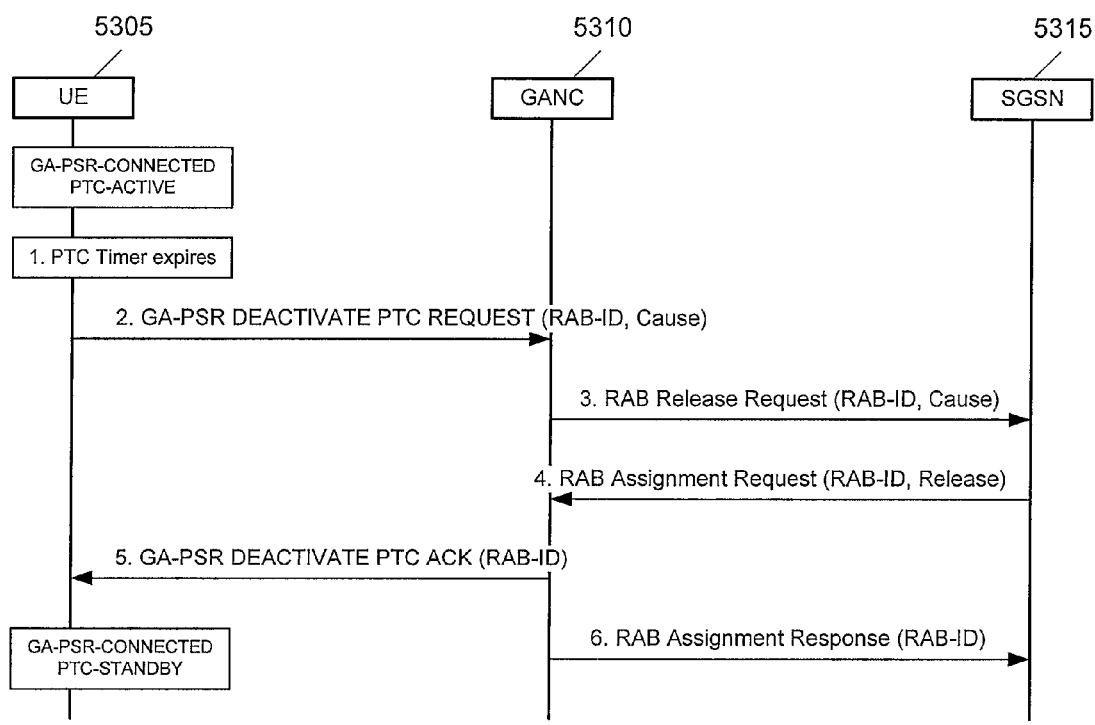
FIG. 53 illustrates UE initiated PTC deactivation in some embodiments.

FIG. 53 depicts the scenario when the UE deactivates the Packet Transport Channel after the PTC Timer expires. The UE is in the GA-PSR-CONNECTED state and the PTC-ACTIVE substate. As shown, the following steps are performed.

The PTC Timer associated with one of the active packet transport channels expires (in Step 1). The UE 5305 sends (in Step 2) the GA-PSR DEACTIVATE PTC REQUEST message to the GANC 5310, including the RAB-ID to identify the PTC and indicating the normal release as a cause for deactivation. Alternatively, the UE may indicate PTC timer expiry as the cause for deactivation.

Next, the GANC 5310 sends (in Step 3) a RAB Release Request message to the SGSN 5315 to request the release of the associated RAB. The SGSN 5315 responds (in Step 4) with the RAB Assignment Request indicating release.

The GANC 5310 responds (in Step 5) to the UE 5305 with a GA-PSR DEACTIVATE PTC ACK message to acknowledge successful deactivation. The UE 5305 transitions to the PTC-STANDBY substate. The GANC 5310 sends (in Step 6) the RAB Assignment Response message to notify the SGSN 5315 that the RAB Release procedure is complete.

5. MS initiated PTC Re-Activation

Figure 54:
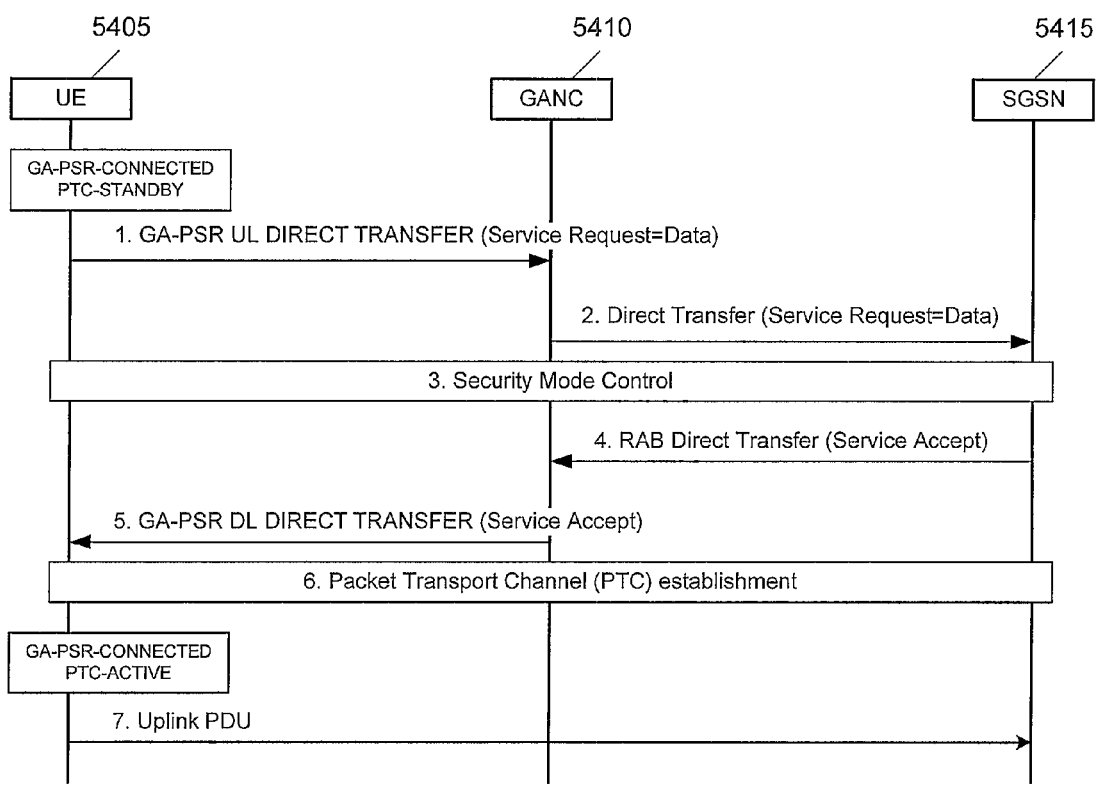
FIG. 54 illustrates UE initiated PTC re-activation in some embodiments.

FIG. 54 depicts the scenario when in some embodiments the UE initiates re-activation of the Packet Transport Channel while in the GA-PSR-CONNECTED and PMM-CONNECTED states; e.g., a PS signaling connection and active PDP context exists between the UE and CN but the PTC was previously deactivated by the UE due to PTC Timer expiry. As shown, the following steps are performed. The UE is in the GA-PSR-CONNECTED state and the PTC-STANDBY substate. The UE is in the PMM-CONNECTED state (i.e., a PS signaling connection and an active PDP context exists).

When the UE 5405 has a PDU to send, the UE 5405 sends (in Step 1) the Service Request message (with Service type value "Data") to the GANC 5410 in the GA-PSR UL DIRECT TRANSFER message. Next, the GANC 5410 forwards (in Step 2) the Service Request over the existing signaling connection to the SGSN 5415 using the RANAP Direct Transfer message.

The SGSN 5415 may optionally initiate (in Step 3) the Security Mode Control procedure described in Security Mode Control sub-section, above. The SGSN 5415 sends (in Step 4) a Service Accept message to the GANC 5410. The GANC 5410 forwards (in Step 5) the message to the UE.

Next, the UE 5405, GANC 5410 and SGSN 5415 establish (in Step 6) the GA-PSR Packet Transport Channel (PTC) as described in steps 3-7 in PTC Initial Activation Sub-section, above. The UE transitions to the PTC-ACTIVE substate and starts the PTC Timer. Finally, the UE 5405 sends (in Step 7) the uplink PDU. Additional data transfer may also take place.

6. Network Initiated PTC De-Activation

Figure 55:
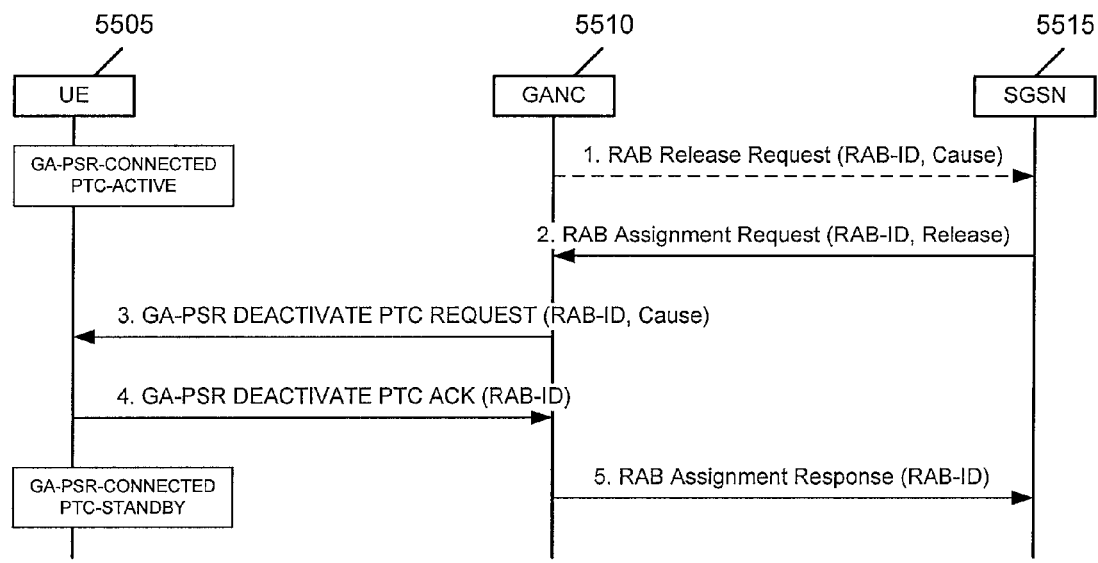
FIG. 55 illustrates Network initiated PTC de-activation in some embodiments.

FIG. 55 depicts the scenario when the network initiates de-activation of the Packet Transport Channel in some embodiments. The UE is in the GA-PSR-CONNECTED state and the PTC-ACTIVE substate. As shown, the following steps are performed.

Optionally, the GANC 5510 may initiate the PTC de-activation procedure; e.g., as a result of an error handling procedure. If so, the GANC 5510 sends (in Step 1) the RAB Release Request message to the SGSN 5515.

The SGSN 5515 sends (in Step 2) a RAB Assignment Request to request the release of the associated RAB. The release request may include one or more RABs. Next, the GANC 5510 requests deactivation of the associated GA-PSR PTC by sending (in Step 3) the GA-PSR DEACTIVATE PTC REQUEST message to the UE 5505.

The UE 5505 transitions to the PTC-STANDBY substate, stops the PTC Timer and sends (in Step 4) the acknowledgment back to the GANC. Steps 3 and 4 are repeated for each additional RAB/PTC that needs to be released. Finally, the GANC 5510 notifies (in Step 5) the SGSN 5515 that the release was successful.

7. Network Initiated PTC Re-Activation

Figure 56:
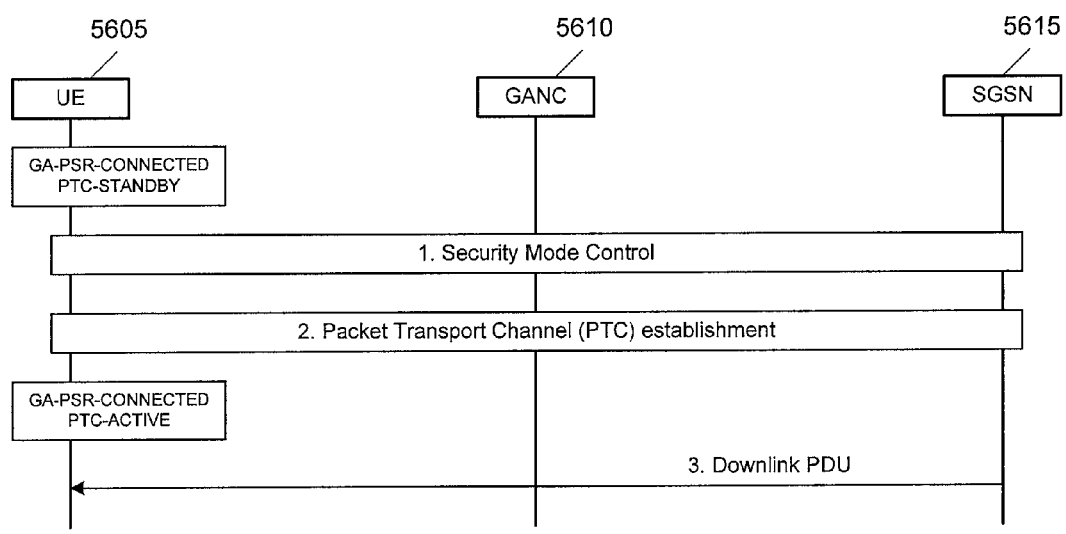
FIG. 56 illustrates Network initiated PTC re-activation in some embodiments.

FIG. 56 depicts the scenario in some embodiments when the network initiates re-activation of the Packet Transport Channel while the UE is in the GA-PSR-CONNECTED and PMM-CONNECTED states; e.g., a PS signaling connection and active PDP context exists between the UE and CN but the PTC was previously deactivated. The UE is in the GA-PSR-CONNECTED state and the PTC-STANDBY substate. The UE is in the PMM-CONNECTED state (i.e., a PS signaling connection and an active PDP context exists). As shown, the following steps are performed.

When the SGSN 5615 has a PDU to send to the UE 5605, the SGSN 5615 may optionally initiate (in Step 1) the Security Mode Control procedure described in Security Mode Control sub-section, above. The UE 5605, GANC 5610 and SGSN 5615 establish (in Step 2) the GA-PSR Packet Transport Channel (PTC) as described in steps 3-7 in PTC Initial Activation sub-section, above. The UE transitions to the PTC-ACTIVE substate and starts the PTC Timer. The SGSN 5615 then sends (in Step 3) the downlink PDU. Additional data transfer may also take place.

8. Implicit PTC De-Activation Due to UE De-Registration

Figure 57:
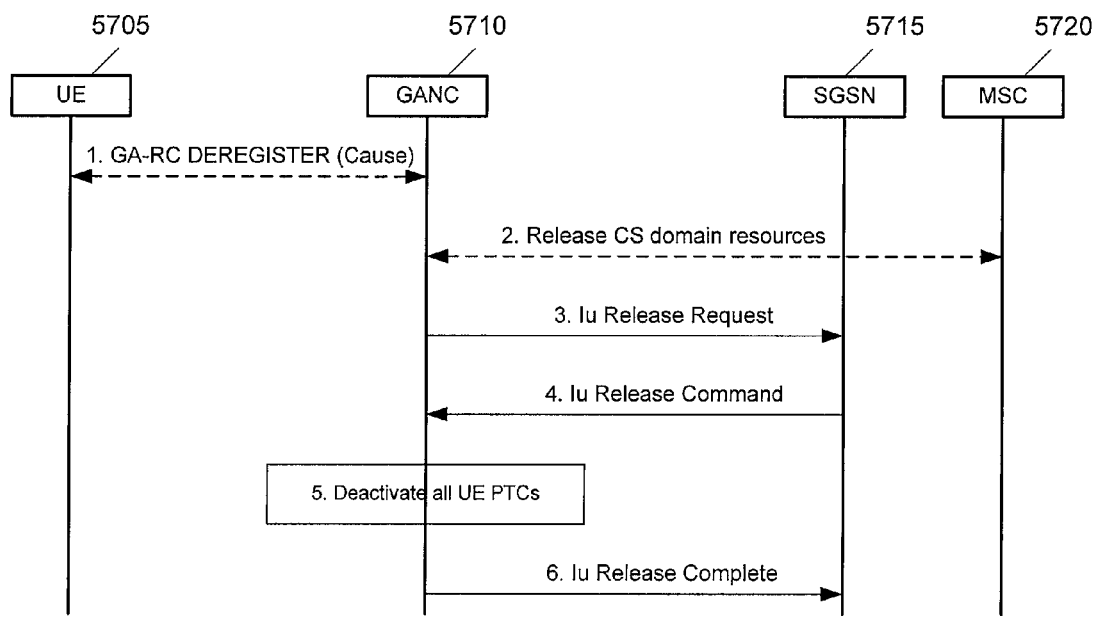
FIG. 57 illustrates Implicit PTC deactivation in some embodiments.

As part of the GAN de-registration procedure, the GANC needs to release all resources allocated to the UE. GAN de-registration may be initiated either explicitly by the UE or implicitly by the GANC if the loss of the signaling connection is detected (as described in De-Registration sub-section, above). FIG. 57 illustrates implicit PTC deactivation procedure in some embodiments. Initially, one or more GA-PSR PTCs associated with a UE are in the PTC-ACTIVE state. As shown, the following steps are performed.

The GAN de-registration procedure is initiated (in Step 1) for the UE 5705 either by the UE 5705 or GANC 5710. Optionally, any outstanding resources associated with the CS Domain are released (in Step 2).

The GANC 5710 initiates (in Step 3) the Iu release procedure to release the corresponding RABs. The SGSN 5715 responds (in Step 4) with Iu Release Command.

Upon receiving the Iu Release Command, the GANC 5710 locally deactivates (in Step 6) all associated PTCs and responds (in Step 6) to the SGSN 5715 with an Iu Release Complete message.

R. PDP Context Activation

Figure 58:
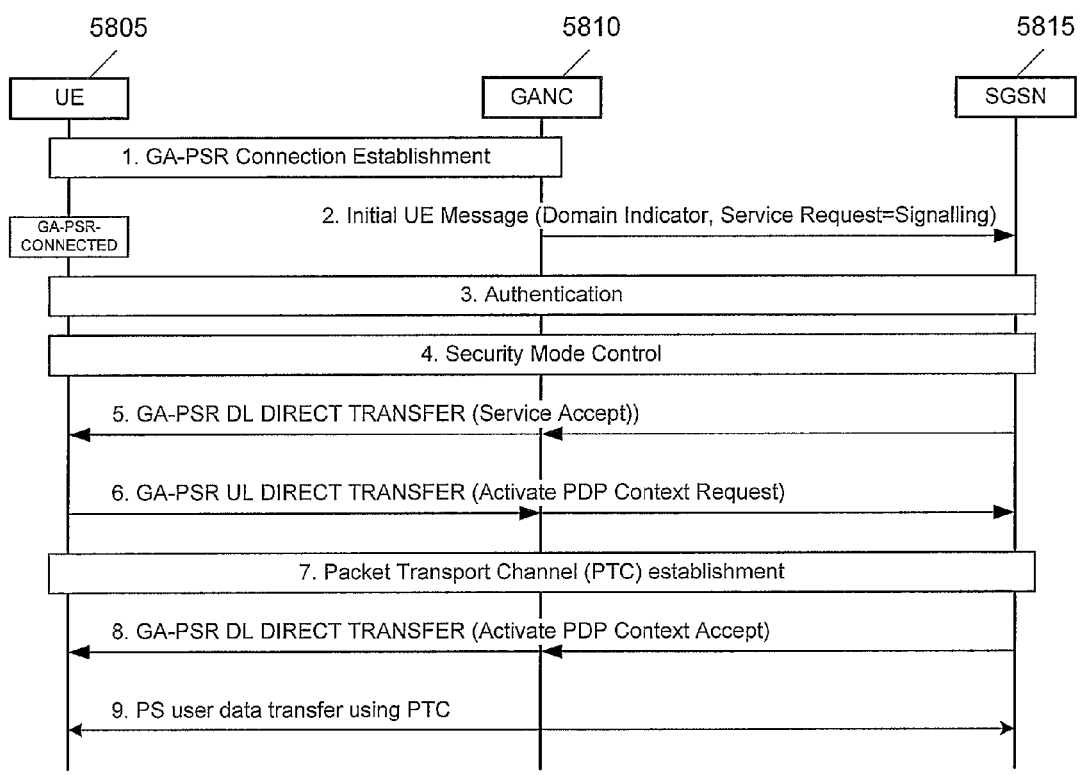
FIG. 58 illustrates PDP Context Activation in some embodiments.

FIG. 58 illustrates the successful UE-initiated PDP Context Activation procedure in some embodiments, assuming the UE is in GA-PSR-IDLE state. As shown, the following steps are performed.

The GA-PSR Connection Establishment procedure is performed (in Step 1) as described in GA-PSR Connection Establishment Sub-section, above. The GANC 5810 establishes an SCCP connection to the SGSN and forwards (in Step 2) the Service Request message (with Service type value "Signaling") to the SGSN 5815 using the RANAP Initial UE Message. Subsequent NAS messages between the UE and core network will be sent between GANC and SGSN using the RANAP Direct Transfer message.

The SGSN 5815 may optionally authenticate (in Step 3) the UE using standard UTRAN authentication procedures. The SGSN 5815 may optionally initiate (in Step 4) the Security Mode Control procedure described in Security Mode Control Sub-section, above. The SGSN 5815 responds (in Step 5) with a Service Accept message. The GANC 5810 forwards (in Step 5) the message to the UE 5805.

The UE 5805 then sends (in Step 6) the Activate PDP Context Request message providing details on the PDP context to the SGSN 5815. This message is contained within the GA-PSR UL DIRECT TRANSFER between the UE 5805 and the GANC 5810. The GANC 5810 forwards (in Step 6) the Activate PDP Context Request message to the SGSN 5815.

Next, the UE 5805, GANC 5810, and SGSN 5815 establish (in Step 7) the GA-PSR Packet Transport Channel (PTC) as described in steps 3-7 in PTC Initial Activation, above. The SGSN 5815 indicates (in Step 8) the PDP context establishment is complete using the Activate PDP Context Accept message to the GANC. GANC forwards this message to the UE in the GA-PSR DL DIRECT TRANSFER message. Finally, the UE 5805 and CN 5815 exchange (in Step 9) user data transfer via the established PTC.

S. Network Requested PDP Context Activation

Figure 59:
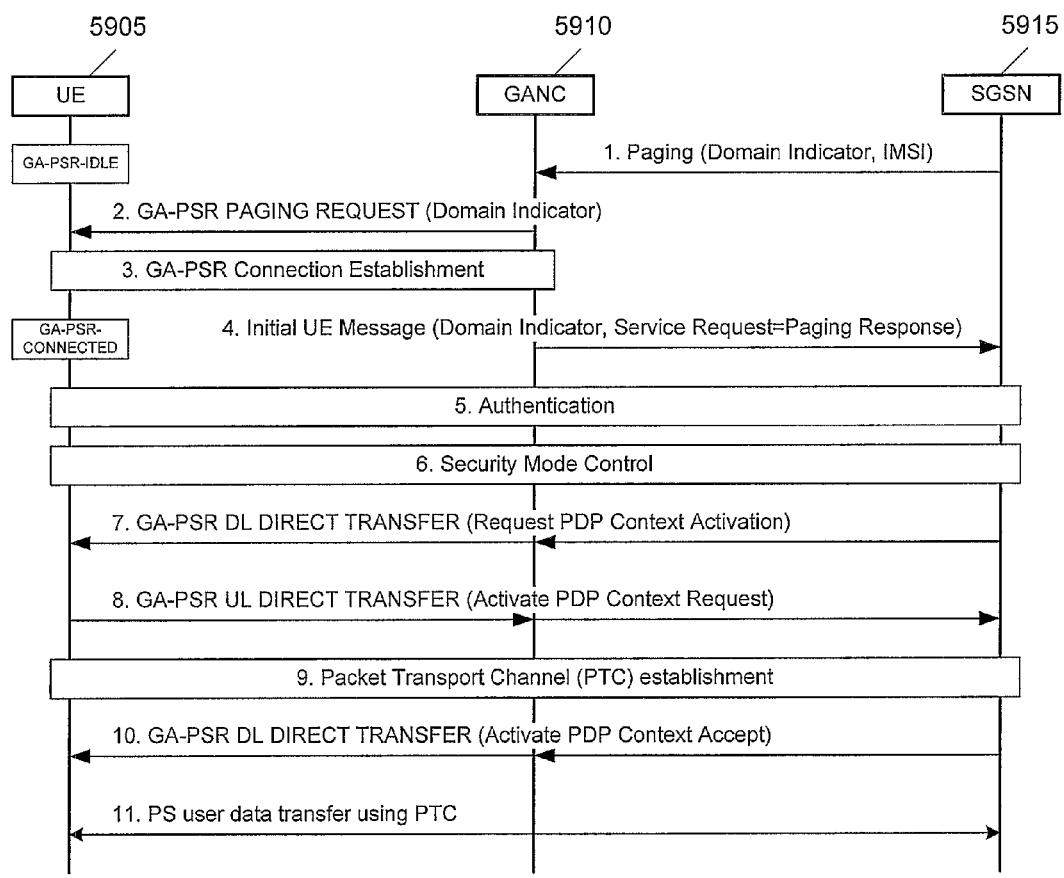
FIG. 59 illustrates Network Requested PDP Context Activation in some embodiments.

FIG. 59 illustrates the successful Network-Requested PDP Context Activation procedure in some embodiments, assuming the UE is in GA-PSR-IDLE state. Initially, the SGSN received downlink user data to transfer to the ULE and the associated RAB is not established. The UE is in PMM-IDLE state. As shown, the SGSN 5915 sends (in Step 1) the RANAP Paging message to the UE 5905 via the GANC 5910 to locate the user. The paging request indicates paging for PS Domain signaling.

The GANC 5910 forwards (in Step 2) the paging information to the UE 5905 in the GA-PSR PAGING REQUEST message. The GA-PSR Connection Establishment procedure is performed (in Step 3) as described in GA-PSR Connection Establishment Sub-section, above. Alternatively, rather than using the the GA-PSR Connection Establishment procedure, the UE 5905 may send the GA-PSR PAGING RESPONSE message (in Step 3) and then transition to the GA-PSR CONNECTED state.

The GANC 5910 establishes an SCCP connection to the SGSN and forwards (in Step 4) the Service Request message (with Service type value "Paging response") to the SGSN 5915 using the RANAP Initial UE Message. Subsequent NAS messages between the UE 5905 and core network 5915 will be sent between GANC 5910 and SGSN 5915 using the RANAP Direct Transfer message.

The SGSN 5915 may optionally authenticate (in Step 5) the UE 5905 using standard UTRAN authentication procedures. The SGSN 5915 may optionally initiate (in Step 6) the Security Mode Control procedure described in Security Mode Control Sub-section, above.

Next, the SGSN 5915 sends (in Step 7) the Request PDP Context Activation message to the GANC 5910. The GANC 5910 forwards (in Step 7) this message to the UE 5905 in the GA-PSR DL DIRECT TRANSFER message. The UE 5905 sends (in Step 8) the Activate PDP Context Request message providing details on the PDP context to the SGSN 5915. This message is contained within the GA-PSR UL DIRECT TRANSFER between the UE and the GANC. The GANC 5910 forwards (in Step 8) the Activate PDP Context Request message to the SGSN 5915.

The UE 5905, GANC 5910, and SGSN 5915 establish (in Step 9) the GA-PSR Packet Transport Channel (PTC) as described in steps 3-7 in PTC Initial Activation Sub-section, above. The SGSN 5915 indicates (in Step 10) the PDP context establishment is complete using the Activate PDP Context Accept message to the GANC. GANC forwards this message to the UE in the GA-PSR DL DIRECT TRANSFER message. Finally, the UE 5905 and SGSN 5915 exchange (in Step 11) user data transfer via the established PTC.

T. SRNS Relocation Between UTRAN and GAN

The SRNS Relocation procedure is performed to move one or more PS sessions between Iu mode GAN and UTRAN. It relocates the Iu-ps connection point at the GAN/UTRAN (in all cases) and at the SGSN (for inter-SGSN Relocation case only).

Support for the Iur interface between UTRAN and GAN is not described in this document. Therefore, only the Combined Hard Handover and SRNS Relocation is applicable for GAN-UTRAN SRNS Relocation. Consequently, only the "UE Involved" Relocation Type is supported.

1. SRNS Relocation from UTRAN to GAN a) Preparation Phase

Figure 60:
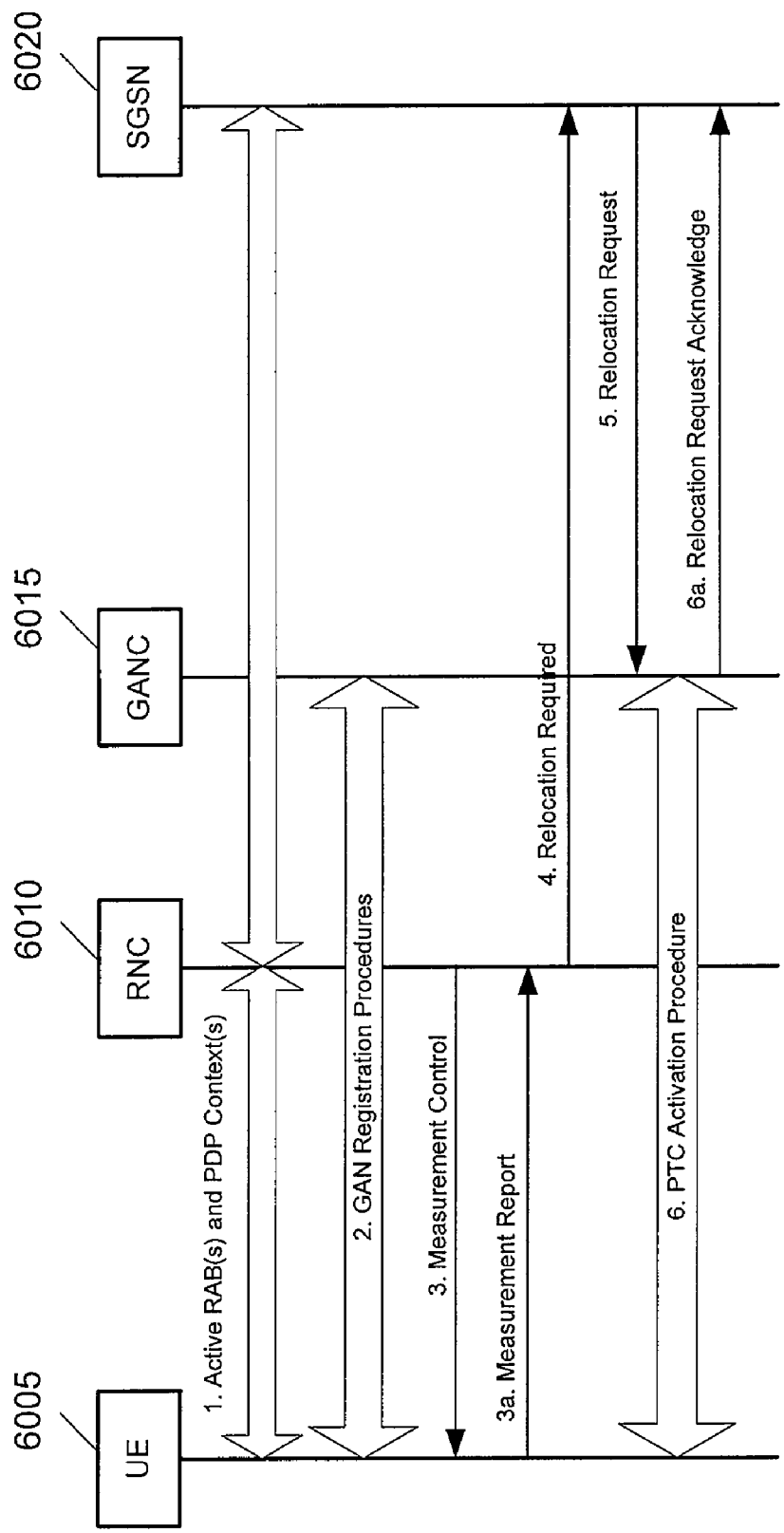
FIG. 60 illustrates UTRAN to GAN SRNS Relocation Preparation Phase in some embodiments.

FIG. 60 illustrates the UTRAN to GAN SRNS relocation preparation phase in some embodiments. As shown, the following steps are performed.

The UE 6005 has one or more active PDP Contexts with active RABs in the UTRAN. Next, the UE 6005 detects a GAN 6015, performs (in Step 2) the Registration procedures and enters GA-RC-REGISTERED state with valid GAN cell identity information.

The Measurement Control message (in Step 3) from the RNC 6010 to UE 6005 includes this GAN's cell identity. The UE begins to include the GAN cell information in the Measurement Report sent (in Step 3*a*) to the RNC. In that message, it sets the GAN cell's signal strength indicator to the highest possible value.

Next, the RNC 6010 decides to initiate a Combined Hard Handover and SRNS Relocation procedure. This decision is made based on the measurement reports and vendor/operator specific criteria. Upon deciding to initiate the Relocation, the RNC 6010 sends (in Step 4) Relocation Required to the SGSN.

The SGSN 6020 determines the target cell is the GANC, based on the contents of Relocation Required. The SGSN 6020 then sends (in Step 5) the Relocation Request to the GANC 6015.

Upon receiving Relocation Request message, the GANC 6015 will setup (in Step 6) Packet Transport Channel(s) as described in steps 4, 5 and 7 in PTC Initial Activation Sub-section, above as needed with appropriate attributes, as defined in the message. The GANC 6015 will then send (in Step 6*a*) a Relocation Request Acknowledge to the SGSN.

b) Execution Phase

Figure 61:
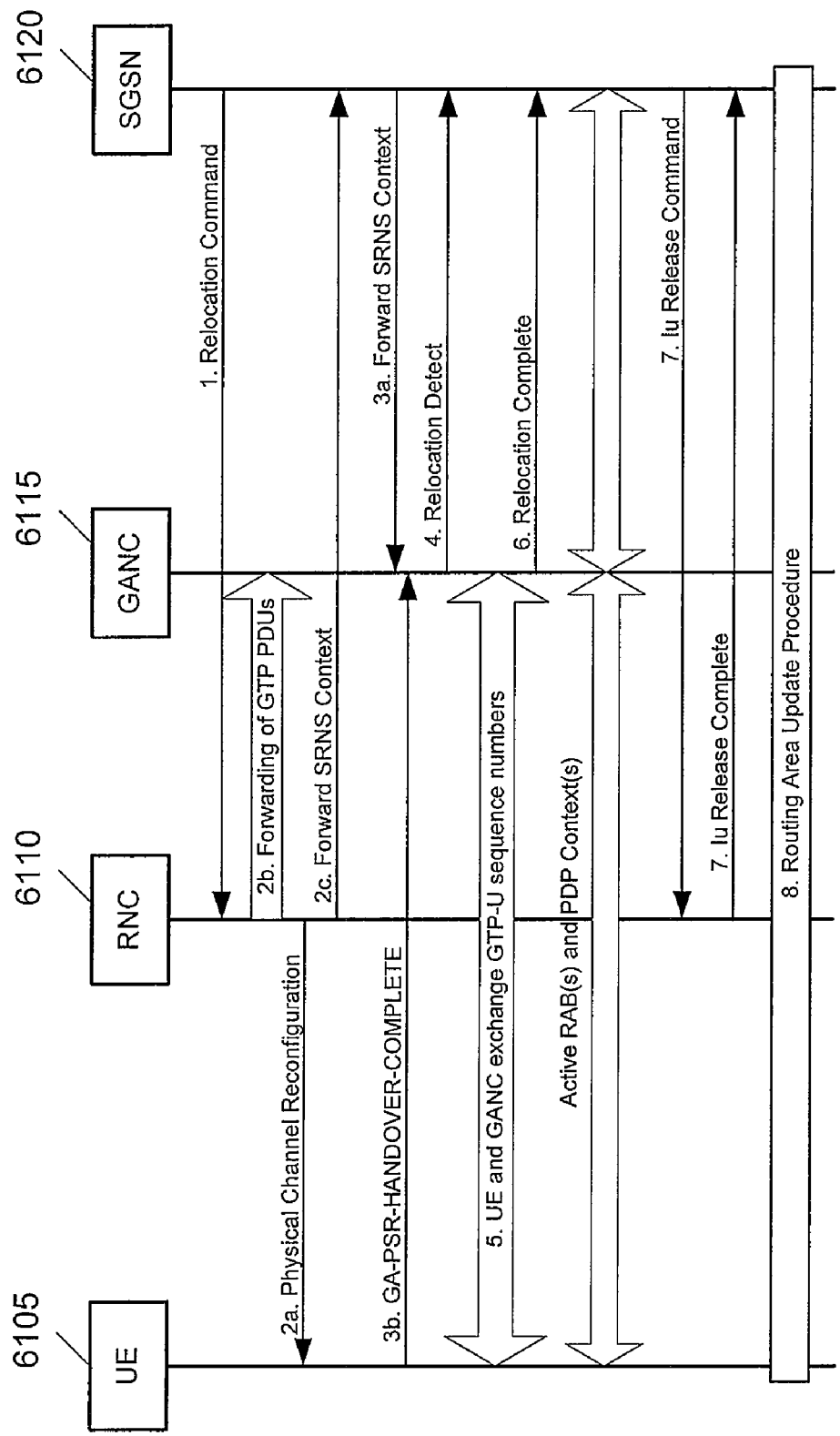
FIG. 61 illustrates UTRAN to GAN SRNS Relocation Execution Phase in some embodiments.

FIG. 61 illustrates UTRAN to GAN SRNS Relocation Execution Phase in some embodiments. As shown, the following steps are performed.

Upon receiving the positive acknowledgement from the GANC 6115 to serve the UE 6105, the SGSN 6120 initiates the Execution Phase by sending (in Step 1) the Relocation Command to the RNC 6110. The RNC 6110 instructs the UE 6105 by sending (in Step 2*a*) the Physical Channel Reconfiguration message to initiate the physical layer switch to move to the GAN.

When the QoS attributes of any of the active RABs require lossless in-sequence SDU Delivery (lossless PDCP), then the RNC 6110 starts forwarding (in Step 2*b*) GTP PDUs to the GANC 6115 while still transmitting them in the downlink direction to the UE 6105. This forwarding is routed via the Iu_PS interface. The GANC may buffer, transmit in the downlink, or discard these forwarded GTP PDUs, depending on the QoS profile, network conditions, and whether it supports Lossless Relocation. Specific implementation is vendor and/or operator specific. In addition, the GANC may delay the start of the downlink transmission until Step 5 below to synchronize the GTP-U sequence numbers.

The RNC sends (in Steps 2*c* and 3*a*) the Forward SRNS Context message to the GAN via the SGSN. In this message, the next-expected sequence number of uplink and downlink GTP-U packets are indicated to the GANC by the old SRNS. If the QoS attributes require and GANC supports Lossless Relocation, then these sequence numbers are used to ensure in-sequence delivery of GTP PDUs.

Immediately after receiving the Physical Channel Reconfiguration message, the UE 6105 sends (in Step 3*b*) GA-PSR- HANDOVER-COMPLETE message to the GANC 6115. Upon receiving this message and the Forward SRNS Context message sent from the SGSN 6120 (in Step 3*a*), the GANC 6115 becomes the Serving RNC.

Immediately upon receiving the GA-PSR-HANDOVER-COMPLETE message from the UE, the GANC 6115 sends (in Step 4) the Relocation Detect message to the SGSN 6120. When the UE supports Lossless Relocation and one or more RABs QoS attribute requires it, the UE initiates (in Step 5) a GTP-U sequence number exchange procedure with the GANC over the newly established PTC. When the GANC 6115 supports Lossless Relocation and one or more RABs QoS attribute requires it, it may also initiate a GTP-U sequence number exchange procedure, if the procedure had not been already initiated by the UE.

Upon completion of the GTP-U sequence number exchange procedure, the GANC 6115 sends (in Step 6) Relocation Complete message to the SGSN. If the GTP-U sequence number exchange is skipped (either due to lack of support in UE and/or GAN or QoS attributes did not require it), then the Relocation Complete is sent right after the Relocation Detect message. The active RABs and PDP contexts are now moved to between UE, GANC and SGSN. The SGSN 6120 then releases (in Step 7) the Iu PS connection with the old RNC 6110. When the Routing Area of the GANC cell (as indicated by the GANC to the UE) is different from that under the old RNC, then the UE 6105 performs (in step 8) Routing Area Update procedure.

2. SRNS Relocation from GAN to UTRAN a) Preparation Phase

Figure 62:
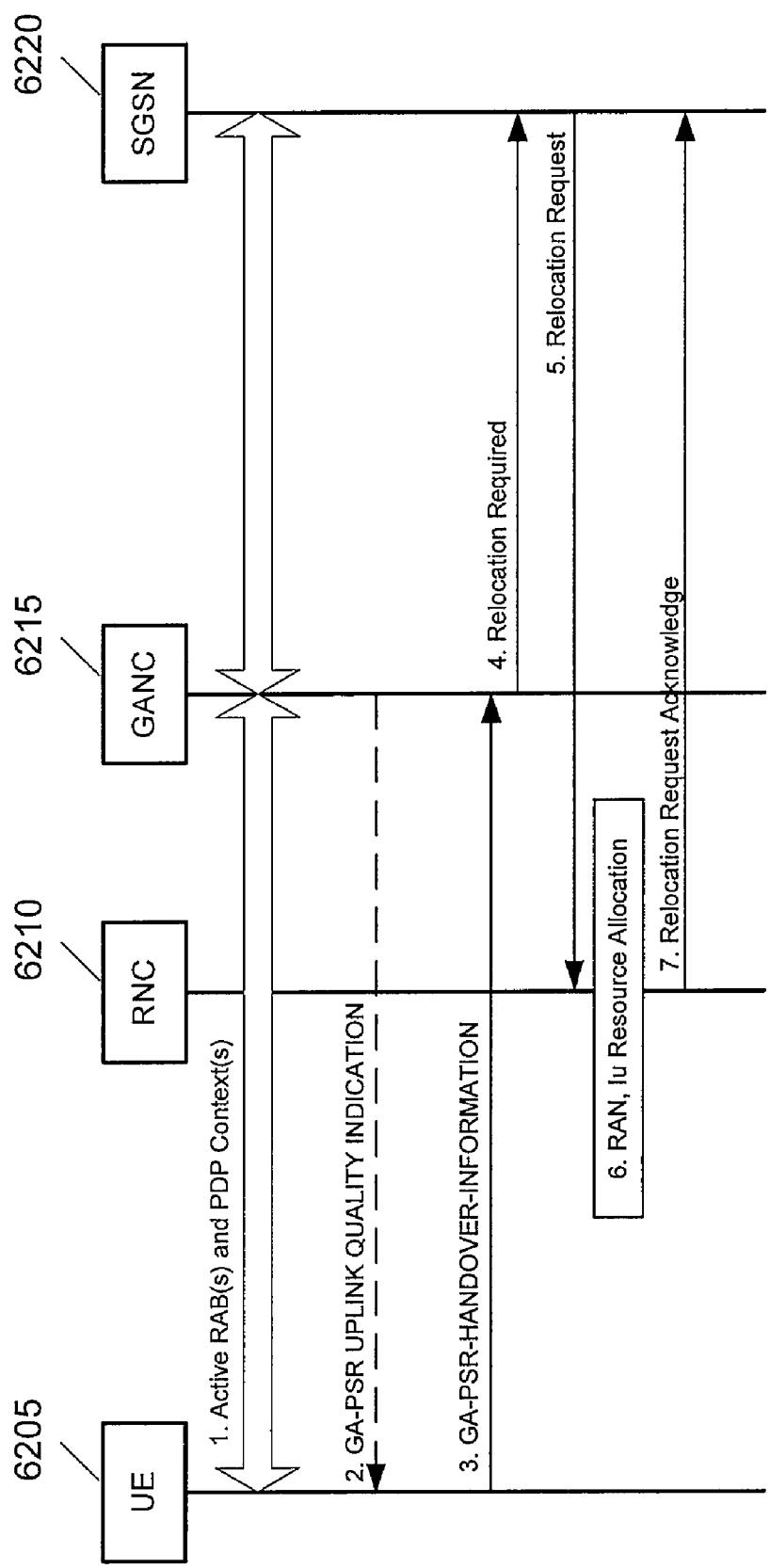
FIG. 62 illustrates GAN to UTRAN SRNS Relocation Preparation Phase in some embodiments.

FIG. 62 illustrates GAN to UTRAN SRNS Relocation Preparation Phase in some embodiments. As shown, the followings steps are performed.

The UE 6205 is (in Step 1) in active packet flow exchange with active PDP Context(s) and PTCs in the GAN. The GANC 6215 may send (in Step 2) a GA-PSR UPLINK QUALITY INDICATION if there is a problem with the uplink quality for the ongoing session. Uplink Quality Indication is information sent by the GANC 6215 to the UE 6205 indicating the crossing of an uplink quality threshold in the uplink direction. Whenever the UE receives an indication of bad quality, it should start the relocation procedure, as described in the next step. Alternatively, UE can use its local measurements to decide to initiate the handover procedure.

Next, the UE decides to initiate an SRNS Relocation from GAN to UTRAN by sending (in Step 3) GA-PSR-HANDOVER-INFORMATION message to the GANC 6215. Specific criteria for this decision would include the case of the UE leaving GAN coverage (e.g., based on deteriorating WLAN signal quality).

The GANC 6215 selects a target RNC based on the contents of the GA-PSR-HANDOVER-INFORMATION message (e.g., the RNC serving the cell identified by the UE as having the best signal quality). The GANC 6215 sends (in Step 4) Relocation Required message to the SGSN 6220 containing the selected RNC information.

The SGSN 6220 sends (in Step 5) a Relocation Request to the target RNC 6210. The RNC 6210 performs (in Step 6) the necessary allocation of radio and Iu transport resources and returns (in Step 7) Relocation Request Acknowledge message to the SGSN. This message contains channelization information needed by UE to access UTRAN.

b) Execution Phase

Figure 63:
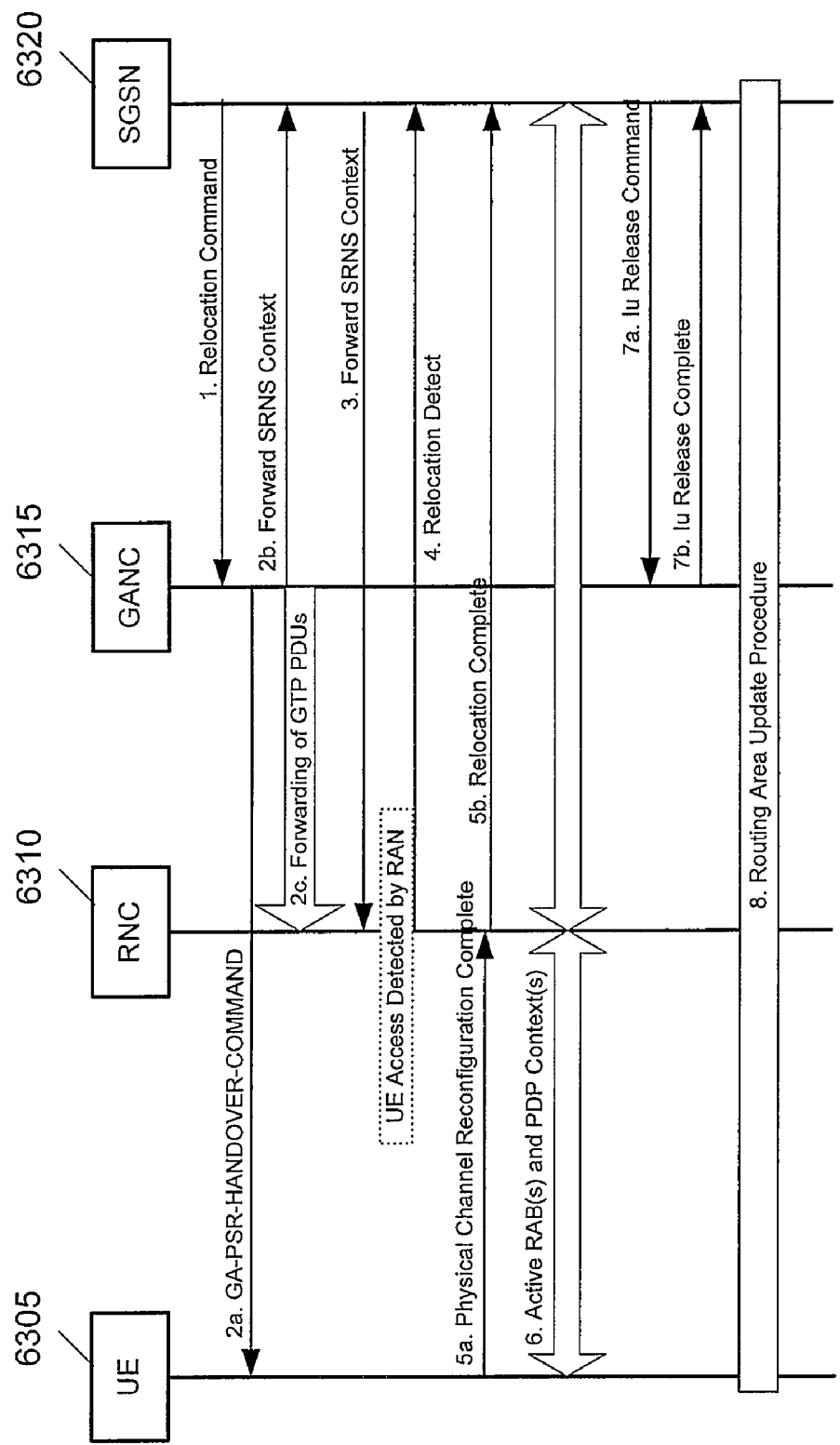
FIG. 63 illustrates GAN to UTRAN SRNS Relocation Execution Phase in some embodiments.

FIG. 63 illustrates GAN to UTRAN SRNS Relocation Execution Phase in some embodiments. As shown, the followings steps are performed.

The SGSN 6320 begins the Execution Phase by issuing (in Step 1) Relocation Command to the GANC 6315. The message contains the channel access information in the target UTRAN cell. The GANC 6315 sends (in Step 2*a*) GA-PSR-HANDOVER-COMMAND to the UE 6305. This message contains the information from the Relocation Command received in Step 1 earlier. The GANC may suspend downlink GTP PDU transfer at this point. If GANC supports Lossless SRNS Relocation and any of existing RABs' QoS requires it, the GANC may initiate (in Step 2*c*) forwarding of GTP PDUs to the target RNC 6310 via the SGSN 6320.

The GANC 6315 also sends (in Steps 2*b* and 3) Forward SRNS Context to the target RNC via the SGSN. As shown, the GANC sends the Forward SRNS Context message (in Step 2*b*) to the SGSN and the SGSN relays (in Step 3) the Forward SRNS Context to the target RNC.

Upon receiving the GA-PSR-HANDOVER-COMMAND, the UE immediately suspends uplink GTP PDU transfer. It immediately begins accessing the UTRAN using indicated channel access parameters in the message. UE's access attempt is detected by the Node B and RNC 6310, and is reported (in Step 4) to the SGSN 6320 via the Relocation Detect message.

The UE completes the lower layer setup and configuration, and sends (in Step 5*a*) the RRC Physical Channel Reconfiguration Complete to the target RNC 6310. This triggers the RNC 6310 to send (in Step 5*b*) the Relocation Complete message to SGSN 6320. At this stage, the target RNC assumes the role of SRNC for the UE.

The packet data flow is now (in Step 6) active via the UTRAN. Next, the SGSN releases the Iu_PS connection by sending (in Step 7*a*) Iu Release Command message to the GANC, to which GANC responds (in Step 7*b*) with Iu Release Complete message. If the Routing Area of the cell under the target RNC is different from that under the old GANC cell, then the UE 6305 performs (in Step 8) the Routing Area Update procedure.

U. Short Message Service

GAN provides support for both Circuit Switched and Packet Switched SMS services. GAN-attached UEs will be able to send and receive SMS messages via the GAN.

1. CS-Based SMS

CS-based SMS support in GAN is based on the same mechanism that is utilized for CS mobility management and call control. On the UE side, the SMS layers (including the supporting CM sub layer functions) utilize the services of the MM layer to transfer SMS messages per standard circuit switched UMTS implementation.

The SM-CP protocol is effectively tunneled between the UE and the CN, using GA-CSR UPLINK DIRECT TRANSFER and GA-CSR DOWNLINK DIRECT TRANSFER messages between the UE and the GANC, where the GANC relays the SM-CP messages via RANAP messages for transport over the Iu-cs interface. As with the mobility management and call control procedures, the secure IPSec tunnel and TCP session are used to provide secure and reliable SMS delivery over the IP network.

2. PS-Based SMS

PS-based SMS message transfer is based on the same mechanism as the transfer of the PS mobility management and session management signaling messages. On the UE side, the SMS layers (including the supporting CM sub layer functions) utilize the services of the GA-PSR layer to transfer SMS messages per standard packet switched UMTS implementation. As with mobility management and session management signaling, the secure IPSec tunnel and TCP session is used to provide secure and reliable PS-based SMS delivery over the IP network.

VI. Configuration Information

A. GAN UARFCN and Primary Scrambling Code for Handover-to-GAN

In some embodiments, selection of the UMTS Absolute Radio Frequency Channel Number (UARFCN) use the following guidelines:

1. The UARFCN should be allocated from the operator's assigned UARFCN values.
2. The UARFCN may be desired to be the same unique number across the whole operator network to minimize the RNC configuration effort.
3. The Primary Scrambling Code (possible values from 0 to 511) should not be allocated from the operator's in-use values; i.e., codes used by macro cells.
4. The Primary Scrambling Code may be desired to be the same unique number across the whole operator network to minimize the RNC configuration effort.

Several options are discussed in more detail below.

1. Option 1

Some embodiments allocate the GAN UARFCN from the DCS band that is being used for GSM. This would result in the DL UARFCNs in the range of 1162 to 1513, inclusive. In this scheme, there are no restrictions in the selection of the specific primary scrambling code (PSC) for GAN—any of the 512 values can be used in the particular UARFCN chosen.

Where initial UMTS deployments are in the 1900 MHz band, an analogous approach may be employed—namely the use of UARFCNs from the 850 MHz band. That would give a GAN UARFCN range of 4357 to 4458, inclusive. Alternatively, UARFCNs from a PCS sub-band doing a non-UMTS technology can also be specified. Again, there are no restrictions in the selection of PSC in a given GAN UARFCN.

2. Option 2

The strategy here is to take advantage of TDD unpaired spectrum and use its UARFCN ranges for GAN purposes. Many operators, as part of the UMTS auction, won a TDD unpaired 5 MHz spectrum, in addition to one or more FDD pairs. The TDD spectrum has remained unused and is likely to remain that way for near foreseeable future.

Even if a given operator does not own any TDD spectrum in a given market, any unused TDD spectrum from any operator in the market can be used since it is a completely harmless interference-free procedure for a UE to do a cell search. Even if a given TDD unpaired 5 MHz is in use in UTRAN-TDD mode, an FDD-only handset is likely fail beyond the initial synchronization at PHY layer. Many handsets planned for near foreseeable future are FDD-only.

If the handsets semantically allow these values, and these UARFCNs are indeed defined in 3GPP, and the infrastructure vendors do allow provisioning of these UARFCN ranges in their systems, then this approach is feasible. The UARFCN ranges in this case are: 9504 to 9596 and 10054 to 10121. As is the case in Option 1, there are no restrictions in PSC selection of GAN.

3. Option 3

This plan calls for use of idle FDD spectrum's UARFCN for GAN purpose. The "idle" spectrum may or may not belong the particular operator. In many parts of Europe and Asia, the FDD spectrums are still unused due to bidders of auction either going out of business or the owners choosing not to deploy services yet due to cost and unavailability of equipment.

VII. Identifiers in GAN

A. Identifiers for UEs and Generic IP Access Network

The key UE and generic IP access network addressing parameters are the IMSI associated with the (U)SIM in the terminal, Public IP Address of the UE, and the generic IP access network point of attachment address (AP-ID). The IMSI associated with the (U)SIM is provided by the UE to the GANC during the Registration procedure. The GANC maintains a record for each registered UE. For example, IMSI is used by the GANC to index the appropriate UE record when the GANC receives a RANAP PAGING message.

The Public IP address of UE is the source IP present in the outermost IP header of packets received from the UE by the GANC-SEGW. If available, this identifier may be used by the GANC to support location services and fraud detection or by service providers to signal Managed IP networks IP flows that require special QoS treatment.

The generic IP access network point of attachment address (AP-ID) is provided by the UE to the GANC at Registration. The AP-ID may be used by the GANC to support location services or by the service provider to restrict GAN access to authorized APs.

B. Service Area Identifiers for GAN

1. GAN Service Area for Location Services & Billing

Service Area Identifiers (SAI) in UMTS may be used to perform location-basing routing of a call for services such as: emergency services; operators; announcements and freephone numbers. SAI can be also used by the core network to identify the location of where a call was originated/terminated for charging purposes. The GANC provides a SAI to the core network indicating the Iu-mode GAN service area.

a) Assigning GAN SAI Based on UTRAN/GERAN Location

In the Iu-mode GAN architecture, the UE has a direct IP-based connection to the GANC. The GAN coverage area may overlay the UTRAN/GERAN coverage area. Logical mapping of GAN Cells to a SAI can be completed at various resolutions, for example (but not limited to): (1) a GAN SAI for each UTRAN/GERAN cell, (2) a GAN SAI for each UTRAN/GERAN routing area; or (3) a GAN SAI for each UTRAN/GERAN location area. A single GANC could represent one or more SAI in one or more location areas (LAI).

VIII. Alternative Embodiments

In some embodiments, instead of using separate CSR and PSR protocols, as described in the previous sections, a single protocol, Generic Access Radio Resource Control (GA-RRC) is used. The following sections describe the architecture and messaging features of this protocol layer. Only the features that are different from the previous embodiments are described.

A. Control and User Plane Architecture

The Iu interface standards include support for both ATM and IP-based signaling and user data transport mechanisms.

1. Circuit Switched (CS) Domain a) CS Domain—Control Plane

Figure 64:
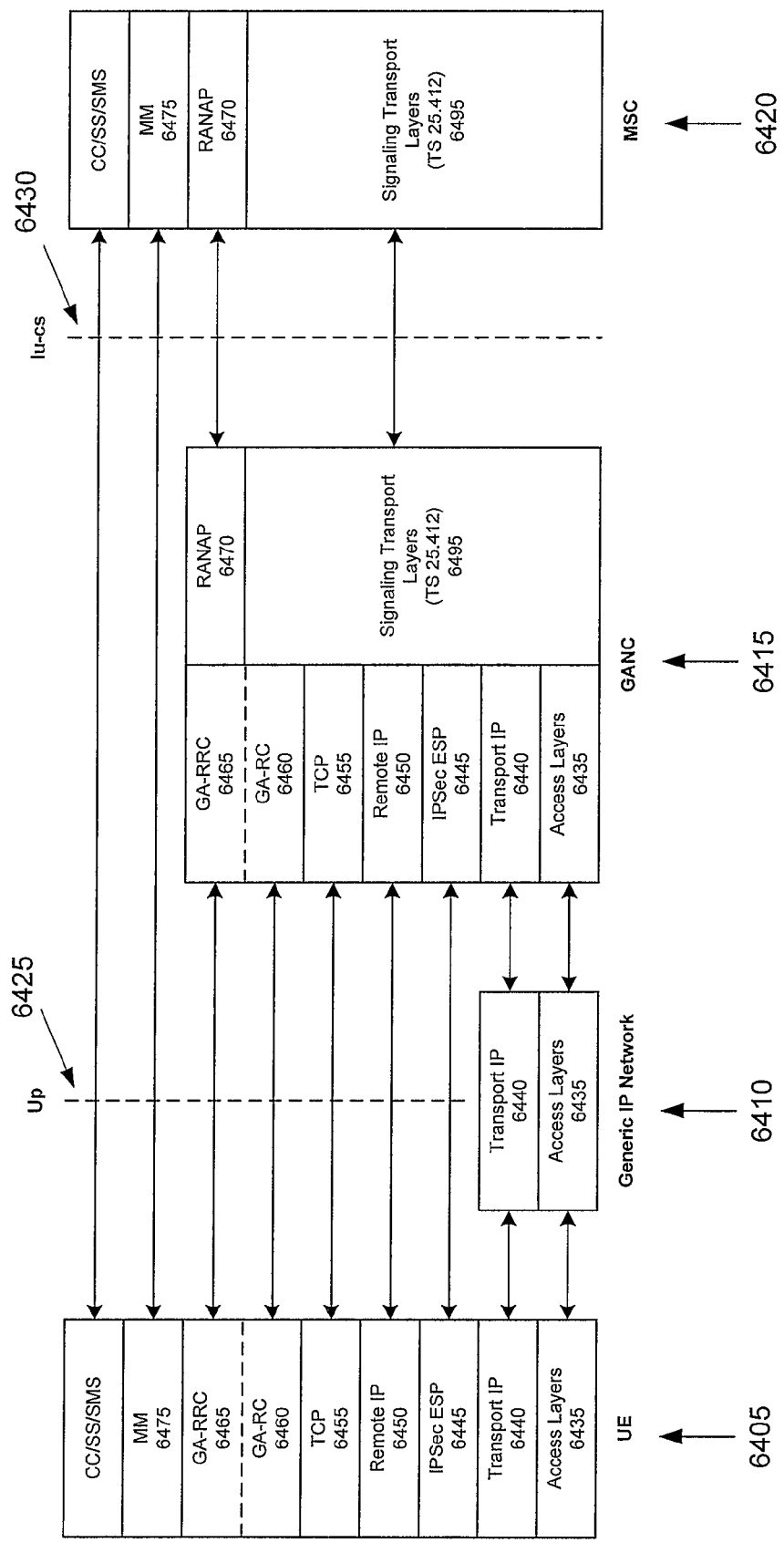
FIG. 64 illustrates the GAN architecture in support of the CS Domain control plane in some embodiments.

FIG. 64 illustrates the GAN architecture in support of the CS Domain control plane in some embodiments. The figure shows different protocol layers for the UE 6405, Generic IP Network 6410, GANC 6415, and MSC 6420. FIG. 64 also shows the two interfaces Up 6425 and Iu-cs 6430. The main features of the GAN CS domain control plane architecture are as follows. The underlying Access Layers 6435 and Transport IP layer 6440 provide the generic connectivity between the UE 6405 and the GANC 6415. The IPSec layer 6445 provides encryption and data integrity between the UE 6405 and GANC 6415. The Remote IP layer 6450 is the 'inner' IP layer for IPSec tunnel mode and is used by the UE 6405 to be addressed by the GANC 6415. The Remote IP layer 6450 is configured during the IPSec connection establishment.

In some embodiments a single TCP connection 6455 is used to provide reliable transport for both the GA-RC 6460 and GA-RRC 6465 signaling between the UE 6405 and GANC 6415. The TCP connection 6455 is managed by GA-RC 6460 and is transported using the Remote IP layer 6450.

The Generic Access Resource Control (GA-RC) protocol 6460 manages the Up session, including the GAN discovery and registration procedures. The Generic Access Radio Resource Control (GA-RRC) protocol 6465 performs functionality equivalent to the UMTS-RRC protocol, using the underlying connection managed by the GA-RC sublayer 6460. Note that GA-RRC 6465 includes both CS service and PS service-related signaling messages. The GANC 6415 terminates the GA-RRC protocol 6465 and inter-works it to the RANAP protocol 6470 over the Iu-cs 6430 interface. The NAS protocols, such as MM 6475 and above, are carried transparently between the UE 6405 and MSC 6420. In some embodiments, the Iu-cs signaling transport layers 6495 are per 3GPP TS 25.412.

b) CS Domain—User Plane

Figure 65:
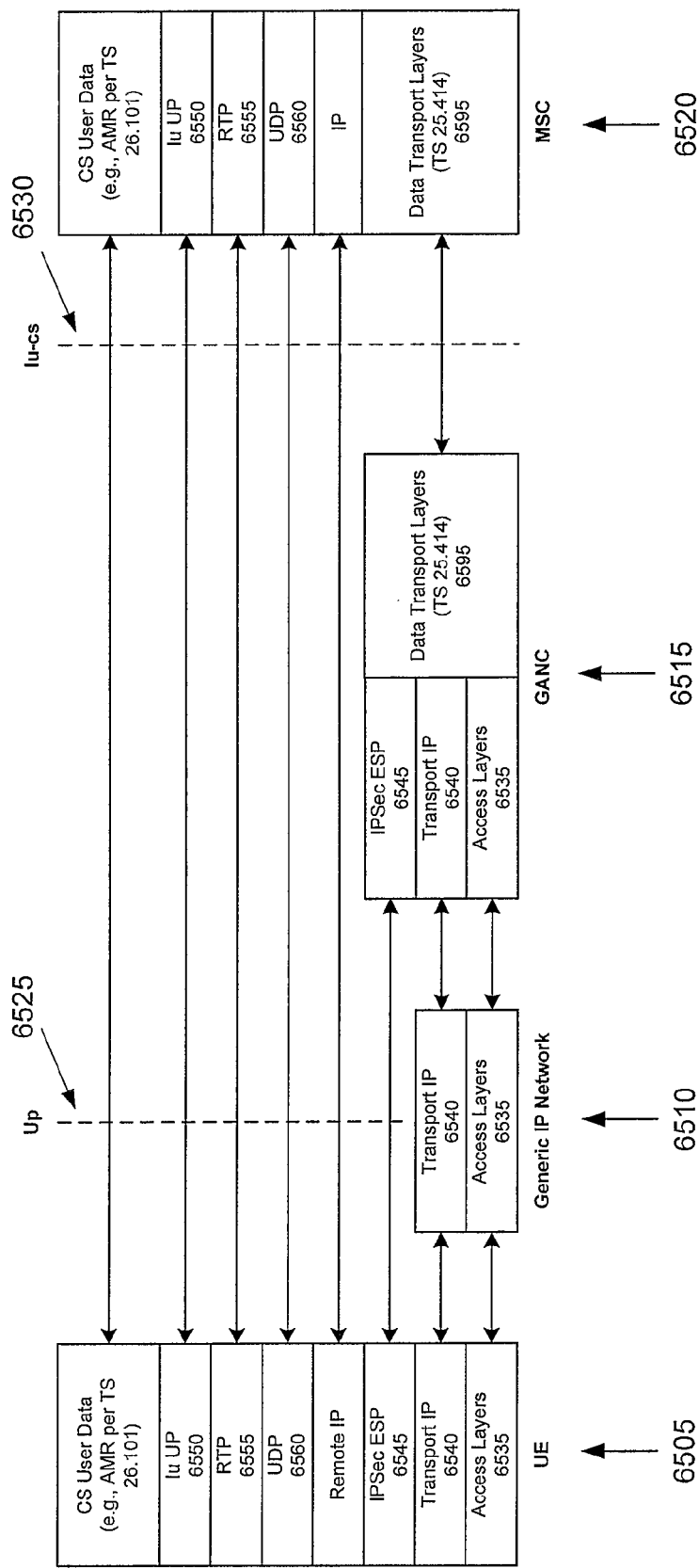
FIG. 65 illustrates the GAN protocol architecture in support of the CS domain user plane in some embodiments.

FIG. 65 illustrates the GAN protocol architecture in support of the CS domain user plane in some embodiments. The figure shows different protocol layers for the UE 6505, Generic IP Network 6510, GANC 6515, and MSC 6520. FIG. 65 also shows the two interfaces Up 6525 and Iu-cs 6530. The main features of the GAN CS domain user plane architecture are as follows. The underlying Access Layers 6535 and Transport IP layer 6540 provide the generic connectivity between the UE 6505 and the GANC 6515.

The IPSec layer 6545 provides encryption and data integrity. CS domain user plane data is transported using the Iu User Plane (Iu UP) protocol 6550 running over RTP/UDP (6555 and 6560) between UE 6505 and MSC 6520. Each Iu UP protocol 6550 instance may operate in either transparent or support modes, as described in "UTRAN Iu interface user plane protocols", 3GPP TS 25.415 standard. The mode choice is indicated to the GANC by the MSC using RANAP and to the UE by the GANC using GA-RRC. Support for the AMR FR codec, as specified in "AMR speech codec; General description", 3GPP TS 26.071 standard, is mandatory when operating in GAN mode, with support for other codecs being optional. In some embodiments, the Iu-cs data transport layers 6595 are per 3GPP TS 25.414.

Some embodiments that utilize GA-RRC protocol implement a protocol stack for the GANC that is different than the protocol stack shown for the GANC 6515. In these embodiments, the GANC protocol stack is similar to the GANC 1115 protocol stack illustrated in FIG. 11. In these embodiments, the GANC has additional protocol layers Remote IP, UDP, and RTP over the IPSec layer 6545. The GANC also has the additional Iu UP protocol layer over the data transport layers 6595. Similar to the GANC 1115 shown in FIG. 11, the GANC in these embodiments interworks the CS domain user plane between the RTP/UDP and the Iu User Plane protocol.

2. Packet Switched (PS) Domain a) PS Domain—Control Plane

Figure 66:
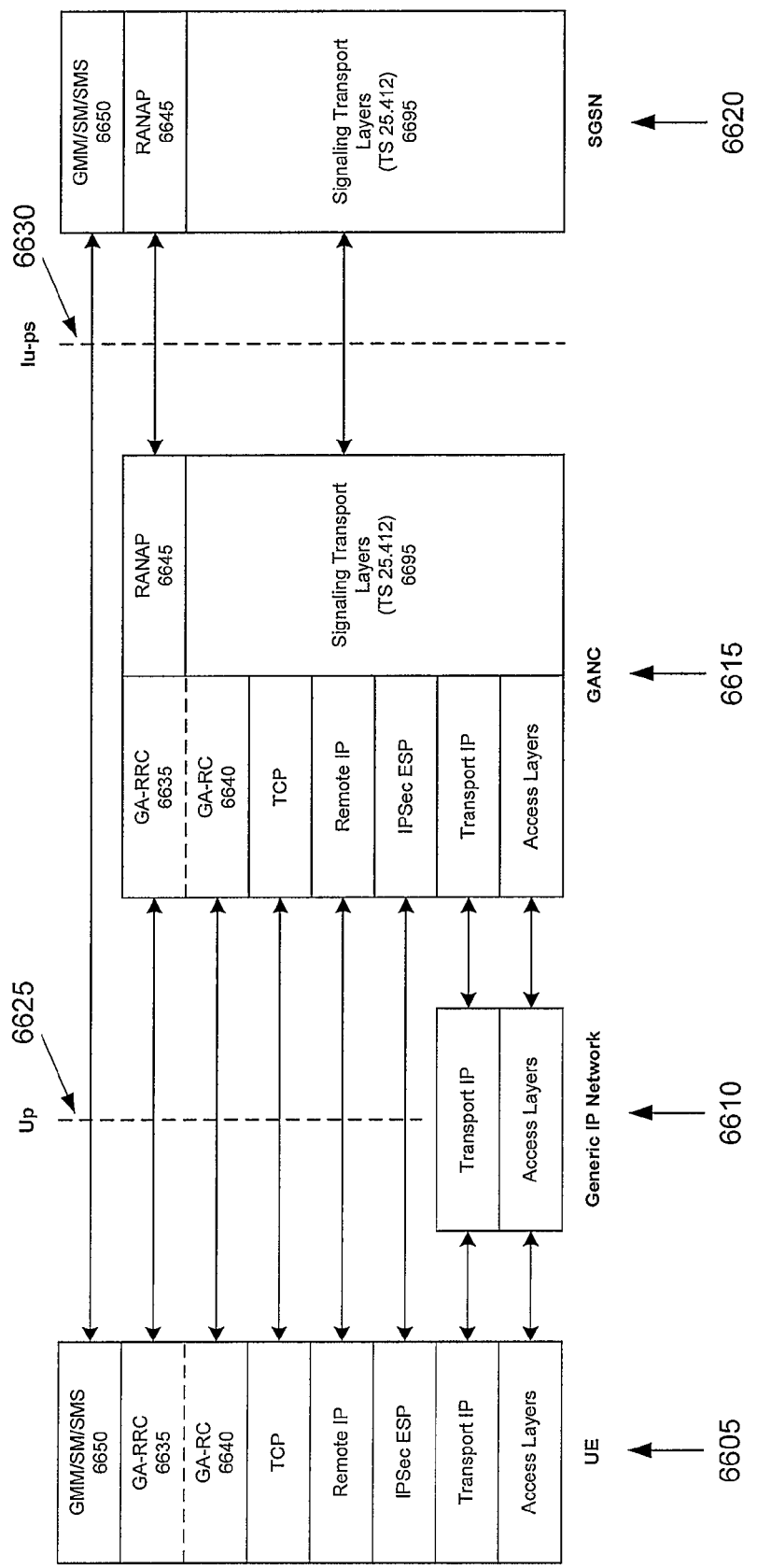
FIG. 66 illustrates the GAN architecture in support of the PS Domain Control Plane in some embodiments.

FIG. 66 illustrates the GAN architecture in support of the PS Domain Control Plane in some embodiments. The figure shows different protocol layers for the UE 6605, Generic IP Network 6610, GANC 6615, and SGSN 6620. FIG. 66 also shows the two interfaces Up 6625 and Iu-ps 6630. The main features of the GAN PS domain control plane architecture are as follows. The functions of GA-RRC 6635 and underlying layers are as described in Sub-section VIII.A.1.a: "CS Domain—Control Plane", above. The GA-RRC protocol 6635 performs functionality equivalent to the UTRAN RRC protocol, using the underlying Up session managed by the GA-RC 6640. The GA-RRC 6635 includes both CS service and PS service-related signaling messages.

The GANC 6615 terminates the GA-RRC protocol 6635 and inter-works it to the RANAP protocol 6645 over the Iu-ps interface 6630. NAS protocols, such as for GMM, SM and SMS 6650, are carried transparently between the UE 6605 and SGSN 6620. In some embodiments, the Iu-ps signaling transport layers 6695 are per 3GPP TS 25.412.

b) PS Domain—User Plane

Figure 67:
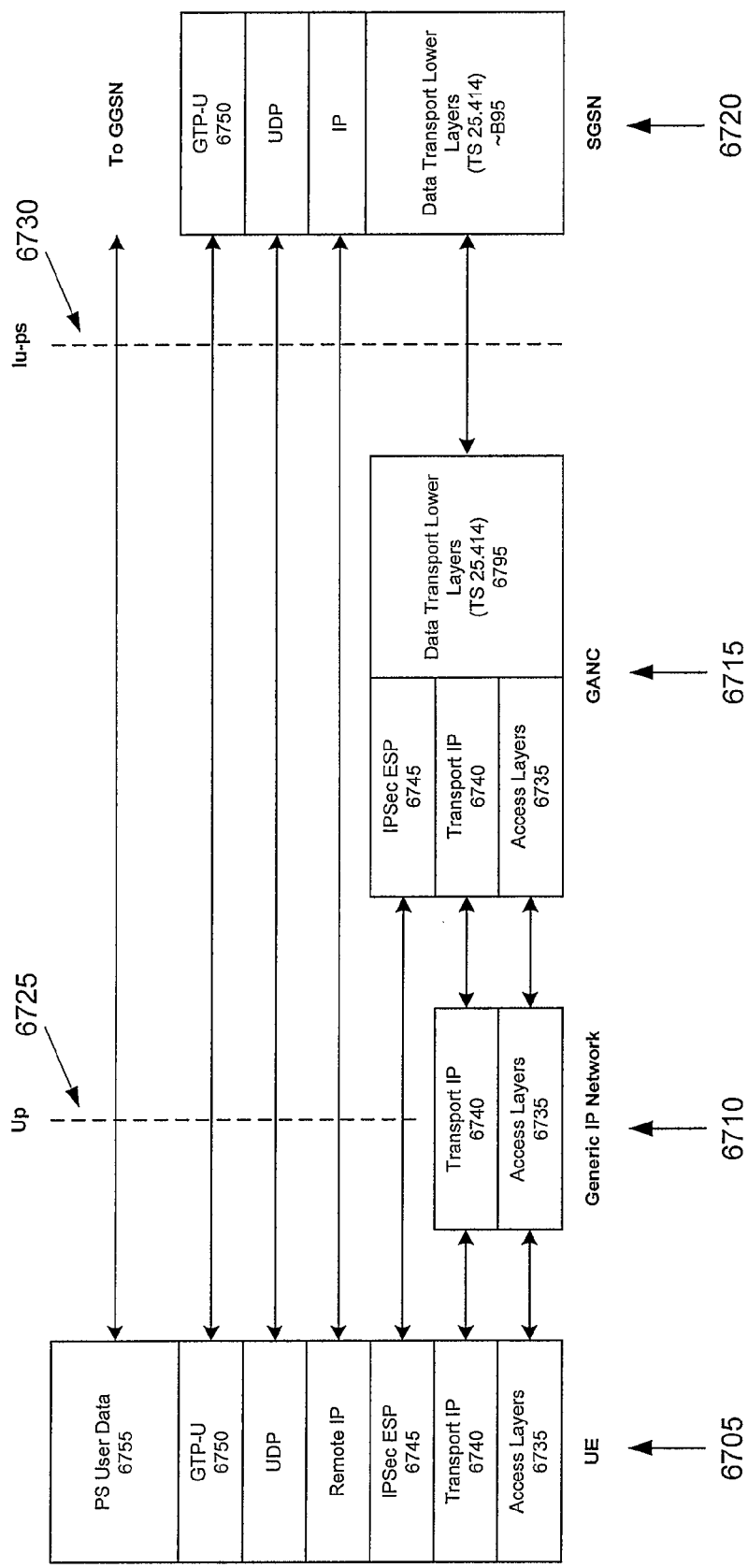
FIG. 67 illustrates the GAN architecture for the PS Domain User Plane in some embodiments.

FIG. 67 illustrates the GAN architecture for the PS Domain User Plane in some embodiments. The figure shows different protocol layers for the UE 6705, Generic IP Network 6710, GANC 6715, and SGSN 6720. FIG. 67 also shows the two interfaces Up 6725 and Iu-ps 6730. The main features of the GAN PS domain user plane architecture are as follows. The underlying Access Layers 6735 and Transport IP 6740 layer provides the generic connectivity between the UE 6705 and the GANC 6715. The IPSec layer 6745 provides encryption and data integrity. The GTP-U 6750 protocol operates between the UE 6705 and the SGSN 6720, transporting the upper layer payload (i.e., PS domain user plane data 6755) across the Up 6725 and Iu-ps interfaces 6730. User data is carried transparently between the UE 6705 and core network. In some embodiments, the Iu-ps data transport lower layers 6795 are per 3GPP TS 25.414.

Some embodiments that utilize GA-RRC protocol implement a protocol stack for the GANC that is different than the protocol stack shown for the GANC 6715. In these embodiments, the GANC protocol stack is similar to the GANC 1815 protocol stack illustrated in FIG. 18. In these embodiments, the GANC has additional protocol layers Remote IP, UDP, and GTP-U over the IPSec layer 6745. In these embodiments, the GTP-U in the UE and the GTP-U layer over the UDP layer in the GANC is a part of GA-RRC protocol. The GANC also has the additional IP, UDP, and GTP-U layers over the data transport lower layers 6795.

3. GA-RC (Generic Access Resource Control)

The GA-RC protocol provides a resource management layer, with the following functions. Discovery and registration with GANC, registration update with GANC, application level keep-alive with GANC, and support for identification of the AP being used for GAN access.

a) States of the GA-RC Sub-layer

Figure 68:
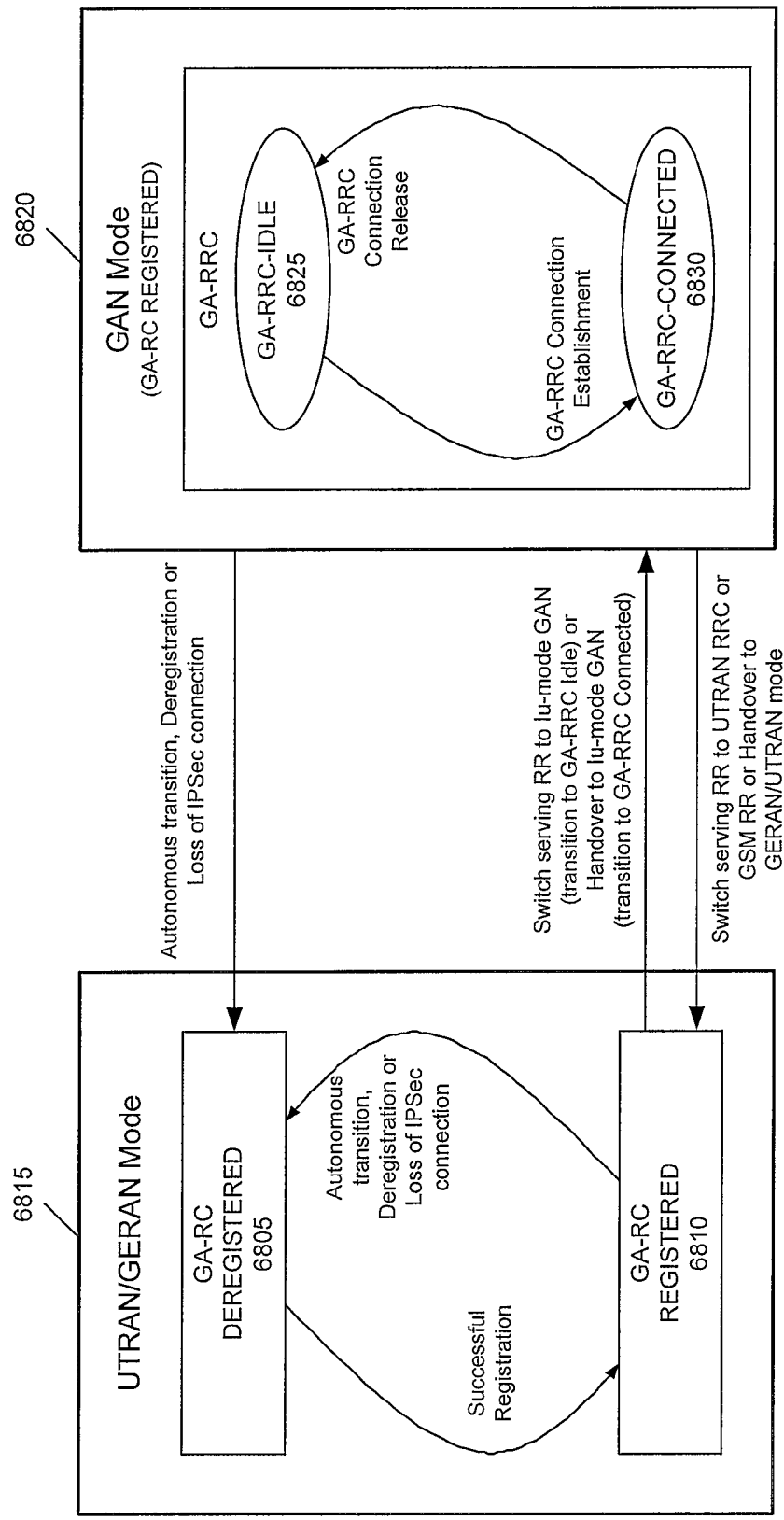
FIG. 68 illustrates the GA-RC sublayer in the UE in some embodiments.

FIG. 68 illustrates the GA-RC sublayer in the UE in some embodiments. As shown, the GA-RC sub-layer in the UE can be in one of two states: GA-RC-DEREGISTERED 6805 or GA-RC-REGISTERED 6810. In the GA-RC-DEREGISTERED state 6805, the UE may be in a GAN coverage area; however, the UE has not registered successfully with the GANC. The UE may initiate the GAN Registration procedure when in the GA-RC-DEREGISTERED state 6805. The UE returns to GA-RC-DEREGISTERED state 6805 on loss of TCP or IPSec connection or on execution of the GAN De-registration procedure.

In the GA-RC-REGISTERED state 6810, the UE is registered with the Serving GANC. The UE has an IPSec tunnel and an TCP connection established to the Serving GANC through which the UE may exchange GA-RC or GA-RRC signaling messages with the GANC. While the UE remains in the GA-RC-REGISTERED state 6805 it performs application level keep-alive with the GANC.

In the GA-RC-REGISTERED state, the UE may be in either UTRAN/GERAN mode 6815 or GAN mode 6820. The UE (1) may be camped on GERAN or UTRAN and idle, (2) may be active in GERAN or UTRAN (e.g., a GSM RR or a UTRAN RRC connection may be established), (3) may have "roved in" to GAN mode, or (4) may have recently "roved out" of GAN mode (e.g., due to handover from GAN).

4. GA-RRC (Generic Access Radio Resource Control)

The GA-RRC protocol provides a resource management layer, which is a replacement for UTRAN-RRC and provides the following functions: (1) setup of transport channels for CS and PS traffic between the UE and GANC, (2) flow control of PS traffic, (3) CS and PS handover support between UTRAN/GERAN and GAN, (4) direct transfer of NAS messages between the UE and the core network, and (5) other functions such as paging and security configuration.

a) States of the GA-RRC Sub-layer

The GA-RRC sub-layer in the UE can be in two states, GA-RRC-IDLE 6825 or GA-RRC-CONNECTED 6830 as illustrated in FIG. 68. The UE enters the GA-RRC-IDLE 6825 state when the UE switches the serving RR entity to GA-RRC and the SAP between the NAS and the GA-RRC is activated. This switch may occur only when the GA-RC is in the GA-RC-REGISTERED state. The UE moves from the GA-RRC-IDLE state 6825 to the GA-RRC-CONNECTED state 6830 when the GA-RRC connection is established and returns to GA-RRC-IDLE state when the GA-RRC connection is released. Upon GA-RRC connection release, an indication that no dedicated resources exist is passed to the upper layers. The UE may also enter the GA-RRC-CONNECTED state while in the GA-RC-REGISTERED state in GERAN/UTRAN mode when Handover to GAN is being performed. In the same way, the UE enters the GA-RC-REGISTERED state in GERAN/UTRAN mode from the GA-RRC-CONNECTED state when Handover from GAN is successfully executed.

B. High-Level Procedures

1. GA-RRC Connection Handling

Figure 69:
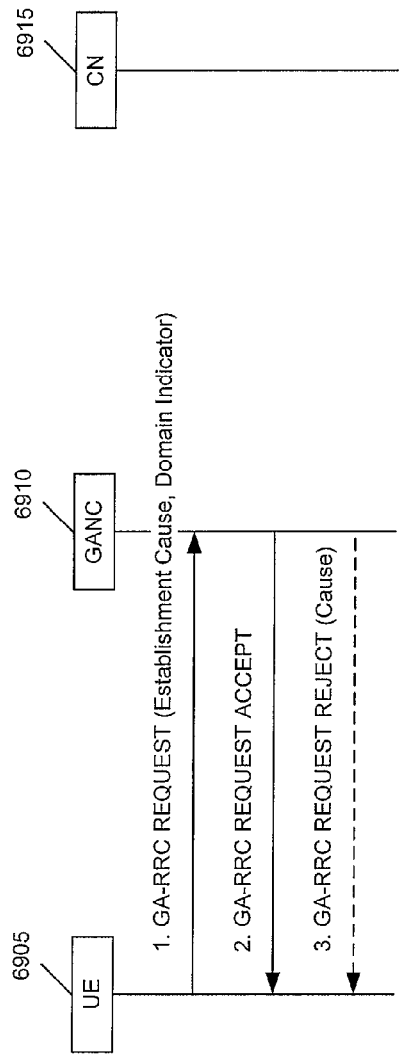
FIG. 69 illustrates successful (and unsuccessful) establishment of the GA-RRC Connection when initiated by the UE in some embodiments.

The GA-RRC connection is a logical connection between the UE and the GANC, either for the CS or PS domain. It is established when the upper layers in the UE request GA-RRC to establish a signaling connection and the UE is in idle mode (no RRC connection exists). When a successful response is received from the network, GA-RRC replies to the upper layer that it has entered RRC connected mode. The upper layers have then the possibility to request transmission of NAS messages to the network.

a) GA-RRC Connection Establishment i) UE Initiated GA-RRC Connection Establishment FIG. 69 illustrates successful (and unsuccessful) establishment of the GA-RRC Connection when initiated by the UE in some embodiments. The UE 6905 initiates GA-RRC connection establishment by sending (in Step 1) the GA-RRC REQUEST message to the GANC 6910. This message contains the Establishment Cause indicating the reason for GA-RRC connection establishment. The message also includes the Domain Indicator (CS or PS). GANC 6910 signals the successful response to the UE 6905 by sending (in Step 2) the GA-RRC REQUEST ACCEPT and the UE 6905 enters GA-RRC connected mode. Alternatively, the GANC 6910 may return (in Step 3) a GA-RRC REQUEST REJECT indicating the reject cause.

ii) Network Initiated GA-RRC Connection Establishment

Figure 70:
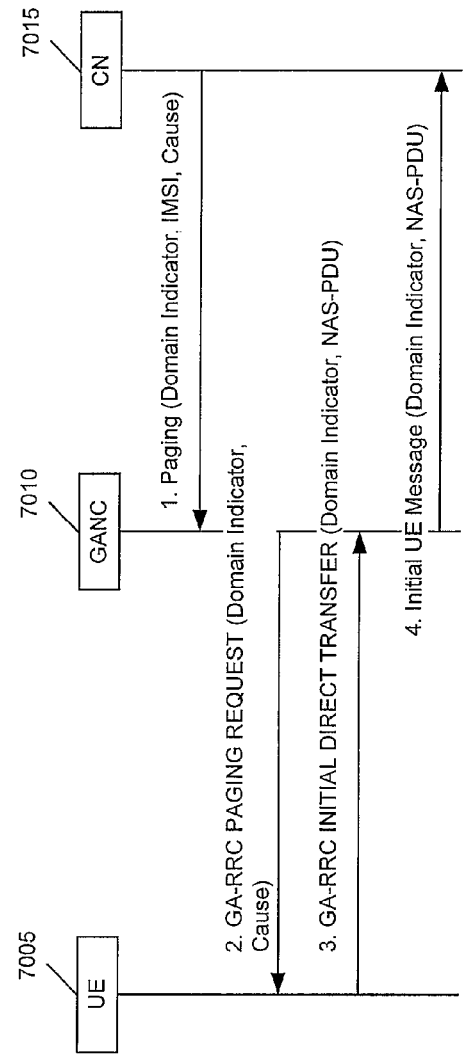
FIG. 70 illustrates successful establishment of the GA-RRC Connection when initiated by the network in some embodiments.

FIG. 70 illustrates successful establishment of the GA-RRC Connection when initiated by the network in some embodiments. The CN 7015 sends (in Step 1) a RANAP Paging message to the GANC 7010 identified through the last Location Update received by it and includes the TMSI if available. The IMSI of the UE being paged is always included in the request, as is the Domain Indicator (CS or PS). A paging cause may be included.

Next, the GANC 7010 identifies the UE registration context using the IMSI provided by the CN 7015. It then pages (in Step 2) the UE 7005 using the GA-RRC PAGING REQUEST message. The UE 7005 responds (in Step 3) with a GA-RRC INITIAL DIRECT TRANSFER message containing a NAS message appropriate to the Domain Indicator (CS or PS) and cause. Alternatively, the UE 7005 responds (in Step 3) with a GA-RRC PAGING RESPONSE message containing a NAS message, the Domain Indicator (i.e., CS or PS) and cause. The UE 7005 enters GA-RRC connected mode. The GANC 7010 establishes an SCCP connection to the CN 70015. The GANC 7010 then forwards (in Step 4) the NAS message to the CN 7015 using the RANAP Initial UE Message. Subsequent NAS messages between the UE and core network will be sent between GANC and CN using the RANAP Direct Transfer message.

b) GA-RRC Connection Release

Figure 71:
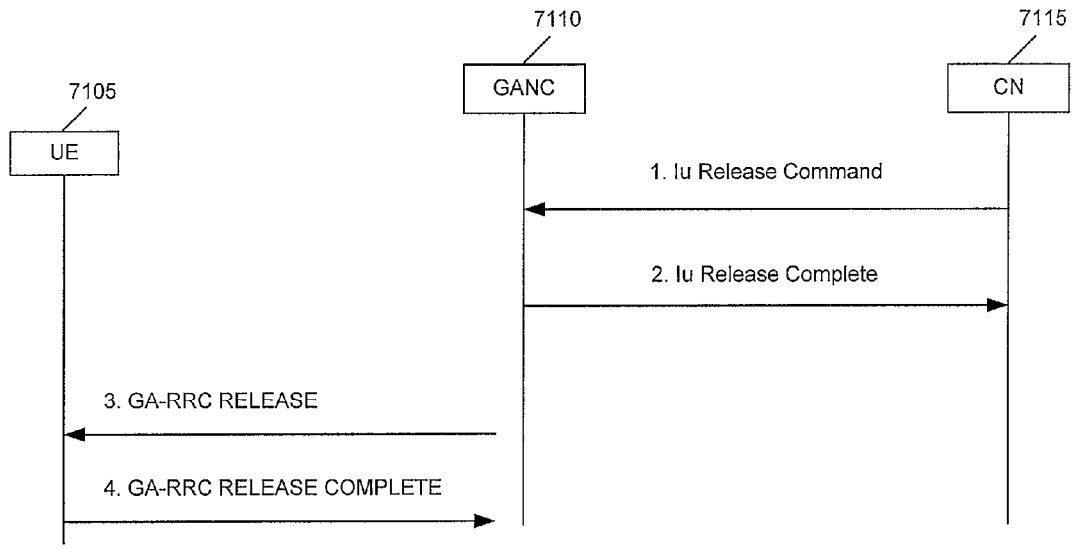
FIG. 71 shows release of the logical GA-RRC connection between the UE and the GANC in some embodiments.

FIG. 71 shows release of the logical GA-RRC connection between the UE and the GANC in some embodiments. The CN 7115 indicates (in Step 1) to the GANC 7110 to release the user plane connection allocated to the UE 7115, via the RANAP Iu Release Command message. The GANC 7110 confirms (in Step 2) resource release to CN 7115 using the Iu Release Complete message 7125.

Next, the GANC 7110 commands (in Step 3) the UE 7105 to release resources, using the GA-RRC CONNECTION RELEASE message. The UE 7105 confirms (in Step 4) resource release to the GANC 7110 using the GA-RRC CONNECTION RELEASE COMPLETE message and the GA-RRC state in the UE changes to idle.

3. Security Mode Control

Figure 72:
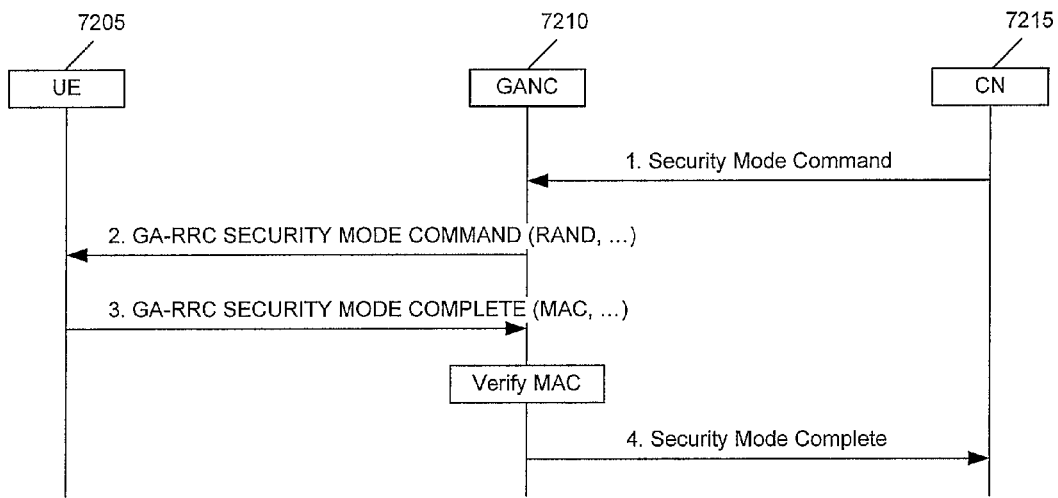
FIG. 72 illustrates the message flow for security mode control in some embodiments.

FIG. 72 illustrates the message flow for security mode control in some embodiments. The CN 7215 sends (in Step 1) the RANAP Security Mode Command message to GANC 7210. This message contains the integrity key (IK) and allowed algorithms, and optionally the encryption key (CK) and allowed algorithms. The GANC 7210 sends (in Step 2) the GA-RRC SECURITY MODE COMMAND message to the UE 7205. This message indicates the integrity protection and encryption settings (i.e., that are applicable after relocation to UTRAN), and a random number. The UE 7205 stores the information for possible future use after a handover to UTRAN.

Next, the UE 7205 computes a MAC based on the random number, the UE IMSI and the integrity key calculated by the UE. The UE 7205 then sends (in Step 3) the GA-RRC SECURITY MODE COMPLETE message to signal its selected algorithm and the computed MAC. The GANC 7210 then verifies the MAC using the random number, the UE IMSI and the integrity key provided by the CN 7215 in step 1. If the GANC verifies the MAC to be correct it sends (in Step 4) the Security Mode Complete message to the CN 7215. The MAC proves that the identity that is authenticated to the GANC is the same as the identity authenticated to the core network.

4. GA-RRC NAS Signaling Procedures

After GA-RRC connection establishment, NAS signaling may be transferred from CN-to-UE and from UE-to-CN.

a) CN-to-UE NAS Signalling

Figure 73:
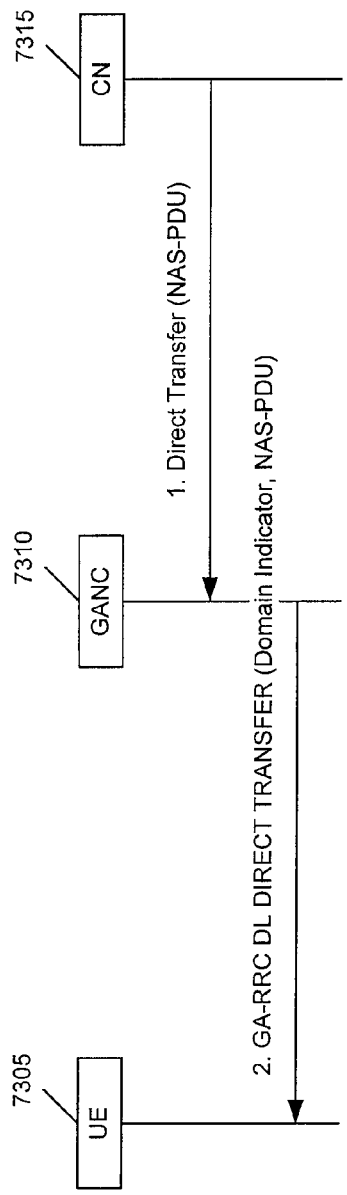
FIG. 73 illustrates core network to UE NAS signaling of some embodiments.

FIG. 73 illustrates core network to UE NAS signaling of some embodiments. For CN-to-UE NAS signaling, the Core Network 7315 sends (in Step 1) a NAS PDU to the GANC via the RANAP Direct Transfer message. The GANC 7310 encapsulates (in Step 2) the NAS PDU within a GA-RRC DL DIRECT TRANSFER message and forwards the message to the UE 7305 via the existing TCP connection.

b) UE-to-CN NAS Signaling

Figure 74:
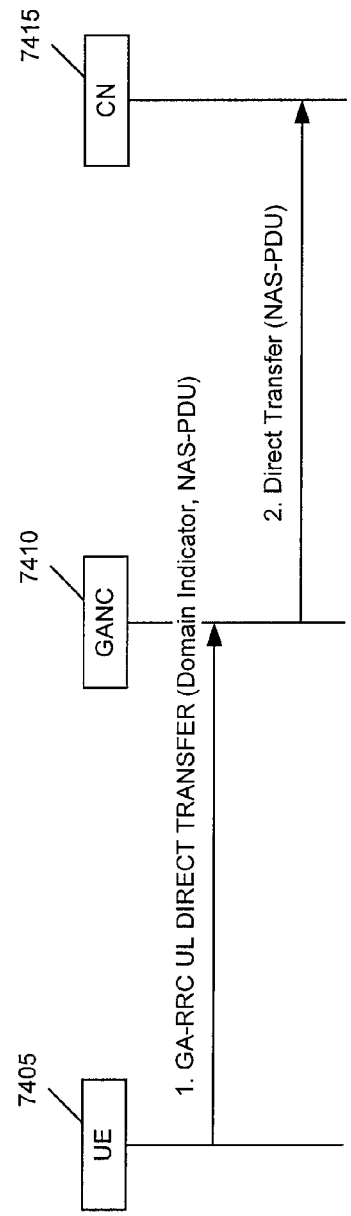
FIG. 74 illustrates the UE to core network NAS signaling of some embodiments.

FIG. 74 illustrates the UE to core network NAS signaling of some embodiments. The UE 7405 GA-RRC layer receives a request from the NAS layer to transfer an uplink NAS PDU. Since the MM connection (and hence RR signaling connection) already exists, the UE GA-RRC encapsulates the NAS PDU within a GA-RRC UL DIRECT TRANSFER message and sends (in Step 1) the message to the GANC 7410. The GANC 7410 relays (in Step 2) the received message to the Core Network 7415 via the RANAP Direct Transfer message 7420.

5. Mobile Originated CS Call a) UE Terminate Iu UP Packet

Figure 75:
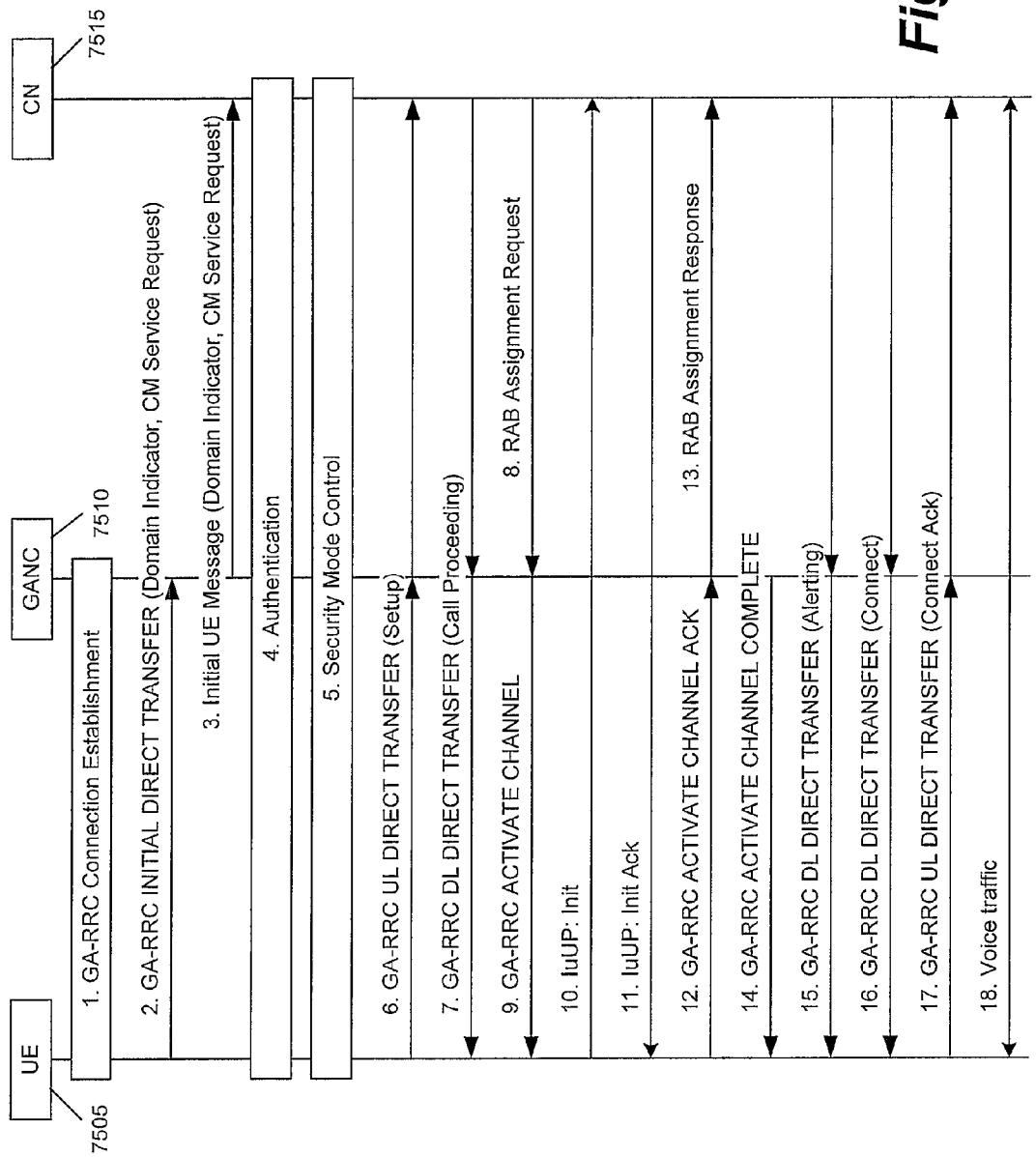
FIG. 75 illustrates mobile originated CS call procedure in some embodiments.

FIG. 75 illustrates mobile originated CS call procedure in some embodiments. The description of the procedure assumes the UE 7505 is in GAN mode; i.e., it has successfully registered with the GANC 7510 and GA-RRC is the serving RR entity in the UE 7505. It also assumes that no GA-RRC connection exists between the UE 7505 and GANC 7510 (i.e., GA-RRC-IDLE state). The GA-RRC Connection Establishment procedure is performed (in Step 1) as described in Sub-section VIII.B.1.a.i: UE Initiated GA-RRC Connection Establishment, above. Upon request from the upper layers, the UE 7505 sends (in Step 2) the CM Service Request to the GANC 7510 in the GA-RRC INITIAL DIRECT TRANSFER message.

The GANC 7510 establishes an SCCP connection to the CN 7515 and forwards (in Step 3) the CM Service Request to the CN 7515 using the RANAP Initial UE Message. Subsequent NAS messages between the UE 7505 and core network 7515 will be sent between GANC 7510 and CN 7515 using the RANAP Direct Transfer message.

The CN 7515 may optionally authenticate (in Step 4) the UE 7505 using standard UTRAN authentication procedures. The CN 7515 may optionally initiate (in Step 5) the Security Mode Control procedure described in Sub-section VIII.B.3: "Security Mode Control", above.

The UE 7505 sends (in Step 6) the Setup message providing details on the call to the CN 7515 and its bearer capability and supported codecs. This message is contained within the GA-RRC UL DIRECT TRANSFER between the UE 7505 and the GANC 7510. The GANC 7510 forwards (in Step 6) the Setup message to the CN 7515.

The CN 7515 indicates (in Step 7) it has received the call setup and it will accept no additional call-establishment information using the Call Proceeding message to the GANC 7510. The GANC 7510 forwards (in Step 7) this message to the UE 7505 in the GA-RRC DL DIRECT TRANSFER message.

The CN 7515 requests (in Step 8) the GANC 7510 to assign call resources using the RANAP RAB Assignment Request message. The CN 7515 includes the RAB-ID, the CN Transport Layer Address (IP address) and the CN Iu Transport Association (UDP port number) for user data. The GANC 7510 sends (in Step 9) the GA-RRC ACTIVATE CHANNEL message to the UE 7505 including bearer path setup information received in the RAB Assignment Request message such as: (1) Radio Access Bearer (RAB) parameters; e.g., RAB-ID, UDP port & the IP address for the uplink RTP stream and (2) Iu UP parameters (e.g., Iu UP mode, where support mode is used for AMR voice calls).

Since Iu UP support mode is indicated, the UE 7505 sends (in Step 10) the Iu UP INITIALISATION packet to the IP address and UDP port indicated in the GA-RRC ACTIVATE CHANNEL message. This message is routed to the core network 7515 (e.g., the R4 media gateway). The core network 7515 responds (in Step 11) with the Iu UP INITIALISATION ACK packet. The core network 7515 sends the message to the source IP address and UDP port number of the received INITIALISATION packet.

The UE 7505 sends (in Step 12) the GA-RRC ACTIVATE CHANNEL ACK to the GANC 7510. The GANC signals (in Step 13) to the CN 7515 that the RAB has been established by sending a RANAP RAB Assignment Response message. The GANC 7510 signals (in Step 14) the completion of the RAB establishment to the ULE 7505 with the GA-RRC ACTIVATE CHANNEL COMPLETE message.

An end-to-end audio path now exists between the UE 7505 and the CN 7515. The UE 7505 can now connect the user to the audio path. The CN 7515 signals to the UE 7505, with the Alerting message, that the called party is ringing. The message is transferred (in Step 15) to the GANC 7510 and GANC forwards (in Step 15) the message to the UE 7505 in the GA-RRC DL DIRECT TRANSFER.

When the UE 7505 has not connected the audio path to the user, it generates ring back to the calling party. Otherwise, the network-generated ring back will be returned to the calling party. The CN 7515 signals that the called party has answered, via the Connect message. The message is transferred (in Step 16) to the GANC 7510 and GANC forwards (in Step 16) the message to the UE 7505 in the GA-RRC DL DIRECT TRANSFER 7595. The UE 7505 connects the user to the audio path. If the UE 7505 is generating ring back, it stops and connects the user to the audio path.

The UE 7505 sends (in Step 17) the Connect Ack message in response, and the two parties are connected for the voice call. This message is contained within the GA-RRC UL DIRECT TRANSFER between the UE 7505 and the GANC 7510. The GANC forwards (in Step 17) the Connect Ack message to the CN 7515. Bi-directional voice traffic flows (in Step 18) between the UE 7505 and CN 7515 through the GANC 7510.

b) GANC Terminates Iu UP Packet

Figure 76:
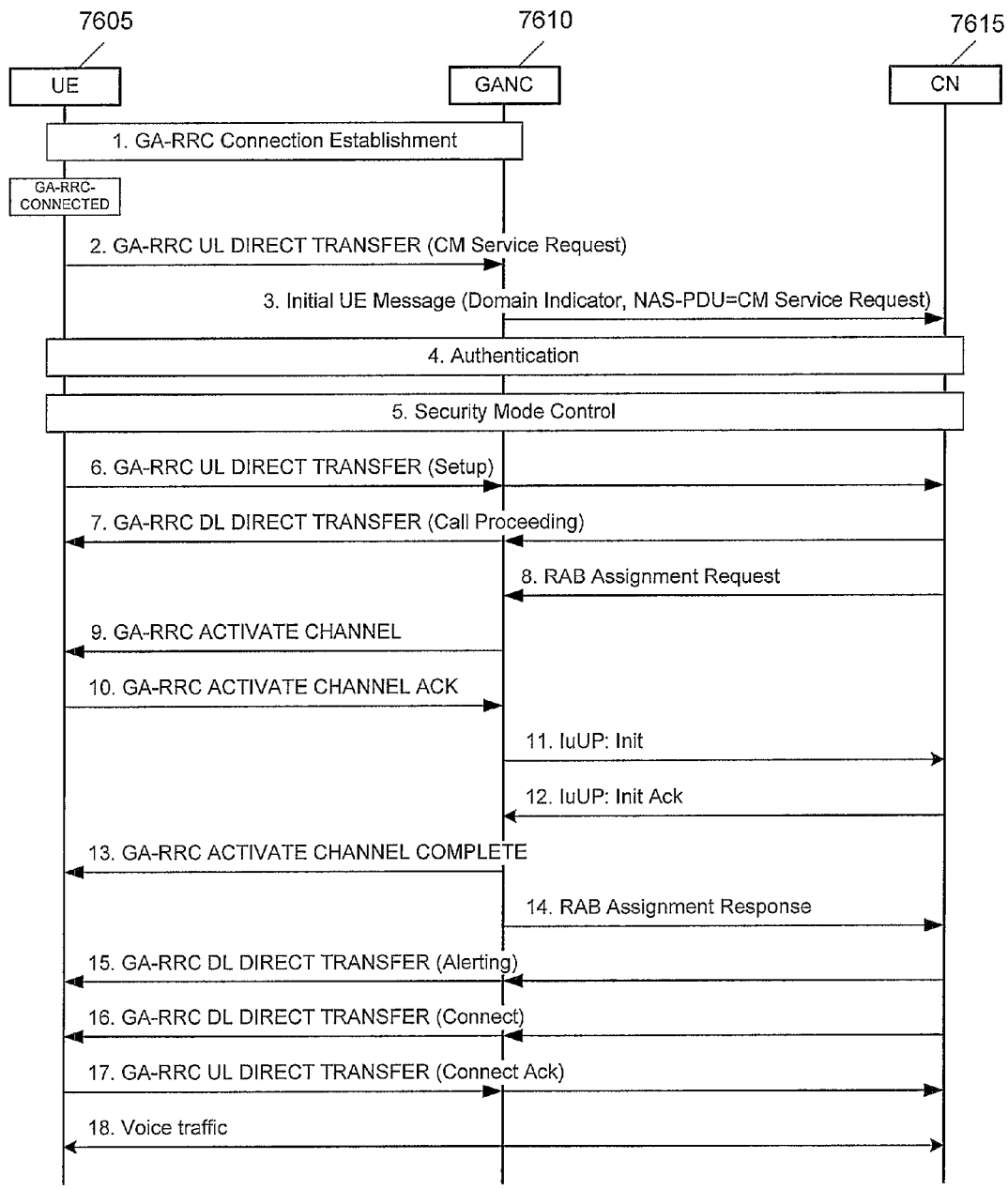
FIG. 76 illustrates an alternative procedure performed during a mobile originated CS call in some embodiments.

Some embodiments utilize an alternative procedure for the mobile originated CS call using RRC protocol. FIG. 76 illustrates steps performed during a mobile originated CS call in these embodiments. The procedure assumes that the UE is in GAN mode; i.e., it has successfully registered with the GANC and GA-RRC is the serving RR entity for CS services in the UE. It also assumes that no GA-RRC signaling connection exists between the UE and GANC (i.e., GA-RRC-IDLE state). As shown, the GA-RRC Connection Establishment procedure is performed (in Step 1). In some embodiments, this procedure is performed. Next, the UE 7605 sends the CM Service Request message to the GANC 7610 within the GA-RRC UL DIRECT TRANSFER message.

Next, the GANC 7610 establishes an SCCP connection to the core network CN 7615 and forwards (in Step 3) the NAS PDU (i.e., the CM Service Request message) to the core network CN 7615 using the RANAP Initial UE Message. The message includes the Domain Indicator set to value 'CS domain'. Subsequent NAS messages between the UE and core network CN will be sent between GANC and core network CN using the RANAP Direct Transfer message.

The core network CN 7615 may optionally authenticate (in Step 4) the UE using standard UTRAN authentication procedures. The core network CN 7615 may optionally initiate (in Step 5) the Security Mode Control procedure. The UE 7605 sends (in Step 6) the Setup message providing details on the call to the core network CN and its bearer capability and supported codecs. This message is contained within the GA-RRC UL DIRECT TRANSFER between the UE and the GANC. The GANC forwards the Setup message to the core network CN.

Next, the core network CN 7615 indicates (in Step 7) it has received the call setup and it will accept no additional call-establishment information using the Call Proceeding message to the GANC. The GANC forwards (in Step 7) this message to the UE in the GA-RRC DL DIRECT TRANSFER message.

The core network CN 7615 requests (in Step 8) the GANC 7610 to assign call resources using the RANAP RAB Assignment Request message. The core network CN 7615 includes the RAB-ID, the CN Transport Layer Address and the CN Iu Transport Association for user data, and an indication that Iu UP support mode is required, among other parameters.

The GANC 7610 then sends (in Step 9) the GA-RRC ACTIVATE CHANNEL message to the UE 7605 including bearer path setup information such as: (1) Channel mode, (2) Multi-rate codec configuration, (3) UDP port & the IP address for the uplink RTP stream, and (4) Voice sample size.

Next, the UE 7605 sends (in Step 10) the GA-RRC ACTIVATE CHANNEL ACK to the GANC 7610 indicating the UDP port for the downlink RTP stream. Since Iu UP support mode is indicated by the core network CN in step 8, the GANC 7610 sends (in Step 11) the Iu UP INITIALIZATION packet to the core network CN.

In response, the core network CN responds (in Step 12) with the Iu UP INITIALISATION ACK packet. The GANC 7610 signals (in Step 13) the completion of the RAB establishment to the UE 7605 with the GA-RRC ACTIVATE CHANNEL COMPLETE message. Alternatively, Steps 11 and 12 may occur before Step 9.

The GANC 7610 signals to the core network CN 7615 that the RAB has been established by sending (in Step 14) a RANAP RAB Assignment Response message. The core network CN 7615 signals to the UE 3505, with the Alerting message, that the called party is ringing. The message is transferred (in Step 15) to the GANC 7610 and GANC forwards (in Step 15) the message to the UE 7605 in the GA-RRC DL DIRECT TRANSFER. When the UE has not connected the audio path to the user, it generates ring back to the calling party. Otherwise, the network-generated ring back will be returned to the calling party.

Next, the core network CN 7615 signals that the called party has answered, via the Connect message. The message is transferred (in Step 16) to the GANC 7610 and GANC forwards (in Step 16) the message to the UE in the GA-RRC DL DIRECT TRANSFER. The UE connects the user to the audio path. If the UE is generating ring back, it stops and connects the user to the audio path.

The UE 7605 then sends (in Step 17) the Connect Ack message in response, and the two parties are connected for the voice call. This message is contained within the GA-RRC UL DIRECT TRANSFER between the UE and the GANC. The GANC forwards the Connect Ack message to the core network CN. At this time, bi-directional voice traffic flows (in Step 18) between the UE 7605 and core network CN 7615 through the GANC 7610.

6. Mobile Terminated CS Call

Figure 77:
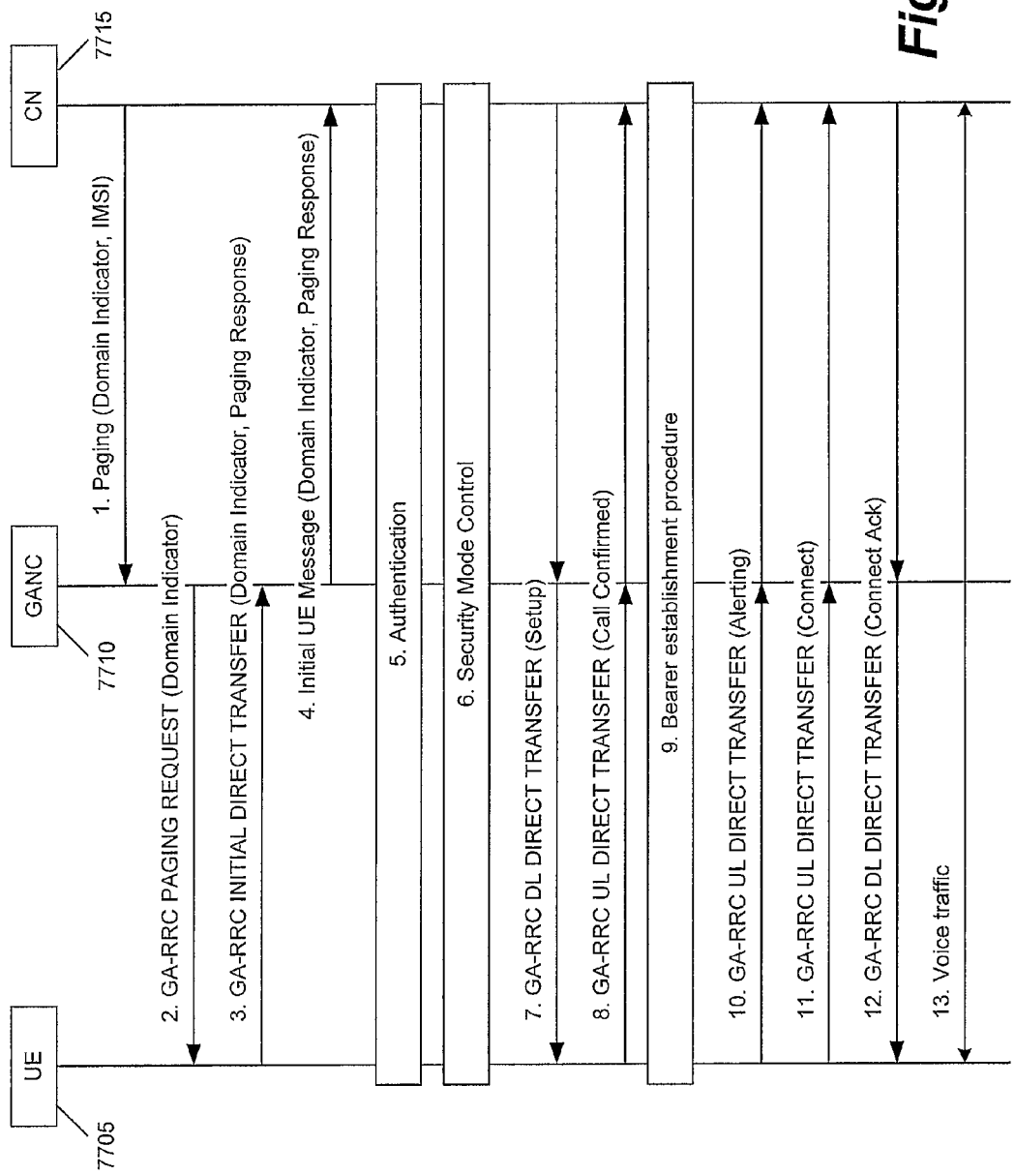
FIG. 77 illustrates mobile terminated CS call procedure in some embodiments.

FIG. 77 illustrates mobile terminated CS call procedure in some embodiments. The description of the procedure assumes the UE 7705 is in GAN mode; i.e., it has successfully registered with the GANC 7710 and GA-RRC is the serving RR entity in the UE 7705. It also assumes that no GA-RRC connection exists between the UE 7705 and GANC 7710 (i.e., GA-RRC-IDLE state).

A mobile-terminated call arrives at the CN 7715. The CN 7715 sends (in Step 1) a RANAP Paging message to the GANC 7710 identified through the last Location Update received by it and includes the TMSI if available. The IMSI of the mobile being paged is always included in the request. The GANC 7710 identifies the UE registration context using the IMSI provided by the CN 7715. The GANC then pages (in Step 2) the UE 7705 using the GA-RRC PAGING REQUEST message. The message includes the TMSI, when available in the request from the CN 7715. Otherwise, the message includes only the IMSI of the UE 7705.

The UE 7705 responds (in Step 3) with a GA-RRC INITIAL DIRECT TRANSFER message containing the Paging Response. The UE 7705 enters GA-RRC connected mode. The GANC 7710 establishes an SCCP connection to the CN 7715. The GANC 7710 then forwards (in Step 4) the paging response to the CN 7715 using the RANAP Initial UE Message. Subsequent NAS messages between the UE 7705 and core network 7715 will be sent between GANC 7710 and CN 7715 using the RANAP Direct Transfer message.

The CN 7715 may optionally authenticate (in Step 5) the UE 7705 using standard UTRAN authentication procedures. The CN 7715 may optionally update (in Step 6) the security configuration in the UE 7705, via the GANC 7710, as described in Sub-section VIII.B.3: "Security Mode Control", above. The CN 7715 initiates call setup using the Setup message sent (in Step 7) to the UE 7705 via GANC 7710. GANC forwards (in Step 7) this message to the UE 7705 in the GA-RRC DL DIRECT TRANSFER message.

The UE 7705 responds (in Step 8) with Call Confirmed using the GA-RRC UL DIRECT TRANSFER after checking it's compatibility with the bearer service requested in the Setup and modifying the bearer service as needed. If the Setup included the signal information element, the UE 7705 alerts the user using the indicated signal, else the UE 7705 alerts the user after the successful configuration of the user plane. The GANC 7710 forwards (in Step 8) the Call Confirmed message to the CN 7715. The CN 7715 initiates (in Step 9) the assignment procedure with the GANC 7710, which triggers the setup of the RTP stream (voice bearer channel) between the GANC 7710 and UE 7705.

The UE 7705 signals (in Step 10) that it is alerting the user, via the Alerting message contained in the GA-RRC UL DIRECT TRANSFER. The GANC 7710 forwards (in Step 10) the Alerting message to the CN 7715. The CN 7715 sends a corresponding alerting message to the calling party. The UE 7705 signals (in Step 11) that the called party has answered, via the Connect message contained in the GA-RRC UL DIRECT TRANSFER. The GANC 7710 forwards (in Step 11) the Connect message to the CN 7715. The CN 7715 sends a corresponding Connect message to the calling party and through connects the audio. The UE 7705 connects the user to the audio path.

The CN 7715 acknowledges (in Step 12) via the Connect Ack message to the GANC 7710. GANC 7710 forwards (in Step 12) this message to the UE 7705 in the GA-RRC DL DIRECT TRANSFER. The two parties on the call are connected on the audio path. Bi-directional voice traffic flows (in Step 13) between the UE 7705 and CN 7715 through the GANC 7710.

7. CS Call Clearing

Figure 78:
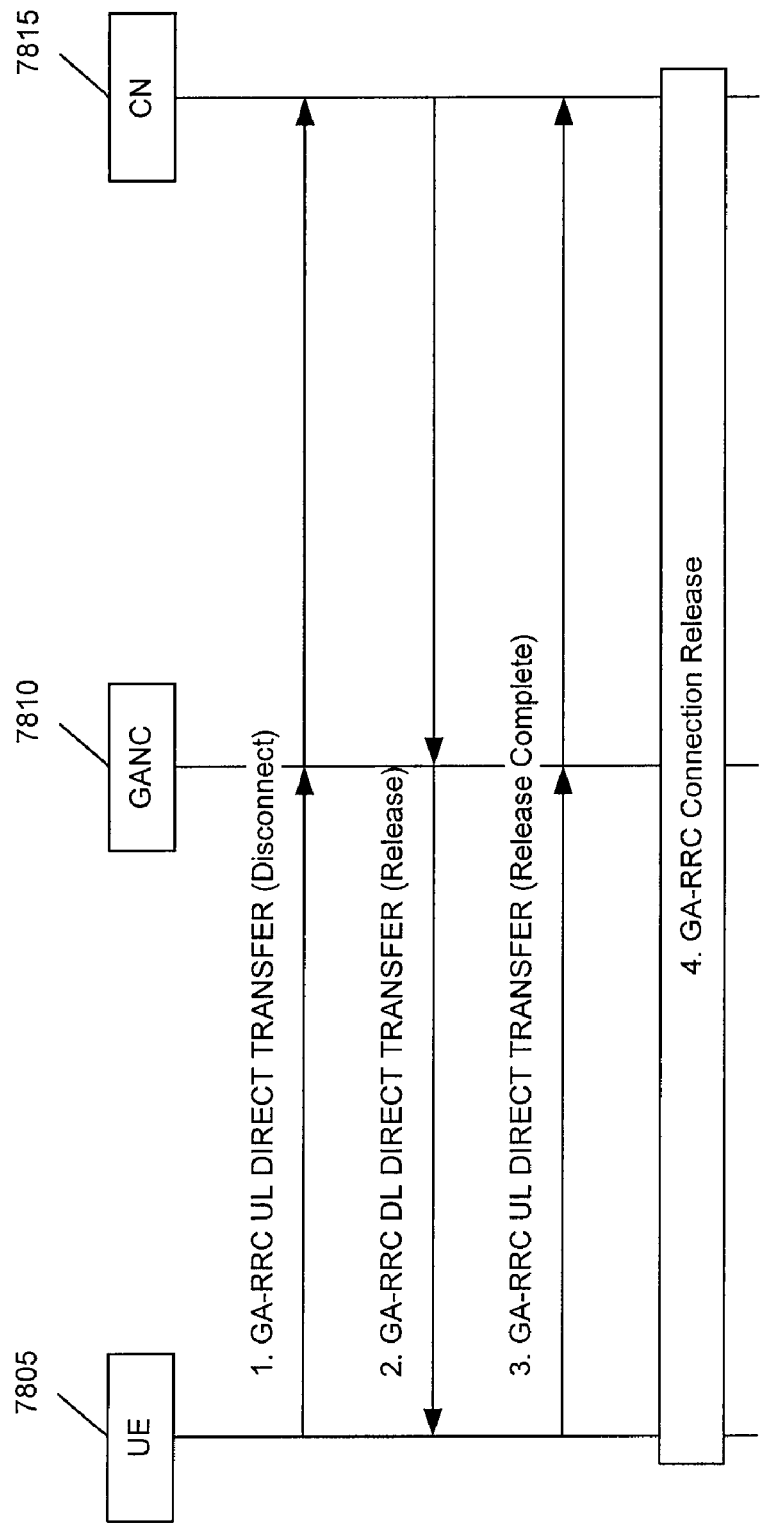
FIG. 78 illustrates call clearing initiated by the UE in some embodiments.

FIG. 78 illustrates call clearing initiated by the UE in some embodiments. As shown, the UE 7805 sends (in Step 1) the Disconnect message to the CN 7815 to release the call. This message is contained in the GA-RRC UL DIRECT TRANSFER message between UE 7805 and GANC 7810. The GANC 7810 forwards (in Step 1) the Disconnect message to the CN 7815 (i.e., using the RANAP Direct Transfer message).

The CN 7815 responds (in Step 2) with a Release message to the GANC 7810. The GANC 7810 forwards (in Step 2) this message to the UE 7805 using the GA-RRC DL DIRECT TRANSFER message.

The UE 7805 responds (in Step 3) with the Release Complete message. This message is contained within the GA-RRC UL DIRECT TRANSFER message between UE 7805 and GANC 7810. The GANC 7810 forwards (in Step 3) the Disconnect message to the CN 7815. The CN 7815 triggers (in Step 4) the release of connection as described in Subsection VIII.B.1.b: "GA-CSR Connection Release".

Figure 79:
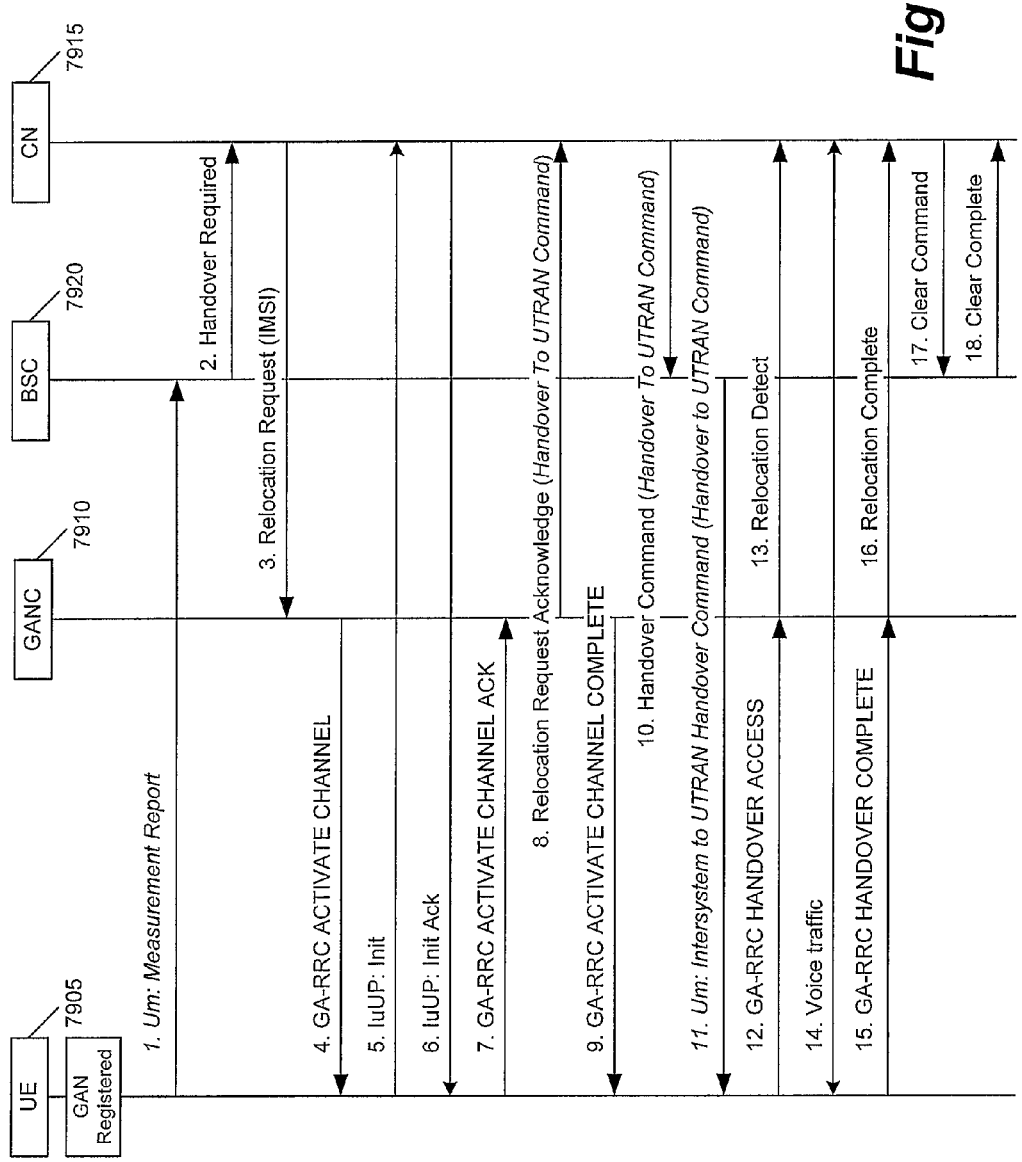
FIG. 79 illustrates the CS Handover from GERAN to GAN procedure in some embodiments.

8. CS Handover a) CS Handover from GERAN to GAN i) UE Terminates Iu UP Packet FIG. 79 illustrates the CS Handover from GERAN to GAN procedure in some embodiments. The description of the GERAN to GAN handover procedure assumes the following: (1) the UE is on an active call on the GERAN; (2) the UE mode selection is GAN-preferred, or if GERAN/UTRAN-preferred, the RxLev from the current serving cell drops below a defined threshold, in some embodiments this threshold can be specified as a fixed value, or provided by the GERAN BSS to the UE in dedicated mode; (3) the UE has successfully registered with a GANC, allowing the UE to obtain GAN system information; and (4) the GERAN provides information on neighboring 3G cells such that one of the cells in the 3G neighbor list matches the 3G cell information associated with the GANC, as provided in the AS-related component of the system information obtained from the GANC.

The UE begins to include (in Step 1) GAN cell information in the Measurement Report message to the GERAN. The UE reports the highest signal level for the GAN cell. This is not the actual measured signal level on GAN, rather an artificial value (i.e., RxLev=63), allowing the UE to indicate preference for the GAN.

Based on UE measurement reports and other internal algorithms, the GERAN BSC decides to handover to the GAN cell. The BSC 7920 starts the handover preparation by sending (in Step 2) a Handover Required message to the CN 7915, identifying the target 3G RNC (GANC) 7910. The CN 7915 requests (in Step 3) the target GANC 7910 to allocate resources for the handover using the Relocation Request message. The UE 7905 is identified by the included IMSI parameter.

The GANC 7910 sends (in Step 4) the GA-RRC ACTIVATE CHANNEL message to the UE 7905 including bearer path setup information received in the Relocation Request message, such as: (1) UDP port & the IP address for the uplink RTP stream, (2) Radio Access Bearer (RAB) parameters, and (3) Iu UP parameters (e.g., Iu UP mode, where support mode is used for AMR voice calls).

Since Iu UP support mode is indicated, the UE 7905 sends (in Step 5) the Iu UP INITIALISATION packet to the IP address and UDP port indicated in the GA-RRC ACTIVATE CHANNEL message. This message is routed to the core network 7915 (e.g., the R4 media gateway).

The core network 7915 responds (in Step 6) with the Iu UP INITIALISATION ACK packet. The core network 7915 sends the message to the source IP address and UDP port number of the received INITIALISATION packet. The UE 7905 sends (in Step 7) the GA-RRC ACTIVATE CHANNEL ACK to the GANC 7910. The GANC 7910 builds a Handover to UTRAN Command message and sends (in Step 8) it to the CN 7915 through the Relocation Request Acknowledge message.

The GANC 7910 signals (in Step 9) the completion of the RAB establishment to the UE 7905 with the GA-RRC ACTIVATE CHANNEL COMPLETE message. An end-to-end audio path now exists between the UE 7905 and the CN 7915. The CN 7915 forwards (in Step 10) the Handover to UTRAN Command message to the GERAN BSC 7920 in the BSS-MAP Handover Command message, completing the handover preparation.

The GERAN BSC 7920 sends (in Step 11) the Intersystem to UTRAN Handover Command message, containing the Handover to UTRAN Command message, to the UE to initiate handover to GAN. The UE does not switch its audio path from GERAN to GAN until handover completion (i.e., until it sends the GA-RRC HANDOVER COMPLETE message) to keep the audio interruption short.

The UE accesses the GANC 7910 using (in Step 12) the GA-RRC HANDOVER ACCESS message, and provides the entire Intersystem to UTRAN Handover Command message received from GERAN. The GANC 7910 indicates (in Step 13) to the CN 7915 that it has detected the UE, using Relocation Detect message. The CN 7915 can optionally now switch the user plane from the source GERAN to the target GAN. Bi-directional voice traffic is now flowing (in Step 14) between the UE and CN 7915, via GANC 7910.

The UE transmits (in Step 15) the GA-RRC HANDOVER COMPLETE message to indicate the completion of the handover procedure at its end. It switches the user from the GERAN user plane to the GAN user plane.

The target GANC 7910 indicates (in Step 16) the handover is complete, using the Relocation Complete message. If it had not done so before, the CN 7915 now switches the user plane from source GERAN to target GAN.

Finally, the CN 7915 tears (in Step 17) down the connection to the source GERAN, using Clear Command message. The source GERAN confirms (in Step 18) the release of GERAN resources allocated for this call, using Clear Complete message.

ii) GANC terminates Iu UP Packet

Figure 80:
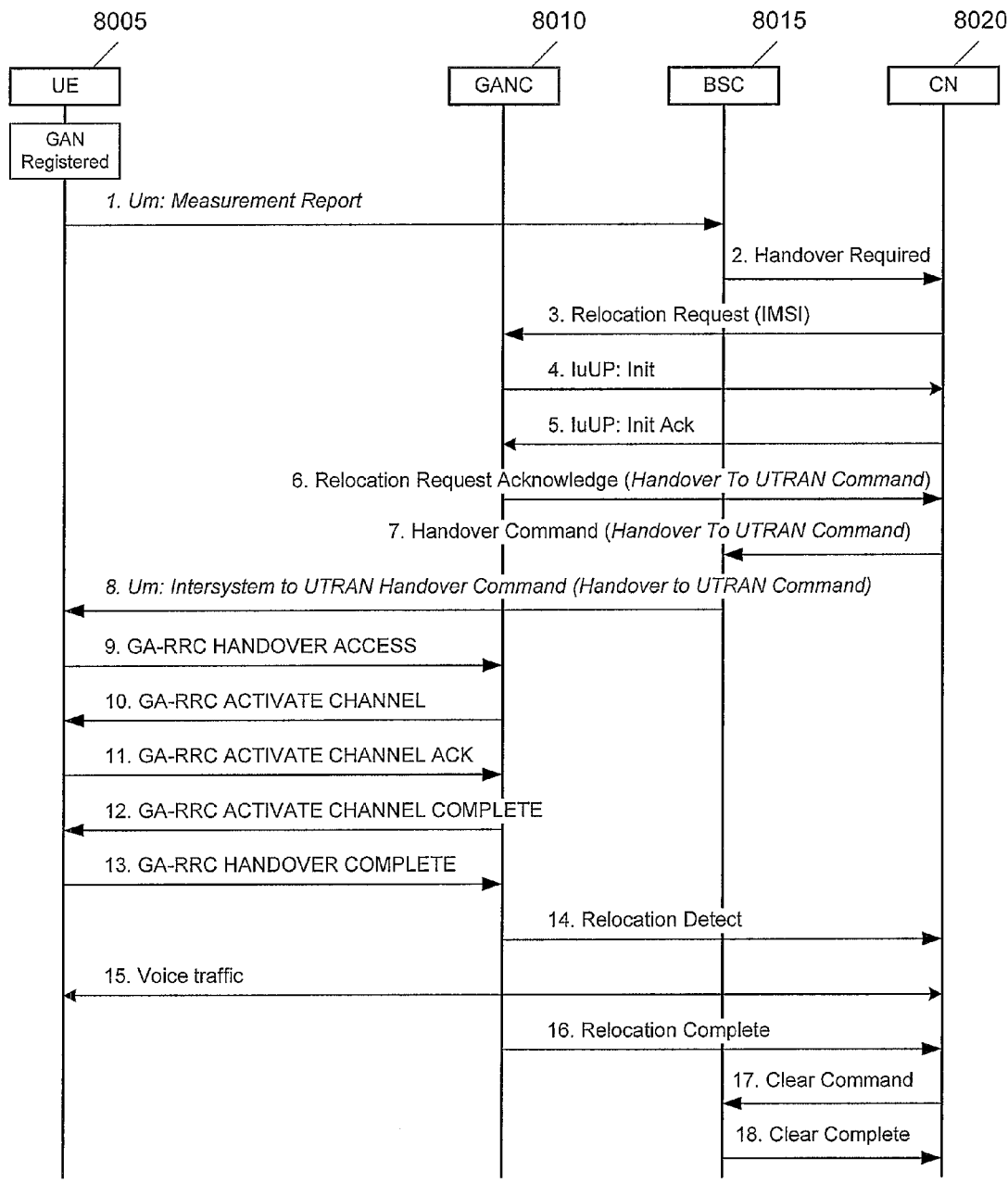
FIG. 80 illustrates an alternative procedure for CS handover from GERAN to GAN in some embodiments.

FIG. 80 illustrates an alternative procedure for CS handover from GERAN to GAN in some embodiments. The description of the GERAN to GAN handover procedure assumes the following: (1) the UE is on an active call on the GERAN, (2) the UE mode selection is GAN-preferred, or if GERAN/UTRAN-preferred, the RxLev from the current serving cell drops below a defined threshold. In some embodiments, this threshold can be specified as a fixed value, or provided by the GERAN BSS to the UE in dedicated mode, (3) the UE has successfully registered with a GANC, allowing the UE to obtain GAN system information, and (4) the GERAN provides information on neighboring 3G cells such that one of the cells in the 3G neighbor list matches the 3G cell information associated with the GANC, as provided in the AS-related component of the system information obtained from the GANC. As shown, the UE 8005 begins to include GAN cell information in the Measurement Report message to the GERAN BSC 8015. The UE 8005 reports the highest signal level for the GAN cell. This is not the actual measured signal level on GAN, rather an artificial value (e.g., RxLev=63), allowing the UE to indicate preference for the GAN.

Based on UE measurement reports and other internal algorithms, the GERAN BSC 8015 decides to handover to the GAN cell. The BSC 8015 starts the handover preparation by sending (in Step 2) a Handover Required message to the core network CN (8020), identifying the target 3G RNC (GANC).

The core network CN (8020) requests (in Step 3) the target GANC 8010 to allocate resources for the handover using the Relocation Request message. The UE is identified by the included IMSI parameter.

Since Iu UP support mode is indicated, the GANC 8010 sends (in Step 4) the Iu UP INITIALISATION packet to the core network CN. The core network CN responds (in Step 5) with the Iu UP INITIALISATION ACK packet.

The GANC 8010 builds a Handover to UTRAN Command message and sends it (in Step 6) to the core network CN 8020 through the Relocation Request Acknowledge message. The core network CN forwards (in Step 7) the Handover to UTRAN Command message to the GERAN BSC 8015 in the BSSMAP Handover Command message, completing the handover preparation.

Next, the GERAN BSC 8015 sends (in Step 8) the Intersystem to UTRAN Handover Command message, containing the Handover to UTRAN Command message, to the UE 8005 to initiate handover to GAN. The UE does not switch its audio path from GERAN to GAN until handover completion (i.e., until it sends the GA-RRC HANDOVER COMPLETE message) to keep the audio interruption short.

The UE 8005 accesses (in Step 9) the GANC 8010 using the GA-RRC HANDOVER ACCESS message, and provides the entire Intersystem to UTRAN Handover Command message received from GERAN. The GANC 8010 sends (in Step 10) the GA-RRC ACTIVATE CHANNEL message to the UE 8005 including bearer path setup information such as: (1) Channel mode, (2) Multi-rate codec configuration, (3) UDP port & the IP address for the uplink RTP stream, and (4) Voice sample size.

Next, the UE 8005 sends (in Step 11) the GA-RRC ACTIVATE CHANNEL ACK to the GANC 8010 indicating the UDP port for the downlink RTP stream. The GANC 8010 signals (in Step 11) the completion of the RAB establishment to the UE 8005 with the GA-RRC ACTIVATE CHANNEL COMPLETE message.

The UE 8005 transmits (in Step 13) the GA-RRC HANDOVER COMPLETE message to indicate the completion of the handover procedure at its end. It switches the user from the GERAN user plane to the GAN user plane. The GANC 8010 indicates (in Step 14) to the core network CN (8020) that it has detected the UE, using Relocation Detect message. The CN can optionally now switch the user plane from the source GERAN to the target GAN.

Bi-directional voice traffic is now (in Step 15) flowing between the UE 8005 and core network CN 8020, via GANC 8010. The target GANC 8010 indicates (in Step 16) the handover is complete, using the Relocation Complete message. If it had not done so before, the CN now switches the user plane from source GERAN to target GAN.

The CN tears down (in Step 17) the connection to the source GERAN, using Clear Command message. Finally, the source GERAN 8015 confirms (in Step 18) the release of GERAN resources allocated for this call, using Clear Complete message.

b) CS Handover from UTRAN to GAN i) UE Terminate Iu UP Packet

The description of the UTRAN to GAN Handover procedure assumes the following: (1) the UE is on an active call on the UTRAN; (2) the UE has been ordered by the RNC to make inter-frequency measurements. When the UE is in GAN preferred mode with an Event 2A configured, the UE handles parameters associated with the Event 2A in a GAN specific manner (as described in 3GPP TS 25.331) for the reporting of the GAN. When the UE is in GERAN/UTRAN preferred mode and an Event 2A has been configured for the GAN cell, the UE shall only send a measurement about the GAN cell, when this event is triggered and no UTRAN cells from the neighbour cell list of the UE satisfy the triggering condition of this Event (as described in 3GPP TS 25.331); and (3) the UTRAN provides information on neighbouring cells such that one of the cells in the neighbour list matches the cell associated with the GANC, as provided in the AS-related component of the system information obtained from GANC.

Figure 81:
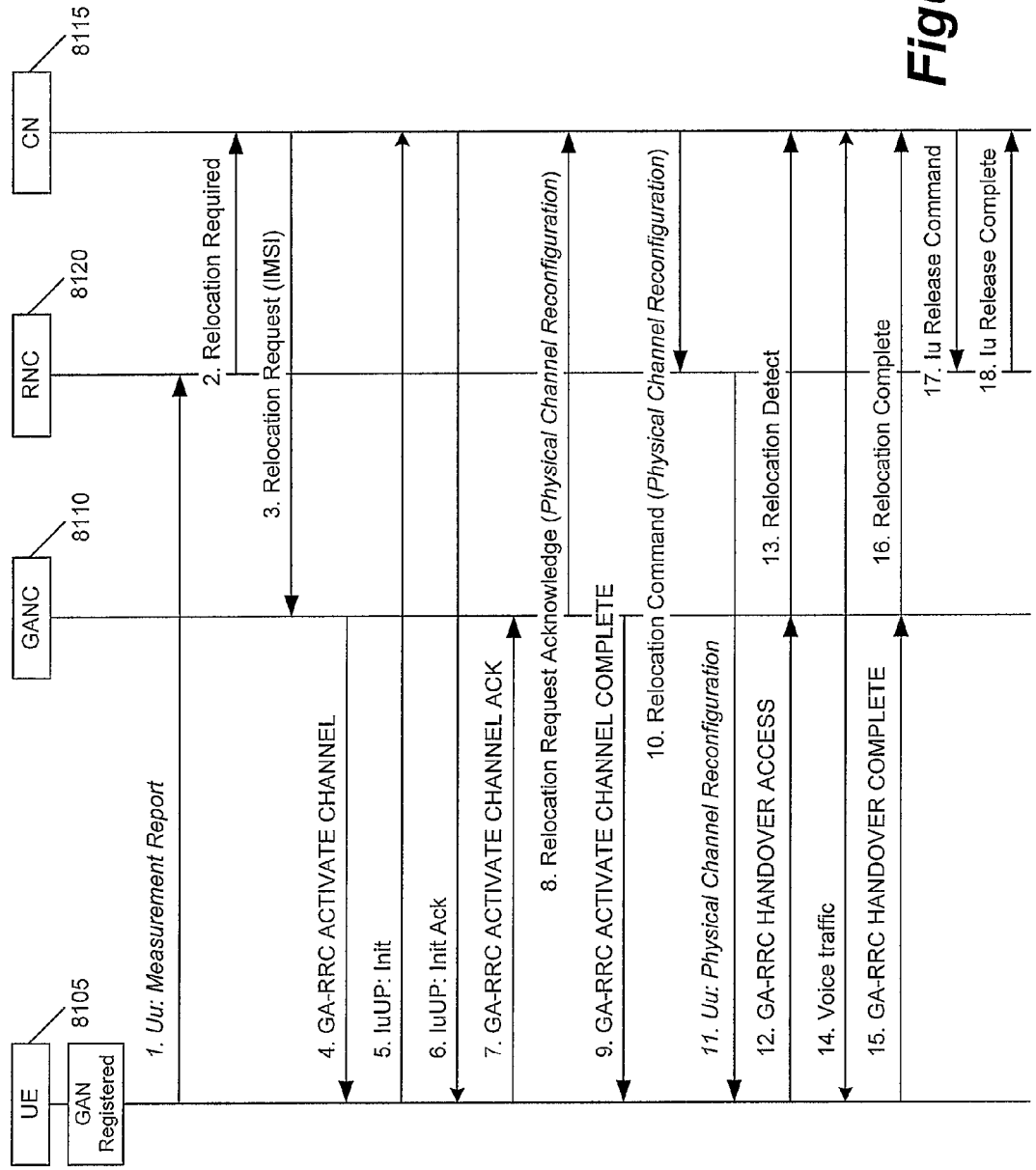
FIG. 81 illustrates the CS Handover from UTRAN to GAN procedure in some embodiments.

FIG. 81 illustrates the CS Handover from UTRAN to GAN procedure in some embodiments. The UE begins to include (in Step 1) information about a GAN cell in the Measurement Report message sent to the RNC 8120. The UE reports the highest signal level for the GAN cell. This is not the actual measured signal level on the GAN, rather an artificial value allowing the UE to indicate preference for the GAN.

Based on UE measurement reports and other internal algorithms, the RNC 8120 decides to initiate handover to the GAN cell. The RNC 8120 starts the preparation phase of the Relocation procedure by sending (in Step 2) a Relocation Required message to the CN 8115, identifying the target (EGAN) cell.

The CN 8115 requests (in Step 3) the target GANC 8110 to allocate resources for the handover using the Relocation Request message. The UE 8105 is identified by the included IMSI parameter.

The GANC 8110 sends (in Step 4) the GA-RRC ACTIVATE CHANNEL message to the UE 8105 including bearer path setup information received in the Relocation Request message, such as: (1) UDP port & the IP address for the uplink RTP stream, (2) Radio Access Bearer (RAB) parameters, and (3) Iu UP parameters (e.g., Iu UP mode, where support mode is used for AMR voice calls).

Since Iu UP support mode is indicated, the UE 8105 sends (in Step 5) the Iu UP INITIALISATION packet to the IP address and UDP port indicated in the GA-RRC ACTIVATE CHANNEL message. This message is routed to the core network 8115 (e.g., the R4 media gateway).

The core network 8115 responds (in Step 6) with the Iu UP INITIALISATION ACK packet. The core network 8115 sends the message to the source IP address and UDP port number of the received INITIALISATION packet. The UE 8105 sends (in Step 7) the GA-RRC ACTIVATE CHANNEL ACK to the GANC 8110.

The target GANC 8110 acknowledges (in Step 8) the handover request message, using Relocation Request Acknowledge message, indicating it can support the requested handover, and including a Physical Channel Reconfiguration message that indicates the radio channel to which the UE 8105 should be directed.

The GANC 8110 signals (in Step 9) the completion of the RAB establishment to the UE 8105 with the GA-RRC ACTIVATE CHANNEL COMPLETE message. An end-to-end audio path now exists between the UE 8105 and the CN 8115. The CN 8115 sends (in Step 10) the Relocation Command message to the RNC 8120, completing the relocation preparation.

The RNC 8120 sends (in Step 11) the PHYSICAL CHANNEL RECONFIGURATION message to the UE to initiate handover to GAN. The UE does not switch its audio path from UTRAN to GAN until handover completion (i.e., until it sends the GA-RRC HANDOVER COMPLETE message) to keep the audio interruption short. The UE accesses (in Step 12) the GANC 8110 using the GA-RRC HANDOVER ACCESS message, and provides the entire PHYSICAL CHANNEL RECONFIGURATION message received from RNC 8120.

The GANC 8110 indicates (in Step 13) to the CN 8115 that it has detected the UE, using Relocation Detect message. The CN 8115 can optionally now switch the user plane from the source RNC 8120 to the target GANC 8110. Bi-directional voice traffic is now flowing (in Step 14) between the UE and CN 8115, via GANC 8110.

The UE transmits (in Step 15) the GA-RRC HANDOVER COMPLETE to indicate the completion of the handover procedure from its perspective. It switches the user from the UTRAN user plane to the GAN user plane. The target GANC 8110 indicates (in Step 16) the handover is complete, using the Relocation Complete message. If it has not done so before, the CN 8115 now switches the user plane from source RNC 8120 to target GANC 8110.

Finally, the CN 8115 tears (in Step 17) down the connection to the source RNC 8120, using Iu Release Command. The source RNC 8120 confirms (in Step 18) the release of UTRAN resources allocated for this call, using Iu Release Complete.

ii) GANC Terminates Iu UP Packet

Figure 82:
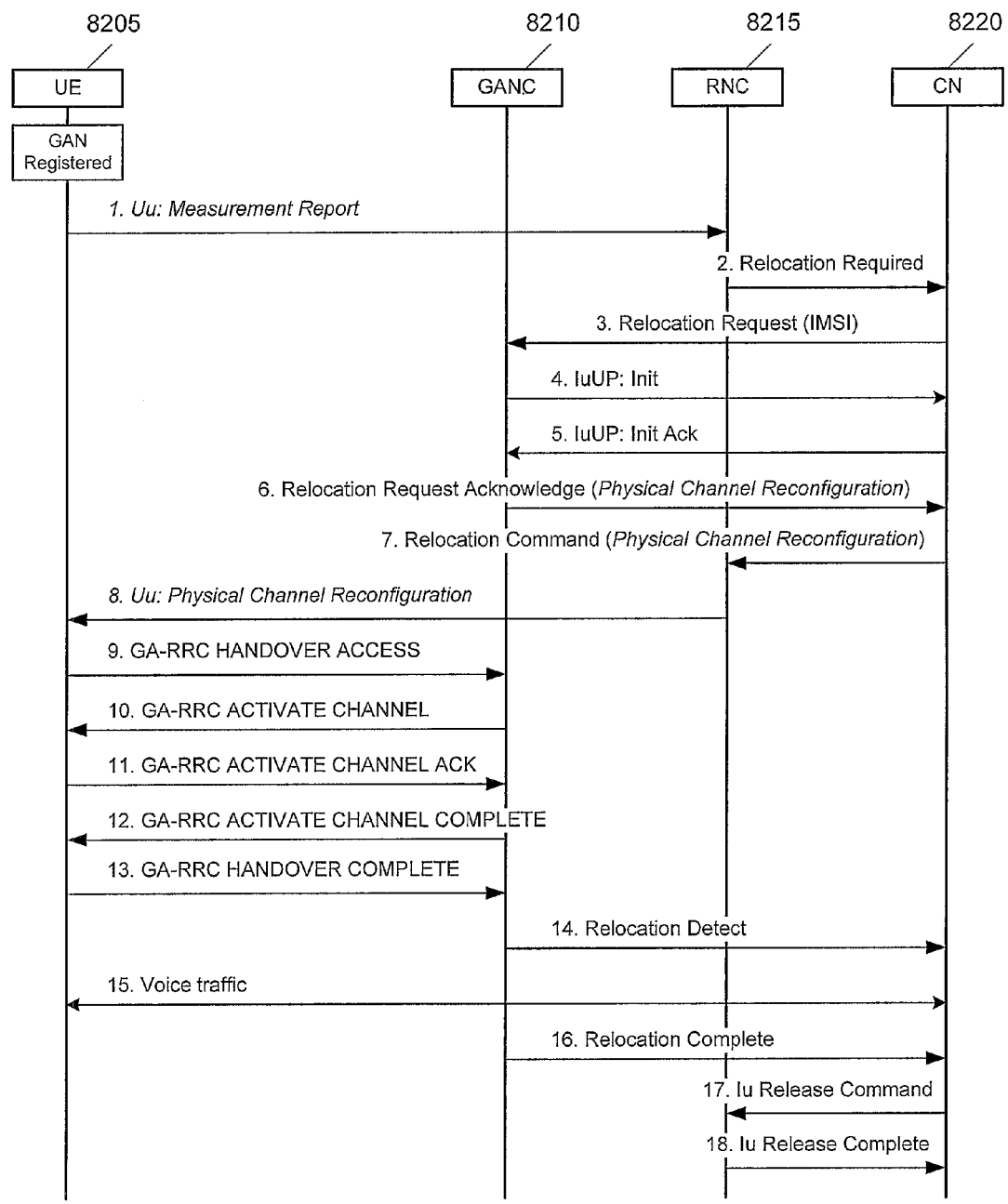
FIG. 82 illustrates an alternative procedure for CS handover from UTRAN to GAN using RRC protocol in some embodiments.

FIG. 82 illustrates an alternative procedure for CS handover from UTRAN to GAN using RRC protocol in some embodiments. The description of the UTRAN to GAN Handover procedure assumes the following: (1) the UE is on an active call on the UTRAN, (2) the UE has been ordered by the RNC to make inter-frequency measurements (i.e., if the GAN cell has been allocated a different frequency value than is used in the UTRAN), (a) if the UE is in GAN preferred mode with an Event 2A configured, the UE handles parameters associated with the Event 2A in a GAN specific manner for the reporting of the EGAN, (b) when the UE is in GERAN/UTRAN preferred mode and an event 2A has been configured for the GAN cell, the UE shall only send a measurement about the GAN cell, when this event is triggered and no UTRAN cells from the neighbor cell list of the UE satisfy the triggering condition of this Event (as described in 3GPP TS 25.331), (3) the UTRAN provides information on neighboring cells such that one of the cells in the neighbor list matches the cell associated with the GANC, as provided in the AS-related component of the system information obtained from GANC.

As shown in FIG. 82, the UE 8205 begins to include information about a GAN cell in the Measurement Report message sent (in Step 1) to the RNC 8215. The UE 8205 reports the highest signal level for the GAN cell. This is not the actual measured signal level on the GAN, rather an artificial value allowing the UE 8205 to indicate preference for the GAN.

Based on UE measurement reports and other internal algorithms, the RNC 8215 decides to initiate handover to the GAN cell. The RNC 8215 starts the preparation phase of the Relocation procedure by sending (in Step 2) a Relocation Required message to the core network CN, identifying the target (GAN) cell.

Next, steps 3 to 5 shown in FIG. 82 are performed similar to steps 3-5 for CSR GERAN to GAN Handover "GANC Terminates Iu UP Packets" Sub-section described above, except that the messages are RRC messages (instead of CSR). The target GANC 8210 acknowledges (in Step 6) the handover request message, using Relocation Request Acknowledge message, indicating it can support the requested handover, and including a Physical Channel Reconfiguration message that indicates the radio channel to which the UE should be directed.

Next, the core network CN 8220 sends (in Step 7) the Relocation Command message to the RNC 8215, completing the relocation preparation. The RNC 8215 sends (in Step 8) the PHYSICAL CHANNEL RECONFIGURATION message to the UE 8205 to initiate handover to GAN. The UE does not switch its audio path from UTRAN to GAN until handover completion (i.e., until it sends the GA-RRC HANDOVER COMPLETE message) to keep the audio interruption short.

Next, Steps 9-16 shown in FIG. 82 are performed similar to Steps 9-16 for CSR GERAN to GAN Handover in "GANC Terminates Iu UP Packets" Sub-section described above, except that Steps 9-16 in FIG. 82 utilize RRC protocol instead of CSR protocol. Next, the core network CN 8220 tears down (in Step 17) the connection to the source RNC, using Iu Release Command. Finally, the source RNC 8215 confirms (in Step 18) the release of UTRAN resources allocated for this call, using Iu Release Complete.

c) CS Handover from GAN to GERAN

The procedure description in this sub-clause assumes the following: (1) the UE is on an active call on the EGAN; and (2) the GERAN becomes available and (i) the UE mode selection is GERAN/UTRAN-preferred, or (ii) the UE mode selection is GAN-preferred and the UE begins to leave GAN coverage, based on its local measurements, received RTCP reports, as well as any uplink quality indications received from the GANC.

The handover from GAN to GERAN procedure is always triggered by the UE.

Figure 83:
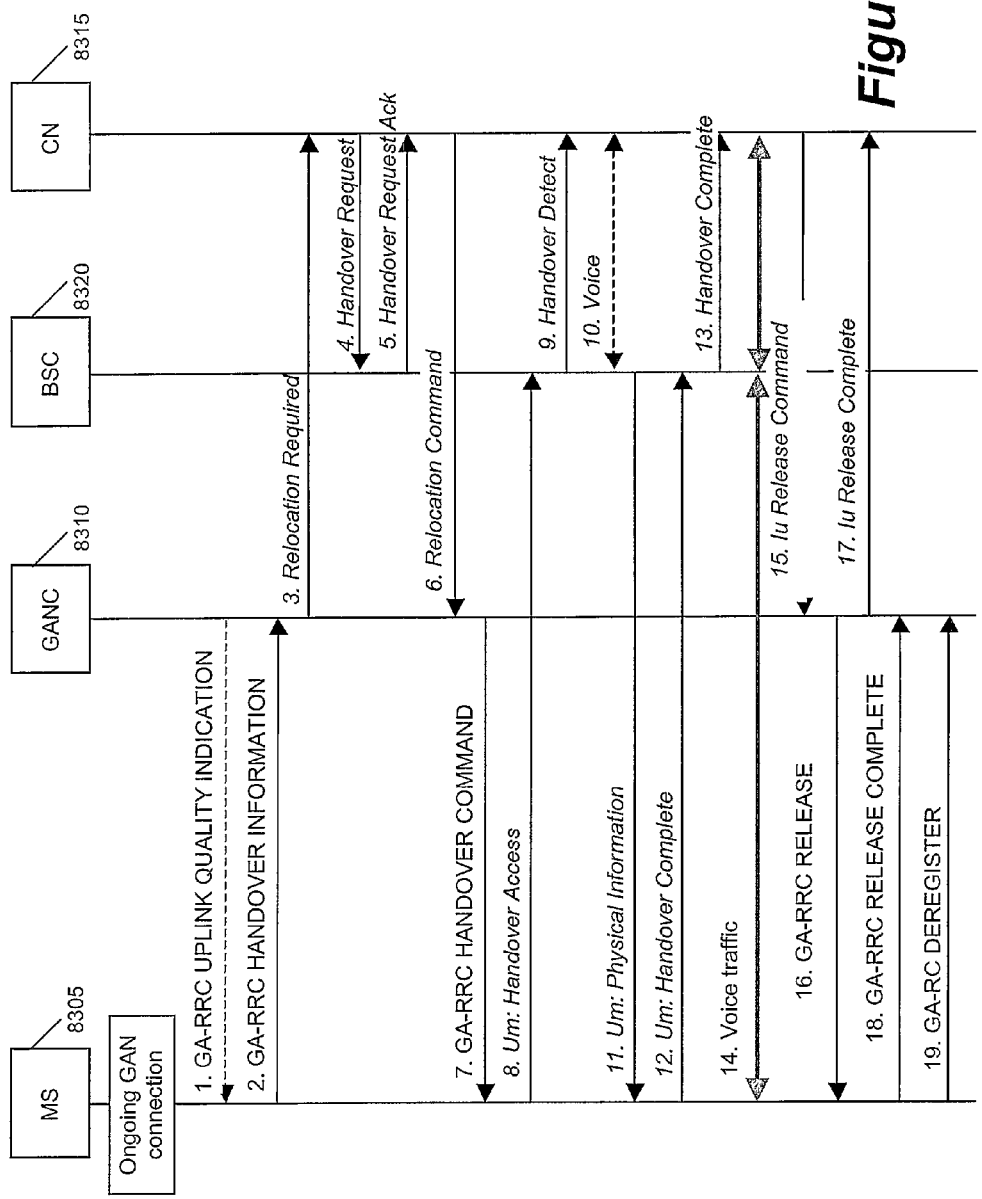
FIG. 83 illustrates the CS handover from GAN to GERAN procedure in some embodiments.

FIG. 83 illustrates the CS handover from GAN to GERAN procedure in some embodiments. The GANC 8310 may send (in Step 1) a GA-RRC UPLINK QUALITY INDICATION if there is a problem with the uplink quality for the ongoing call. Uplink Quality Indication is information sent by the GANC 8310 to the UE 8305 indicating the crossing of an uplink quality threshold in the uplink direction. Whenever the UE 8305 receives an indication of bad quality, it should start the handover procedure, as described in the next step. Alternatively, UE 8305 can use its local measurements or received RTCP reports, to decide to initiate the handover procedure.

The UE 8305 sends (in Step 2) the GA-RRC HANDOVER INFORMATION message to the GANC 8310 indicating the Channel Mode and a list of target GERAN cells, identified by CGI, in order of preference (e.g. ranked by C1 path loss parameter) for handover, and includes the received signal strength for each identified GERAN cell. This list is the most recent information available from the GSM RR subsystem. In addition, the GA-RRC HANDOVER INFORMATION message may include a list of target UTRAN cells ranked in order of preference for handover, and the received signal strength for each identified UTRAN cell.

If the Serving GANC 8310 selects a target GERAN cell, the handover to GERAN procedure is performed. The Serving GANC 8310 starts the handover preparation by signaling (in Step 3) to the CN 8315 the need for handover, using Relocation Required, and including the GERAN cell list provided by the UE 8305. The GANC 8310 may include only a subset of the cell list provided by the UE 8305.

The CN 8315 selects a target GERAN cell and requests (in Step 4) it to allocate the necessary resources, using Handover Request. The target GERAN builds a Handover Command message providing information on the channel allocated and sends (in Step 5) it to the CN 8315 through the Handover Request Acknowledge message.

The CN 8315 signals (in Step 6) the GANC 8310 to handover the UE 8305 to the GERAN, using Relocation Command message, ending the handover preparation phase. GANC 8310 transmits (in Step 7) the GA-RRC HANDOVER COMMAND to the UE 8305 including the details sent by the GERAN on the target resource allocation. The UE 8305 transmits (in Step 8) the Um: Handover Access containing the handover reference element to allow the target GERAN to correlate this handover access with the Handover Command message transmitted earlier to the CN 8315 in response to the Handover Required.

The target GERAN confirms (in Step 9) the detection of the handover to the CN 8315, using the Handover Detect message. The CN 8315 may at this point switch (in Step 10) the user plane to the target BSS. The GERAN provides (in Step 11) Physical Information to the UE 8305 (i.e., Timing Advance) to allow the UE 8305 to synchronize with the GERAN. The UE 8305 signals (in Step 12) to the GERAN that the handover is completed, using Handover Complete.

The GERAN confirms (in Step 13) to the CN 8315 the completion of the handover, via Handover Complete message. The CN 8315 may use the target CGI used in the Handover procedure for charging purposes. Bi-directional voice traffic is now flowing (in Step 14) between the UE 8305 and CN 8315, via the GERAN.

On receiving the confirmation of the completion of the handover, the CN 8315 indicates (in Step 15) to the GANC 8310 to release any resources allocated to the UE 8305, via the Iu Release Command. GANC 8310 commands (in Step 16) the UE 8305 to release resources, using the GA-RRC RELEASE message. GANC 8310 confirms (in Step 17) resource release to CN 8315 using the Iu Release Complete message.

The UE 8305 confirms (in Step 18) resource release to the GANC 8310 using the GA-RRC RELEASE COMPLETE message. The UE 8305 may finally deregister (in Step 19) from the GANC 8310, using GA-RC DEREGISTER message.

d) CS Handover from GAN to UTRAN

The procedure description in this sub-clause assumes the following: (1) the UE is on an active call on the GAN; (2) the UE is capable of operating in all of the GAN, GERAN and UTRAN modes; and (3) the UTRAN becomes available and (i) the UE is in GERAN/UTRAN-preferred mode, or (ii) the UE mode selection is GAN preferred and begins to leave GAN coverage, based on its local measurements, received RTCP reports, as well as any uplink quality indications received from the GANC.

Figure 84:
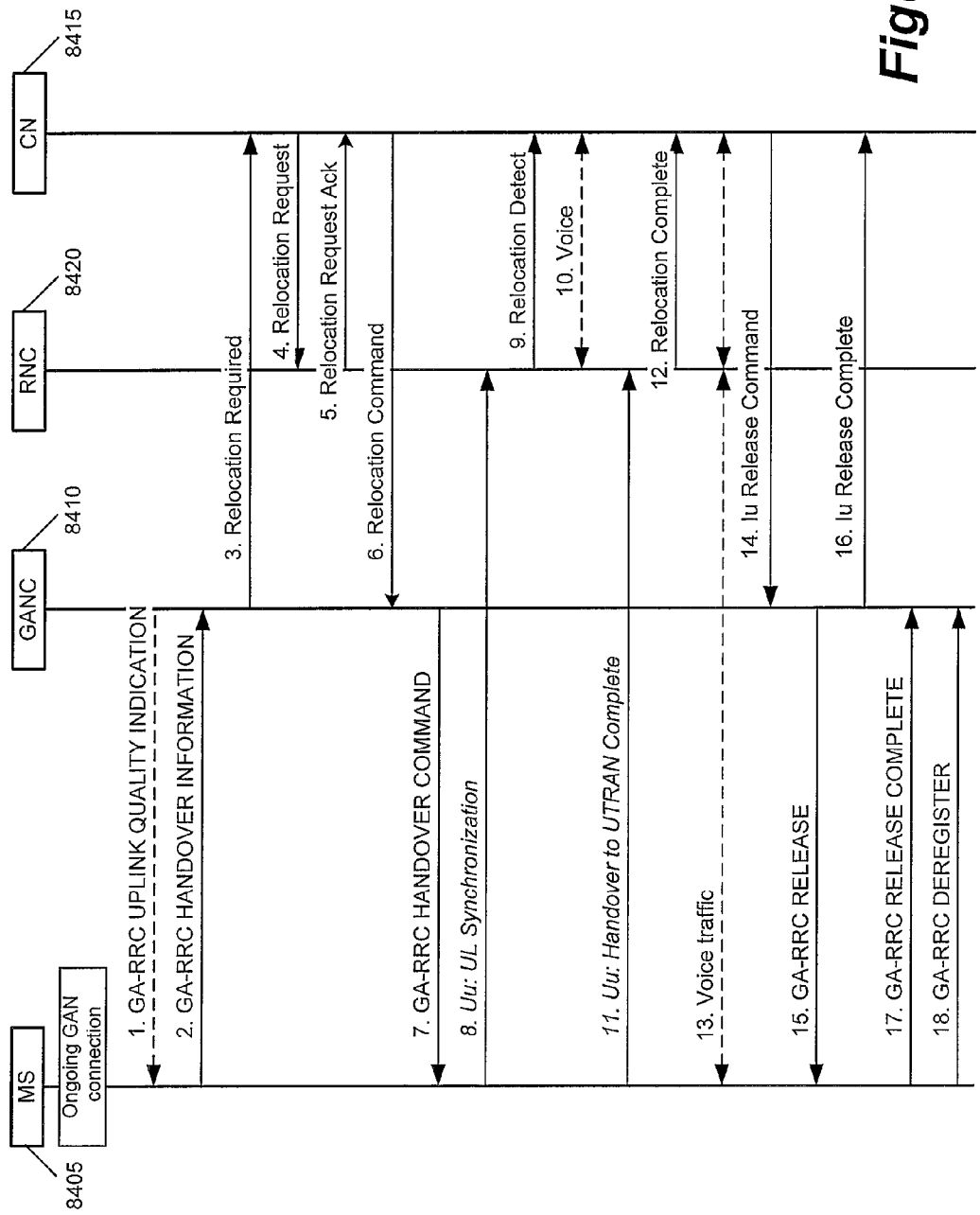
FIG. 84 illustrates the CS handover from GAN to UTRAN procedure in some embodiments.

FIG. 84 illustrates the CS handover from GAN to UTRAN procedure in some embodiments. The handover from GAN procedure is always triggered by the UE 8405. The GANC 8410 may send (in Step 1) a GA-RRC UPLINK QUALITY INDICATION if there is a problem with the uplink quality for the ongoing call. Uplink Quality Indication is information sent by the GANC 8410 to the UE 8405 indicating the crossing of an uplink quality threshold in the uplink direction. Whenever the UE 8405 receives an indication of bad quality, it should start the handover procedure, as described in the next step. Alternatively, UE 8405 can use its local measurements or received RTCP reports, to decide to initiate the handover procedure.

The UE 8405 sends (in Step 2) the GA-RRC HANDOVER INFORMATION message to the Serving GANC 8410 indicating the Channel Mode and a list of candidate target UTRAN and GERAN cells, in order of preference for handover, and includes the received signal strength for each identified cell. The UTRAN cells are identified by the PLMN ID, the LAC and the 3G Cell identity (defined in 3GPP TS 25.331).

If the Serving GANC 8410 selects UTRAN as the target RAT, the handover to UTRAN procedure is performed. The Serving GANC 8410 starts the handover preparation by signaling (in Step 3) to the CN 8415 the need for handover, using Relocation Required and including the UTRAN cell list provided by the UE 8405. The GANC 8410 may include only a subset of the cell list provided by the UE 8405.

The CN 8415 starts the handover procedure towards the target RNC 8420 identified by the Serving GANC 8410. The CN 8415 requests (in Step 4) from the target RNC 8420 to allocate the necessary resources using Relocation Request. The target RNC 8420 builds a Physical Channel Reconfiguration message providing information on the allocated UTRAN resources and sends (in Step 5) it to the CN 8415 through the Relocation Request Acknowledge message.

The CN 8415 signals (in Step 6) the Serving GANC 8410 to handover the UE 8405 to the UTRAN, using Relocation Command message (which includes the Physical Channel Reconfiguration message), ending the handover preparation phase. The Serving GANC 8410 transmits (in Step 7) the GA-RRC HANDOVER COMMAND to the UE 8405 including the details sent by the UTRAN on the target resource allocation.

Target RNS achieves (in Step 8) uplink synchronization on the Uu interface. The target RNC 8420 confirms (in Step 9) the detection of the handover to the CN 8415, using the Relocation Detect message. The CN 8415 may at this point switch (in Step 10) the user plane to the target RNS. The UE 8405 signals (in Step 11) to the UTRAN that the handover is completed, using Handover to UTRAN Complete.

The UTRAN confirms (in Step 12) to the CN 8415 the completion of the handover, via Relocation Complete message. If the user plane has not been switched in Step 10, the CN 8415 switches the user plane to the target RNS. Bi-directional voice traffic is now flowing (in Step 13) between the UE 8405 and CN 8415, via the UTRAN.

On receiving the confirmation of the completion of the handover, the CN 8415 indicates (in Step 14) to the Serving GANC 8410 to release any resources allocated to the UE 8405, via the Iu Release Command. The Serving GANC 8410 commands (in Step 15) the UE 8405 to release resources, using the GA-RRC RELEASE message.

The Serving GANC 8410 confirms (in Step 16) resource release to CN 8415 using the Iu Release Complete message. The UE 8405 confirms (in Step 17) resource release to the Serving GANC 8410 using the GA-RRC RELEASE COMPLETE message. The UE 8405 may finally deregister (in Step 18) from the Serving GANC 8410, using GA-RC DEREGISTER message.

9. GA-RRC Packet Transport Channel Management Procedures

The GA-RRC Packet Transport Channel (GA-RRC PTC) provides the association between the UE and the network for the transport of GPRS user data over the Up interface (i.e., via the GAN in Iu-mode). The PTC uses the GTP-U protocol running over UDP transport. The endpoint addresses of the PTC are identified by the IP addresses and UDP ports assigned to the PTC in the UE and network during the PTC activation procedure. The UDP port number for GTP-U is as defined in 3GPP TS 25.414. Multiple PTC instances between a UE and the network may be activated at the same time, using the same endpoint addresses. Each PTC instance is assigned unique GTP-U Tunnel Endpoint IDs (one on the UE and one on the network) during the activation procedure. The UE and GANC manage the activation and deactivation of the PTC instances based on the requests for data transfer and the configurable PTC Timer.

a) States of the GA-RRC Packet Transport Channel

The UE in the GA-RRC-CONNECTED state can be in one of two PTC substates: PTC-STANDBY or PTC-ACTIVE. PTC-STANDBY: this is the initial/default PTC substate of the UE when in the GA-RRC-CONNECTED state in GAN mode. The UE is not able to send or receive GPRS user data to or from the network. The UE needs to activate the PTC before sending any GPRS user data. When the UE successfully establishes a PTC, the UE transitions to the PTC-ACTIVE substate. PTC-ACTIVE the UE is in the GA-RRC-CONNECTED state and the PTC is active between the UE and the network and the UE is able to send and receive GPRS user data to and from the network. The following are the possible triggers for GA-RRC PTC activation on the UE side: (1) The UE initiates the uplink user data transfer, and (2) the GANC initiates PTC activation; i.e., the UE receives a GA-RRC-ACTIVATE-PTC-REQUEST message from the GANC.

On successful PTC activation and in parallel with transition to the PTC-ACTIVE substate, the UE starts the PTC Timer. When the PTC Timer expires, the UE sends a message to the GANC to initiate PTC deactivation. On successful PTC deactivation, the UE transitions to PTC-STANDBY substate. At any time while in the GA-RRC-CONNECTED state and the PTC-ACTIVE substate, the UE may receive the GA-RRC RELEASE message. In addition to requesting release of the RRC session, this is interpreted by the UE as an implicit PTC deactivate command. At any time while in GAN mode, if the serving RR entity is switched to GSM-RR/UTRAN-RRC, the GA-RRC is disconnected from the GPRS SAPs and the UE enters GERAN/UTRAN mode. Simultaneously, the UE will release the associated PTC regardless of the PTC Timer status. The UE GA-RRC entity maintains one PTC for each active PDP context. The PTC Timer is restarted whenever any uplink user data packet is sent or downlink user data packet is received related to the PDP context. The PTC Timer value is provided to the UE as part of the GAN Registration procedure (i.e., in the GA-RC REGISTER ACCEPT message).

b) PTC Initial Activation

Figure 85:
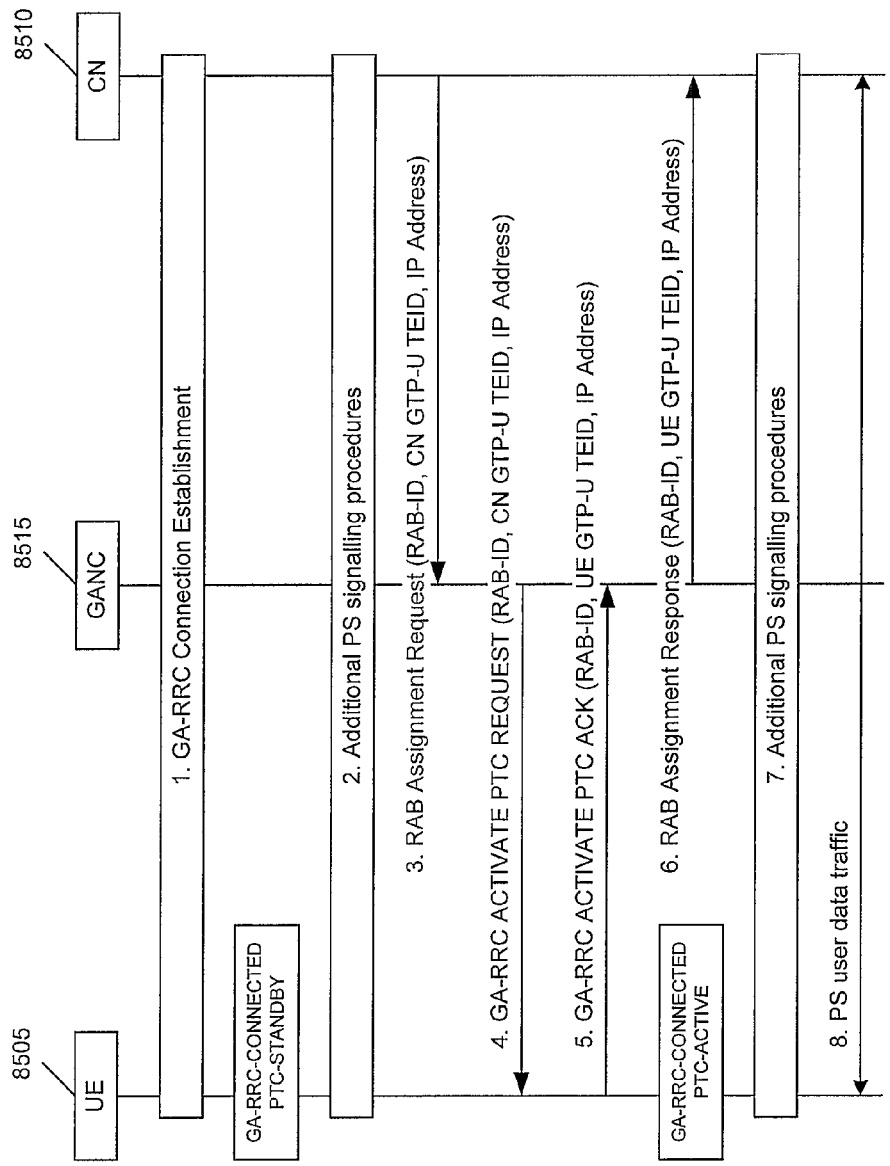
FIG. 85 illustrates the Packet Transport Channel initial activation procedure of some embodiments.

FIG. 85 illustrates the Packet Transport Channel initial activation procedure of some embodiments. The following description assumes the UE 8505 is in the GA-RRC-IDLE state, in some embodiments. The GA-RRC Connection Establishment procedure is performed (in Step 1) as described in clause UE Initiated GA-RRC Connection Establishment, above. The UE 8505 transitions to the GA-RRC-CONNECTED state and the PTC-STANDBY substate. Additional PS signaling procedures are performed (in Step 2).

The CN 8510 (SGSN) initiates (in Step 3) the RAB Assignment procedure and includes the RAB-ID, the CN Transport Layer Address (IP address) and the CN Iu Transport Association (GTP-U Terminal Endpoint Identifier, TEID) for user data. The GANC 8515 sends (in Step 4) the GA-RRC ACTIVATE PTC REQUEST message to the UE 8505 to request activation of the Packet Transport Channel. The message includes the RAB-ID, and the CN IP Address and TEID to allow the UE 8505 to send PTC packets (i.e., GTP-U messages) directly to the SGSN.

The UE 8505 acknowledges (in Step 5) the PTC activation and provides the Transport Layer Address (IP address) and Iu Transport Association (GTP-U TEID) that identifies the UE end of the PTC. The UE 8505 transitions to the PTC-ACTIVE substate and starts the PTC Timer.

Upon receiving the acknowledgment, the GANC 8515 sends (in Step 6) the RAB Assignment Response message to the CN 8510 (SGSN) to complete the RAB Assignment procedure and includes UE IP Address and GTP-U TEID. Additional PS signalling procedures are performed (in Step 7); examples are illustrated in PDP Context Activation and Network Requested PDP Context Activation Sub-sections, below. The UE 8505 initiates (in Step 8) uplink user data transfer via the established PTC and the CN 8510 (SGSN) may use the same transport channel to send downlink user data packets.

c) PTC Data Transfer

Figure 86:
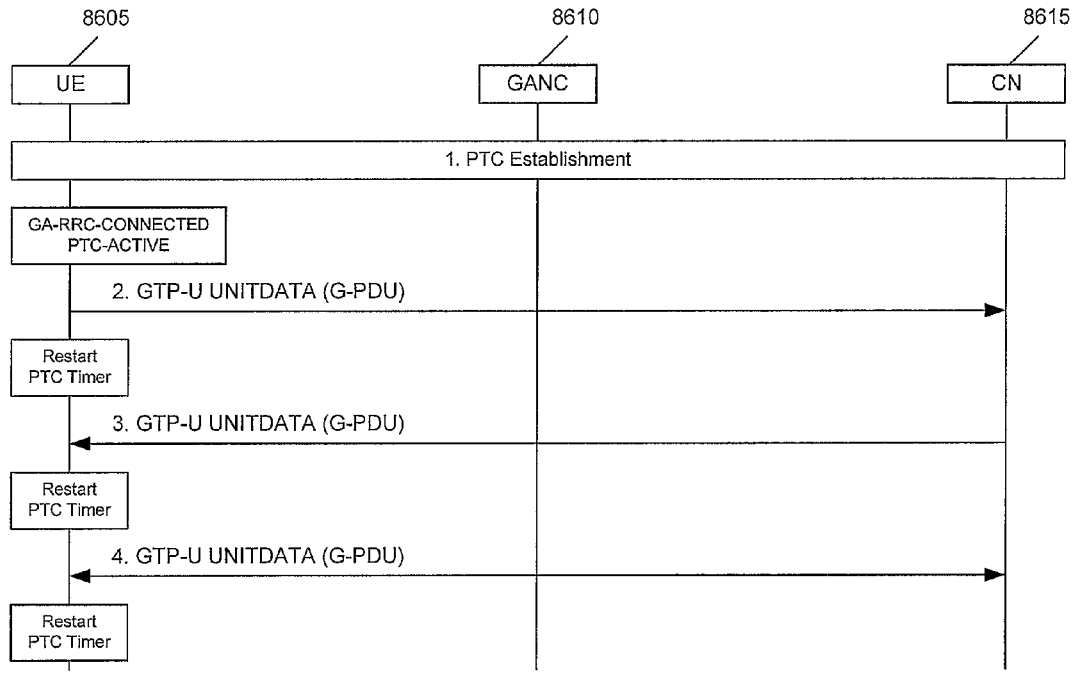
FIG. 86 illustrates the transfer of GPRS user data packets via the GAN Packet Transport Channel in some embodiments.

FIG. 86 illustrates the transfer of GPRS user data packets via the GAN Packet Transport Channel in some embodiments. If required, the GAN PTC is established (in Step 1) as specified in Sub-section VIII.B.9.b: "PTC Initial Activation", above. Upon the GA-RRC PTC establishment, the UE 8605 enters the PTC-ACTIVE substate and starts the PTC Timer. The UE 8605 initiates (in Step 2) the transfer of an uplink user data packet using the standard GTP-U protocol as specified in 3GPP TS 29.060 and restarts the PTC Timer.

The CN 8615 (SGSN) transfers (in Step 3) downlink user data packet utilizing the same PTC associated with the specific PDP context. Downlink user data packets are transferred using the standard GTP-U protocol as specified in 3GPP TS 29.060. Upon receiving the downlink data packet, the UE restarts the associated PTC Timer. Additional uplink and downlink user data packets are transferred (in Step 4) via the same PTC as described in steps 2 and 3, respectively. After each transmission/reception, the UE 8605 restarts the PTC Timer.

d) UE Initiated PTC Deactivation

Figure 87:
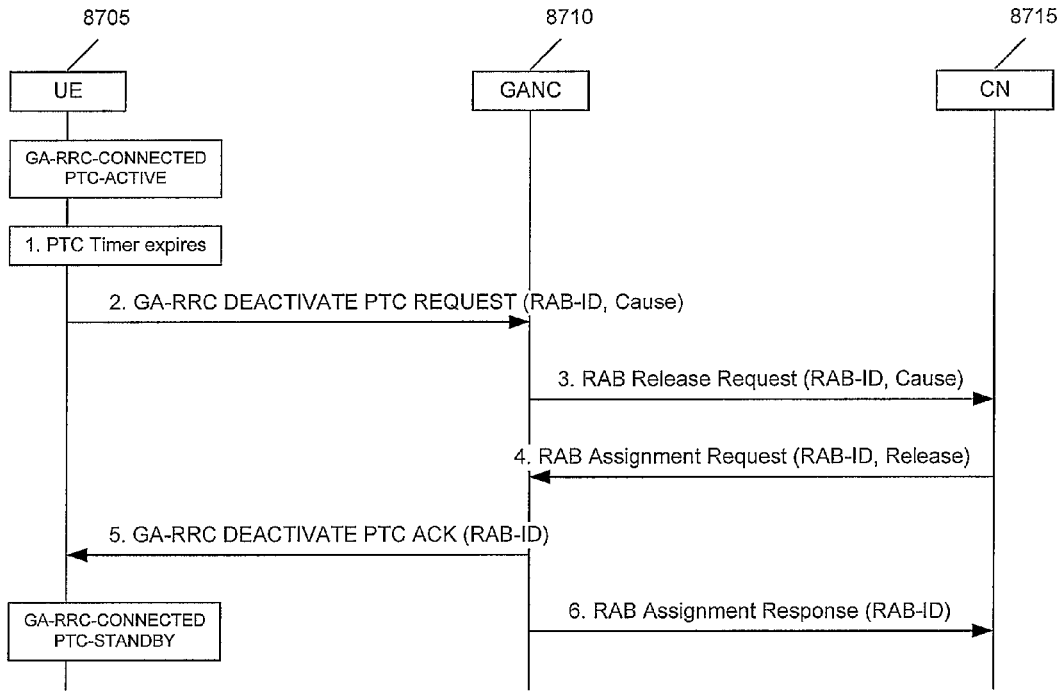
FIG. 87 illustrates the scenario when the user equipment deactivates the Packet Transport Channel after the PTC Timer expires in some embodiments.

FIG. 87 illustrates the scenario when the UE deactivates the Packet Transport Channel after the PTC Timer expires in some embodiments. The UE 8705 is (in Step 1) in the GA-RRC-CONNECTED state and the PTC-ACTIVE substate. The PTC Timer associated with one of the active packet transport channels expires.

The UE 8705 sends (in Step 2) the GA-RRC DEACTIVATE PTC REQUEST message to the GANC 8710, including the RAB-ID to identify the PTC and indicating the normal release as a cause for deactivation. The GANC 8710 sends (in Step 3) a RAB Release Request message to the CN (SGSN) 8715 to request the release of the associated RAB. The CN (SGSN) 8715 responds (in Step 4) with the RAB Assignment Request indicating release.

The GANC 8710 responds (in Step 5) to the UE 8705 with a GA-RRC DEACTIVATE PTC ACK message to acknowledge successful deactivation. The UE 8705 transitions to the PTC-STANDBY substate. The GANC 8710 sends (in Step 6) the RAB Assignment Response message to notify the SGSN 8715 that the RAB Release procedure is complete.

e) UE Initiated PTC Re-Activation

Figure 88:
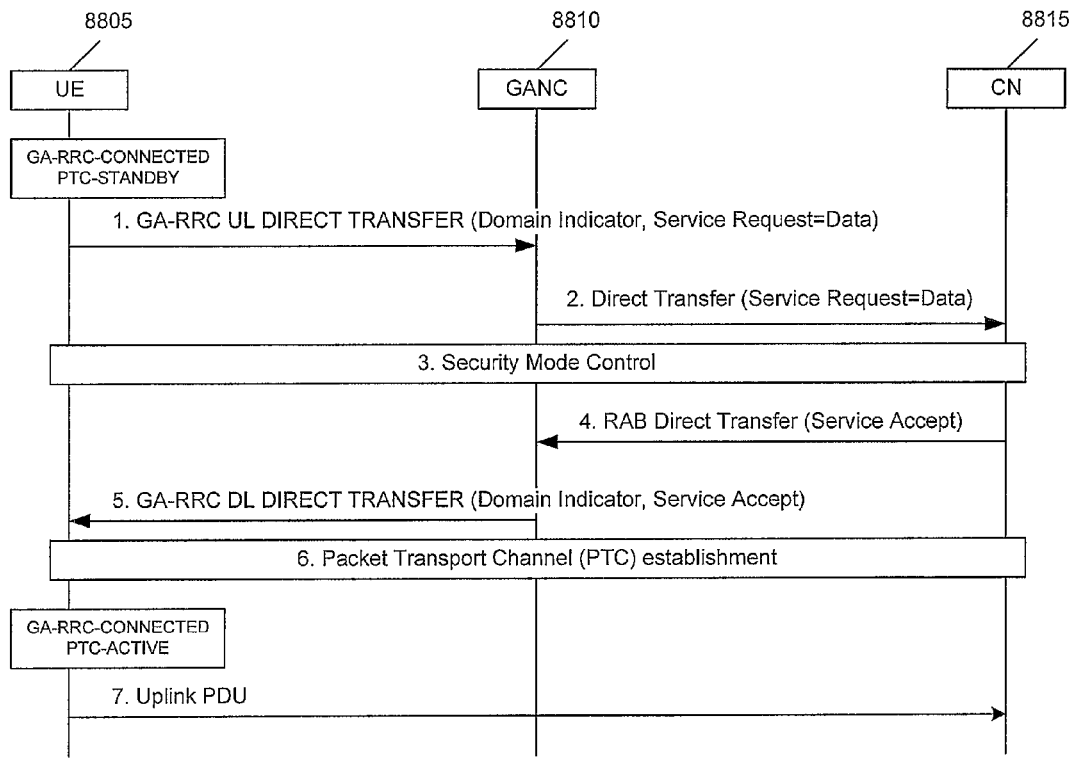
FIG. 88 illustrates the scenario when the user equipment initiates re-activation of the Packet Transport Channel in some embodiments.

FIG. 88 illustrates the scenario when the UE initiates re-activation of the Packet Transport Channel in some embodiments. The UE is in the GA-RRC-CONNECTED and PMM-CONNECTED states; e.g., a PS signaling connection and active PDP context exists between the UE 8805 and CN 8815 but the PTC was previously deactivated by the UE 8805 due to PTC Timer expiry in some embodiments. The UE 8805 is in the GA-RRC-CONNECTED state and the PTC-STANDBY substate. The UE 8805 is in the PMM-CONNECTED state (i.e., a PS signaling connection and an active PDP context exists).

The UE 8805 has a PDU to send. The UE 8805 sends (in Step 1) the Service Request message (with Service type value "Data") to the GANC 8810 in the GA-RRC UL DIRECT TRANSFER message. The GANC 8810 forwards (in Step 2) the Service Request over the existing signaling connection to the CN 8815 using the RANAP Direct Transfer message.

The CN 8815 may optionally initiate (in Step 3) the Security Mode Control procedure described in Sub-section VIII.B.3: "Security Mode Control", above. The CN 8815 responds (in Step 4) with a Service Accept message. The GANC 8810 forwards (in Step 5) the message to the UE 8805.

The UE 8805, GANC 8810 and CN 8815 establish (in Step 6) the GA-RRC Packet Transport Channel (PTC) as described in steps 3-6 in VIII.B.9.b: "PTC Initial Activation", above. The UE 8805 transitions to the PTC-ACTIVE substate and starts the PTC Timer. The UE 8805 sends (in Step 7) the uplink PDU. Additional data transfer may take place.

f) Network Initiated PTC De-activation

Figure 89:
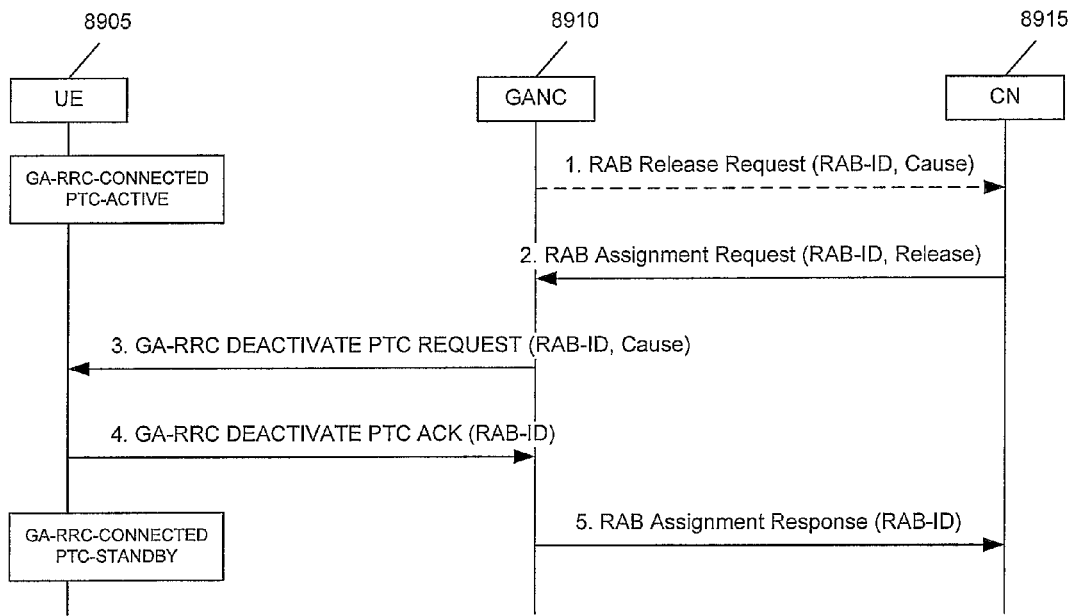
FIG. 89 illustrates the scenario when the network initiates de-activation of the Packet Transport Channel in some embodiments.

FIG. 89 illustrates the scenario when the network initiates de-activation of the Packet Transport Channel in some embodiments. The UE 8905 is in the GA-RRC-CONNECTED state and the PTC-ACTIVE substate.

Optionally, the GANC 8910 may initiate the PTC de-activation procedure; e.g., as a result of an error handling procedure. If so, the GANC 8910 sends (in Step 1) the RAB Release Request message to the CN 8915. The CN (SGSN) 8915 sends (in Step 2) a RAB Assignment Request to request the release of the associated RAB. The release request may include one or more RABs.

The GANC 8910 requests (in Step 3) deactivation of the associated GA-RRC PTC by sending the GA-RRC DEACTIVATE PTC REQUEST message to the UE 8905. The UE 8905 transitions to the PTC-STANDBY substate, stops the PTC Timer and sends (in Step 4) the acknowledgment back to the GANC 8910. Steps 3 and 4 are repeated for each additional RAB/PTC that needs to be released. The GANC 8910 notifies (in Step 5) the CN (SGSN) 8915 that the release was successful.

g) Network Initiated PTC Re-activation

Figure 90:
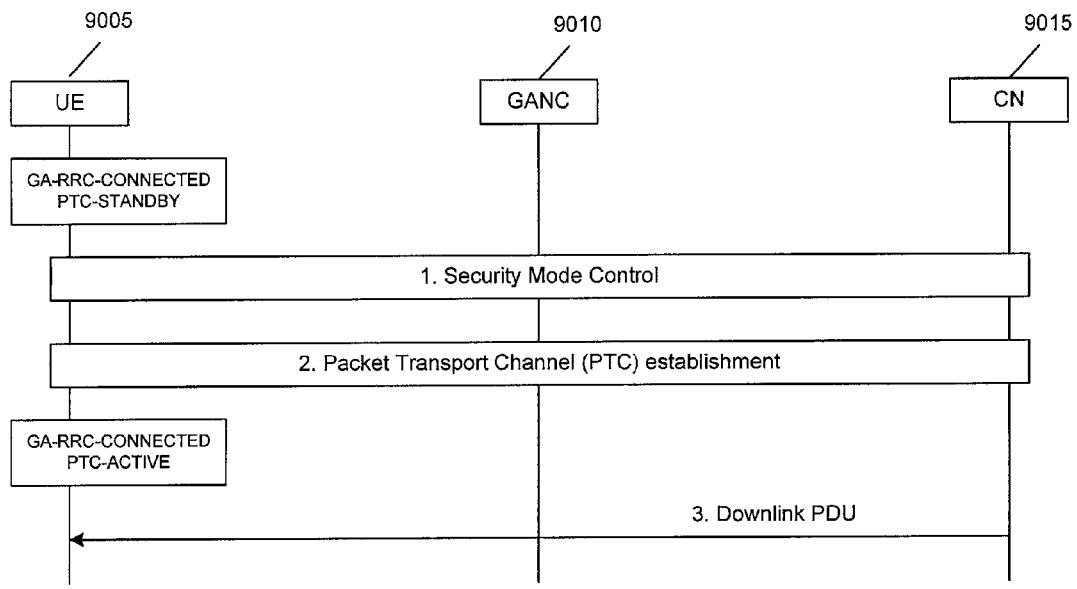
FIG. 90 illustrates the scenario when the network initiates re-activation of the Packet Transport Channel in some embodiments.

FIG. 90 illustrates the scenario when the network initiates re-activation of the Packet Transport Channel in some embodiments. The UE 9005 is in the GA-RRC-CONNECTED and PMM-CONNECTED states; e.g., a PS signaling connection and active PDP context exists between the UE and CN but the PTC was previously deactivated in some embodiments. The UE 9005 is in the GA-RRC-CONNECTED state and the PTC-STANDBY substate. The UE 9005 is in the PMM-CONNECTED state (i.e., a PS signaling connection and an active PDP context exists).

The CN 9015 has a PDU to send to send to the UE 9005. The CN 9015 may optionally initiate (in Step 1) the Security Mode Control procedure described in Sub-section VIII.B.3: "Security Mode Control", above. The UE 9005, GANC 9010 and CN 9015 establish (in Step 2) the GA-RRC Packet Transport Channel (PTC) as described in steps 3-6 in clause in Sub-section VIII.B.9.b: "PTC Initial Activation", above. The UE 9005 transitions to the PTC-ACTIVE substate and starts the PTC Timer. The CN 9015 sends (in Step 3) the downlink PDU. Additional data transfer may take place.

h) Implicit PTC De-Activation Due to UE De-Registration

Figure 96:
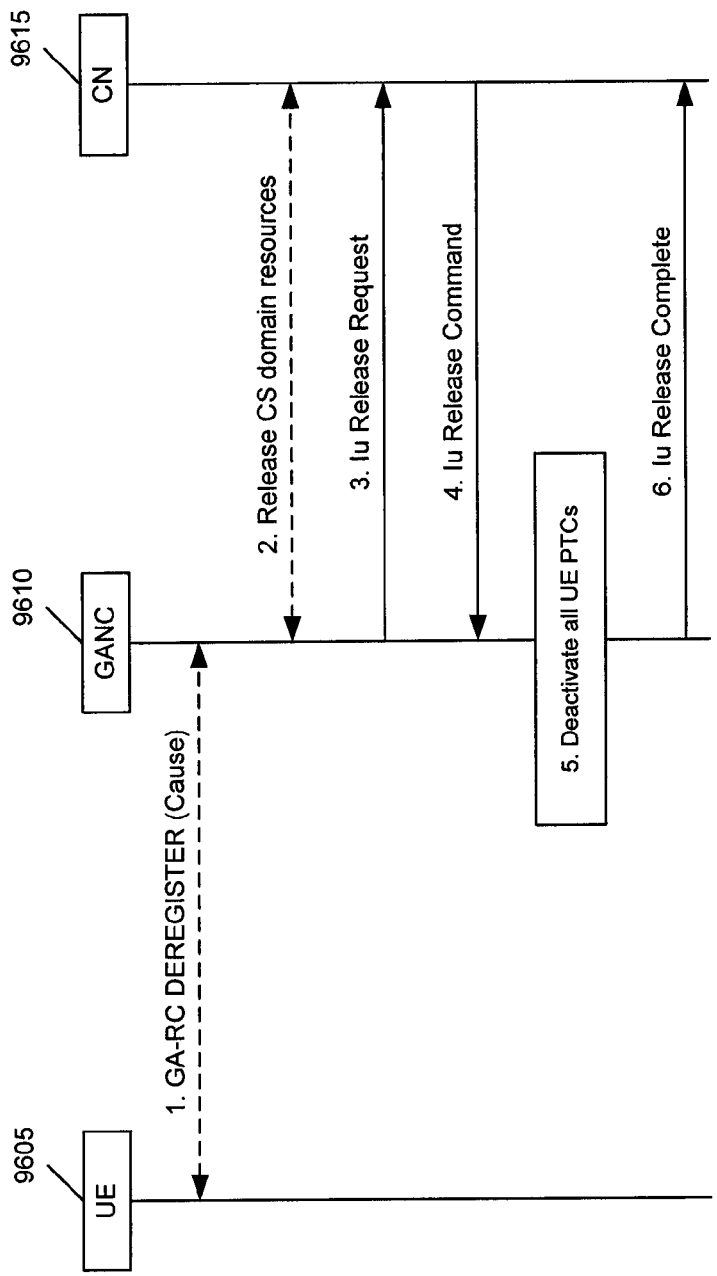
FIG. 96 illustrates the procedure for implicit PTC de-activation in some embodiments.

FIG. 96 illustrates the procedure for implicit PTC de-activation in some embodiments. As part of the GAN de-registration procedure, the GANC needs to release all resources allocated to that UE 9605. GAN de-registration may be initiated either explicitly by the UE 9605 or implicitly by the GANC 9610 if the loss of the signaling connection is detected. Initially, one or more GA-RRC PTCs associated with a UE 9605 are in the PTC-ACTIVE state.

The GAN de-registration procedure is initiated (in Step 1) for the UE 9605 either by the UE 9605 or GANC 9610. Optionally, any outstanding resources associated with the CS Domain are released (in Step 2). Optionally, if there are any outstanding resources associated with the PS Domain, the GANC 9610 initiates (in Step 3) the Iu release procedure to release the corresponding RABs. The CN (SGSN) 9615 responds (in Step 4) with Iu Release Command. Upon receiving the Iu Release Command, the GANC 9610 locally deactivates (in Step 5) all associated PTCs and responds (in Step 6) to the core network (SGSN) 9615 with an Iu Release Complete message.

10. PDP Context Activation

Figure 91:
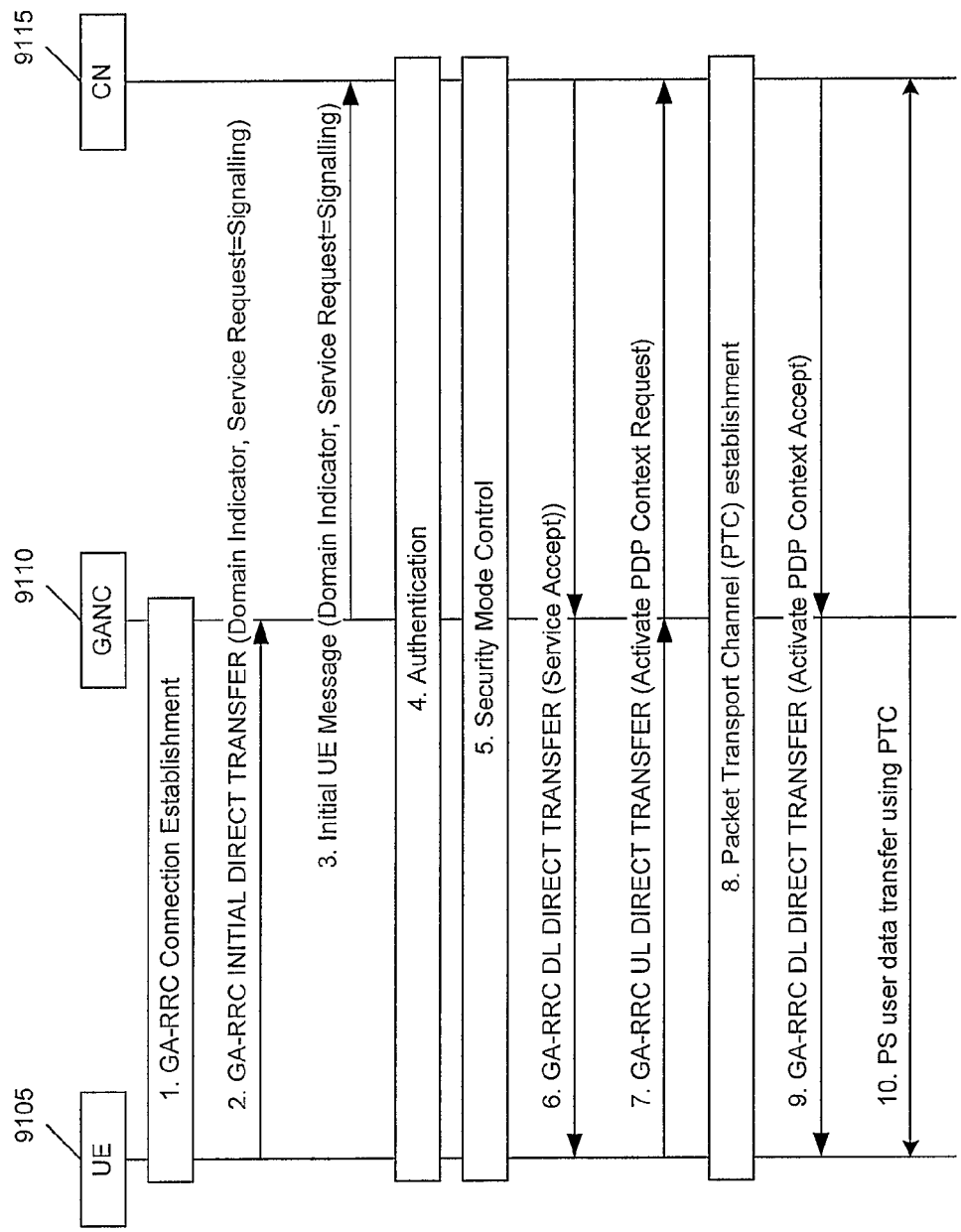
FIG. 91 illustrates the successful user equipment initiated PDP Context Activation procedure in some embodiments.

FIG. 91 illustrates the successful UE-initiated PDP Context Activation procedure, assuming the UE is in GA-RRC-IDLE mode in some embodiments. The GA-RRC Connection Establishment procedure is performed (in Step 1) as described in Sub-section UE Initiated GA-RRC Connection Establishment, above. If a GA-RRC connection already exists (e.g., there is an existing CS call in progress), this step is skipped.

Upon request from the upper layers, the UE 9105 sends (in Step 2) the Service Request message (with Service type value "Signaling") to the GANC 9110 in the GA-RRC INITIAL DIRECT TRANSFER message. The GANC 9110 establishes an SCCP connection to the CN 9115 and forwards (in Step 3) the Service Request to the CN 9115 using the RANAP Initial UE Message. Subsequent NAS messages between the UE 9105 and core network 9115 will be sent between GANC 9110 and CN 9115 using the RANAP Direct Transfer message.

The CN 9115 may optionally authenticate (in Step 4) the UE 9105 using standard UTRAN authentication procedures. The CN 9115 may optionally initiate (in Step 5) the Security Mode Control procedure described in Sub-section VIII.B.3: "Security Mode Control", above.

The CN (SGSN) 9115 responds (in Step 6) with a Service Accept message. The GANC 9110 forwards (in Step 6) the message to the UE 9105. The UE 9105 sends (in Step 7) the Activate PDP Context Request message providing details on the PDP context to the CN 9115. This message is contained within the GA-RRC UL DIRECT TRANSFER between the UE 9105 and the GANC 9110. The GANC 9110 forwards (in Step 7) the Activate PDP Context Request message to the CN 9115.

The UE 9105, GANC 9110 and CN 9115 establish (in Step 8) the GA-RRC Packet Transport Channel (PTC) as described in steps 3-6 in Sub-section VIII.B.9.b: "PTC Initial Activation", above. The CN 9115 indicates (in Step 9) the PDP context establishment is complete using the Activate PDP Context Accept message to the GANC 9110. GANC forwards (in Step 9) this message to the UE 9105 in the GA-RRC DL DIRECT TRANSFER message. The UE 9105 and CN 9115 exchange (in Step 10) user data transfer via the established PTC.

11. Network Requested PDP Context Activation

Figure 92:
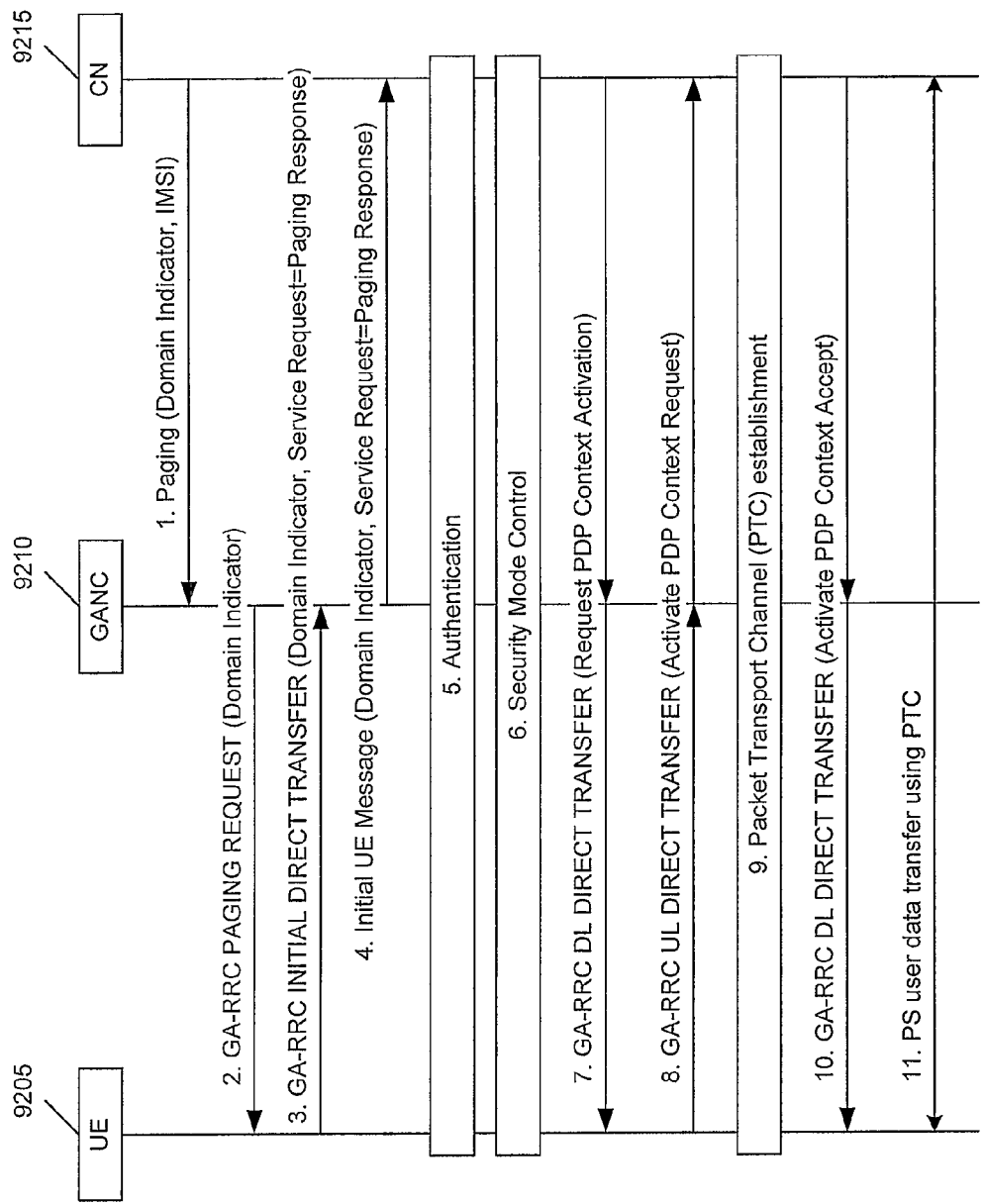
FIG. 92 illustrates the successful Network-Requested PDP Context Activation procedure in some embodiments.

FIG. 92 illustrates the successful Network-Requested PDP Context Activation procedure, assuming the UE is in GA-RRC-IDLE mode, in some embodiments. Initially, the CN (SGSN) 9215 received downlink user data to transfer to the UE and the associated RAB is not established. The UE is in PMM-IDLE state.

The CN (SGSN) 9215 sends (in Step 1) the RANAP Paging message to the UE 9205 via the GANC 9210 to locate the user. The paging request indicates paging for PS Domain signaling. The GANC 9210 forwards (in Step 2) the paging information to the UE 9205 in the GA-RRC PAGING REQUEST message.

The UE 9205 responds (in Step 3) to the SGSN 9215 via the GANC 9210 with a Service Request message (with Service type value "Paging response"). The message is encapsulated within the GA-RRC INITIAL DIRECT TRANSFER message. The GANC 9210 forwards (in Step 4) the Service Request message to the SGSN 9215 encapsulated in the RANAP Initial UE Message.

The CN 9215 may optionally authenticate (in Step 5) the UE 9205 using standard UTRAN authentication procedures. The CN 9215 may optionally initiate (in Step 6) the Security Mode Control procedure described in Sub-section VIII.B.3: "Security Mode Control", above.

The CN 9215 sends (in Step 7) the Request PDP Context Activation message to the GANC 9210. The GANC 9210 forwards (in Step 7) this message to the UE 9205 in the GA-RRC DL DIRECT TRANSFER message.

The UE 9205 sends (in Step 8) the Activate PDP Context Request message providing details on the PDP context to the CN 9215. This message is contained within the GA-RRC UL DIRECT TRANSFER between the UE 9205 and the GANC 9210. The GANC forwards (in Step 8) the Activate PDP Context Request message to the CN 9215. The UE 9205, GANC 9210 and CN 9215 establish (in Step 9) the GA-RRC Packet Transport Channel (PTC) as described in steps 3-6 in Sub-section VIII.B.9.b: "PTC Initial Activation", above.

The CN 9215 indicates (in Step 10) the PDP context establishment is complete using the Activate PDP Context Accept message to the GANC 9210. GANC forwards (in Step 10) this message to the UE 9205 in the GA-RRC DL DIRECT TRANSFER message. The UE 9205 and CN 9215 exchange (in Step 11) user data transfer via the established PTC.

12. PDP Context Activation with Active CS Session

Figure 93:
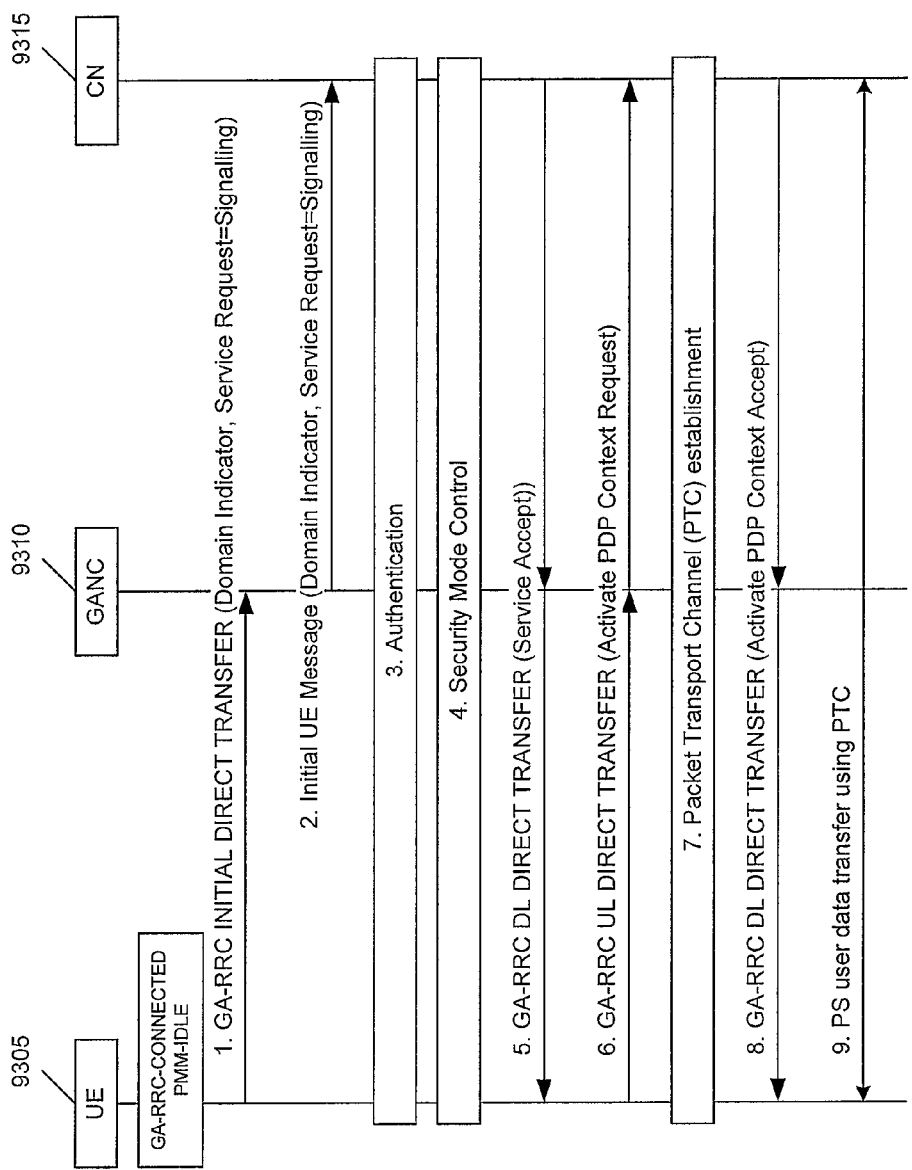
FIG. 93 illustrates the successful UE-initiated PDP Context Activation procedure in some embodiments.

FIG. 93 illustrates the successful UE-initiated PDP Context Activation procedure, assuming the UE 9305 is in GA-RRC-CONNECTED mode (e.g., existing CS session) in some embodiments. The GA-RRC Connection Establishment procedure is performed as described in Sub-section UE Initiated GA-RRC Connection Establishment, above. If a GA-RRC connection already exists (e.g., there is an existing CS call in progress), this step is skipped.

Upon request from the upper layers, the UE 9305 sends (in Step 1) the Service Request message (with Service type value "Signaling") to the GANC 9310 in the GA-RRC INITIAL DIRECT TRANSFER message. The GANC 9310 establishes (in Step 2) an SCCP connection to the CN 9315 and forwards the Service Request to the CN using the RANAP Initial UE Message. Subsequent NAS messages between the UE 9305 and core network 9315 will be sent between GANC 9310 and CN 9315 using the RANAP Direct Transfer message.

The CN 9315 may optionally authenticate (in Step 3) the UE 9305 using standard UTRAN authentication procedures. The CN 9315 may optionally initiate (in Step 4) the Security Mode Control procedure described in Sub-section VIII.B.3: "Security Mode Control", above.

The CN (SGSN) 9315 responds (in Step 5) with a Service Accept message. The GANC 9310 forwards (in Step 5) the message to the UE 9305. The UE 9305 sends (in Step 6) the Activate PDP Context Request message providing details on the PDP context to the CN 9315. This message is contained within the GA-RRC UL DIRECT TRANSFER between the UE 9305 and the GANC 9310. The GANC forwards (in Step 6) the Activate PDP Context Request message to the CN 9315.

The UE 9305, GANC 9310 and CN 9315 establish (in Step 7) the GA-RRC Packet Transport Channel (PTC) as described in steps 3-6 in Sub-section VIII.B.9.b: "PTC Initial Activation", above. The CN 9315 indicates (in Step 8) the PDP context establishment is complete using the Activate PDP Context Accept message to the GANC 9310. GANC forwards (in Step 8) this message to the UE 9305 in the GA-RRC DL DIRECT TRANSFER message. The UE 9305 and CN 9315 exchange (in Step 9) user data transfer via the established PTC.

13. SRNS Relocation

Serving RNS Relocation Procedure is performed for an UE in PMM-CONNECTED state to move the RAN connection point from old RNC to the new RNC. Two scenarios will be considered: (1) SRNS Relocation from RNC to GANC; i.e. from UTRAN to GAN, and (2) SRNS Relocation from GANC to RNC; i.e., from GAN to UTRAN. These procedures include several options based on the support for Iur interface and lossless SRNS Relocation. It is assumed in this version of the GAN Specification that the Iur interface is not supported. Additionally, given that PDCP protocol is not included in the GAN solution in order to optimize the data transport, it is assumed that the lossless SRNS Relocation is not supported either.

a) SRNS Relocation from UTRAN to GAN

Figure 94:
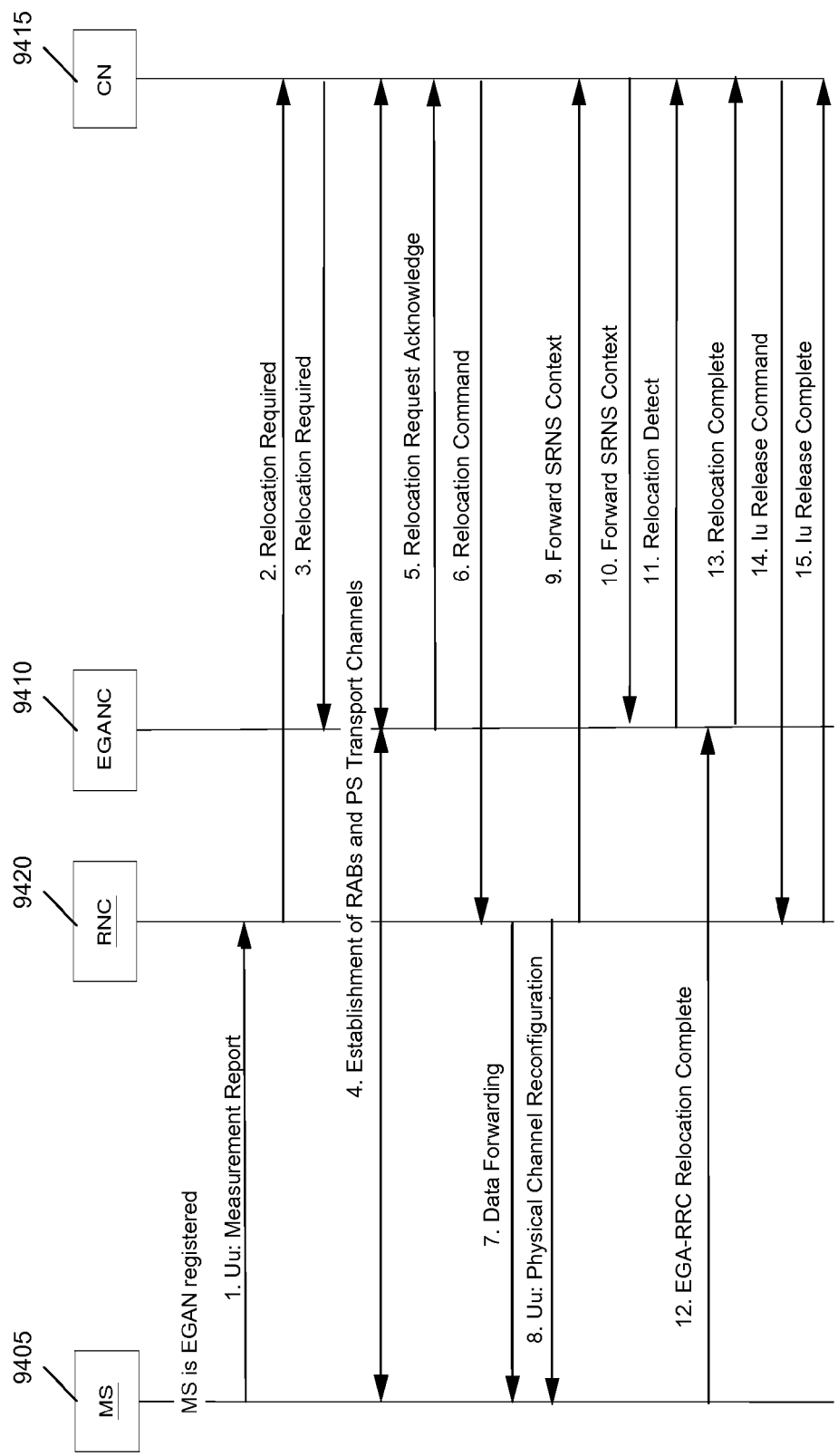
FIG. 94 illustrates SRNS relocation procedure from UTRAN to GAN for a UE that is in PMM Connected state in some embodiments.

FIG. 94 illustrates SRNS relocation procedure from UTRAN to GAN for a UE that is in PMM Connected state in some embodiments. It is assumed that Iur interface and lossless SRNS relocation procedure are not supported. Initially, the ULE 9405 is registered for GAN service and in PMM Connected state. At lease one PDP context is active with maximum bitrate higher than 0.

After detecting GAN coverage and successfully registering for GAN service, the UE 9405 sends (in Step 1) measurement report to the RNC 9410 indicating the highest signal level for the GAN cell. The RNC 9410 sends (in Step 2) Relocation Required message to the core network (SGSN) 9420 to initiate the SRNS relocation procedure. The message indicates the GANC 9415 as a target RNC 9410 and includes the information necessary for the relocation coordination.

The core network (SGSN) 9420 forwards (in Step 3) the request to the GANC 9415. The message includes the list of the RABs that need to be setup and associated information. Based on the Relocation Request message, the CN 9420 and GANC 9415 establish (in Step 4) requested RABs and associated PS Transport Channels as specified in GA-RRC Packet Transport Channel Management Procedures Sub-section, above.

The GANC 9415 responds (in Step 5) to the core network 9420 with acknowledgment including Target RNC 9410 to Source RNC Transport Container. The core network (SGSN) 9420 proceeds (in Step 6) with relocation by sending a Relocation Command to the old RNC that includes the Target RNC to Source RNC Transport Container.

The RNC 9410 starts forwarding (in Step 7) of data to the UE 9405 for the RABs that are subject to forwarding. The forwarding is performed for downlink user data only and is based on the Transport Layer Address and Iu Transport Association received from the GANC 9415.

The RNC 9410 sends (in Step 8) the PHYSICAL CHANNEL RECONFIGURATION message to the UE 9405 to initiate relocation to GAN. The RNC 9410 continues with relocation by forwarding (in Step 9) the SRNS Context information to the GANC 9415 via the core network (SGSN) 9420. The core network (SGNS) 9420 forwards (in Step 10) the SRNS Context to the GANC 9415. The GANC 9415 responds (in Step 11) with a Relocation Detect message.

The UE 9405 sends (in Step 12) a GA-RRC Relocation Complete message to the GANC 9415 to indicate successful relocation. The GANC 9415 sends (in Step 13) the Relocation Complete message to the core network (SGSN) 9420 to complete the procedure.

Upon receiving the Relocation Complete message, the core network (SGSN) 9420 switches user plane from RNC 9410 to GANC (UE) and initiates (in Step 14) Iu Release procedure towards the RNC 9410. After the data forwarding timer expires and after releasing the associated resources, the RNC 9410 responds (in Step 15) with Iu Release Complete message to the core network (SGSN) 9420.

14. Short Message Service

GAN provides support for both Circuit Switched and Packet Switched SMS services. GAN-attached and GPRS enabled UEs will be able to send and receive SMS messages via the GAN.

a) CS-Based SMS

CS-based SMS support in GAN is based on the same mechanism that is utilized for CS mobility management and call control. On the UE side, the SMS layers (including the supporting CM sub layer functions) utilize the services of the MM layer to transfer SMS messages per standard circuit switched UMTS implementation. The SM-CP protocol is effectively tunnelled between the UE and the CN, using GA-RRC messages from the UE to the GANC, where the GANC relays the SM-CP to RANAP messages for transport over the Iu-cs interface. As with the mobility management and call control procedures, the secure IPSec tunnel and TCP session are used to provide secure and reliable SMS delivery over the IP network.

b) PS-based SMS

PS-based SMS message transfer is based on the same mechanism as the transfer of the PS mobility management and session management signaling messages. On the UE side, the SMS layers (including the supporting CM sub layer functions) utilize the services of the RRC (i.e., GA-RRC) layer to transfer SMS messages per standard packet switched UMTS implementation. As with mobility management and session management signaling, the secure IPsec tunnel and TCP session is used to provide secure and reliable PS-based SMS delivery over the IP network.

IX. Computer System

Figure 95:
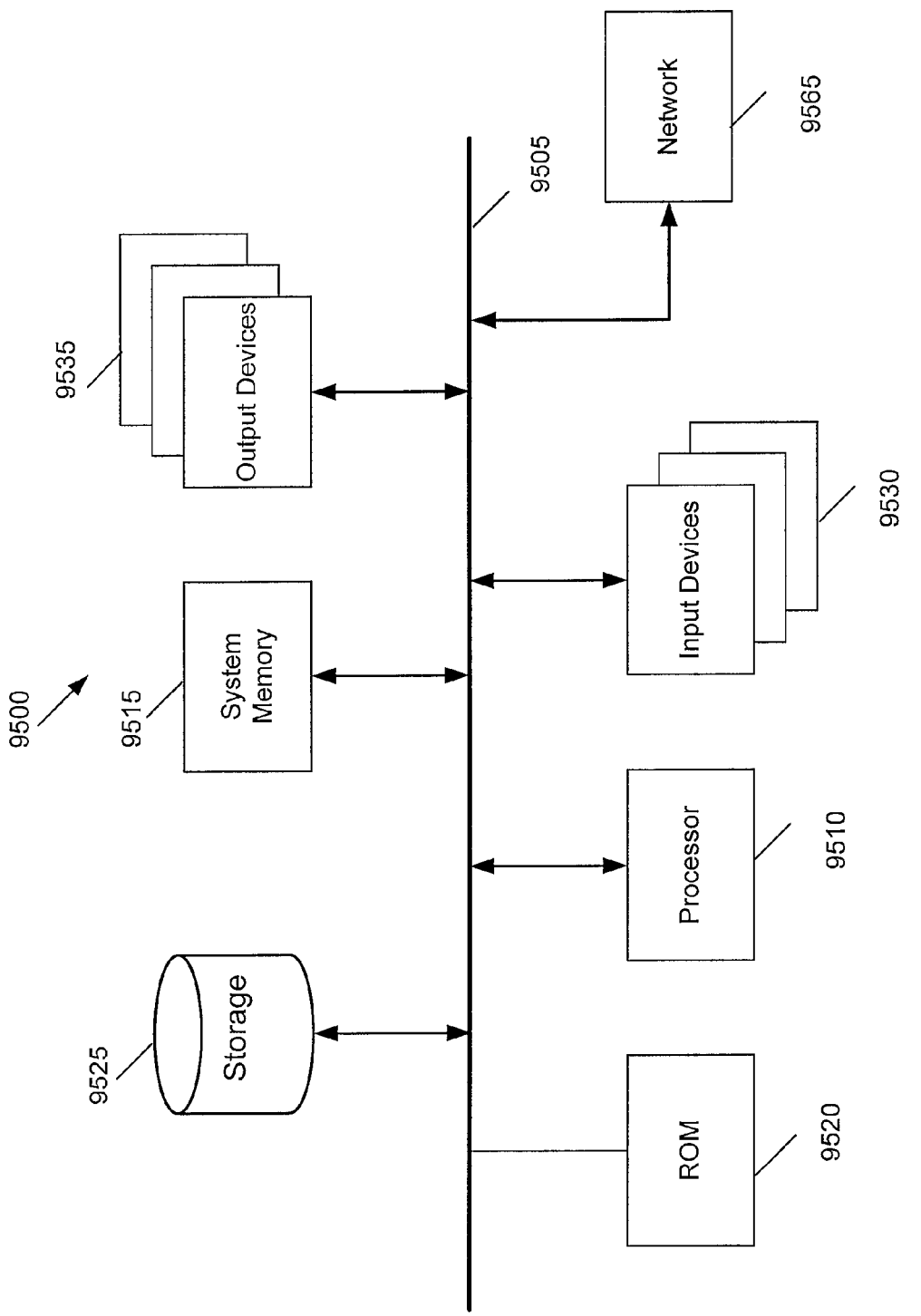
FIG. 95 conceptually illustrates a computer system with which some embodiments of the invention are implemented.

FIG. 95 conceptually illustrates a computer system with which some embodiments of the invention are implemented. The computer system 9500 includes a bus 9505, a processor 9510, a system memory 9515, a read-only memory 9520, a permanent storage device 9525, input devices 9530, and output devices 9535.

The bus 9505 collectively represents all system, peripheral, and chipset buses that support communication among internal devices of the computer system 9500. For instance, the bus 9505 communicatively connects the processor 9510 with the read-only memory 9520, the system memory 9515, and the permanent storage device 9525.

From these various memory units, the processor 9510 retrieves instructions to execute and data to process in order to execute the processes of the invention. In some embodiments the processor comprises a Field Programmable Gate Array (FPGA), an ASIC, or various other electronic components for executing instructions. The read-only-memory (ROM) 9520 stores static data and instructions that are needed by the processor 9510 and other modules of the computer system. The permanent storage device 9525, on the other hand, is a read-and-write memory device. This device is a non-volatile memory unit that stores instruction and data even when the computer system 9500 is off. Some embodiments of the invention use a mass-storage device (such as a magnetic or optical disk and its corresponding disk drive) as the permanent storage device 9525. Some embodiments use one or more removable storage devices (flash memory card or memory stick) as the permanent storage device.

Like the permanent storage device 9525, the system memory 9515 is a read-and-write memory device. However, unlike storage device 9525, the system memory is a volatile read-and-write memory, such as a random access memory. The system memory stores some of the instructions and data that the processor needs at runtime.

Instructions and/or data needed to perform processes of some embodiments are stored in the system memory 9515, the permanent storage device 9525, the read-only memory 9520, or any combination of the three. For example, the various memory units contain instructions for processing multimedia items in accordance with some embodiments. From these various memory units, the processor 9510 retrieves instructions to execute and data to process in order to execute the processes of some embodiments.

The bus 9505 also connects to the input and output devices 9530 and 9535. The input devices enable the user to communicate information and select commands to the computer system. The input devices 9530 include alphanumeric keyboards and cursor-controllers. The output devices 9535 display images generated by the computer system. The output devices include printers and display devices, such as cathode ray tubes (CRT) or liquid crystal displays (LCD). Finally, as shown in FIG. 95, bus 9505 also couples computer 9500 to a network 9565 through a network adapter (not shown). In this manner, the computer can be a part of a network of computers (such as a local area network ("LAN"), a wide area network ("WAN"), or an Intranet) or a network of networks (such as the Internet).

It should be recognized by one of ordinary skill in the art that any or all of the components of computer system 9500 may be used in conjunction with the invention. For instance, some or all components of the computer system described with regards to FIG. 95 comprise some embodiments of the UE, FAP, GANC, and other equipments described above. Moreover, one of ordinary skill in the art will appreciate that any other system configuration may also be used in conjunction with the invention or components of the invention.

X. Definitions and Abbreviations

The following is a list of definitions and abbreviations used:

| | |
|---|---|
| AAA | Authentication, Authorization and Accounting |
| AKA | Authentication and Key Agreement |
| AP | Access Point |
| AS | Access Stratum |
| BSC | Base Station Controller |
| BSS | Base Station Subsystem |
| BSSGP | Base Station System GPRS Protocol |
| BSSMAP | Base Station System Management Application Part |
| CC | Call Control |
| CGI | Cell Global Identification |
| CM | Connection Management |
| CN | Core Network |
| CS | Circuit Switched |
| CTM | Cellular Text Telephone Modem |
| DNS | Domain Name System |
| DTM | Dual Transfer Mode |
| EAP | Extensible Authentication Protocol |
| GA-CSR | Generic Access - Circuit Switched Resources |
| GA-PSR | Generic Access - Packet Switched Resources |

-continued

| | |
|---|---|
| GA-RC | Generic Access - Resource Control |
| GAN | Generic Access Network |
| GANC | Generic Access Network Controller |
| ETSI | European Telecommunications Standards Institute |
| FCC | US Federal Communications Commission |
| FQDN | Fully Qualified Domain Name |
| GAD | Geographical Area Description |
| GERAN | GSM EDGE Radio Access Network |
| GGSN | Gateway GPRS Support Node |
| GMM/SM | GPRS Mobility Management and Session Management |
| GPRS | General Packet Radio Service |
| GSM | Global System for Mobile communications |
| GSN | GPRS Support Node |
| HLR | Home Location Register |
| HPLMN | Home PLMN |
| IETF | Internet Engineering Task Force |
| IKE | Internet Key Exchange |
| IKEv2 | IKE Version 2 |
| IMEISV | International Mobile station Equipment Identity and Software Version number |
| IMSI | International Mobile Subscriber Identity |
| IP | Internet Protocol |
| LA | Location Area |
| LAI | Location Area Identity |
| LLC | Logical Link Control |
| MAC | Medium Access Control |
| MAC | Message Authentication Code |
| MM | Mobility Management |
| MS | Mobile Station |
| MSC | Mobile Switching Center |
| MTP1 | Message Transfer Part layer 1 |
| MTP2 | Message Transfer Part layer 2 |
| MTP3 | Message Transfer Part layer 3 |
| NAS | Non-Access Stratum |
| PDP | Packet Data Protocol |
| PDU | Protocol Data Unit |
| PLMN | Public Land Mobile Network |
| PSAP | Public Safety Answering Point - A PSAP is an emergency services network element that is responsible for answering emergency calls |
| PSTN | Public Switched Telephone Network |
| P-TMSI | Packet - TMSI |
| QoS | Quality of Service |
| RA | Routing Area |
| RAC | Routing Area Code |
| RAI | Routing Area Identity |
| RAT | Radio Access Technology |
| RLC | Radio Link Control |
| RNC | Radio Network Controller |
| RNS | Radio Network Subsystem |
| RTCP | Real Time Control Protocol |
| RTP | Real Time Protocol |
| SCCP | Signaling Connection Control Part |
| SEGW | SEcurity GateWay |
| SGSN | Serving GPRS Support Node |
| SIM | Subscriber Identity Module |
| SMLC | Serving Mobile Location Center |
| SMS | Short Message Service |
| SNDCP | Sub-Network Dependent Convergence Protocol |
| TBF | Temporary Block Flow |
| TC | Transport Channel |
| TCP | Transmission Control Protocol |
| TFO | Tandem Free Operation |
| TMSI | Temporary Mobile Subscriber Identity |
| TrFO | Transcoder Free Operation |
| TTY | Text Telephone or TeleTYpewriter |
| UE | User Equipment |
| UDP | User Datagram Protocol |
| UMTS | Universal Mobile Telecommunication System |
| UTRAN | UMTS terrestrial Radio Access Network |
| Up | Up is the Interface between UE and GANC |
| VLR | Visited Location Register |
| VPLMN | Visited Public Land Mobile Network |

While the invention has been described with reference to numerous specific details, one of ordinary skill in the art will recognize that the invention can be embodied in other specific forms without departing from the spirit of the invention. For instance the specific sequencing of procedures described and their associated attributes may be modified. Thus, one of ordinary skill in the art would understand that the invention is not to be limited by the foregoing illustrative details, but rather is to be defined by the appended claims.

What is claimed is:

1. A communication system comprising:
   a) a first communication system comprising a licensed radio access network and a core network comprising a serving general packet radio service (GPRS) support node (SGSN) and a gateway GPRS support node (GGSN) communicatively coupled to the SGSN, wherein the SGSN comprises:
      i) a user datagram protocol (UDP) protocol layer; and
      ii) a GPRS tunnelling protocol (GTP-U) protocol layer over said UDP protocol layer of the SGSN;
   b) a second generic access network (GAN) comprising a generic access network controller (GANC), wherein the GANC is communicatively coupled to the SGSN of the first communication system through a universal mobile telecommunication system (UMTS) terrestrial radio access network (UTRAN) Iu interface; and
   c) a user equipment (UE),
   wherein the GANC comprises:
      i) a UDP protocol layer;
      ii) a GTP-U protocol layer over said UDP protocol layer of the GANC;
      iii) a remote Internet Protocol (IP) layer below said UDP protocol layer of the GANC; and
      iv) an IPSec layer below said remote IP layer of the GANC,
   wherein the UE comprises:
      i) a UDP protocol layer;
      ii) a GTP-U protocol layer over said UDP protocol layer of the UE;
      iii) a remote IP layer below said UDP protocol layer of the UE; and
      iv) an IPSec layer below said remote IP layer of the UE,
   wherein the UDP protocol layer of the GANC is communicatively coupled to the UDP protocol layer of the UE,
   wherein the GTP-U protocol layer of the GANC is communicatively coupled to the GTP-U protocol layer of the UE,
   wherein the GTP-U protocol layer of the GANC is directly coupled to the GTP-U protocol layer of the SGSN,
   wherein the remote IP layer of the GANC is communicatively coupled to the remote IP layer of the UE,
   wherein the IPSec layer of the GANC is communicatively coupled to the IPSec layer of the UE, and
   wherein the direct coupling of the GTP-U protocol layer of the GANC to the GTP-U protocol layer of the SGSN avoids going through the GGSN.

2. The communication system of claim 1 further comprising a generic IP network comprising a transport IP protocol layer and a set of access protocol layers below the transport IP protocol layer of the generic IP network.

3. The communication system of claim 2, wherein:
   a) the GANC further comprises:
      i) a transport IP protocol layer below the IPSec layer of the GANC; and
      ii) a set of access protocol layers below the transport IP protocol layer of the GANC; and
   b) the UE further comprises:
      i) a transport IP protocol layer below the IPSec layer of the UE; and
      ii) a set of access protocol layers below the transport IP protocol layer of the UE, wherein the transport IP protocol layer of the GANC is communicatively coupled to the transport IP protocol layer of the UE through the transport IP protocol layer of the generic IP network, wherein the set of access protocol layers of the GANC are communicatively coupled to the set of access protocol layers of the UE through the set of access protocol layers of the generic IP network.

4. The communication system of claim 1, wherein the UDP protocol layer of the GANC is communicatively coupled to the UDP protocol layer of the SGSN.

5. The communication system of claim 1, wherein the GANC further comprises an IP protocol layer below said UDP protocol layer of the GANC, wherein the SGSN further comprises an IP protocol layer below said UDP protocol layer of the SGSN, wherein the IP protocol layer of the GANC is communicatively coupled to the IP protocol layer of the SGSN.

6. The communication system of claim 5, wherein the GANC further comprises a set of data transport lower layers below said IP protocol layer of the GANC, wherein the SGSN further comprises a set of data transport lower layers below said IP protocol layer of the SGSN, wherein the set of data transport lower layers of the GANC is communicatively coupled to the set of data transport lower layers of the SGSN.

7. The communication system of claim 1, wherein the Iu interface is an Iu-ps interface.

8. The communication system of claim 1, wherein user data is carried transparently between the UE and the core network through the SGSN to the GGSN.

9. The communication system of claim 1, wherein the GANC establishes an active GTP-U path between the GANC and the SGSN.

10. The communication system of claim 9, wherein packet switched (PS) user data is carried transparently between the UE and the SGSN through the active GTP-U path.

11. The communication system of claim 10, wherein the PS user data is carried transparently between the UE and the SGSN through a Up interface GTP-U tunnel between the UE and the GANC.

12. The communication system of claim 1 further comprising a plurality of UEs, wherein the GANC minimizes a number of active GTP-U paths presented to the SGSN by (i) establishing a plurality of GTP-U tunnels between the plurality of UEs and the GANC and (ii) presenting one active GTP-U path to the SGSN.

13. The communication system of claim 12, wherein the GANC appears to the core network as a UTRAN radio network controller (RNC).

14. The communication system of claim 12, wherein packet switched (PS) user data is carried transparently between the plurality of UEs and the SGSN through the active GTP-U path.

15. The communication system of claim 1, wherein packet switched (PS) user data in GTP-U protocol data unit (PDU) messages are carried transparently between the UE and the core network through the SGSN to the GGSN.

16. The communication system of claim 1, wherein the GANC (i) terminates a Up interface GTP-U tunnel between the UE and the GANC and (ii) terminates an Iu-ps interface GTP-U tunnel between the SGSN and the GANC.

17. A communication system comprising:
a) a first communication system comprising a licensed radio access network and a core network comprising a serving general packet radio service (GPRS) support node (SGSN) and a gateway GPRS support node (GGSN) communicatively coupled to the SGSN,
b) a second generic access network (GAN) comprising a generic access network controller (GANC), wherein the GANC is communicatively coupled to the SGSN of the first communication system through a universal mobile telecommunication system (UMTS) terrestrial radio access network (UTRAN) Iu interface; and
c) a user equipment (UE),
wherein the GANC comprises:
  i) a user datagram protocol (UDP) protocol layer;
  ii) a GPRS tunnelling protocol (GTP-U) protocol layer over said UDP protocol layer of the GANC;
  iii) a remote Internet Protocol (IP) layer below said UDP protocol layer of the GANC; and
  iv) an IPSec layer below said remote IP layer of the GANC,
wherein the UE comprises:
  i) a UDP protocol layer;
  ii) a GTP-U protocol layer over said UDP protocol layer of the UE;
  iii) a remote IP layer below said UDP protocol layer of the UE; and
  iv) an IPSec layer below said remote IP layer of the UE,
wherein the UDP protocol layer of the GANC is communicatively coupled to the UDP protocol layer of the UE,
wherein the GTP-U protocol layer of the GANC is communicatively coupled to the GTP-U protocol layer of the UE,
wherein the GTP-U protocol layer of the GANC is directly coupled to a GTP-U protocol layer of the SGSN,
wherein the remote IP layer of the GANC is communicatively coupled to the remote IP layer of the UE,
wherein the IPSec layer of the GANC is communicatively coupled to the IPSec layer of the UE,
wherein the direct coupling of the GTP-U protocol layer of the GANC to the GTP-U protocol layer of the SGSN avoids going through the GGSN,
wherein the GANC (i) terminates a Up interface GTP-U tunnel between the UE and the GANC and (ii) terminates an Iu-ps interface GTP-U tunnel between the SGSN and the GANC, and
wherein the Up interface GTP-U tunnel and the Iu-ps interface GTP-U tunnel are separate tunnels.

18. The communication system of claim 17, wherein the GANC relays packet switched (PS) user data between the Up interface GTP-U tunnel and the Iu-ps interface GTP-U tunnel.

19. The communication system of claim 17, wherein user data is carried transparently between the UE and the core network through the SGSN to the GGSN.

20. A generic access network controller (GANC) of a generic access network (GAN), the GANC for communicatively coupling a user equipment (UE) to a core network of a communication system through a universal mobile telecommunication system (UMTS) terrestrial radio access network (UTRAN) Iu interface, wherein the core network comprises a serving general packet radio service (GPRS) support node (SGSN) and a gateway GPRS support node (GGSN) communicatively coupled to the SGSN, the GANC comprising:
a) a user datagram protocol (UDP) layer for communicatively coupling to a UDP protocol layer of the UE;
b) a GPRS tunnelling protocol (GTP-U) protocol layer over said UDP protocol layer of the GANC for (i) communicatively coupling to a GTP-U protocol layer of the UE, the GTP-U protocol layer of the UE being over the UDP protocol layer of the UE, and for (ii) directly coupling to a GTP-U protocol layer of the SGSN, the GTP-U protocol layer of the SGSN being over a UDP protocol layer of the SGSN;

c) a remote Internet Protocol (IP) layer below the UDP protocol layer of the GANC for communicatively coupling to a remote IP layer of the UE, the remote IP layer of the UE being below the UDP protocol layer of the UE; and d) an IPSec layer below the remote IP layer of the GANC for communicatively coupling to an IPSec layer of the UE, the IPSec layer of the UE being below the remote IP layer of the UE, wherein the direct coupling of the GTP-U protocol layer of the GANC to the GTP-U protocol layer of the SGSN avoids going through the GGSN.

21. The GANC of claim 20 further comprising:

a transport IP protocol layer below said IPSec layer of the GANC for communicatively coupling to a transport IP protocol layer of the UE through a transport IP protocol layer of a generic IP network; and a set of access protocol layers below said transport IP protocol layer of the GANC for communicatively coupling to a set of access protocol layers of the UE through a set of access protocol layers of the generic IP network.

22. The GANC of claim 20 further comprising:

a) a Up interface GTP-U tunnel between the UE and the GANC, wherein the Up interface GTP-U tunnel is terminated at the GANC; and b) an Iu-ps interface GTP-U tunnel between the SGSN and the GANC, wherein the Iu-ps interface GTP-U tunnel is terminated at the GANC.

23. The GANC of claim 22, wherein the GANC relays packet switched (PS) user data between the Up interface GTP-U tunnel and the Iu-ps interface GTP-U tunnel.

* * * * *